(12) United States Patent
Joao

(10) Patent No.: US 12,694,460 B2
(45) Date of Patent: *Jul. 28, 2026

(54) DISTRIBUTED LEDGER AND BLOCKCHAIN TECHNOLOGY-BASED RECRUITMENT, JOB SEARCHING AND/OR PROJECT SEARCHING, SCHEDULING, AND/OR ASSET TRACKING AND/OR MONITORING, AND/OR INTELLECTUAL PROPERTY COMMERCIALIZATION, APPARATUS AND METHOD

(71) Applicant: Raymond Anthony Joao, Yonkers, NY (US)

(72) Inventor: Raymond Anthony Joao, Yonkers, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/045,771

(22) Filed: Feb. 5, 2025

(65) Prior Publication Data

US 2025/0182228 A1 Jun. 5, 2025

Related U.S. Application Data

(63) Continuation of application No. 17/498,804, filed on Oct. 12, 2021, now Pat. No. 12,260,466, which is a
(Continued)

(51) Int. Cl.
G06Q 50/18 (2012.01)
G06Q 10/0631 (2023.01)
G06Q 10/1053 (2023.01)

(52) U.S. Cl.
CPC ..... *G06Q 50/184* (2013.01); *G06Q 10/06315* (2013.01); *G06Q 10/1053* (2013.01)

(58) Field of Classification Search
CPC ........... G06Q 50/184; G06Q 10/06315; G06Q 10/1053
See application file for complete search history.

(56) References Cited

FOREIGN PATENT DOCUMENTS

GB 2574866 A * 12/2019 ......... G06Q 10/1053

OTHER PUBLICATIONS

Sedgwick, M., & Spiers, J. The Use of Videoconferencing as a Medium for the Qualitative Interview. 2009. International Journal of Qualitative Methods, 8(1), 1-11. (Year: 2009).*

* cited by examiner

*Primary Examiner* — Sarah M Monfeldt
*Assistant Examiner* — Karma A El-Chanti
(74) *Attorney, Agent, or Firm* — Raymond A. Joao, Esq.

(57) ABSTRACT

A computer-implemented method, including using a central processing computer programmed to process recruitment, job searching, project searching, or scheduling, information, regarding a job or project related to a commercialization or monetization activity regarding an intellectual property; and a distributed ledger and blockchain technology system, transmitting, from an electronic forum from the central processing computer to a user device; receiving, with the central processing computer, information for engaging in a recruitment, job searching, project searching, or scheduling, activity, in or via the electronic forum; providing a videoconference call between the individual and an employer or hiring entity or between the individual and a job applicant; generating, with the central processing computer, an electronic forum report containing information regarding an activity or activities of the individual in or during the electronic forum; and storing the electronic forum report in the distributed ledger and blockchain technology system.

20 Claims, 20 Drawing Sheets

Related U.S. Application Data continuation-in-part of application No. 17/218,202, filed on Mar. 31, 2021, now Pat. No. 12,333,500.

(60) Provisional application No. 63/118,762, filed on Nov. 27, 2020, provisional application No. 63/026,005, filed on May 16, 2020.

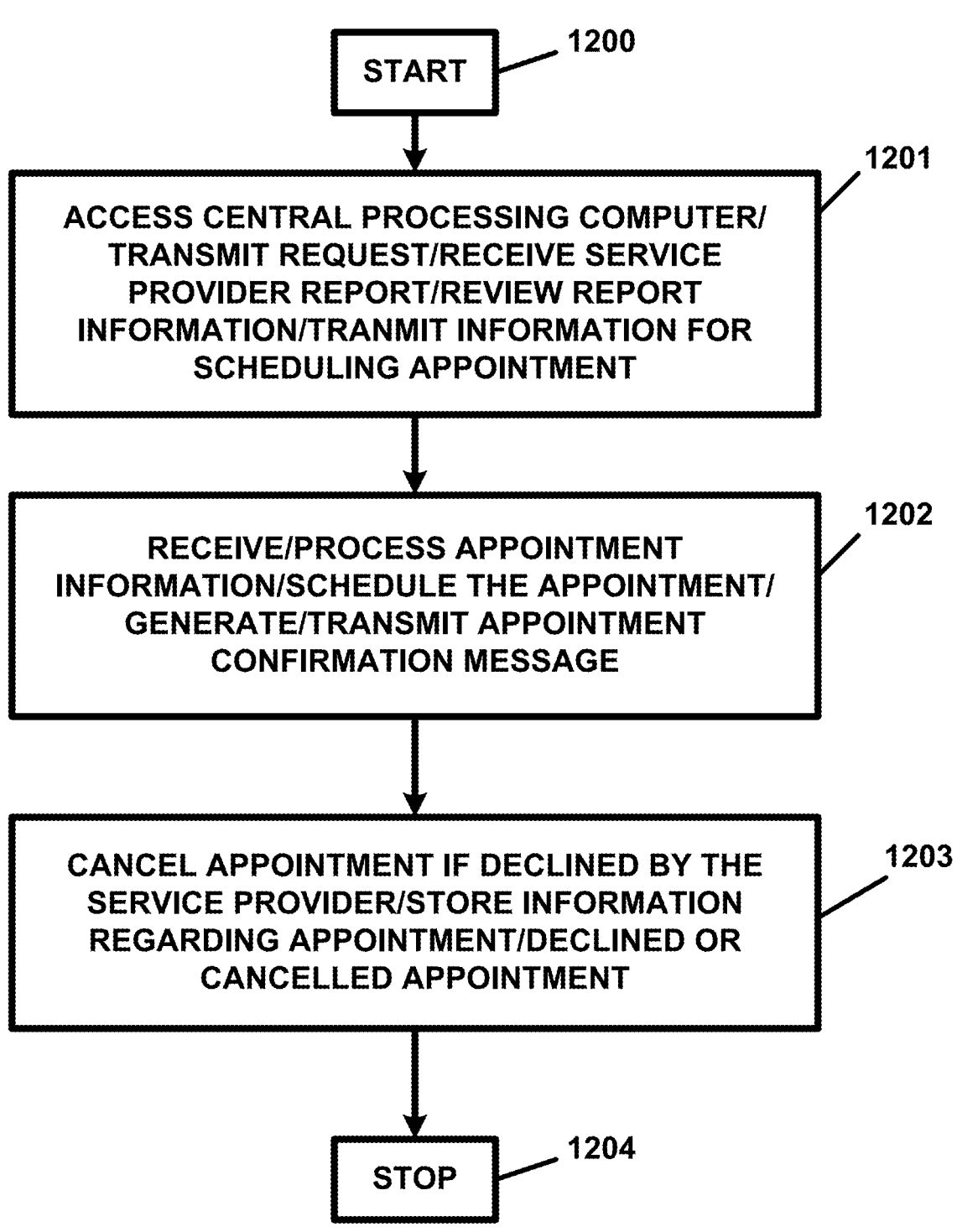

START — 1200

ACCESS CENTRAL PROCESSING COMPUTER/
TRANSMIT REQUEST/RECEIVE SERVICE
PROVIDER REPORT/REVIEW REPORT
INFORMATION/TRANMIT INFORMATION FOR
SCHEDULING APPOINTMENT — 1201

RECEIVE/PROCESS APPOINTMENT
INFORMATION/SCHEDULE THE APPOINTMENT/
GENERATE/TRANSMIT APPOINTMENT
CONFIRMATION MESSAGE — 1202

CANCEL APPOINTMENT IF DECLINED BY THE
SERVICE PROVIDER/STORE INFORMATION
REGARDING APPOINTMENT/DECLINED OR
CANCELLED APPOINTMENT — 1203

STOP — 1204

FIG. 12

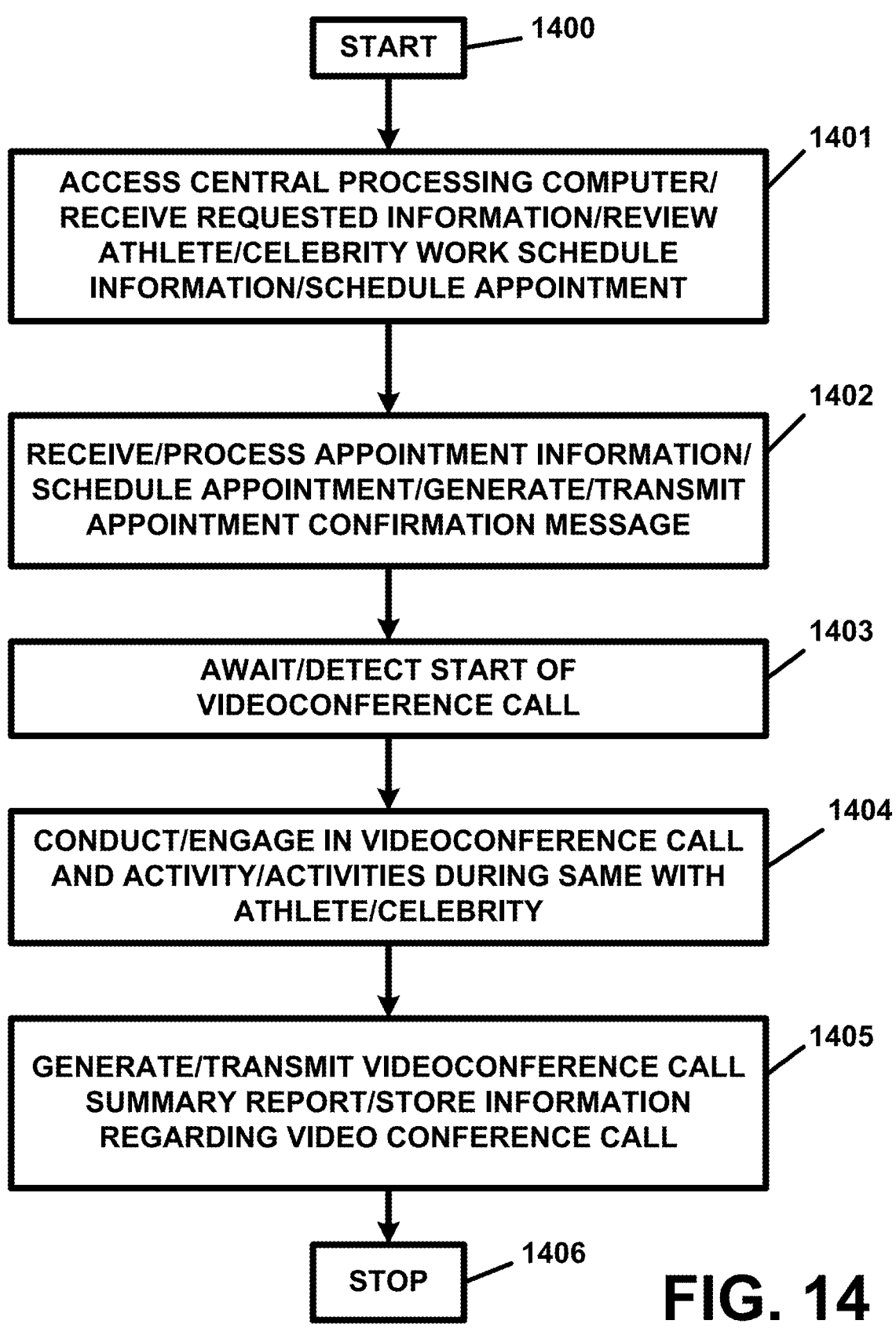

START — 1400

ACCESS CENTRAL PROCESSING COMPUTER/
RECEIVE REQUESTED INFORMATION/REVIEW
ATHLETE/CELEBRITY WORK SCHEDULE
INFORMATION/SCHEDULE APPOINTMENT — 1401

RECEIVE/PROCESS APPOINTMENT INFORMATION/
SCHEDULE APPOINTMENT/GENERATE/TRANSMIT
APPOINTMENT CONFIRMATION MESSAGE — 1402

AWAIT/DETECT START OF
VIDEOCONFERENCE CALL — 1403

CONDUCT/ENGAGE IN VIDEOCONFERENCE CALL
AND ACTIVITY/ACTIVITIES DURING SAME WITH
ATHLETE/CELEBRITY — 1404

GENERATE/TRANSMIT VIDEOCONFERENCE CALL
SUMMARY REPORT/STORE INFORMATION
REGARDING VIDEO CONFERENCE CALL — 1405

STOP — 1406

FIG. 14

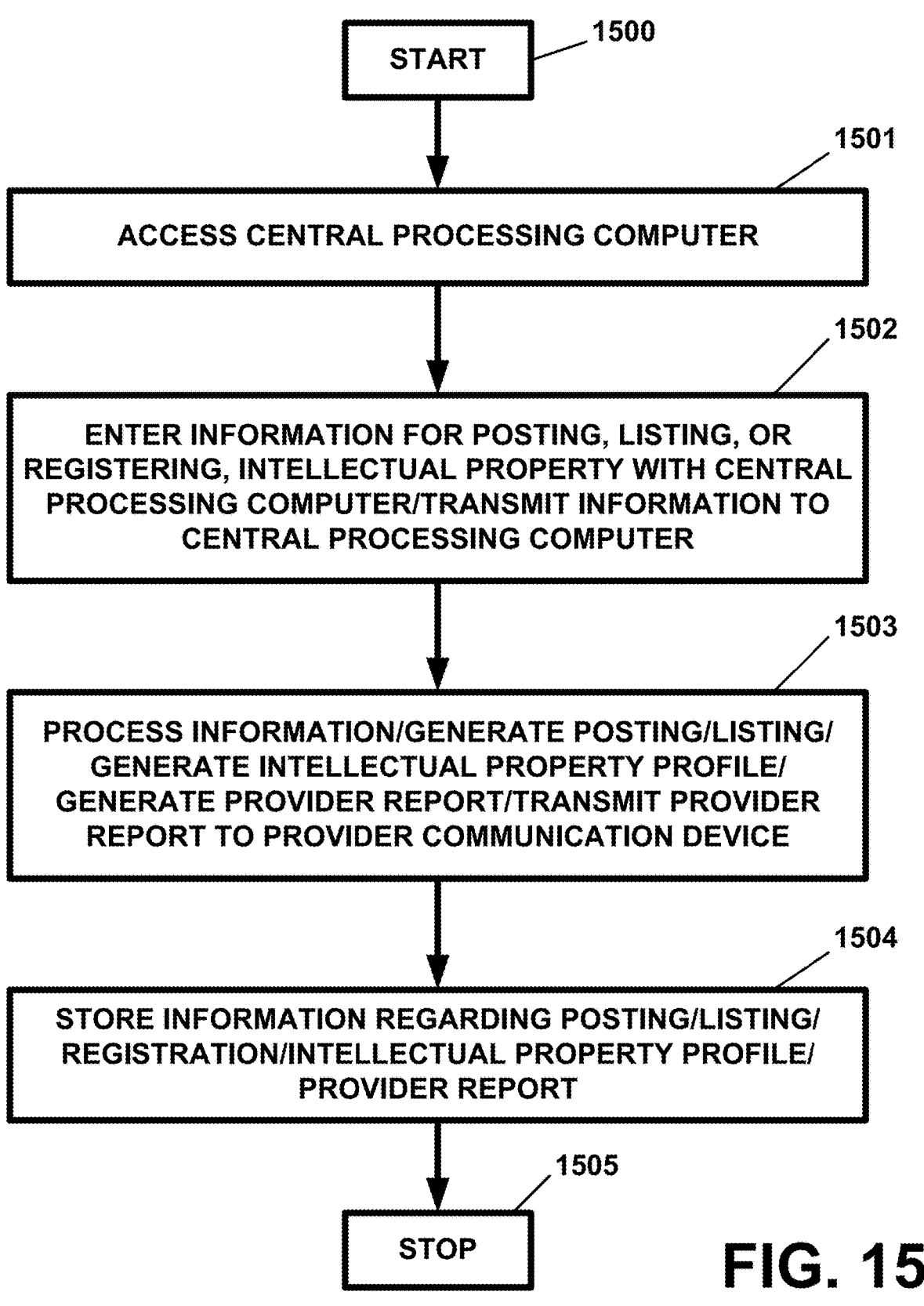

START 1500

ACCESS CENTRAL PROCESSING COMPUTER 1501

ENTER INFORMATION FOR POSTING, LISTING, OR REGISTERING, INTELLECTUAL PROPERTY WITH CENTRAL PROCESSING COMPUTER/TRANSMIT INFORMATION TO CENTRAL PROCESSING COMPUTER 1502

PROCESS INFORMATION/GENERATE POSTING/LISTING/ GENERATE INTELLECTUAL PROPERTY PROFILE/ GENERATE PROVIDER REPORT/TRANSMIT PROVIDER REPORT TO PROVIDER COMMUNICATION DEVICE 1503

STORE INFORMATION REGARDING POSTING/LISTING/ REGISTRATION/INTELLECTUAL PROPERTY PROFILE/ PROVIDER REPORT 1504

STOP 1505

FIG. 15

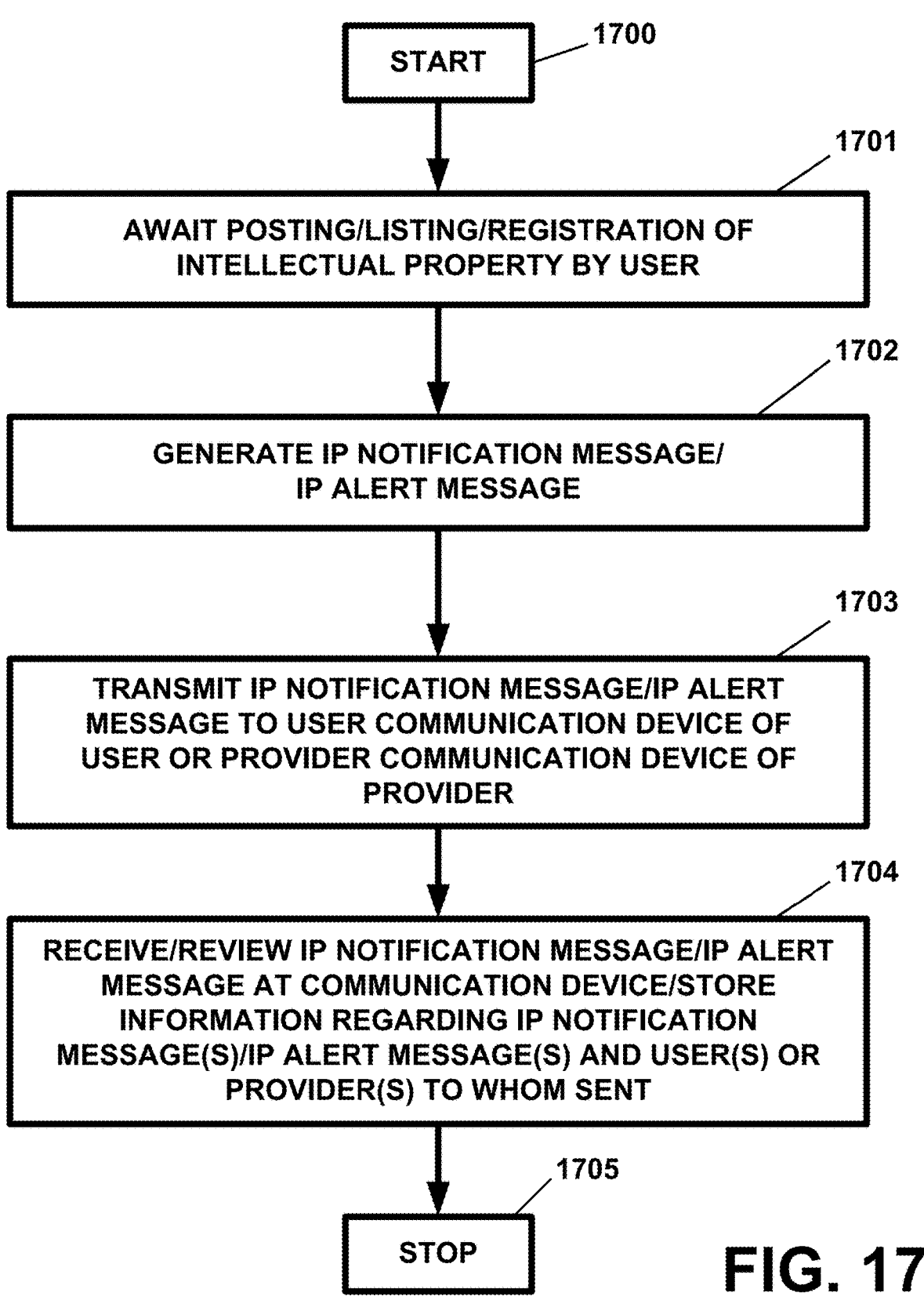

START —1700

AWAIT POSTING/LISTING/REGISTRATION OF
INTELLECTUAL PROPERTY BY USER —1701

GENERATE IP NOTIFICATION MESSAGE/
IP ALERT MESSAGE —1702

TRANSMIT IP NOTIFICATION MESSAGE/IP ALERT
MESSAGE TO USER COMMUNICATION DEVICE OF
USER OR PROVIDER COMMUNICATION DEVICE OF
PROVIDER —1703

RECEIVE/REVIEW IP NOTIFICATION MESSAGE/IP ALERT
MESSAGE AT COMMUNICATION DEVICE/STORE
INFORMATION REGARDING IP NOTIFICATION
MESSAGE(S)/IP ALERT MESSAGE(S) AND USER(S) OR
PROVIDER(S) TO WHOM SENT —1704

STOP —1705

FIG. 17

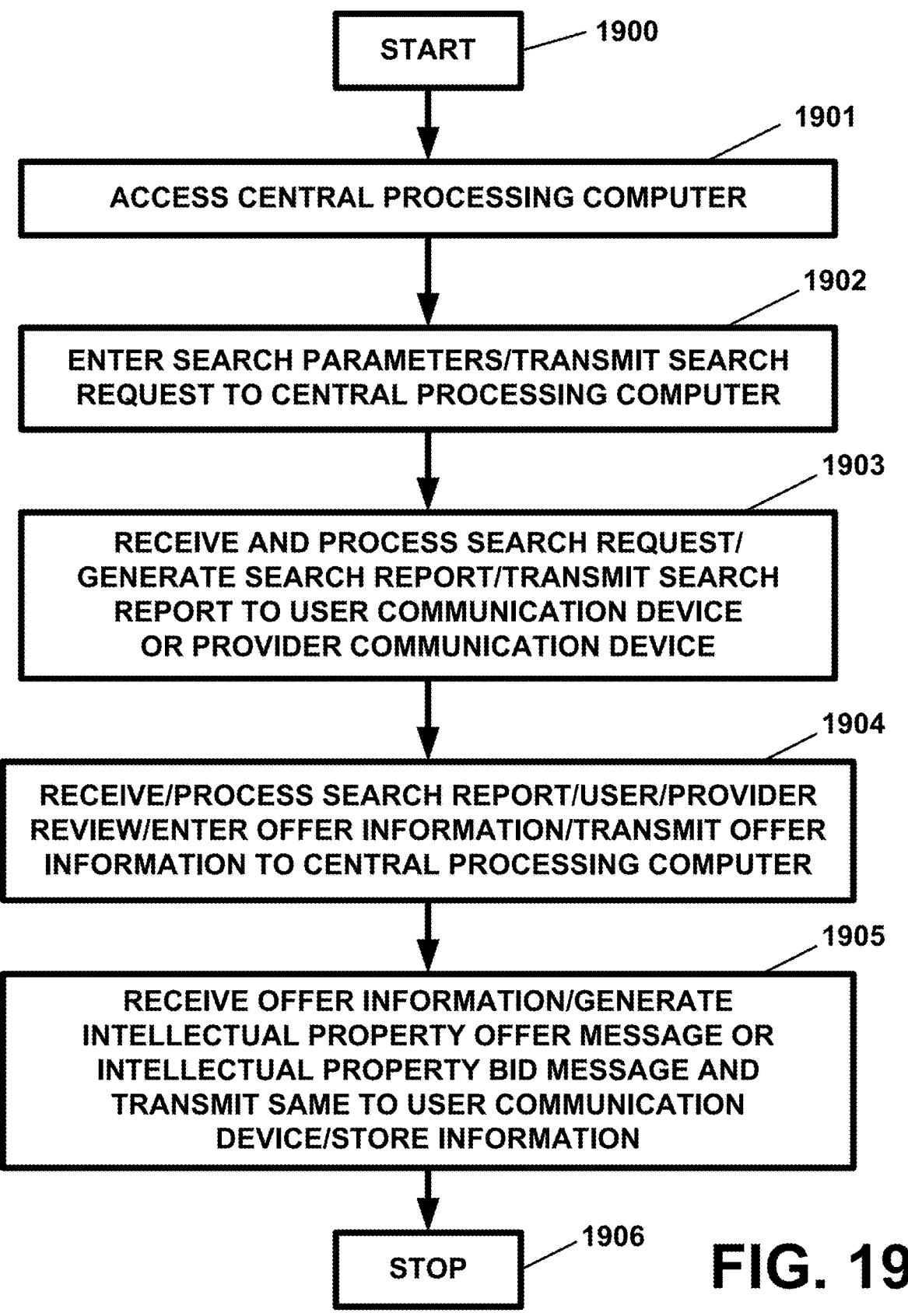

START — 1900

ACCESS CENTRAL PROCESSING COMPUTER — 1901

ENTER SEARCH PARAMETERS/TRANSMIT SEARCH REQUEST TO CENTRAL PROCESSING COMPUTER — 1902

RECEIVE AND PROCESS SEARCH REQUEST/ GENERATE SEARCH REPORT/TRANSMIT SEARCH REPORT TO USER COMMUNICATION DEVICE OR PROVIDER COMMUNICATION DEVICE — 1903

RECEIVE/PROCESS SEARCH REPORT/USER/PROVIDER REVIEW/ENTER OFFER INFORMATION/TRANSMIT OFFER INFORMATION TO CENTRAL PROCESSING COMPUTER — 1904

RECEIVE OFFER INFORMATION/GENERATE INTELLECTUAL PROPERTY OFFER MESSAGE OR INTELLECTUAL PROPERTY BID MESSAGE AND TRANSMIT SAME TO USER COMMUNICATION DEVICE/STORE INFORMATION — 1905

STOP — 1906

FIG. 19

DISTRIBUTED LEDGER AND BLOCKCHAIN TECHNOLOGY-BASED RECRUITMENT, JOB SEARCHING AND/OR PROJECT SEARCHING, SCHEDULING, AND/OR ASSET TRACKING AND/OR MONITORING, AND/OR INTELLECTUAL PROPERTY COMMERCIALIZATION, APPARATUS AND METHOD

RELATED APPLICATIONS

This application is a continuation application of U.S. patent application Ser. No. 17/498,804, filed Oct. 12, 2021, and entitled "DISTRIBUTED LEDGER AND BLOCK-CHAIN TECHNOLOGY-BASED RECRUITMENT, JOB SEARCHING AND/OR PROJECT SEARCHING, SCHEDULING, AND/OR ASSET TRACKING AND/OR MONITORING, AND/OR INTELLECTUAL PROPERTY COMMERCIALIZATION, APPARATUS AND METHOD", the subject matter and teachings of which are hereby incorporated by reference herein in their entirety, which application is a continuation-in-part application of U.S. patent application Ser. No. 17/218,202, filed Mar. 31, 2021, and entitled "DISTRIBUTED LEDGER AND BLOCKCHAIN TECHNOLOGY-BASED RECRUIT-MENT, JOB SEARCHING AND/OR PROJECT SEARCH-ING, SCHEDULING, AND/OR ASSET TRACKING AND/OR MONITORING, APPARATUS AND METHOD", the subject matter and teachings of which are hereby incorporated by reference herein in their entirety. U.S. patent application Ser. No. 17/218,202 claims the benefit of the priority of U.S. Provisional Patent Application Ser. No. 63/026,005, filed May 16, 2020, and entitled "DISTRIB-UTED LEDGER AND BLOCKCHAIN TECHNOLOGY-BASED RECRUITMENT, JOB SEARCHING AND/OR PROJECT SEARCHING, SCHEDULING, AND/OR ASSET TRACKING AND/OR MONITORING, APPARA-TUS AND METHOD", the subject matter and teachings of which are hereby incorporated by reference herein in their entirety. U.S. patent application Ser. No. 17/498,804 claims the benefit of the priority of U.S. Provisional Patent Appli-cation Ser. No. 63/118,762, filed Nov. 27, 2020, and entitled "DISTRIBUTED LEDGER AND BLOCKCHAIN TECH-NOLOGY-BASED RECRUITMENT, JOB SEARCHING AND/OR PROJECT SEARCHING, SCHEDULING, AND/OR ASSET TRACKING AND/OR MONITORING, AND/OR INTELLECTUAL PROPERTY COMMERCIALIZA-TION, APPARATUS AND METHOD", the subject matter and teachings of which are hereby incorporated by reference herein in their entirety.

FIELD OF THE INVENTION

The present invention pertains to a distributed ledger and blockchain technology-based recruitment, job searching and/or project searching, scheduling, and/or asset tracking and/or monitoring, and/or intellectual property commercial-ization, apparatus and method and, in particular, the present invention pertains to a distributed ledger and blockchain technology-based recruitment, job searching and/or project searching, scheduling, and/or asset tracking and/or monitor-ing, apparatus and method which can provide for enhanced transparency and/or security for, in, or regarding, various recruitment activities, job searching and/or project searching activities, and/or scheduling activities, and/or which can provide for the tracking, monitoring, and/or authentication, of assets, digital or otherwise.

BACKGROUND OF THE INVENTION

There can be no doubt that individuals, independent contractors, and/or freelancers, can expend great efforts, and a great deal of time, in searching for, and in securing permanent, temporary, or other, jobs or other employment relationships, contract work opportunities and/or indepen-dent contracting opportunities, and/or work and/or freelance projects, opportunities, or assignments. These individuals, independent contractors, and/or freelancers, have been known to turn to employment agencies, recruiters, on-line recruitment websites, company websites, and/or other indi-viduals, websites, or entities, in seeking and/or in applying for work, a job, an independent contractor project, a free-lance project or assignment, or any other employment or work-related relationship or situation.

Employers and/or hiring entities, of any and/or all types or kinds, also need or require a satisfactory workforce in order to meet the demands of doing business. In this regard, employers and/or hiring entities very often need to find and/or recruit new employees, replace former employees, find employees with new skills to meet their business needs, and/or obtain the services of temporary workers, indepen-dent contractors, and/or freelancers. These employers or hiring entities have also been known to employment agen-cies, recruiters, on-line recruitment websites, and/or other individuals, websites, or entities, in order to attempt to meet their needs.

While the use of on-line recruitment websites and/or on-line job searching websites might appear to be best equipped to allow individuals, independent contractors, and/or freelancers, to find or to locate job, project, or other work, opportunities, with employers or hiring entities, and vice versa, these on-line recruitment websites and/or on-line job searching websites do not appear to yield positive results in many instances. For example, it is not uncommon for individuals to expend a great amount of time and effort in searching for, in identifying, and/or in applying for, a job or work opportunity with an employer or hiring entity, only to never hear back, one way or another, from that employer or hiring entity. Such efforts typically entail time consuming efforts in submitting a resume and/or in filling out a job application. The same holds true for those individuals who apply for a job or position directly on an employer's website. Notwithstanding the time involved in job or project appli-cants filling out a sometimes lengthy job or employment application, in many instances, these job or project appli-cants never hear back from, or receive any substantive feedback from, those employers or hiring entities to whom they have submitted an application.

There can be no doubt that the above-described on-line recruitment websites and/or on-line job searching websites, of the various and/or respective on-line recruitment compa-nies or employers or hiring entities, lack the needed and/or desired transparency and accountability to those numerous individuals, independent contractors, and/or freelancers, who seek to secure permanent, temporary, or other, jobs or other employment relationships, contract work opportunities and/or independent contracting opportunities, and/or work and/or freelance projects, opportunities, or assignments.

It is submitted that the herein-described individuals, inde-pendent contractors, and/or freelancers, and the herein-described employers and/or hiring entities would be much better served by a system which overcomes the shortcomings of the herein-described prior art systems.

Many individuals also dream of inventing that new invention, dreaming up that new idea, or creating that new creation, which will enable them to achieve financial independence, achieve wealth, become famous, gain recognition, or solve a problem or problems which can help others or which can help society, people, or the environment. Individuals can spend a great deal of time and money, and/or can wait years, in order to protect that new invention, that new idea, or that new creation, only to find out that they lack the resources, the money or the capital, or the expertise to commercialize, develop, market, sell, transfer, license, or monetize, same. While some individuals are fortunate enough to have access to the needed resources, the needed money or capital, or the needed expertise, to commercialize, develop, market, sell, transfer, license, or monetize, their inventions, ideas, or creations, the vast majority of individuals lack access to these resources, money or capital, or expertise.

There is also a need to provide safeguards and/or security for and regarding transactions which can occur between individuals attempting to commercialize, develop, market, sell, transfer, license, or monetize, their inventions, ideas, or creations, and those persons or entities with whom they might attempt to do business. There is also a need to provide safeguards and/or security for individuals attempting to commercialize, develop, market, sell, transfer, license, or monetize, their inventions, ideas, or creations, as well as for the their respective subject inventions, ideas, and/or creations.

While official or governmental filing offices or invention, idea, or new creation, submission companies or entities can or may offer some guidance and/or assistance to some individuals for allowing them to obtain intellectual property to protect their invention, idea, or new creation, these official or governmental filing offices or invention, idea, or new creation, submission companies or entities fall far short when it comes to providing the vast majority of individuals with the guidance, money or capital, assistance, or expertise, or with any introduction to same or access to same, which is needed in order to enable or allow these individuals to commercialize, develop, market, sell, transfer, license, litigate, enforce, or monetize, their intellectual property.

SUMMARY OF THE INVENTION

The present invention pertains to a distributed ledger and blockchain technology-based recruitment, job searching and/or project searching, scheduling, and/or asset tracking and/or monitoring, and/or intellectual property commercialization, apparatus and method and, in particular, the present invention pertains to a distributed ledger and blockchain technology-based recruitment, job searching and/or project searching, scheduling, and/or asset tracking and/or monitoring, apparatus and method which can provide for enhanced transparency and/or security for, in, or regarding, various recruitment activities, job searching and/or project searching activities, and/or scheduling activities, and/or which can provide for the tracking, monitoring, and/or authentication, of assets, digital or otherwise, which overcomes the shortcomings of the prior art.

The present invention can be utilized in numerous types and/or kinds of recruitment applications, on-line recruitment or on-line recruiting applications, on-line job searching applications, on-line scheduling applications, and/or in numerous applications involving or relating to the tracking, monitoring, and/or authentication of, assets, digital or otherwise, and/or consideration of all types or kinds.

The present invention can be utilized by an individual, an independent contractor, or a freelancer, to find and apply for a job, project, or assignment, of any kind or type, and allow the respective individual, independent contractor, or freelancer, to be kept appraised as to when and how his or her application is being, or has been, considered by an employer or hiring entity as well as the status of, or a decision, regarding the same.

The present invention can also be utilized by an employer or hiring entity to reach out to an individual, an independent contractor, or a freelancer, regarding a request for a proposal ("RFP"), request for bid ("RFB"), or an offer of employment or an offer to perform a job, project, or assignment, and to be kept appraised as to when and how his, her, or its, respective request or offer is being, or has been, considered by the individual, independent contractor, or freelancer, as well as the status of, or a decision, regarding the same.

The present invention can be utilized by an individual, an independent contractor, or a freelancer, to schedule an appointment with an employer or hiring entity, or can be utilized by an employer or hiring entity to schedule an appointment with any individual, independent contractor, freelancer, athlete, former athlete, celebrity, or any other person.

The present invention can also be utilized by any individual, independent contractor, or freelancer, described herein, or can be utilized by any employer or hiring entity, in order to track, monitor, and/or authenticate, any type or kind of asset(s), digital asset(s), and/or consideration or digital consideration, which be exchanged between, or which might otherwise be transferred between, or exchanged between, any of the users of the present invention.

The present invention can be utilized in connection with a distributed ledger and blockchain technology system to provide a secured record keeping system of and for any other information and/or data processed and/or stored by the present invention in any and/or all of the embodiments described herein or otherwise.

The apparatus of the present invention includes a central processing computer and distributed ledger and Blockchain technology system (hereinafter referred to as "central processing computer/distributed ledger/Blockchain technology system"). The central processing computer/distributed ledger/Blockchain technology system can include a central processing computer or central processing computer system and a distributed ledger and Blockchain technology system. The central processing computer can be any computer or computer system or can be any server computer or any computer or computer system which can be used in a communication network. Any number of central processing computers can be utilized in conjunction with, or in connection, with the present invention.

The central processing computer can provide control over the apparatus and can perform any of the various processing services and/or functions described herein as being performed by the present invention. The central processing computer may be a single computer or system of computers and/or may include a plurality of computers or computer systems which are utilized in conjunction with one another. The central processing computer can also provide services for any of the other communications devices and/or computers and/or computer systems described herein as being associated with any of the users, individuals, persons, or entities, who or which utilize the present invention.

The apparatus also includes a user communication device or computer (hereinafter referred to as "user communication device") which is associated with, or which can be used by, any one or more of any of the herein-described users, individuals, persons, or entities, who or which utilize the present invention.

Any number of user communication devices can be utilized by, or can be associated with, each of the users, individuals, persons, or entities, who or which utilize the present invention. The user communication device can be any communication device, computer, personal computer, laptop computer, notebook computer, Smart phone or smartphone, smart telephone, cellular telephone, personal digital assistant, wireless telephone, wireless communication device, tablet, tablet computer, watch, smart watch, or wearable device or computer, or any combination of same, or any equivalent of same, which can be utilized by any user, individual, person, or entity, who or which utilizes the present invention. The user communication device can also be a server computer, a mainframe computer, a mini-computer, a microcomputer, or any other computer or device for suiting the needs of the particular user. The user communication device can also be any device or computer, or a kiosk, that can be located at public places or locations or which can also be publicly available. Any number of user communication devices can be utilized in conjunction with, or in connection with, the present invention.

The user communication device(s) can communicate with, and/or can operate in conjunction with, the central processing computer/distributed ledger/Blockchain technology system and/or any of the other communication devices, computers, and/or computer systems, described herein as being associated with, or used by, any of the users, individuals, persons, or entities, who or which utilize the present invention.

The apparatus also includes an employer or hiring entity communication device or computer (hereinafter referred to as "employer communication device") which is associated with, or which can be used by, any one or more of any of the herein-described employers or hiring entities who or which utilize the present invention.

Any number of employer communication devices can be utilized by, or can be associated with, each of the employers or hiring entities who or which utilize the present invention. The employer communication device can be any communication device, computer, personal computer, laptop computer, notebook computer, Smart phone or smartphone, smart telephone, cellular telephone, personal digital assistant, wireless telephone, wireless communication device, tablet, tablet computer, watch, smart watch, or wearable device or computer, or any combination of same, or any equivalent of same, which can be utilized by any employer or hiring entity who or which utilizes the present invention. The employer communication device can also be a server computer, a mainframe computer, a mini-computer, a microcomputer, or any other computer or device for suiting the needs of the particular user. The employer communication device can also be any device or computer, or a kiosk, that can be located at public places or locations or which can also be publicly available. Any number of employer communication devices can be utilized in conjunction with, or in connection with, the present invention.

The employer communication device(s) can communicate with, and/or can operate in conjunction with, the central processing computer/distributed ledger/Blockchain technology system and/or any of the other communication devices, computers, and/or computer systems, described herein as being associated with, or used by, any of the users, individuals, persons, or entities, who or which utilize the present invention.

The apparatus also includes a counterparty communication device or computer (hereinafter referred to as "counterparty communication device") which is associated with, or which can be used by, any one or more of any of the herein-described counterparties who or which utilize the present invention.

Any number of employer communication devices can be utilized by, or can be associated with, each of the counterparties who or which utilize the present invention. The counterparty communication device can be any communication device, computer, personal computer, laptop computer, notebook computer, Smart phone or smartphone, smart telephone, cellular telephone, personal digital assistant, wireless telephone, wireless communication device, tablet, tablet computer, watch, smart watch, or wearable device or computer, or any combination of same, or any equivalent of same, which can be utilized by any counterparty who or which utilizes the present invention. The counterparty communication device can also be a server computer, a mainframe computer, a mini-computer, a microcomputer, or any other computer or device for suiting the needs of the particular user. The counterparty communication device can also be any device or computer, or a kiosk, that can be located at public places or locations or which can also be publicly available. Any number of counterparty communication devices can be utilized in conjunction with, or in connection with, the present invention.

The counterparty communication device(s) can communicate with, and/or can operate in conjunction with, the central processing computer/distributed ledger/Blockchain technology system and/or any of the other communication devices, computers, and/or computer systems, described herein as being associated with, or used by, any of the users, individuals, persons, or entities, who or which utilize the present invention.

The apparatus also includes a media provider or content provider communication device or computer (hereinafter referred to as "media/content provider computer") which is associated with, or which can be used by, any one or more of any of the herein-described media providers or content providers who or which can utilize the present invention in order to provide or distribute its/their respective media or content to any of the herein-described users, individuals, persons, or entities, who or which utilize the present invention.

Any number of media/content provider computers can be utilized by, or can be associated with, each of the respective media providers or content providers who or which utilize the present invention. The media/content provider computer can be any communication device, computer, personal computer, laptop computer, notebook computer, Smart phone or smartphone, smart telephone, cellular telephone, personal digital assistant, wireless telephone, wireless communication device, tablet, tablet computer, watch, smart watch, or wearable device or computer, or any combination of same, or any equivalent of same, which can be utilized by any media provider or content provider who or which utilizes the present invention. The media/content provider computer can also be a server computer, a mainframe computer, a mini-computer, a microcomputer, or any other computer or device for suiting the needs of the particular user. The media/content provider computer can also be any device or computer, or a kiosk, that can be located at public places or locations or which can also be publicly available. Any number of media/content provider computers can be utilized in conjunction with, or in connection with, the present invention.

The media/content provider computer(s) can communicate with, and/or can operate in conjunction with, the central processing computer/distributed ledger/Blockchain technology system and/or any of the other communication devices, computers, and/or computer systems, described herein as being associated with, or used by, any of the users, individuals, persons, or entities, who or which utilize the present invention.

The apparatus also includes a digital assets/records storage computer which is associated with, or which can be used by, any one or more of any of the herein-described digital assets/records storage providers, which can provide services for or regarding the storage and/or the safeguarding of or for digital assets and/or information regarding same, and/or of or for records and/or information regarding the same, who or which can utilize the present invention.

Any number of digital assets/records storage computers can be utilized by, or can be associated with, each of the respective digital assets/records storage providers who or which utilize the present invention. The digital assets/records storage computer can be any communication device, computer, personal computer, laptop computer, notebook computer, Smart phone or smartphone, smart telephone, cellular telephone, personal digital assistant, wireless telephone, wireless communication device, tablet, tablet computer, watch, smart watch, or wearable device or computer, or any combination of same, or any equivalent of same, which can be utilized by any digital assets/records storage provider who or which utilizes the of the present invention. The digital assets/records storage computer can also be a server computer, a mainframe computer, a mini-computer, a microcomputer, or any other computer or device for suiting the needs of the particular user. The digital assets/records storage computer can also be any device or computer, or a kiosk, that can be located at public places or locations or which can also be publicly available. Any number of digital assets/records storage computers can be utilized in conjunction with, or in connection with, the present invention.

The digital assets/records storage computer(s) can communicate with, and/or can operate in conjunction with, the central processing computer/distributed ledger/Blockchain technology system and/or any of the other communication devices, computers, and/or computer systems, described herein as being associated with, or used by, any of the users, individuals, persons, or entities, who or which utilize the present invention.

The apparatus also includes an educational facility or instructional facility communication device or computer (hereinafter referred to as "educational/instructional provider computer") which is associated with, or which can be used by, any one or more of any of the herein-described individuals, instructional facilities, educational facilities, training facilities, gyms, health clubs, country clubs, fitness centers, wellness centers, athletic training centers or facilities, physical education schools, centers, or programs, martial arts schools, exercise schools or centers, schools, colleges, universities, trade schools, tutors, and/or instructors, who or which provide instruction, classes, courses, or training, of any type or kind, who or which utilize the present invention.

Any number of educational/instructional provider computers can be utilized by, or in conjunction with, any individual, instructional facility, educational facility, training facility, gym, health club, country club, fitness center, wellness center, athletic training center or facility, physical education school, center, or program, martial arts school, exercise school or center, school, college, university, trade school, tutor, and/or instructor, or any group of same or combination of same, described herein, who or which utilize the present invention (hereinafter referred to interchangeably as an "educational provider" or as an "instructional provider").

The educational/instructional provider computer can be any communication device, computer, personal computer, laptop computer, notebook computer, Smart phone or smartphone, smart telephone, cellular telephone, personal digital assistant, wireless telephone, wireless communication device, tablet, tablet computer, watch, smart watch, or wearable device or computer, or any combination of same, or any equivalent of same, which can be utilized by any of the herein-described educational providers or instructional providers. The educational/instructional provider computer can also be a server computer, a mainframe computer, a mini-computer, a microcomputer, or any other computer or device for suiting the needs of the particular user. The educational/instructional provider computer can also be any device or computer, or a kiosk, that can be located at public places or locations or which can also be publicly available. Any number of educational/instructional provider computers can be utilized in conjunction with, or in connection with, the present invention.

The educational/instructional provider computer(s) can communicate with, and/or can operate in conjunction with, the central processing computer/distributed ledger/Blockchain technology system and/or any of the other communication devices, computers, and/or computer systems, described herein as being associated with, or used by, any of the users, individuals, persons, or entities, who or which utilize the present invention.

The apparatus can also include a social networking computer. The social networking computer can be linked with, and utilized in connection with, the apparatus so as to allow and/or facilitate integrating the present invention with social networks and social media. The social networking computer can be associated with a social networking company, a social networking website, or social networking entity, website, group, organization, or association. The social networking computer can be associated with any one or any number of social networking companies, social networking websites, or social networking entities, websites, groups, organizations, or associations. The social networking computer can also provide links to any computers associated with any one or any number of social networking companies, social networking websites, or social networking entities, websites, groups, organizations, or associations. The social networking computer can perform any and all of the functions performed by any social networking company, a social networking website, or social networking entity, website, group, organization, or association. Any number of social networking computers can be utilized in connection with the present invention. Any number of social networking computers can be utilized by or in conjunction with any social network or social networking provider who or which utilizes the present invention.

The social networking computer can be a server computer, a personal computer, a mainframe computer, a mini-computer, a microcomputer, or any other computer or device for suiting the needs of the particular social network or social networking provider. The social networking computer can also be any communication device, computer, personal computer, laptop computer, notebook computer, Smart phone or smartphone, smart telephone, cellular telephone, personal digital assistant, wireless telephone, wireless communication device, tablet, tablet computer, watch, smart watch, or wearable device or computer, or any combination of same, or any equivalent of same, which can be utilized by any social network or social networking provider who or which utilizes the present invention. The social networking computer can also be any device or computer, or a kiosk, that can be located at public places or locations or which can also be publicly available. Any number of social networking computers can be utilized in conjunction with, or in connection with, the present invention.

The social networking computer(s) can communicate with, and/or can operate in conjunction with, the central processing computer/distributed ledger/Blockchain technology system and/or any of the other communication devices, computers, and/or computer systems, described herein as being associated with, or used by, any of the users, individuals, persons, or entities, who or which utilize the present invention.

The apparatus can also include any number of RFID tags/RFID reader system(s), each of which can include any number of RFID tags and RFID reader systems. The RFID tags/RFID reader system(s) can be utilized in or for any number of a variety ways as described herein and/or otherwise. The RFID tags/RFID reader system(s) can be connected to, and/or linked with, the central processing computer/distributed ledger/Blockchain technology system, using any suitable and/or appropriate wired connection, wireless connection, or any combination of same, on, via, or using, any suitable and/or appropriate communication network or any combination of communication networks.

The RFID tags/RFID reader system(s) can communicate with, and/or can operate in conjunction with, the central processing computer/distributed ledger/Blockchain technology system and/or any of the other communication devices, computers, and/or computer systems, described herein as being associated with, or used by, any of the users, individuals, persons, or entities, who or which utilize the present invention.

Any of the central processing computer(s), the user communication device(s), the employer communication device(s), the counterparty communication device(s), the media/content provider computer(s), the digital assets/records storage computer(s), the educational/instructional provider computer(s), and/or the social networking computer(s), can be any computer or communication device, including, but not limited to, a personal computer, a home computer, a server computer, a computer capable of being utilized in a network, a hand-held computer, a palmtop computer, a laptop computer, a personal communication device, a cellular telephone, a wireless telephone, wireless communication device, a mobile telephone, a digital television, an interactive television, a digital television, a personal digital assistant, a telephone, a digital telephone, a television, an interactive television, a beeper, a pager, and/or a watch or a Smart watch, and/or any wearable device, computer or communication device.

Each of the central processing computer(s), the user communication device(s), the employer communication device(s), the counterparty communication device(s), the media/content provider computer(s), the digital assets/records storage computer(s), the educational/instructional provider computer(s), and/or the social networking computer(s), can transmit information to, as well as receive information from, any of the computers or communication devices described herein. In this regard, each of the computers or communication devices can communicate with, process information transmitted from or received from, and/or share data and/or information with, each other and/or any other computer(s) or communication device(s) described herein and/or utilized in conjunction with the present invention. In this manner, any of the computer(s) or communication device(s) described herein can communicate with any other computer(s) or communication device(s) in a bi-directional manner.

The present invention can be utilized on, and/or over, the Internet and/or the World Wide Web. The present invention can also utilize wireless Internet and/or World Wide Web services, equipment and/or devices. The central processing computer(s) can have a web site or web sites associated therewith. Each of the other computers or communication devices described herein can also have a web site or web sites associated with same.

Although the Internet and/or the World Wide Web is a preferred communication system and/or medium utilized, the present invention, in any and/or all of the embodiments described herein, can also be utilized with any appropriate communication network or system including, but not limited to, a telecommunication network or system, a telephone communication network or system, a cellular communication network or system, a wireless communication network or system, a line or wired communication network or system, a wireless Internet network or system, a wireless World Wide Web network or system, a digital communication network or system, a personal communication network or system, a personal communication services (PCS) network or system, a satellite communication network or system, a broad band communication network or system, a low earth orbiting (LEO) satellite network or system, a public switched telephone network or system, a telephone communication network or system, a radio communication network or system, a cable television network or system, and/or any other communication network or system, and/or any combination of the above communication networks or systems.

Any of the central processing computer(s), the user communication device(s), the employer communication device(s), the counterparty communication device(s), the media/content provider computer(s), the digital assets/records storage computer(s), the educational/instructional provider computer(s), and/or the social networking computer(s), can communicate with one another, and/or can be linked to one another, on, over, or via, any suitable communication network, telecommunication network, telephone network, a line-connected network, and/or a wireless communication network, and/or the Internet and/or the World Wide Web. Each of the computers or communication devices described herein can be linked with any other computer or computers directly or indirectly with one another so as to facilitate a direct or indirect bi-directional communication between said respective computers or communication devices. Communications between each of the computers or communication devices described herein can also involve an e-mail server or e-mail servers in those instances when e-mails are described as being used to transmit, or to send, any of the information, signals, messages, reports, notification messages, or any other communications, described herein, by or between any of the computers or communication devices described herein, or when any of the information, signals, messages, reports, notification messages, or any other computers or communications, described herein, are transmitted by and/or between any of the parties described herein and/or by or between any of the herein-described computers or communication devices, or any other computers or communication devices, computer systems, communication network equipment, server computers, etc., or any other devices used or needed, in order to facilitate communications or the transmission of any of the herein-described information, signals, messages, reports, notification messages, or any other communications.

Each of the central processing computer(s), the user communication device(s), the employer communication device(s), the counterparty communication device(s), the media/content provider computer(s), the digital assets/records storage computer(s), the educational/instructional provider computer(s), and/or the social networking computer(s), can communicate in a bi-directional manner with, and/or can send and/or receive signals, messages, reports, notification messages, alerts, or any other communications or electronic communication transmissions, to, from, and/or between, any other, or any number of, other central processing computer(s), the user communication device(s), the employer communication device(s), the counterparty communication device(s), the media/content provider computer(s), the digital assets/records storage computer(s), the educational/instructional provider computer(s), and/or the social networking computer(s).

Each of the central processing computer(s), the user communication device(s), the employer communication device(s), the counterparty communication device(s), the media/content provider computer(s), the digital assets/records storage computer(s), the educational/instructional provider computer(s), and/or the social networking computer(s), can be linked to or with any other central processing computer(s), the user communication device(s), the employer communication device(s), the counterparty communication device(s), the media/content provider computer(s), the digital assets/records storage computer(s), the educational/instructional provider computer(s), and/or the social networking computer(s), via a wired link or line or a wireless link.

Each of the user communication device(s), the employer communication device(s), the counterparty communication device(s), the media/content provider computer(s), the digital assets/records storage computer(s), the educational/instructional provider computer(s) and/or the social networking computer(s), can be connected with, or linked with, the central processing computer(s). Each of the user communication device(s), the employer communication device(s), the counterparty communication device(s), the media/content provider computer(s), the digital assets/records storage computer(s), the educational/instructional provider computer(s), and/or the social networking computer(s), can be connected with, or linked with, the central processing computer(s) via a wired line or wired link, via a wireless line, and/or via any combination of same.

Any and/or all of the signals, messages, reports, notification messages, or any other communications, described herein as being transmitted from one device, computer, or communication device, to another, can be, or can be included in, or be attached to, an e-mail message, an instant messaging message, an electronic transmission, or an electronic data transmission or electronic data interchange, or can be transmitted via any other data or information transmission, and/or can be transmitted via or using any appropriate or necessary computer(s) or device(s).

Each of the central processing computer(s), the user communication device(s), the employer communication device(s), the counterparty communication device(s), the media/content provider computer(s), the digital assets/records storage computer(s), the educational/instructional provider computer(s), and/or the social networking computer(s), can transmit data and/or information using TCP/IP, as well as any other Internet and/or World Wide Web, and/or communication, protocols.

The present invention can utilize electronic commerce technologies and security methods, techniques and technologies, including any encryption or security technologies and/or techniques, in any and/or all of the instances of, or involving, data and/or information processing, and/or data and/or information transmission, described herein.

The central processing computer can be a computer or computer system, a server computer, a network computer, or any other communication device, which can provide the functionality of, and which can be utilized as a central processing computer, such as an Internet server computer and/or a web site server computer. The central processing computer includes a central processing unit or CPU, which can be a microprocessor. The CPU can also be a microcomputer, a minicomputer, a macro-computer, and/or a mainframe computer, depending upon the application.

The central processing computer also includes a random access memory device(s) (RAM) and a read only memory device(s) (ROM), each of which is connected to, or linked with, the CPU, and a user input device, for entering data and/or information and/or commands into the central processing computer, which can include any one or more of a keyboard, a scanner, a user pointing device, such as, for example, a mouse, a touch pad, and/or an audio input device and/or a video input device, a microphone or audio recording device, a camera or a video recording device, and/or any device, electronic and/or otherwise, which can be utilized for inputting and/or entering data and/or information and/or commands into the central processing computer. The user input device(s) is/are also connected to, or linked with, the CPU. The central processing computer also includes a display device for displaying data and/or information to a user or operator.

The central processing computer also includes a transmitter(s), for transmitting signals and/or data and/or information to any one or more of the user communication device(s), the employer communication device(s), the counterparty communication device(s), the media/content provider computer(s), the digital assets/records storage computer(s), the educational/instructional provider computer(s), and/or the social networking computer(s), and/or to any other central processing computer(s) and/or any other individual computer(s) or individual communication device(s) which may be utilized in conjunction with the present invention.

The central processing computer also includes a receiver, for receiving signals and/or data and/or information from any one or more of the user communication device(s), the employer communication device(s), the counterparty communication device(s), the media/content provider computer(s), the digital assets/records storage computer(s), the educational/instructional provider computer(s), and/or the social networking computer(s), and/or to any other central processing computer(s) and/or any other individual computer(s) or individual communication device(s) which may be utilized in conjunction with the present invention.

The central processing computer also includes a database(s) which contains any and/or all of the data and/or information required, needed, or desired, for allowing and/or enabling the central processing computer and/or the apparatus of the present invention to perform any and/or all of the functions and functionalities described herein as being performed, and/or as capable of being performed, by the central processing computer and/or the present invention.

The central processing computer also includes an output device for outputting any of the data, information, or reports, described herein or otherwise. The output device can be a printer, a display, a transmitter, a modem, a speaker, and/or any other device which can be used to output data.

The central processing computer can also include a video and/or audio recording device(s) which can include a camera and/or a video recording device, for recording pictures or video and/or video clips, and/or a microphone or an audio recording device, for recording audio or audio clips, which can be recorded by, and/or transmitted live, by or from the central processing computer, or which can be recorded by, and stored at or in, the central processing computer for transmission by or from the central processing computer at a later time. The video and/or audio recording device(s) can also be utilized to facilitate one-way broadcasts from the central processing computer, and/or can be utilized to facilitate video conferencing, video chatting, and/or audio conferencing, and/or video and audio conferencing, between users of the central processing computer and any of the herein-described users, individuals, persons, or entities, who or which utilize the present invention.

The central processing computer can also include a global positioning device. The global positioning device determines or can determine a position or location of the central processing computer.

The central processing computer can also be equipped, and/or can be programmed, for voice activation operation and/or voice control operation of and/or regarding any and/or all of the herein-described operations and functions which are capable of being performed by the central processing computer.

The user communication device, the employer communication device, and/or the counterparty communication device, can be any communication device, computer, personal computer, laptop computer, notebook computer, Smart phone or smartphone, smart telephone, cellular telephone, personal digital assistant, wireless telephone, wireless communication device, tablet, tablet computer, watch, smart watch, or wearable device or computer, or any combination of same, or any equivalent of same, or any other computer or communication device which can provide the functionality of each respective device. Each of the user communication device, the employer communication device, and/or the counterparty communication device, can include a central processing unit or CPU, a random access memory device(s) (RAM), a read only memory device(s) (ROM), a user input device, a display device, a transmitter, a receiver, a database, an output device, and a video and/or audio recording device(s). The user communication device, the employer communication device, and/or the counterparty communication device, can also include a global positioning device.

Each of the user communication device, the employer communication device, and/or the counterparty communication device, can also be equipped, and/or can be programmed, for voice activation operation and/or voice control operation of and/or regarding any and/or all of the herein-described operations and functions which are capable of being performed by the same.

The media/content provider computer, the digital assets/records storage computer, educational/instructional provider computer, and/or the social networking computer, can be any computer or computer system, a server computer, an Internet server computer and/or a web site server computer, a network computer, or any other communication device. The media/content provider computer, the digital assets/records storage computer, educational/instructional provider computer, and/or the social networking computer, can be any computer, personal computer, laptop computer, notebook computer, Smart phone or smartphone, smart telephone, cellular telephone, personal digital assistant, wireless telephone, wireless communication device, tablet, tablet computer, watch, smart watch, or wearable device or computer, or any combination of same, or any equivalent of same, or any other computer or communication device which can provide the functionality of each respective computer. Each of the media/content provider computer, the digital assets/records storage computer, educational/instructional provider computer, and/or the social networking computer, can include a central processing unit or CPU, a random access memory device(s) (RAM), a read only memory device(s) (ROM), a user input device, a display device, a transmitter, a receiver, a database, an output device, and a video and/or audio recording device(s). The media/content provider computer, the digital assets/records storage computer, educational/instructional provider computer, and/or the social networking computer, can also include a global positioning device.

Each of the media/content provider computer, the digital assets/records storage computer, educational/instructional provider computer, and/or the social networking computer, can also be equipped, and/or can be programmed, for voice activation operation and/or voice control operation of and/or regarding any and/or all of the herein-described operations and functions which are capable of being performed by the same.

The present invention can be utilized by any user, individual, independent contractor, or freelancer, in order to manage and/or monitor his, her, or its, job seeking, employment, and/or work, activities. It is envisioned that each user, individual, independent contractor, or freelancer, and each employer or hiring entity, can create, and/or have associated therewith, a user or member account. The user or member account can be utilized in order to perform any of the herein-described activities described herein as being capable of being performed while using the present invention.

The user or member account can contain and/or can include any information regarding the respective user, individual, independent contractor, or freelancer, and each employer or hiring entity, including, but not limited to, any and/or all of the information described herein as being stored, for the respective user, individual, independent contractor, or freelancer, and each employer or hiring entity, in any of the databases described herein, along with identification information, contact information, user or member profile information, and/or user work schedule or work calendar information.

The user, individual, independent contractor, or freelancer, can utilize the present invention in order to search for jobs, projects, or assignments, and/or to search for postings or listings for jobs, projects, or assignments, to submit resumes and/or job applications for jobs, projects, or assignments, to submit proposals or bids for jobs, projects, or assignments, to submit cover letters, to submit video messages, to ascertain the status of a submission(s) or application(s) for or regarding a job(s), a project(s), or an assignment(s), to request an interview, to request information, in applying for, or submitting a proposal for, a job, project, or assignment, to check on the status of an application or proposal for a job, project, or assignment, and/or to perform any other action or activity in finding a job, project, or assignment, and/or a listing or posting for same. The user, individual, independent contractor, or freelancer, can also request to be notified when employer or hiring entity receives, views, considers, or acts upon, his or her application for a job, project, or assignment. The user, individual, independent contractor, or freelancer, can also request to be notified regarding new job, project, or assignment, postings or listings.

Any of the status alerts and/or status messages described herein can be generated and transmitted, from an employer communication device and/or by the central processing computer to the user communication device at any time and/or upon the any occurrence or happening of any event or activity of interest to the user or individual. In addition to containing information regarding the occurrence or happening, the status alert or status message can also contain a link or hyperlink to an electronic forum or a web page associated with, or provided by, the central processing computer.

The user or individual can also use his or her user communication device in order to program the central processing computer in order to detect the posting of jobs, projects, or assignments, of interest to the user or individual. Upon detecting the posting of any jobs, projects, or assignments, of interest to the user or individual, the central processing computer can generate a job alert message or a project alert message automatically and can automatically transmit the same to the user's or individual's user communication device. The job alert message or a project alert message can contain information regarding the job, project, or assignment, and can also contain a link or hyperlink to the electronic forum.

The present invention can also be utilized by any employer or hiring entity in order to manage and/or monitor his, her, or its, recruitment and/or manpower procurement and/or management activities. It is envisioned that each user, individual, independent contractor, or freelancer, and each employer or hiring entity, will create, and/or have associated therewith, a user or member account. The user or member account can be utilized in order to perform any of the herein-described activities described herein as being capable of being performed while using the present invention. The user or member account can contain and/or can include any information regarding the respective user, individual, independent contractor, or freelancer, and each employer or hiring entity, including, but not limited to, any and/or all of the information described herein as being stored, for the respective user, individual, independent contractor, or freelancer, and each employer or hiring entity, in any of the databases describe herein, along with identification information, contact information, user or member profile information, and/or user work schedule or work calendar information.

The employer or hiring entity, can utilize the present invention in order to search for individuals, independent contractors, or freelancers, who can perform services for the employer or hiring entity, and/or to search for employees or candidates for jobs, projects, or assignments, to receive and review resumes and/or job applications from individuals, independent contractors, or freelancers, to submit requests for proposals or bids for jobs, projects, or assignments to individuals, independent contractors, or freelancers, to receive cover letters, to receive video messages, to ascertain the status of an individual, independent contractor, or freelancer, to request an interview, to request information, and/or to check on the status of an applicant for a job, project, or assignment, and/or to perform any other action or activity in finding an employee or candidate for a job, project, or assignment.

Any of the herein-described status alerts and/or status messages can be generated and transmitted, by and/or from a user communication device, or from the central processing computer, to the employer communication device at any time and/or upon the any occurrence or happening of any event or activity of interest to the employer or hiring entity. In addition to containing information regarding the occurrence or happening, the status alert or status message can also contain a link or hyperlink to an electronic forum or a web page associated with, or provided by, the central processing computer.

The employer or hiring entity can use his or her employer communication device in order to program the central processing computer in order to detect the posting of a user or member profile or a resume of or for potential candidates, potential employees, independent contractors, or freelancers, who may be of interest to the employer or hiring entity. Upon detecting the posting of a user or member profile or a resume of or for a potential candidate, a potential employee, an independent contractor, or a freelancer, of interest to the employer or hiring entity, the central processing computer can generate a candidate alert message automatically and can automatically transmit the same to the employer communication device of the employer or hiring entity. The candidate alert message can contain information regarding the potential candidate, potential employee, independent contractor, or freelancer, and can also contain a link or hyperlink to the electronic forum.

The present invention can also be utilized in order to allow any of the herein-described users or individuals to schedule an appointment with an independent contractor or a freelancer for or regarding the performing of a work project or an assignment, or for or regarding obtaining a consultation, or a work estimate, and/or for or regarding a project or an assignment. In this regard, the present invention can be utilized to schedule appointments with independent contractors and/or freelancers for any and/or all types of kinds of services. The present invention can also be utilized to schedule appointments with independent contractors and/or freelancers who can perform any service or services in any field or sector of the global economy.

The present invention can also be utilized in order to allow any of the herein-described users or individuals to schedule, and/or to participate in, videoconference calls, video chat sessions, telephone calls, or telephone conference calls, with any independent contractor, freelancer, consultant, or other user or individual.

In the case of a video conference call or video chat session, the user or individual and/or the respective independent contractor, freelancer, consultant, or counterparty, can also, at any time during the video conference call or video chat session, take a screenshot picture or photograph of the user or individual and the respective independent contractor, freelancer, consultant, or counterparty, so as to record any information provided during the video conference call or video chat session.

A user or individual can, at any time, access the central processing computer, the distributed ledger/Blockchain technology system of the central processing computer and distributed ledger and Blockchain technology system, and/or the digital assets/records storage computer, and can request access to, and can be provided, via his or her user communication device, with access to, any videoconference call summary report, any digital videoconference call recording, any written transcript of the audio conversation during the videoconference call, and/or any information regarding any screenshot picture(s) or photograph(s) taken during any videoconference call or video conference calls involving the user or individual. The user or individual can access the central processing computer and can obtain, and can be provided with via his or her user communication device, a translation of any written transcript from one language to another. The user or individual can also access the central processing computer and can request, and can be provided with, a written transcript of any video conference call. Any written transcript can also be digitally signed, with a digital signature of the user or individual or of the consultant who participated in the respective videoconference call, and such digital signature can be assigned a serial number or an authentication number.

The present invention can be utilized in connection with allowing a user or individual to engage in a video conference call, a video chat session, a telephone call, or a telephone conference call, with any independent contractor, freelancer, consultant, or counterparty. The present invention can also be utilized by any user or individual to create, store, and/or collect, information as a digital asset of any type or kind.

The present invention can also be utilized in order to allow any of the herein-described users or individuals to schedule, and/or to participate in, videoconference calls, video chat sessions, telephone calls, or telephone conference calls, with athletes, active or retired, of any and/or all ages and/or of any and/or all types or kinds, with actors or actresses, active or retired, of any and/or all ages and/or of any and/or all types or kinds, with entertainers, active or retired, of any and/or all ages and/or of any and/or all types or kinds, with any other celebrities, active or retired, of any and/or all ages and/or of any and/or all types or kinds, or with any other notable individuals or groups of individuals of any and/or all ages and/or of any and/or all types or kinds. The athletes, actors, actresses, or entertainers, can be professional, amateur, college, high school or secondary school-aged, athletes, actors, actresses, entertainers, celebrities, and/or other notable people. A respective athlete, actor or actress, entertainer, or celebrity, can utilize the present invention as an independent contractor or as a freelancer.

The user or individual and the respective athlete, actor or actress, entertainer, or celebrity, can engage in the video conference call, the video chat session, the telephone call, or the telephone conference call, for any scheduled or unscheduled amount of time. The video conference call, the video chat session, the telephone call, or the telephone conference call, can be recorded, and a digitally recorded copy of the video conference call, the video chat session, the telephone call, or the telephone conference call, between the user or individual and the respective athlete, actor or actress, entertainer, or celebrity, can be stored as a digital memorabilia asset or as digital memorabilia in a digital asset account or in digital memorabilia account of or associated with the user or individual.

In the case of a video conference call or video chat session, the user or individual and/or the respective athlete, actor or actress, entertainer, or celebrity, can also, at any time during the same, take a screenshot picture or photograph of the user or individual and the respective athlete, actor or actress, entertainer, or celebrity, and can affix, attach, or digitally sign, a digital autograph to or on the same. The digital autograph can be a digitized copy of any actual autograph of the respective athlete, actor or actress, entertainer, or celebrity, or any other recognized electronic, or other digital, signature. A digital autograph can also be affixed, attached, or digitally signed, to or on the digitally recorded copy of the video conference call, the video chat session, the telephone call, or the telephone conference call. The present invention can assign a serial number, or an authentication number, to the digitally recorded copy of the video conference call, the video chat session, the telephone call, or the telephone conference call, and/or to each screenshot picture or photograph of the user or individual and the respective athlete, actor or actress, entertainer, or celebrity, taken during the respective video conference call or video chat session, and can store the same, along with information regarding the same, in the distributed ledger/Blockchain technology system of the central processing computer and distributed ledger and Blockchain technology system.

In this regard, the present invention can be utilized by any user or individual to create, store, and/or collect, digital memorabilia of any and/or all types or kinds. Further, the present invention can also be utilized in order to facilitate and/or to provide athlete, actor or actress, entertainer, or celebrity, meetings, introductions, meet and greets, and/or personalized autograph sessions, with any of the herein-described users or individuals.

Any of the herein-described digital assets, digital autographs, digital memorabilia, or digital souvenirs, can be tracked, monitored, and/or authenticated, and/or safeguarded, by using the serial numbers and/or authentication numbers which can be or have been assigned to the same.

Any digital asset or digital memorabilia described herein can be stored in, and/or accessed via, any number of digital asset accounts, digital memorabilia accounts, or digital souvenir accounts, of or associated with the user or individual. An RFID tag, or any number of RFID tags, can be assigned to each digital asset account, digital memorabilia account, or digital souvenir account, of the user or individual.

An RFID tag can also be provided to the user or individual so that the user or individual can access any of his or her digital asset accounts, digital memorabilia accounts, or digital souvenir accounts, at any time and from or at any location, and/or via a kiosk or other public communication device or computer system. An RFID tag, which the user or individual possesses or can possess, can be read or scanned by an RFID reader system located at, or associated with, a respective kiosk or other private or public communication device or computer system. The data and/or information read or scanned by the RFID reader system can be transmitted to the central processing computer, which can process the same and can verify or authenticate the user or individual and/or the respective digital asset account, digital memorabilia account, or digital souvenir account.

Once the user or individual and/or the respective digital asset account, digital memorabilia account, or digital souvenir account, has been verified or authenticated, the user or individual can be provided with access to his or her digital asset account, digital memorabilia account, or digital souvenir account, which is stored in the digital assets/records storage computer. The user or individual can access and/or can view any digital asset, digital memorabilia, or digital souvenir, or any number of digital assets, digital memorabilia, or digital souvenirs, which is/are stored in the respective digital asset account, digital memorabilia account, or digital souvenir account, via the respective kiosk or other private or public communication device or computer system. An RFID tag can also be affixed to, attached to, or associated with the user communication device of or associated with the user or individual.

The educational/instructional records computer can contain, in its database, video recordings and/or audio recordings of lessons, classes, courses, seminars, educational materials, instructional materials, training materials, fitness materials, sports materials, athletic materials, or any other recordings or materials. Any of the herein-described athletes, actors or actresses, entertainers, celebrities, or other notable persons, or any educational provider or any instructional provider, can produce, record, and/or can post any of the herein-described video recordings and/or audio recordings of lessons, classes, courses, seminars, educational materials, instructional materials, training materials, fitness materials, sports materials, athletic materials, or any other recordings or materials (hereinafter referred to as "educational/instructional content"), with the educational/instructional records computer, which can be stored in the database of same. Any user or individual can access the educational/instructional records computer at any time using his or her user communication device and can request to receive any of the herein-described educational/instructional content. Thereafter, the educational/instructional records computer can transmit the request educational/instructional content to the user's or individual's user communication device and the same can be viewed via the display device of same.

The herein-described educational/instructional content can be used by any of the herein-described users, individuals, independent contractors, and/or freelancers, and/or by any of the herein-described employers or hiring entities, for any educational, training, re-training, certification, change of career, continuing training, and/or any other, purpose(s).

Any user, individual, independent contractor, freelancer, employer, or hiring entity, can enroll in, and can participate in, any distance learning activities offered by any of the operators of any of the herein-described educational providers and/or instructional providers. The above-referenced distance learning activities can be, or can include, classes, lessons, seminars, degree programs, certificate programs, and/or any other educational and/or instructional products, services, offerings, and/or activities.

Any user, individual, independent contractor, freelancer, employer, or hiring entity, can also access the social networking computer of a social network in or to which he or she belongs for any social networking, socializing, and/or information gathering, purpose or purposes.

Any data and/or information received by, processed by, generated by, and/or transmitted from, the central processing computer(s), any user communication device(s), any employer communication device(s), any counterparty communication device(s), any media/content provider computer(s), any digital assets/records storage computer(s), any other educational/instructional provider computer(s), and/or any social networking computer(s), can be stored in the distributed ledger/Blockchain technology system of the central processing computer and distributed ledger and Blockchain technology system as well as in the database of the central processing computer.

Any data and/or information regarding, pertaining to, indicative of, or representative of, any action(s) taken by, or any activity or activities performed by, or engaged in by, any herein-described user, individual, independent contractor, freelancer, employer, or hiring entity, can be stored in the distributed ledger/Blockchain technology system of the central processing computer and distributed ledger and Blockchain technology system as well as in the database of the central processing computer.

As provided herein, the present invention can provide a distributed ledger and blockchain technology-based recruitment, job searching and/or project searching, scheduling, and/or asset and/or consideration tracking, and/or monitoring, apparatus and method, which can be used in any number and/or variety of ways.

The present invention can be utilized in order to allow any user, individual, or entity, to post, list, or register, his, her, or its, intellectual property with the apparatus of the present invention for purposes of commercializing, developing, marketing, selling, transferring, licensing, and/or monetizing, same. In this regard, the present invention can be utilized as a posting, listing, or registration, entity for intellectual property of any type or kind.

The present invention can also be utilized in order to allow any provider, service provider, goods provider, funding service, investor, agent, broker, employer, counterparty, media/content provider, digital assets/records storage provider, educational/instructional provider, or social network provider, to post, list, or register, himself, herself, or itself, and/or any information regarding the respective services, goods, or products, which he, she, or it, provides, with the apparatus of the present invention for purposes of serving the commercializing, developing, marketing, selling, transferring, licensing, and/or monetizing, needs of any of users described herein who or which own, hold, or manage, any intellectual property. In this regard, the present invention can be utilized as a posting, listing, or registration, entity for services, goods, or products, of any type or kind.

The present invention can also be utilized in order to allow any user, provider, funding service or investor, agent or broker, employer, counterparty, media/content provider, digital assets/records storage provider, educational/instructional provider, or social network provider, to be notified upon the posting, listing, or registration, of an intellectual property with the apparatus of the present invention. In this regard, the present invention can be utilized to generate a notification message or an alert message, containing information regarding a newly posted, listed, or registered, intellectual property, and to transmit the notification message or the alert message to a respective communication device or computer of a respective user, provider, funding service or investor, agent or broker, employer, counterparty, media/content provider, digital assets/records storage provider, educational/instructional provider, or social network provider.

The present invention can be utilized in order to allow any owner of intellectual property or any user who posts, lists, or registers, the same with the apparatus of the present invention to be notified upon the posting, listing, or registration, of any provider, funding service or investor, agent or broker, official or governmental filing office, employer, counterparty, media/content provider, digital assets/records storage provider, educational/instructional provider, or social network provider, or any other user, who or which the owner of intellectual property or any user who posts, lists, or registers, the same might be interested in engaging the services of, or might be interested in purchasing services, goods, or products, from, or might be interested in being represented by, or to whom the owner of intellectual property or any user who posts, lists, or registers, the same might be interested in selling or licensing the intellectual property or a portion thereof, or who or which the owner of intellectual property or any user who posts, lists, or registers, the same may have any reason or interest for being so notified. In this regard, the present invention can be utilized to generate a notification message or an alert message, containing information regarding a newly posted, listed, or registered, provider, funding service or investor, agent or broker, official or governmental filing office, employer, educational/instructional provider, or social network provider, or other user, who can provide any service, good, or product, which might be of interest to the owner of intellectual property or any user who posts, lists, or registers, the same or who might be of any interest to the owner of intellectual property or any user who posts, lists, or registers, the same for any reason or purpose. The present invention can thereafter transmit the notification message or the alert message to the user communication device of or associated with the owner of intellectual property or any user who posts, lists, or registers, the same.

The present invention can also be utilized to provide a centralized entity or repository, or a clearinghouse, for storing and/or for providing information regarding intellectual property of any kind or type which is available, or which can be available for commercialization, development, marketing, sale, transfer, licensing, or monetization. Any number of users of the present invention can post, list, or register, his, her, or its, intellectual property or intellectual properties with the present invention in order to commercialize, develop, market, sell, transfer, license, or monetize, the same.

The present invention can also be utilized to provide a centralized entity or repository, or a clearinghouse, for storing and/or for providing information regarding any of the herein-described providers, funding services or investors, official or governmental filing offices, agents or brokers, employers, counterparties, media/content providers, digital assets/records storage providers, educational/instructional providers, or social network providers, or any other users, and/or any of the respective services, goods, or products, which are or which can be provided by each of the same.

The present invention can also be utilized in any number of ways in order to process information for, regarding, and/or for facilitating, the commercialization, development, marketing, sale, transfer, licensing, litigating, enforcement, or monetization, of any type or kind of intellectual property, which can be beneficial to the various users, providers, funding services or investors, official or governmental filing offices, agents or brokers, employers, counterparty or counterparties, media/content providers, digital assets/records storage providers, educational/instructional providers, or social network providers, or other users, described herein or otherwise who or which utilize the present invention.

The present invention can provide a distributed ledger and blockchain technology-based recruitment, job searching and/or project searching, scheduling, and/or asset and/or consideration tracking, and/or monitoring, apparatus and method, which can be used in any number of applications and/or in any number and/or variety of ways.

BRIEF DESCRIPTION OF THE DRAWINGS

In the Drawings:

FIG. 12 illustrates still another preferred embodiment method for utilizing the apparatus of the present invention, in flow diagram form;

FIG. 14 illustrates another preferred embodiment method for utilizing the apparatus of the present invention, in flow diagram form.

FIG. 15 illustrates a preferred embodiment method of utilizing the apparatus of the present invention, in flow diagram form;

FIG. 17 illustrates yet another preferred embodiment method of utilizing the apparatus of the present invention, in flow diagram form;

FIG. 19 illustrates another preferred embodiment method of using the apparatus of the present invention, in flow diagram form.

DESCRIPTION OF THE PREFERRED EMBODIMENTS

Figure 1:
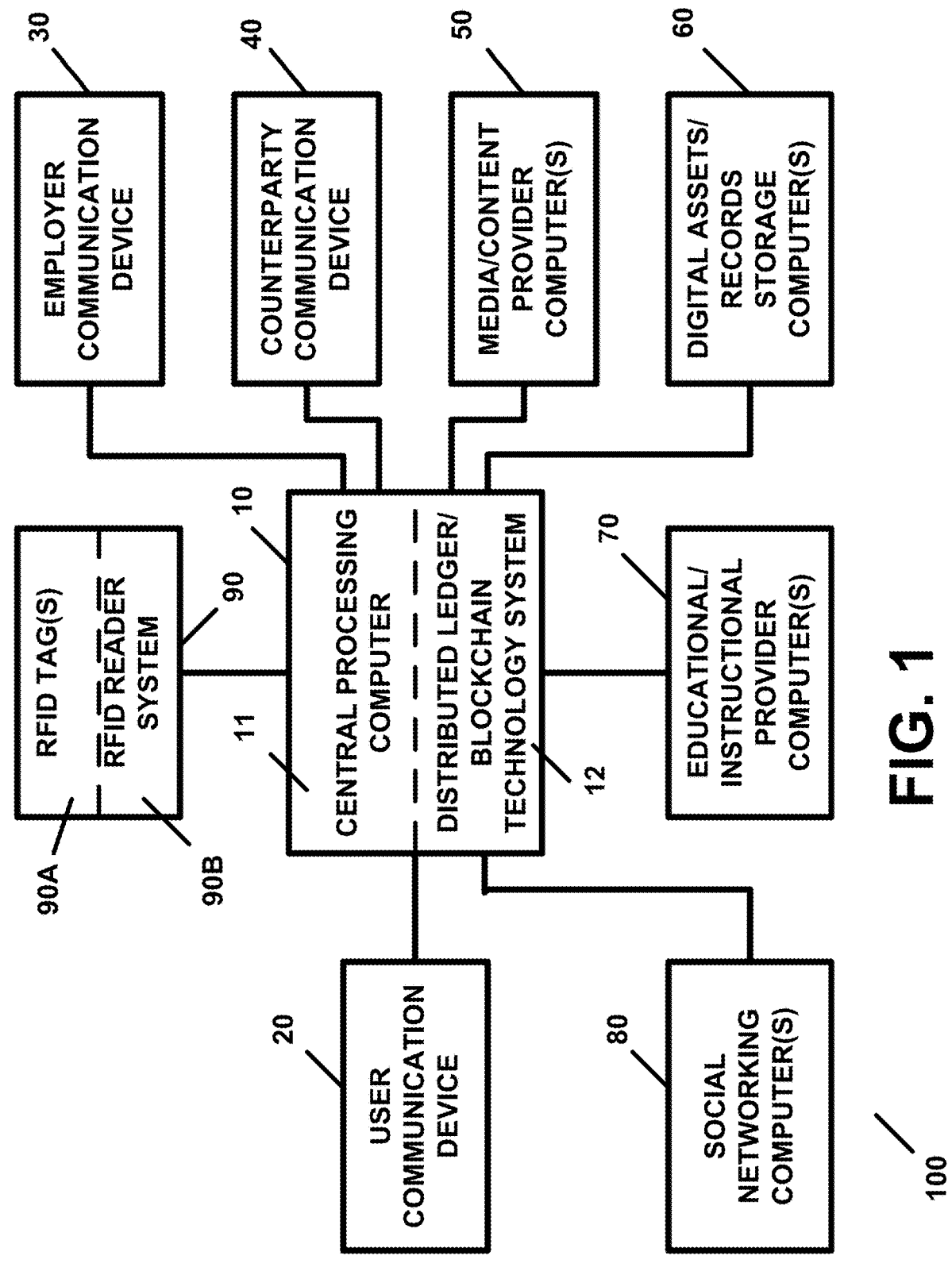
FIG. 1 illustrates a preferred embodiment of the apparatus of the present invention, in block diagram form.

The present invention pertains to a distributed ledger and blockchain technology-based recruitment, job searching and/or project searching, scheduling, and/or asset tracking and/or monitoring, and/or intellectual property commercialization, apparatus and method and, in particular, the present invention pertains to a distributed ledger and blockchain technology-based recruitment, job searching and/or project searching, scheduling, and/or asset tracking and/or monitoring, apparatus and method which can provide for enhanced transparency and/or security for, in, or regarding, various recruitment activities, job searching and/or project searching activities, and/or scheduling activities, and/or which can provide for the tracking, monitoring, and/or authentication, of assets, digital or otherwise.

The apparatus and methods of the present invention can be utilized in numerous types and/or kinds of recruitment applications, on-line recruitment or on-line recruiting applications, on-line job searching applications, on-line scheduling applications, and/or in numerous applications involving or relating to the tracking, monitoring, and/or authentication of, assets, digital or otherwise, and/or consideration of all types or kinds.

The apparatus and methods of the present invention can be utilized by an individual, an independent contractor, or a freelancer, to find and apply for a job, project, or assignment, of any kind or type, and allow the respective individual, independent contractor, or freelancer, to be kept appraised as to when and how his or her application is being, or has been, considered by an employer or hiring entity as well as the status of, or a decision, regarding the same.

The apparatus and methods of the present invention can also be utilized by an employer or hiring entity to reach out to an individual, an independent contractor, or a freelancer, regarding a request for a proposal ("RFP"), request for bid ("RFB"), or an offer of employment or an offer to perform a job, project, or assignment, and to be kept appraised as to when and how his, her, or its, respective request or offer is being, or has been, considered by the individual, independent contractor, or freelancer, as well as the status of, or a decision, regarding the same.

The apparatus and methods of the present invention can be utilized by an individual, an independent contractor, or a freelancer, to schedule an appointment with an employer or hiring entity, or can be utilized by an employer or hiring entity to schedule an appointment with any individual, independent contractor, freelancer, athlete, former athlete, celebrity, or any other person.

The apparatus and methods of the present invention can also be utilized by any individual, independent contractor, or freelancer, described herein, or can be utilized by any employer or hiring entity, in order to track, monitor, and/or authenticate, any type or kind of asset(s), digital asset(s), and/or consideration or digital consideration, which be exchanged between, or which might otherwise be transferred between, or exchanged between, any of the users of the present invention.

The apparatus and methods of the present invention can be utilized in connection with a distributed ledger and blockchain technology system to provide a secured record keeping system of and for any other information and/or data processed and/or stored by the present invention in any and/or all of the embodiments described herein or otherwise.

Applicant hereby incorporates by reference herein the subject matter and teachings of U.S. Provisional Patent Application Ser. No. 63/118,762, filed Nov. 27, 2020, and entitled "DISTRIBUTED LEDGER AND BLOCKCHAIN TECHNOLOGY-BASED RECRUITMENT, JOB SEARCHING AND/OR PROJECT SEARCHING, SCHEDULING, AND/OR ASSET TRACKING AND/OR MONITORING, AND/OR INTELLECTUAL PROPERTY COMMERCIALIZATION, APPARATUS AND METHOD", the subject matter and teachings of which are hereby incorporated by reference herein in their entirety.

Applicant hereby incorporates by reference herein the subject matter and teachings of U.S. patent application Ser. No. 17/218,202, filed Mar. 31, 2021, and entitled "DISTRIBUTED LEDGER AND BLOCKCHAIN TECHNOLOGY-BASED RECRUITMENT, JOB SEARCHING AND/OR PROJECT SEARCHING, SCHEDULING, AND/OR ASSET TRACKING AND/OR MONITORING, APPARATUS AND METHOD", the subject matter and teachings of which are hereby incorporated by reference herein in their entirety.

Applicant hereby incorporates by reference herein the subject matter and teachings of U.S. Provisional Patent Application Ser. No. 63/026,005, filed May 16, 2020, and entitled "DISTRIBUTED LEDGER AND BLOCKCHAIN TECHNOLOGY-BASED RECRUITMENT, JOB SEARCHING AND/OR PROJECT SEARCHING, SCHEDULING, AND/OR ASSET TRACKING AND/OR MONITORING, APPARATUS AND METHOD", the subject matter and teachings of which are hereby incorporated by reference herein in their entirety.

Applicant hereby incorporates by reference herein the subject matter and teachings of U.S. patent application Ser. No. 17/498,804, filed Oct. 12, 2021, and entitled "DISTRIBUTED LEDGER AND BLOCKCHAIN TECHNOLOGY-BASED RECRUITMENT, JOB SEARCHING AND/OR PROJECT SEARCHING, SCHEDULING, AND/OR ASSET TRACKING AND/OR MONITORING, AND/OR INTELLECTUAL PROPERTY COMMERCIALIZATION, APPARATUS AND METHOD", the subject matter and teachings of which are hereby incorporated by reference herein in their entirety.

FIG. 1 illustrates the apparatus of the present invention, in block diagram form. The apparatus of the present invention is denoted generally by the reference numeral 100. In the preferred embodiment, the apparatus 100 of the present invention includes a central processing computer and distributed ledger and Blockchain technology system 10 (hereinafter referred to as "central processing computer/distributed ledger/Blockchain technology system 10"). In a preferred embodiment, the central processing computer/distributed ledger/Blockchain technology system 10 includes a central processing computer or central processing computer system 11 (hereinafter referred to as "central processing computer 11" or "central processing computer 11 component") and a distributed ledger and Blockchain technology system 12 (hereinafter referred to as "distributed ledger/Blockchain technology system 12" or "distributed ledger/Blockchain technology system 12 component"). In the preferred embodiment, the central processing computer 11 can be any computer or computer system or can be any server computer or any computer or computer system which can be used in a communication network. Any number of central processing computers 11 can be utilized in conjunction with, or in connection, with the apparatus 100 of the present invention.

In the preferred embodiment, the central processing computer 11 can provide control over the apparatus 100 and can perform any of the various processing services and/or functions described herein as being performed by the apparatus 100 of the present invention. In a preferred embodiment, the central processing computer 11 may be a single computer or system of computers and/or may include a plurality of computers or computer systems which are utilized in conjunction with one another. The central processing computer 11, in the preferred embodiment, can provide services for any of the other communications devices and/or computers and/or computer systems described herein as being associated with any of the users, individuals, persons, or entities, who or which utilize the apparatus 100 of the present invention.

With reference once again to FIG. 1, the apparatus 100 also includes a user communication device or computer 20 (hereinafter referred to as "user communication device 20" or "user computer 20") which is associated with, or which can be used by, any one or more of any of the herein-described users, individuals, persons, or entities, who or which utilize the apparatus 100 of the present invention.

Any number of user communication devices 20 can be utilized by, or can be associated with, each of the users, individuals, persons, or entities, who or which utilize the apparatus 100 of the present invention. The user communication device 20 can be any communication device, computer, personal computer, laptop computer, notebook computer, Smart phone or smartphone, smart telephone, cellular telephone, personal digital assistant, wireless telephone, wireless communication device, tablet, tablet computer, watch, smart watch, or wearable device or computer, or any combination of same, or any equivalent of same, which can be utilized by any user, individual, person, or entity, who or which utilizes the apparatus 100 and method of the present invention. The user communication device 20 can also be a server computer, a mainframe computer, a mini-computer, a microcomputer, or any other computer or device for suiting the needs of the particular user. The user communication device 20 can also be any device or computer, or a kiosk, that can be located at public places or locations or which can also be publicly available. Any number of user communication devices 20 can be utilized in conjunction with, or in connection with, the apparatus 100 of the present invention.

The user communication device(s) 20 can communicate with, and/or can operate in conjunction with, the central processing computer/distributed ledger/Blockchain technology system 10 and/or any of the other communication devices, computers, and/or computer systems, described herein as being associated with, or used by, any of the users, individuals, persons, or entities, who or which utilize the apparatus 100 and method of the present invention.

With reference once again to FIG. 1, the apparatus 100 also includes an employer or hiring entity communication device or computer 30 (hereinafter referred to as "employer communication device 30") which is associated with, or which can be used by, any one or more of any of the herein-described employers or hiring entities who or which utilize the apparatus 100 of the present invention.

Any number of employer communication devices 30 can be utilized by, or can be associated with, each of the employers or hiring entities who or which utilize the apparatus 100 of the present invention. The employer communication device 30 can be any communication device, computer, personal computer, laptop computer, notebook computer, Smart phone or smartphone, smart telephone, cellular telephone, personal digital assistant, wireless telephone, wireless communication device, tablet, tablet computer, watch, smart watch, or wearable device or computer, or any combination of same, or any equivalent of same, which can be utilized by any employer or hiring entity who or which utilizes the apparatus 100 and method of the present invention. The employer communication device 30 can also be a server computer, a mainframe computer, a mini-computer, a microcomputer, or any other computer or device for suiting the needs of the particular user. The employer communication device 30 can also be any device or computer, or a kiosk, that can be located at public places or locations or which can also be publicly available. Any number of employer communication devices 30 can be utilized in conjunction with, or in connection with, the apparatus 100 of the present invention.

The employer communication device(s) 30 can communicate with, and/or can operate in conjunction with, the central processing computer/distributed ledger/Blockchain technology system 10 and/or any of the other communication devices, computers, and/or computer systems, described herein as being associated with, or used by, any of the users, individuals, persons, or entities, who or which utilize the apparatus 100 and method of the present invention.

With reference once again to FIG. 1, the apparatus 100 also includes a counterparty communication device or computer 40 (hereinafter referred to as "counterparty communication device 40") which is associated with, or which can be used by, any one or more of any of the herein-described counterparties who or which utilize the apparatus 100 of the present invention.

Any number of employer communication devices 40 can be utilized by, or can be associated with, each of the counterparties who or which utilize the apparatus 100 of the present invention. The counterparty communication device 40 can be any communication device, computer, personal computer, laptop computer, notebook computer, Smart phone or smartphone, smart telephone, cellular telephone, personal digital assistant, wireless telephone, wireless communication device, tablet, tablet computer, watch, smart watch, or wearable device or computer, or any combination of same, or any equivalent of same, which can be utilized by any counterparty who or which utilizes the apparatus 100 and method of the present invention. The counterparty communication device 40 can also be a server computer, a mainframe computer, a mini-computer, a microcomputer, or any other computer or device for suiting the needs of the particular user. The counterparty communication device 40 can also be any device or computer, or a kiosk, that can be located at public places or locations or which can also be publicly available. Any number of counterparty communication devices 40 can be utilized in conjunction with, or in connection with, the apparatus 100 of the present invention.

The counterparty communication device(s) 40 can communicate with, and/or can operate in conjunction with, the central processing computer/distributed ledger/Blockchain technology system 10 and/or any of the other communication devices, computers, and/or computer systems, described herein as being associated with, or used by, any of the users, individuals, persons, or entities, who or which utilize the apparatus 100 and method of the present invention.

With reference once again to FIG. 1, the apparatus 100 also includes a media provider or content provider communication device or computer 50 (hereinafter referred to as "media/content provider computer 50") which is associated with, or which can be used by, any one or more of any of the herein-described media providers or content providers who or which can utilize the apparatus 100 of the present invention in order to provide or distribute its/their respective media or content to any of the herein-described users, individuals, persons, or entities, who or which utilize the apparatus 100 and method of the present invention.

Any number of media/content provider computers 50 can be utilized by, or can be associated with, each of the respective media providers or content providers who or which utilize the apparatus 100 of the present invention. The media/content provider computer 50 can be any communication device, computer, personal computer, laptop computer, notebook computer, Smart phone or smartphone, smart telephone, cellular telephone, personal digital assistant, wireless telephone, wireless communication device, tablet, tablet computer, watch, smart watch, or wearable device or computer, or any combination of same, or any equivalent of same, which can be utilized by any media provider or content provider who or which utilizes the apparatus 100 and method of the present invention. The media/content provider computer 50 can also be a server computer, a mainframe computer, a mini-computer, a microcomputer, or any other computer or device for suiting the needs of the particular user. The media/content provider computer 50 can also be any device or computer, or a kiosk, that can be located at public places or locations or which can also be publicly available. Any number of media/content provider computers 50 can be utilized in conjunction with, or in connection with, the apparatus 100 of the present invention.

The media/content provider computer(s) 50 can communicate with, and/or can operate in conjunction with, the central processing computer/distributed ledger/Blockchain technology system 10 and/or any of the other communication devices, computers, and/or computer systems, described herein as being associated with, or used by, any of the users, individuals, persons, or entities, who or which utilize the apparatus 100 and method of the present invention.

With reference once again to FIG. 1, the apparatus 100 also includes a digital assets/records storage computer 60 which is associated with, or which can be used by, any one or more of any of the herein-described digital assets/records storage providers, which can provide services for or regarding the storage and/or the safeguarding of or for digital assets and/or information regarding same, and/or of or for records and/or information regarding the same, who or which can utilize the apparatus 100 of the present invention.

Any number of digital assets/records storage computers 60 can be utilized by, or can be associated with, each of the respective digital assets/records storage providers who or which utilize the apparatus 100 of the present invention. The digital assets/records storage computer 60 can be any communication device, computer, personal computer, laptop computer, notebook computer, Smart phone or smartphone, smart telephone, cellular telephone, personal digital assistant, wireless telephone, wireless communication device, tablet, tablet computer, watch, smart watch, or wearable device or computer, or any combination of same, or any equivalent of same, which can be utilized by any digital assets/records storage provider who or which utilizes the apparatus 100 and method of the present invention. The digital assets/records storage computer 60 can also be a server computer, a mainframe computer, a mini-computer, a microcomputer, or any other computer or device for suiting the needs of the particular user. The digital assets/records storage computer 60 can also be any device or computer, or a kiosk, that can be located at public places or locations or which can also be publicly available. Any number of digital assets/records storage computers 60 can be utilized in conjunction with, or in connection with, the apparatus 100 of the present invention.

The digital assets/records storage computer(s) 60 can communicate with, and/or can operate in conjunction with, the central processing computer/distributed ledger/Blockchain technology system 10 and/or any of the other communication devices, computers, and/or computer systems, described herein as being associated with, or used by, any of the users, individuals, persons, or entities, who or which utilize the apparatus 100 and method of the present invention.

With reference once again to FIG. 1, the apparatus 100 also includes an educational facility or instructional facility communication device or computer 70 (hereinafter referred to as "educational/instructional provider computer 70") which is associated with, or which can be used by, any one or more of any of the herein-described individuals, instructional facilities, educational facilities, training facilities, gyms, health clubs, country clubs, fitness centers, wellness centers, athletic training centers or facilities, physical education schools, centers, or programs, martial arts schools, exercise schools or centers, schools, colleges, universities, trade schools, tutors, and/or instructors, who or which provide instruction, classes, courses, or training, of any type or kind, who or which utilize the apparatus 100 and method of the present invention.

Any number of educational/instructional provider computers 70 can be utilized by, or in conjunction with, any individual, instructional facility, educational facility, training facility, gym, health club, country club, fitness center, wellness center, athletic training center or facility, physical education school, center, or program, martial arts school, exercise school or center, school, college, university, trade school, tutor, and/or instructor, or any group of same or combination of same, described herein, who or which utilize the apparatus 100 and method of the present invention (hereinafter referred to interchangeably as an "educational provider" or as an "instructional provider").

The educational/instructional provider computer 70 can be any communication device, computer, personal computer, laptop computer, notebook computer, Smart phone or smartphone, smart telephone, cellular telephone, personal digital assistant, wireless telephone, wireless communication device, tablet, tablet computer, watch, smart watch, or wearable device or computer, or any combination of same, or any equivalent of same, which can be utilized by any of the herein-described educational providers or instructional providers. The educational/instructional provider computer 70 can also be a server computer, a mainframe computer, a mini-computer, a microcomputer, or any other computer or device for suiting the needs of the particular user. The educational/instructional provider computer 70 can also be any device or computer, or a kiosk, that can be located at public places or locations or which can also be publicly available. Any number of educational/instructional provider computers 70 can be utilized in conjunction with, or in connection with, the apparatus 100 of the present invention.

The educational/instructional provider computer(s) 70 can communicate with, and/or can operate in conjunction with, the central processing computer/distributed ledger/Blockchain technology system 10 and/or any of the other communication devices, computers, and/or computer systems, described herein as being associated with, or used by, any of the users, individuals, persons, or entities, who or which utilize the apparatus 100 and method of the present invention.

The apparatus 100 can also include a social networking computer 80. The social networking computer 80 can be linked with, and utilized in connection with, the apparatus 100 so as to allow and/or facilitate integrating the apparatus 100 of the present invention with social networks and/or social media. In a preferred embodiment, for example, the social networking computer 80 can be associated with a social networking company, a social networking website, or social networking entity, website, group, organization, or association. The social networking computer 80 can be associated with any one or any number of social networking companies, social networking websites, or social networking entities, websites, groups, organizations, or associations. The social networking computer 80 can also provide links to any computers associated with any one or any number of social networking companies, social networking websites, or social networking entities, websites, groups, organizations, or associations. In the preferred embodiment, the social networking computer 80 can perform any and all of the functions performed by any social networking company, a social networking website, or social networking entity, website, group, organization, or association. In a preferred embodiment, any number of social networking computers 80 can be utilized in connection with the apparatus 100 of the present invention. Any number of social networking computers 80 can be utilized by or in conjunction with any social network or social networking provider who or which utilizes the apparatus 100 of the present invention.

The social networking computer 80 can be a server computer, a personal computer, a mainframe computer, a mini-computer, a microcomputer, or any other computer or device for suiting the needs of the particular social network or social networking provider. The social networking computer 80 can also be any communication device, computer, personal computer, laptop computer, notebook computer, Smart phone or smartphone, smart telephone, cellular telephone, personal digital assistant, wireless telephone, wireless communication device, tablet, tablet computer, watch, smart watch, or wearable device or computer, or any combination of same, or any equivalent of same, which can be utilized by any social network or social networking provider who or which utilizes the apparatus 100 and method of the present invention. The social networking computer 80 can also be any device or computer, or a kiosk, that can be located at public places or locations or which can also be publicly available. Any number of social networking computers 80 can be utilized in conjunction with, or in connection with, the apparatus 100 of the present invention.

The social networking computer(s) 80 can communicate with, and/or can operate in conjunction with, the central processing computer/distributed ledger/Blockchain technology system 10 and/or any of the other communication devices, computers, and/or computer systems, described herein as being associated with, or used by, any of the users, individuals, persons, or entities, who or which utilize the apparatus 100 and method of the present invention.

With reference once again to FIG. 1, in a preferred embodiment, the apparatus 100 can also include any number of RFID tags/RFID reader system(s) 90, each of which can include any number of RFID tags 90A and RFID reader systems 90B. In a preferred embodiment, the RFID tags/RFID reader system(s) 90 can be utilized in or for any number of a variety ways as described herein and/or otherwise. In a preferred embodiment, the RFID tags/RFID reader system(s) 90 can be connected to, and/or linked with, the central processing computer/distributed ledger/Blockchain technology system 10, using any suitable and/or appropriate wired connection, wireless connection, or any combination of same, on, via, or using, any suitable and/or appropriate communication network or any combination of communication networks.

The RFID tags/RFID reader system(s) 90 can communicate with, and/or can operate in conjunction with, the central processing computer/distributed ledger/Blockchain technology system 10 and/or any of the other communication devices, computers, and/or computer systems, described herein as being associated with, or used by, any of the users, individuals, persons, or entities, who or which utilize the apparatus 100 and method of the present invention.

In the preferred embodiment, any of the central processing computer(s) 11, the user communication device(s) 20, the employer communication device(s) 30, the counterparty communication device(s) 40, the media/content provider computer(s) 50, the digital assets/records storage computer(s) 60, the educational/instructional provider computer(s) 70, and/or the social networking computer(s) 80, can be any computer or communication device, including, but not limited to, a personal computer, a home computer, a server computer, a computer capable of being utilized in a network, a hand-held computer, a palmtop computer, a laptop computer, a personal communication device, a cellular telephone, a wireless telephone, wireless communication device, a mobile telephone, a digital television, an interactive television, a digital television, a personal digital assistant, a telephone, a digital telephone, a television, an interactive television, a beeper, a pager, and/or a watch or a Smart watch, and/or any wearable device, computer or communication device.

Each of the central processing computer(s) 11, the user communication device(s) 20, the employer communication device(s) 30, the counterparty communication device(s) 40, the media/content provider computer(s) 50, the digital assets/records storage computer(s) 60, the educational/instructional provider computer(s) 70, and/or the social networking computer(s) 80, can transmit information to, as well as receive information from, any of the computers or communication devices 11, 20, 30, 40, 50, 60, 70, and/or 80, described herein. In this regard, each of the computers or communication devices 11, 20, 30, 40, 50, 60, 70, and/or 80, can communicate with, process information transmitted from or received from, and/or share data and/or information with, each other and/or any other computer(s) or communication device(s) 11, 20, 30, 40, 50, 60, 70, and/or 80, described herein and/or utilized in conjunction with the apparatus 100 of the present invention. In this manner, data and/or information transfer, between any of the computer(s) or communication device(s) 11, 20, 30, 40, 50, 60, 70, and/or 80, can communicate with any other computer(s) or communication device(s) 11, 20, 30, 40, 50, 60, 70, and/or 80, in a bi-directional manner. In this manner, any of the computer(s) or communication device(s) 11, 20, 30, 40, 50, 60, 70, and/or 80, can communicate with any other computer(s) or communication device(s) 11, 20, 30, 40, 50, 60, 70, and/or 80, in a bi-directional manner.

In the preferred embodiment, the present invention can be utilized on, and/or over, the Internet and/or the World Wide Web. The apparatus 100 of the present invention, in the preferred embodiment, can also utilize wireless Internet and/or World Wide Web services, equipment and/or devices. The central processing computer(s) 11, in the preferred embodiment, has a web site or web sites associated therewith. Each of the other computers or communication devices described herein can also have a web site or web sites associated with same.

Although the Internet and/or the World Wide Web is a preferred communication system and/or medium utilized, the present invention, in any and/or all of the embodiments described herein, can also be utilized with any appropriate communication network or system including, but not limited to, a telecommunication network or system, a telephone communication network or system, a cellular communication network or system, a wireless communication network or system, a line or wired communication network or system, a wireless Internet network or system, a wireless World Wide Web network or system, a digital communication network or system, a personal communication network or system, a personal communication services (PCS) network or system, a satellite communication network or system, a broad band communication network or system, a low earth orbiting (LEO) satellite network or system, a public switched telephone network or system, a telephone communication network or system, a radio communication network or system, a cable television network or system, and/or any other communication network or system, and/or any combination of the above communication networks or systems.

Any of the central processing computer(s) 11, the user communication device(s) 20, the employer communication device(s) 30, the counterparty communication device(s) 40, the media/content provider computer(s) 50, the digital assets/records storage computer(s) 60, the educational/instructional provider computer(s) 70, and/or the social networking computer(s) 80, can communicate with one another, and/or can be linked to one another, on, over, or via, any suitable communication network, telecommunication network, telephone network, a line-connected network, and/or a wireless communication network, and/or the Internet and/or the World Wide Web. Each of the computers or communication devices 11, 20, 30, 40, 50, 60, 70, and/or 80, can be linked with any other computer or computers directly or indirectly with one another so as to facilitate a direct or indirect bi-directional communication between said respective computers or communication devices. Communications between each of the computers or communication devices 11, 20, 30, 40, 50, 60, 70, and/or 80, can also involve an e-mail server or e-mail servers in those instances when e-mails are described as being used to transmit, or to send, any of the information, signals, messages, reports, notification messages, or any other communications, described herein, by or between any of the computers or communication devices 11, 20, 30, 40, 50, 60, 70, and/or 80, or when any of the information, signals, messages, reports, notification messages, or any other computers or communications, described herein, are transmitted by and/or between any of the parties described herein and/or by or between any of the computers or communication devices 11, 20, 30, 40, 50, 60, 70, and/or 80, or any other computers or communication devices, computer systems, communication network equipment, server computers, etc., or any other devices used or needed, in order to facilitate communications or the transmission of any of the herein-described information, signals, messages, reports, notification messages, or any other communications.

In a preferred embodiment, each of the central processing computer(s) 11, the user communication device(s) 20, the employer communication device(s) 30, the counterparty communication device(s) 40, the media/content provider computer(s) 50, the digital assets/records storage computer(s) 60, the educational/instructional provider computer(s) 70, and/or the social networking computer(s) 80, can communicate in a bi-directional manner with, and/or can send and/or receive signals, messages, reports, notification messages, alerts, or any other communications or electronic communication transmissions, to, from, and/or between, any other, or any number of, other central processing computer(s) 11, the user communication device(s) 20, the employer communication device(s) 30, the counterparty communication device(s) 40, the media/content provider computer(s) 50, the digital assets/records storage computer(s) 60, the educational/instructional provider computer(s) 70, and/or the social networking computer(s) 80.

In a preferred embodiment, each of the central processing computer(s) 11, the user communication device(s) 20, the employer communication device(s) 30, the counterparty communication device(s) 40, the media/content provider computer(s) 50, the digital assets/records storage computer(s) 60, the educational/instructional provider computer(s) 70, and/or the social networking computer(s) 80, can be linked to or with any other central processing computer(s) 11, the user communication device(s) 20, the employer communication device(s) 30, the counterparty communication device(s) 40, the media/content provider computer(s) 50, the digital assets/records storage computer(s) 60, the educational/instructional provider computer(s) 70, and/or the social networking computer(s) 80, via a wired link or line or a wireless link.

In a preferred embodiment, each of the user communication device(s) 20, the employer communication device(s) 30, the counterparty communication device(s) 40, the media/content provider computer(s) 50, the digital assets/records storage computer(s) 60, the educational/instructional provider computer(s) 70, and/or the social networking computer(s) 80, can be connected with, or linked with, the central processing computer(s) 11 as shown in FIG. 1. In a preferred embodiment, each of the user communication device(s) 20, the employer communication device(s) 30, the counterparty communication device(s) 40, the media/content provider computer(s) 50, the digital assets/records storage computer(s) 60, the educational/instructional provider computer(s) 70, and/or the social networking computer(s) 80, can be connected with, or linked with, the central processing computer(s) 11 via a wired line or wired link, via a wireless line, and/or via any combination of same.

In a preferred embodiment, any and/or all of the signals, messages, reports, notification messages, or any other communications, described herein as being transmitted from one device, computer, or communication device, to another, can be, or can be included in, or be attached to, an e-mail message, an instant messaging message, an electronic transmission, or an electronic data transmission or electronic data interchange, or can be transmitted via any other data or information transmission, and/or can be transmitted via or using any appropriate or necessary computer(s) or device(s).

In the preferred embodiment, each of the central processing computer(s) 11, the user communication device(s) 20, the employer communication device(s) 30, the counterparty communication device(s) 40, the media/content provider computer(s) 50, the digital assets/records storage computer(s) 60, the educational/instructional provider computer(s) 70, and/or the social networking computer(s) 80, can transmit data and/or information using TCP/IP, as well as any other Internet and/or World Wide Web, and/or communication, protocols.

The apparatus 100 of the present invention can utilize electronic commerce technologies and security methods, techniques and technologies, including any encryption or security technologies and/or techniques, in any and/or all of the instances of, or involving, data and/or information processing, and/or data and/or information transmission, described herein.

Figure 2:
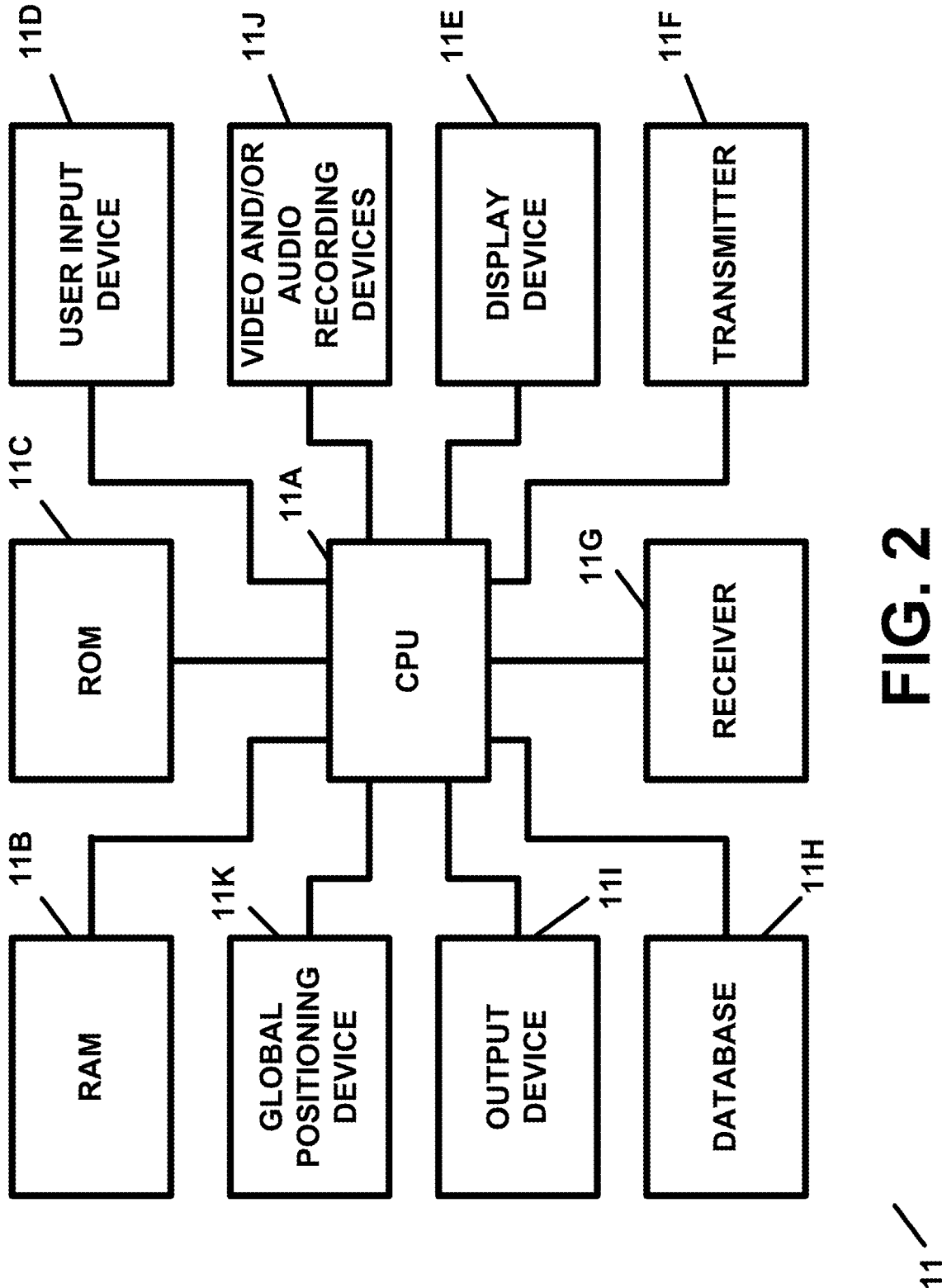
FIG. 2 illustrates the central processing computer component of the central processing computer and distributed ledger and Blockchain technology system of FIG. 1, in block diagram form.

FIG. 2 illustrates the central processing computer 11 component, of the central processing computer/distributed ledger/Blockchain technology system 10 of the apparatus 100, in block diagram form. The central processing computer 11, in the preferred embodiment, can be a computer or computer system, a server computer, a network computer, or any other communication device, which can provide the functionality of, and which can be utilized as a central processing computer 11, such as an Internet server computer and/or a web site server computer. In the preferred embodiment, the central processing computer 11 includes a central processing unit or CPU 11A, which, in the preferred embodiment, is a microprocessor. The CPU 11A can also be a microcomputer, a minicomputer, a macro-computer, and/or or a mainframe computer, depending upon the application.

The central processing computer 11 also includes a random access memory device(s) 11B (RAM) and a read only memory device(s) 11C (ROM), each of which is connected to, or linked with, the CPU 11A, and a user input device 11D, for entering data and/or information and/or commands into the central processing computer 11, which can include any one or more of a keyboard, a scanner, a user pointing device, such as, for example, a mouse, a touch pad, and/or an audio input device and/or a video input device, a microphone or audio recording device, a camera or a video recording device, and/or any device, electronic and/or otherwise, which can be utilized for inputting and/or entering data and/or information and/or commands into the central processing computer 11. The user input device(s) 11D is/are also connected to, or linked with, the CPU 11A. The central processing computer 11 also includes a display device 11E for displaying data and/or information to a user or operator. The display device 11E is also connected to, or linked with, the CPU 11A.

The central processing computer 11 also includes a transmitter(s) 11F, for transmitting signals and/or data and/or information to any one or more of the user communication device(s) 20, the employer communication device(s) 30, the counterparty communication device(s) 40, the media/content provider computer(s) 50, the digital assets/records storage computer(s) 60, the educational/instructional provider computer(s) 70, and/or the social networking computer(s) 80, and/or to any other central processing computer(s) 11 and/or any other individual computer(s) or individual communication device(s) which may be utilized in conjunction with the apparatus 100 of the present invention. The transmitter 11F is also connected to, or linked with, the CPU 11A.

The central processing computer 11 also includes a receiver 11G, for receiving signals and/or data and/or information from any one or more of the user communication device(s) 20, the employer communication device(s) 30, the counterparty communication device(s) 40, the media/content provider computer(s) 50, the digital assets/records storage computer(s) 60, the educational/instructional provider computer(s) 70, and/or the social networking computer(s) 80, and/or to any other central processing computer(s) 11 and/or any other individual computer(s) or individual communication device(s) which may be utilized in conjunction with the apparatus 100 of the present invention. The receiver 11G is also connected to, or linked with, the CPU 11A.

The central processing computer 11 also includes a database(s) 11H which contains any and/or all of the data and/or information required, needed, or desired, for allowing and/or enabling the central processing computer 11 and/or the apparatus 100 to perform any and/or all of the functions and functionalities described herein as being performed, and/or as capable of being performed, by the central processing computer 11 and/or the apparatus 100 of the present invention. In this regard, and notwithstanding any specific examples of data and/or information described herein as being stored in the database 11H, it is to be understood that the database 11H contains or includes any and/or all data and/or information required, needed, or desired, for allowing and/or enabling the central processing computer 11 and/or the apparatus 100 to perform any and/or all of the functions and functionalities described herein as being performed by the central processing computer 11 and/or the apparatus 100 of the present invention.

In a preferred embodiment, the database 11H can contain and/or include data and/or information pertaining to any and/or all of the users, individuals, employees, independent contractors, freelancers, employers, hiring entities, counterparties, media providers, content providers, digital asset storage providers, educational institutions, schools, high schools, secondary schools, colleges, universities, trade schools, instructional institutions, instructional facilities, social networks, RFID systems providers, RFID tags, and/or RFID reader systems, described herein as utilizing, or as being utilized in connection with the apparatus 100 of the present invention.

In a preferred embodiment, the database 11H can also contain and/or include, for each of the users, individuals, employees, independent contractors, freelancers, employers, hiring entities, and/or counterparties, described herein, information regarding the user's or individual's name, sex, age, birth date, address, telephone number, cellular telephone number, text messaging number, videoconferencing or video chat identification (ID) name or number, email address, website address or uniform resource locator (url), and/or any other contact information, agent or representative contact information, educational information, schooling, work experience, work history, skills, work-related skills, past employers, references, salary history, salary requirements, compensation requirements, benefit requirements, school transcripts, links to registrar's offices and/or databases at respective school(s) and/or to a transcript database and/or electronic storage facility, medium, and/or device, which stores transcripts and/or other scholastic and/or educational information about an individual(s), work samples, reference letters, recommendation letters, pictures, photographs, video clips, work schedule(s) and/or work calendar(s), and/or other relevant and/or pertinent information. In this manner, the apparatus 100 of the present invention facilitates more efficient access to data and/or information pertaining to a user(s) or individual(s).

In a preferred embodiment, the database 11H can include, for each of the users, individuals, employees, independent contractors, freelancers, employers, hiring entities, and/or counterparties, described herein, any information needed or desired for allowing the users, individuals, employees, independent contractors, freelancers, employers, hiring entities, and/or counterparties, to utilize the apparatus 100 in any manner described herein or otherwise.

The database 11H can also contain and/or include data and/or information pertaining to recruiters, headhunters, management consultants, managers, and/or other intermediaries, and/or third parties, who or which utilize the apparatus 100 of the present invention in order to act on behalf of any of the users, individuals, independent contractors, freelancers, employers, and/or hiring entities, who attempt to match the needs of any of the parties described herein.

In a preferred embodiment, the database 11H can also contain and/or include, for each of the media providers, content providers, digital asset storage providers, educational institutions, instructional institutions, and/or social network providers, who or which utilize the apparatus 100 of the present invention, information regarding the respective media provider's, content provider's, digital asset storage provider's, educational institution's, instructional institution's, or social network provider's, name, address, telephone number, cellular telephone number, text messaging number, videoconferencing or video chat identification (ID) name or number, email address, website address or uniform resource locator (url), and/or any other contact information, agent or representative contact information, references, reference letters, recommendation letters, pictures, photographs, video clips, work schedule(s) and/or work calendar(s), and/or other relevant and/or pertinent information.

In a preferred embodiment, the database 11H can also contain and/or include, for each of the users, individuals, employees, independent contractors, freelancers, employers, hiring entities, counterparties, media providers, content providers, digital asset storage providers, educational institutions, instructional institutions, and/or social network providers, who or which utilize the apparatus 100 of the present invention, information regarding a user or member profile page for the respective user, individual, employee, independent contractor, freelancer, employer, hiring entity, counterparty, media provider, content provider, digital asset storage provider, educational institution, instructional institution, and/or social network provider, who or which utilize the apparatus 100 of the present invention. In a preferred embodiment, the user or member profile page can include, for the respective user, individual, employee, independent contractor, freelancer, employer, hiring entity, counterparty, media provider, content provider, digital asset storage provider, educational institution, instructional institution, and/or social network provider, information regarding the name, address, telephone number, cellular telephone number, text messaging number, videoconferencing or video chat identification (ID) name or number, email address, website address or uniform resource locator (url), and/or any other contact information, agent or representative contact information, references, reference letters, recommendation letters, a picture(s), a photograph(s), a video clip(s), a work schedule(s) and/or work calendar(s), and/or other relevant and/or pertinent information, for the respective user, individual, employee, independent contractor, freelancer, employer, hiring entity, counterparty, media provider, content provider, digital asset storage provider, educational institution, instructional institution, and/or social network provider. The profile page can also contain and/or include a link(s) or hyperlink(s) to initiate a telephone call or a videoconference or video chat communication session, with the respective user, individual, employee, independent contractor, freelancer, employer, hiring entity, counterparty, media provider, content provider, digital asset storage provider, educational institution, instructional institution, and/or social network provider, and/or to send a text message or an email message to the respective user, individual, employee, independent contractor, freelancer, employer, hiring entity, counterparty, media provider, content provider, digital asset storage provider, educational institution, instructional institution, and/or social network provider.

The database 11H can also contain and/or include data and/or information regarding all past, present or current, and/or future, job listings, job openings, job postings, project listings, project posts, requests for proposals, requests for bids, and/or any other listings or postings regarding a need to hire an employee or employees or a need to engage and independent contractor, independent contractors, a freelancer, or freelancers, which can be listed or posted by any number of employers or hiring entities. The database 11H can also include data and/or information regarding any and/or all of the herein-described users, individuals, independent contractors, or freelancers, who are available to provide work for any of the herein-described employers or hiring entities as an employee, as an independent contractor, or as a freelancer, who have registered with the apparatus 100, who have applied for any past, present or current, and/or future, job listings, job openings, job postings, project listings, project posts, requests for proposals, requests for bids, and/or any other listings or postings of or by any of the herein-described employers or hiring entities, and/or who desire to apply for any past, present or current, and/or future, job listings, job openings, job postings, project listings, project posts, requests for proposals, requests for bids, and/or any other listings or postings of or by any of the herein-described employers or hiring entities. In this regard, the apparatus 100 can also serve as an on-line job, project, and/or assignment, clearinghouse.

The data and/or information contained and/or included in the database 11H can also include information concerning events, occurrences, availability of an applicant or applicants, and/or any other information of which the employer may which to be notified, and/or can also include information regarding when an employer or hiring entity will be in need of the assistance of, and/or the services, of users, individuals, independent contractors, temporary employees, and/or freelancers. The database 11H can also contain and/or include information regarding schedules and/or work calendars which can provide notification of the human resource needs of an employer or hiring entity.

The database 11H may also contain and/or include data and/or information regarding the latest developments and/or current developments in the employment and/or recruiting field, including, but not limited to, growth areas, and/or demand information for certain jobs and/or professions, and/or any other information.

In a preferred embodiment, the database 11H can also contain and/or include, for each of the users, individuals, employees, independent contractors, freelancers, employers, hiring entities, counterparties, media providers, content providers, digital asset storage providers, educational institutions, instructional institutions, and/or social network providers, who or which utilize the apparatus 100 of the present invention, information regarding any digital asset account(s), digital memorabilia account(s), a digital souvenir account(s), or any other digital account(s), instructional record(s), instructional records account(s), educational record(s), and/or educational records account(s), educational or instructional account(s), media account(s), and/or content account(s), and any and/or all data and/or information stored therein, of, for, or associated with, a respective user, individual, employee, independent contractor, freelancer, employer, hiring entity, counterparty, media provider, content provider, digital asset storage provider, educational institution, instructional institution, and/or social network provider.

In a preferred embodiment, the database 11H can contain and/or include any data and/or information described herein as being contained and/or included in any of the databases 20H of any and/or all of the user communication devices 20 utilized in connection with the apparatus 100, any data and/or information described herein as being contained and/or included in any of the databases 30H of any and/or all of the employer communication devices 30 utilized in connection with the apparatus 100, any data and/or information described herein as being contained and/or included in any of the databases 40H of any and/or all of the counterparty communication devices 40 utilized in connection with the apparatus 100, any data and/or information described herein as being contained and/or included in any of the databases 50H of any and/or all of the media/content provider computers 50 utilized in connection with the apparatus 100, any data and/or information described herein as being contained and/or included in any of the databases 60H of any and/or all of the digital assets/records storage computers 60 utilized in connection with the apparatus 100, any data and/or information described herein as being contained and/or included in any of the databases 70H of any and/or all of the educational/instructional provider computers 70 utilized in connection with the apparatus 100, and/or any data and/or information described herein as being contained and/or included in any of the databases 80H of any and/or all of the social networking computers 80 utilized in connection with the apparatus 100, and/or any other data and/or information needed and/or desired fro utilizing the apparatus 100 in any and/or all of the embodiments described herein.

In a preferred embodiment, any data and/or information described herein as being contained and/or included in the each of the respective databases 20H, 30H, 40H, 50H, 60H, 70H, and/or 80H, can be contained and/or included in the database 11H for each and every computer or communication device 11, 20, 30, 40, 50, 60, 70, and/or 80, utilized in connection with the apparatus 100. In this regard, Applicant hereby incorporates by reference herein any and/or all data and/or information described herein as being contained and/or included in each of the databases 20H, 30H, 40H, 50H, 60H, 70H, and/or 80H, as being contained and/or included in the database 11H for each and every central processing computer 11, user communication device 20, employer communication device 30, counterparty communication device 40, media/content provider computer 50, digital assets/records storage computer 60, educational/institutional provider computer 70, and/or social networking computer 80, which is utilized in connection with the apparatus 100 of the present invention. In another preferred embodiment, the data and/or information, described herein as being stored in each of the databases 11H, 20H, 30H, 40H, 50H, 60H, 70H, and/or 80H, for each and every central processing computer 11, user communication device 20, employer communication device 30, counterparty communication device 40, media/content provider computer 50, digital assets/records storage computer 60, educational/institutional provider computer 70, and/or social networking computer 80, utilized in connection with the apparatus 100 can also be stored in the database 11H.

The database 11H can also contain and/or include any data and/or information, including identifying information for or regarding each RFID tag 90A and each RFID reader system 90B which is used in conjunction with, or in connection with the apparatus 100 of the present invention. The database 11 can also contain and/or include data and/or information needed or utilized for tracking each RFID tag 90A, and/or for storing information regarding any thing, item, entity, or asset, to which each respective RFID tag 90A is attached, associated, or assigned.

The database 11H can also contain and/or include, for each respective user, individual, employee, independent contractor, freelancer, employer, hiring entity, counterparty, media provider, content provider, digital asset storage provider, educational institution, instructional institution, and/or social network provider, information regarding the respective user's, individual's, employee's, independent contractor's, freelancer's, employer's, hiring entity's, counterparty's, media provider's, content provider's, digital asset storage provider's, educational institution's, instructional institution's, and/or social network provider's, name, address, telephone number(s), cellular telephone number(s), mobile or wireless telephone number(s), e-mail address or e-mail addresses, and/or text message, instant message, SMS message, or MMS message, or any other messaging, telephone number or other address or identifier, videoconferencing or video chat identification (ID) name or number, website(s), domain name, and/or IP address(es). In a preferred embodiment, each of the respective databases 20H, 30H, 40H, 50H, 60H, 70H, and/or 80H, described herein, can also contain and/or include the respective user's, individual's, employee's, independent contractor's, freelancer's, employer's, hiring entity's, counterparty's, media provider's, content provider's, digital asset storage provider's, educational institution's, instructional institution's, and/or social network provider's, name, address, telephone number(s), cellular telephone number(s), mobile or wireless telephone number(s), e-mail address or e-mail addresses, and/or text message, instant message, SMS message, or MMS message, or any other messaging, telephone number or other address or identifier, videoconferencing or video chat identification (ID) name or number, website(s), domain name, and/or IP address(es).

The database 11H can also contain and/or include, for each respective user, individual, employee, independent contractor, freelancer, employer, hiring entity, counterparty, media provider, content provider, digital asset storage provider, educational institution, instructional institution, and/or social network provider, who or which utilizes the apparatus 100, data and/or information regarding any searches for or regarding, any requests for alerts regarding, or any requests for notification messages regarding, any jobs, projects, assignments, offers to work, lessons, classes, courses, or seminars, and/or any other offerings described herein as being offered or provided by, or otherwise offered or provided by, any other user, individual, employee, independent contractor, freelancer, employer, hiring entity, counterparty, media provider, content provider, digital asset storage provider, educational institution, instructional institution, and/or social network provider.

The database 11H can also include advertisements, advertisement materials and information, marketing materials or information, commercials, video clips, infomercials, and any other information, which can include text information, video information, audio information, or any combination of same, which can be used to provide an advertisement, or advertisement material or information, to or for any user, individual, employee, independent contractor, freelancer, employer, hiring entity, counterparty, media provider, content provider, digital asset storage provider, educational institution, instructional institution, and/or social network provider, who or which utilizes the apparatus 100 of the present invention.

The database 11H can also contain and/or include news information, news reports, published reports, theses, study reports, programs, television programs, video information, and/or audio information, or any other data or information regarding any instructional, educational, academic, scholastic, health, fitness, wellness, exercise, martial arts, sports, or athletics, or any healthcare, therapeutic, or other, information, issues, news, news reports, published papers, white papers, magazine articles, television shows or programs, radio programs, Internet or World Wide Web broadcasts or programs, video clips, audio clips, videos, or any other media or information which can be provided to, for, or by, any user, individual, employee, independent contractor, freelancer, employer, hiring entity, counterparty, media provider, content provider, digital asset storage provider, educational institution, instructional institution, and/or social network provider, who or which utilizes the apparatus 100 of the present invention.

The database 11H can also include language translation information or software so that any of the data or information described herein as being stored in the database 11H, and/or in any of the databases 20H, 30H, 40H, 50H, 60H, 70H, and/or 80H, or as being provided in any of the messages, reports, or other communications, described herein, can be translated into any language or any languages.

The database 11H can also contain any notes, comments, or messages, which can be provided in text, in audio recordings or audio clips, and/or in video recordings or video clips. The database 11H can also contain any data, information, and/or software programs for translating audio information into text information and for translating text information into audio information. The database 11H can also contain any data, information, and/or software programs for translating text information or audio information from one language to another so as to provide a multi-lingual communications platform and system. The database 11H can also contain any notes, comments, or messages, which can be provided by or for user, individual, employee, independent contractor, freelancer, employer, hiring entity, counterparty, media provider, content provider, digital asset storage provider, educational institution, instructional institution, and/or social network provider, described herein who or which utilizes the apparatus 100 of the present invention.

In a preferred embodiment, any text or audio information described herein can be translated into or from text to audio or from audio into text, and any text or audio information can be translated from one language to any other language or languages.

The database 11H can also contain any other data and/or information, including software for performing any and all of the operations, routines, processing routines, and other functions and/or functionality, described herein as being capable of being performed by the apparatus 100, and/or by the central processing computer(s) 11 and/or by any of the herein-described user communication device(s) 20, employer communication device(s) 30, counterparty communication device(s) 40, media/content provider computer(s) 50, digital assets/records storage computer(s) 60, educational/instructional provider computer(s) 70, and/or social networking computer(s) 80.

The database 11H can also contain any data and/or information to or regarding, as well as any links or hyperlinks to, any of the herein-described user communication device(s) 20, employer communication device(s) 30, counterparty communication device(s) 40, media/content provider computer(s) 50, digital assets/records storage computer(s) 60, educational/instructional provider computer(s) 70, and/or social networking computer(s) 80, described herein, and/or their any of their respective databases 20H, 30H, 40H, 50H, 60H, 70H, and/or 80H, and/or can contain data and/or information and/or links or hyperlinks to any data and/or information located in, or stored at, or in, any of the user communication device(s) 20, employer communication device(s) 30, counterparty communication device(s) 40, media/content provider computer(s) 50, digital assets/records storage computer(s) 60, educational/instructional provider computer(s) 70, and/or social networking computer(s) 80, described herein, and/or stored in any of the respective databases 20H, 30H, 40H, 50H, 60H, 70H, and/or 80H, of same.

In any and/or all of the embodiments described herein, any of the data and/or information which is, or which may be, stored in the database 11H, and/or in any of the other databases 20H, 30H, 40H, 50H, 60H, 70H, and/or 80H described herein, can be utilized in and/or can appear in any of the reports, messages, alerts, alert messages, notification messages, or any other information, described herein as being generated by the apparatus 100 of the present invention.

The database 11H can also contain and/or include, for each user, individual, employee, independent contractor, freelancer, employer, hiring entity, counterparty, media provider, content provider, digital asset storage provider, educational institution, instructional institution, and/or social network provider, who or which utilizes the apparatus 100 of the present invention, information regarding any search criteria or alert or notification criteria of or associated with the respective user, individual, employee, independent contractor, freelancer, employer, hiring entity, counterparty, media provider, content provider, digital asset storage provider, educational institution, instructional institution, and/or social network provider. The database 11H can also contain and/or include, for each user, individual, employee, independent contractor, freelancer, employer, hiring entity, counterparty, media provider, content provider, digital asset storage provider, educational institution, instructional institution, and/or social network provider, who or which utilizes the apparatus 100 of the present invention, information regarding any alerts, alert messages, notifications, or notification messages, the subject matter or desired contents of same, and any other information regarding any requests to receive the same.

The databases 11H can also contain and/or include copies of any all recordings of videoconference calls, video and audio recordings, audio recordings, and/or any other communications which take place by and/or between any of the users, individuals, employees, independent contractors, freelancers, employers, hiring entities, counterparties, media providers, content providers, digital asset storage providers, educational institutions, instructional institutions, and/or social network providers, who or which utilize the apparatus 100 of the present invention.

The database 11H can also contain and/or include any data and/or information regarding any interactions, transactions, employment applications, submitted resumes, submitted proposals, interviews, conference calls, consultations, and/or any other activities, which take place by and between any of the users, individuals, employees, independent contractors, freelancers, employers, hiring entities, counterparties, media providers, content providers, digital asset storage providers, educational institutions, instructional institutions, and/or social network providers, who or which utilize the apparatus 100, and data and/or information regarding any considerations, outcomes, results, and/or decisions, relating to, or deriving or resulting from the same.

In a preferred embodiment, the database 11H can also contain and/or include any software programs, software algorithms, and/or software applications ("apps") deemed to be necessary, desirable, and/or useful, in utilizing the apparatus 100 and method of the present invention in the various embodiments described herein. In a preferred embodiment, the database 11H can also contain and/or include any other data and/or information deemed to be necessary, desirable, and/or useful, in utilizing the apparatus 100 and method of the present invention in the various embodiments described herein. The database 11H can also contain and/or include any other data and/or information which is or may be needed and/or desired in performing any and/or all of the features and/or functionality described herein as being provided by the apparatus 100 of the present invention and/or the central processing computer 11, and/or any of the herein-described user communication devices 20, employer communication devices 30, counterparty communication devices 40, media/content provider computers 50, digital assets/records storage computers 60, educational/instructional provider computers 70, and/or social networking computers 80.

The database 11H can also contain and/or include any other data and/or information which is or may be needed and/or desired in performing any and/or all of the features and/or functionality described herein as being provided by the apparatus 100 of the present invention and/or described herein as being provided by the central processing computer 10 and/or any of the communication devices or computers 20, 30, 40, 50, 60, 70, and/or 80. The database 11H can also contain and/or include any other data and/or information which is or may be stored in any of the herein-described databases 20H, 30H, 40H, 50H, 60H, 70H, and/or 80H.

The database 11H can also contain and/or include, and/or can be linked to or with, any of the data and/or information described herein as being stored in any of the respective databases 11H, 20H, 30H, 30H, 50H, 60H, 70H, and/or 80H, of any of the herein-described computers or communication devices 11, 20, 30, 40, 50, 60, 70, and/or 80. The database 11H can also contain and/or include any other data and/or information which is, or may be, needed and/or desired in performing any and/or all of the features and/or functionality described herein as being provided by the apparatus 100 of the present invention and/or the central processing computer 11.

It is important to note, and it is to be understood, that the database 11H can contain and/or include any data and/or information which is described herein as be input into, received by, processed by, generated by, and/or transmitted from, the central procession computer(s) 11, and/or any of the herein-described user communication devices 20, employer communication devices 30, counterparty communication devices 40, media/content provider computers 50, digital assets/records storage computers 60, educational/instructional provider computers 70, and/or social networking computers 80.

The central processing computer 11 also includes an output device 11I for outputting any of the data, information, or reports, described herein or otherwise. In the preferred embodiment, the output device 11I can be a printer, a display, a transmitter, a modem, a speaker, and/or any other device which can be used to output data.

The central processing computer 11 can also include a video and/or audio recording device(s) 11J which can include a camera and/or a video recording device, for recording pictures or video and/or video clips, and/or a microphone or an audio recording device, for recording audio or audio clips, which can be recorded by, and/or transmitted live, by or from the central processing computer 11, or which can be recorded by, and stored at or in, the central processing computer 11 for transmission by or from the central processing computer 11 at a later time. The video and/or audio recording device(s) 11J can also be utilized to facilitate one-way broadcasts from the central processing computer 11, and/or can be utilized to facilitate video conferencing, video chatting, and/or audio conferencing, and/or video and audio conferencing, between users of the central processing computer 11 and any of the herein-described users, individuals, persons, or entities, who or which utilize the apparatus 100 of the present invention.

The central processing computer 11 can also include a global positioning device 11K. In a preferred embodiment, the global positioning device 11K determines or can determine a position or location of the central processing computer 11.

In a preferred embodiment, the central processing computer 11 can also be equipped, and/or can be programmed, for voice activation operation and/or voice control operation of and/or regarding any and/or all of the herein-described operations and functions which are capable of being performed by the central processing computer 11.

Figure 3:
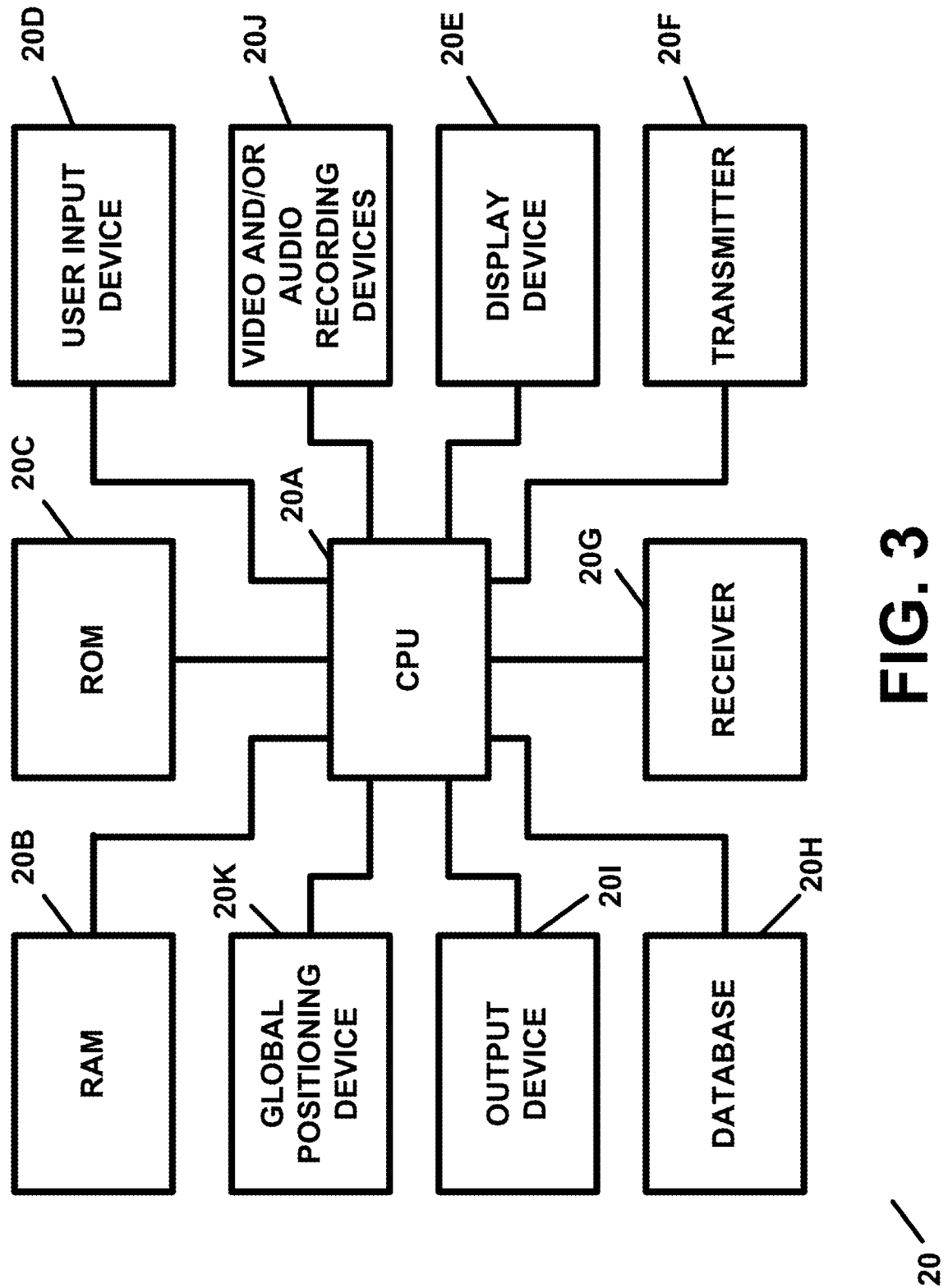
FIG. 3 illustrates the user communication device of FIG. 1, in block diagram form.

FIG. 3 illustrates the user communication device 20 of the apparatus 100, in block diagram form. The user communication device 20, in the preferred embodiment, can be any communication device, computer, personal computer, laptop computer, notebook computer, Smart phone or smartphone, smart telephone, cellular telephone, personal digital assistant, wireless telephone, wireless communication device, tablet, tablet computer, watch, smart watch, or wearable device or computer, or any combination of same, or any equivalent of same, or any other computer or communication device, which can provide the functionality of, and which can be utilized as a user communication device 20. In the preferred embodiment, the user communication device 20 includes a central processing unit or CPU 20A, which, in the preferred embodiment, is a microprocessor. The CPU 20A can also be a microcomputer, a minicomputer, a macro-computer, and/or a mainframe computer, depending upon the application.

The user communication device 20 also includes a random access memory device(s) 20B (RAM) and a read only memory device(s) 20C (ROM), each of which is connected to, or linked with, the CPU 20A, and a user input device 20D, for entering data and/or information and/or commands into the user communication device 20, which can include any one or more of a keyboard, a scanner, a user pointing device, such as, for example, a mouse, a touch pad, and/or an audio input device and/or a video input device, a microphone or audio recording device, a camera or a video recording device, and/or any device, electronic and/or otherwise, which can be utilized for inputting and/or entering data and/or information and/or commands into the user communication device 20. The user input device(s) 20D is/are also connected to, or linked with, the CPU 20A. The user communication device 20 also includes a display device 20E for displaying data and/or information to a user or individual. The display device 20E is also connected to, or linked with, the CPU 20A.

The user communication device 20 also includes a transmitter(s) 20F, for transmitting signals and/or data and/or information to any one or more of the central processing computer(s) 11, the employer communication device(s) 30, the counterparty communication device(s) 40, the media/content provider computer(s) 50, the digital assets/records storage computer(s) 60, the educational/instructional provider computer(s) 70, and/or the social networking computer(s) 80, and/or to any other user communication device(s) 20, and/or any other individual computer(s) or individual communication device(s) which may be utilized in conjunction with the apparatus 100 of the present invention. The transmitter 20F is also connected to, or linked with, the CPU 20A.

The user communication device 20 also includes a receiver 20G, for receiving signals and/or data and/or information from any one or more of the central processing computer(s) 11, the employer communication device(s) 30, the counterparty communication device(s) 40, the media/content provider computer(s) 50, the digital assets/records storage computer(s) 60, the educational/instructional provider computer(s) 70, and/or the social networking computer(s) 80, and/or from any other user communication device(s) 20, and/or any other individual computer(s) or individual communication device(s) which may be utilized in conjunction with the apparatus 100 of the present invention. The receiver 20G is also connected to, or linked with, the CPU 20A.

The user communication device 20 also includes a database(s) 20H which contains any and/or all of the data and/or information required, needed, or desired, for allowing and/or enabling the user communication device 20 and/or the apparatus 100 to perform any and/or all of the functions and functionalities described herein as being performed, and/or as capable of being performed, by the user communication device 20 and/or the apparatus 100. In this regard, and notwithstanding any specific examples of data and/or information described herein as being stored in the database 20H, it is to be understood that the database 20H contains and/or includes any and/or all data and/or information required, needed, or desired, for allowing and/or enabling the user communication device 20 and/or the apparatus 100 to perform any and/or all of the functions and functionalities described herein as being performed by the user communication device 20 and/or the apparatus 100 of the present invention.

In a preferred embodiment, the database 20H can contain and/or include any data and/or information regarding the user or individual, including, but not limited to, the name, sex, age, birth date, address, telephone number, cellular telephone number, text messaging number, videoconferencing or video chat identification (ID) name or number, email address, website address or uniform resource locator (url), and/or any other contact information, agent or representative contact information, of the user or individual. In a preferred embodiment, the database 20H can also contain and/or include educational and/or training information for or regarding the user or individual, educational or training transcripts or records of or for the user or individual, work experience and/or work history information for or regarding the user or individual, and/or any other data and/or information for or regarding the user or individual.

In a preferred embodiment, the database 20H can also include work schedule(s) and/or work calendar(s), including project schedules and/or calendars, work scheduling information, and/or work schedule information, for or regarding the user or individual. This data and/or information can also include information concerning when the user or individual may be in need of work or a project or assignment, and/or when the user or individual is or may be available to take a job, accept employment, or be available for a project or assignment. This data and/or information can also include information concerning when the user or individual is scheduled to work and/or when the user or individual is available to take work assignments.

In a preferred embodiment, the database 20H can also contain and/or include information regarding any digital asset account(s), digital memorabilia account(s), a digital souvenir account(s), or any other digital account(s), instructional record(s), instructional records account(s), educational record(s), and/or educational records account(s), educational or instructional account(s), media account(s), and/or content account(s), of, for, or associated with, the user or individual. In a preferred embodiment, the database 20H can also contain and/or include video recordings, video calls, video conference recordings, video chat recordings, audio recordings, telephone call recordings, video and audio recordings, photographs, pictures, and/or any records regarding any transactions or activities, involving, regarding, or relating to any interests of or regarding, the user or individual.

The database 20H can also contain and/or include, and/or can be linked to or with, any of the data and/or information described herein as being stored in any of the respective databases 11H, 20H, 30H, 30H, 50H, 60H, 70H, and/or 80H, of any of the herein-described computers or communication devices. The database 20H can also contain and/or include any other data and/or information which is, or may be, needed and/or desired in performing any and/or all of the features and/or functionality described herein as being provided by the apparatus 100 of the present invention and/or the user communication device 20.

The user communication device 20 also includes an output device 20I for outputting any of the data, information, or reports, described herein or otherwise. In the preferred embodiment, the output device 20I can be a printer, a display, a transmitter, a modem, a speaker, and/or any other device which can be used to output data.

The user communication device 20 can also include a video and/or audio recording device(s) 20J which can include a camera and/or a video recording device, for recording pictures or video and/or video clips, and/or a microphone or an audio recording device, for recording audio or audio clips, which can be recorded by, and/or transmitted live, by or from the user communication device 20, or which can be recorded by, and stored at or in, the user communication device 20 for transmission by or from the user communication device 20 at a later time. The video and/or audio recording device(s) 20J can also be utilized to facilitate one-way broadcasts from the user communication device 20, and/or can be utilized to facilitate video conferencing, video chatting, and/or audio conferencing, and/or video and audio conferencing, between a user of the user communication device 20 and any of the herein-described users, individuals, persons, or entities, who or which utilize the apparatus 100 of the present invention.

The user communication device 20 can also include a global positioning device 20K. In a preferred embodiment, the global positioning device 20K determines or can determine a position or location of the user communication device 20.

In a preferred embodiment, the user communication device 20 can also be equipped, and/or can be programmed, for voice activation operation and/or voice control operation of and/or regarding any and/or all of the herein-described operations and functions which are capable of being performed by the user communication device 20.

Figure 4:
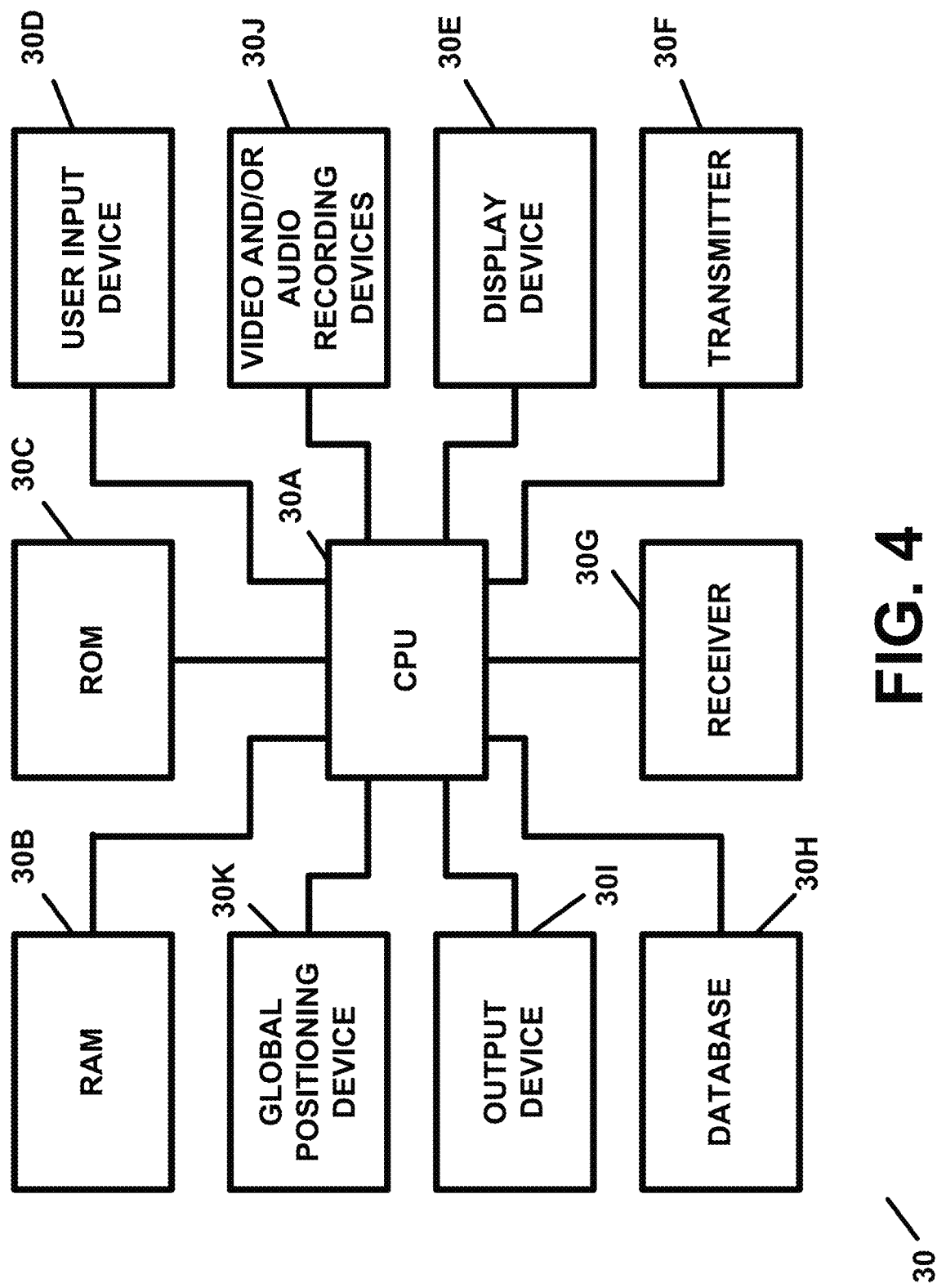
FIG. 4 illustrates the employer communication device of FIG. 1, in block diagram form.

FIG. 4 illustrates the employer communication device 30 of the apparatus 100, in block diagram form. The employer communication device 30, in the preferred embodiment, can be any communication device, computer, personal computer, laptop computer, notebook computer, Smart phone or smartphone, smart telephone, cellular telephone, personal digital assistant, wireless telephone, wireless communication device, tablet, tablet computer, watch, smart watch, or wearable device or computer, or any combination of same, or any equivalent of same, or any other computer or communication device, which can provide the functionality of, and which can be utilized as an employer communication device 30. In the preferred embodiment, the employer communication device 30 includes a central processing unit or CPU 30A, which, in the preferred embodiment, is a microprocessor. The CPU 30A can also be a microcomputer, a minicomputer, a macro-computer, and/or a mainframe computer, depending upon the application.

The employer communication device 30 also includes a random access memory device(s) 30B (RAM) and a read only memory device(s) 30C (ROM), each of which is connected to, or linked with, the CPU 30A, and a user input device 30D, for entering data and/or information and/or commands into the employer communication device 30, which can include any one or more of a keyboard, a scanner, a user pointing device, such as, for example, a mouse, a touch pad, and/or an audio input device and/or a video input device, a microphone or audio recording device, a camera or a video recording device, and/or any device, electronic and/or otherwise, which can be utilized for inputting and/or entering data and/or information and/or commands into the employer communication device 30. The user input device(s) 30D is/are also connected to, or linked with, the CPU 30A. The employer communication device 30 also includes a display device 30E for displaying data and/or information to a user or individual. The display device 30E is also connected to, or linked with, the CPU 30A.

The employer communication device 30 also includes a transmitter(s) 30F, for transmitting signals and/or data and/or information to any one or more of the central processing computer(s) 11, the user communication device(s) 20, the counterparty communication device(s) 40, the media/content provider computer(s) 50, the digital assets/records storage computer(s) 60, the educational/instructional provider computer(s) 70, and/or the social networking computer(s) 80, and/or to any other employer communication device(s) 30, and/or any other individual computer(s) or individual communication device(s) which may be utilized in conjunction with the apparatus 100 of the present invention. The transmitter 30F is also connected to, or linked with, the CPU 30A.

The employer communication device 30 also includes a receiver 30G, for receiving signals and/or data and/or information from any one or more of the central processing computer(s) 11, the user communication device(s) 20, the counterparty communication device(s) 40, the media/content provider computer(s) 50, the digital assets/records storage computer(s) 60, the educational/instructional provider computer(s) 70, and/or the social networking computer(s) 80, and/or to any other employer communication device(s) 30, and/or any other individual computer(s) or individual communication device(s) which may be utilized in conjunction with the apparatus 100 of the present invention. The receiver 30G is also connected to, or linked with, the CPU 30A.

The employer communication device 30 also includes a database(s) 30H which contains and/or includes any and/or all of the data and/or information required, needed, or desired, for allowing and/or enabling the employer communication device 30 and/or the apparatus 100 to perform any and/or all of the functions and functionalities described herein as being performed, and/or as capable of being performed, by the employer communication device 30 and/or the apparatus 100 of the present invention. In this regard, and notwithstanding any specific examples of data and/or information described herein as being stored in the database 30H, it is to be understood that the database 30H contains and/or includes any and/or all data and/or information required, needed, or desired, for allowing and/or enabling the employer communication device 30 and/or the apparatus 100 to perform any and/or all of the functions and functionalities described herein as being performed by the employer communication device 30 and/or the apparatus 100 of the present invention.

In a preferred embodiment, the database 30H can contain and/or include any data and/or information regarding the employer or hiring entity, including, but not limited to, the name, address, telephone number, cellular telephone number, text messaging number, videoconferencing or video chat identification (ID) name or number, email address, website address or uniform resource locator (url), and/or any other contact information, agent or representative contact information, of or regarding the employer or hiring entity.

In a preferred embodiment, the database 30H can contain and/or include information regarding and/or all employees, independent contractors, freelancers, or other individuals, who work for, or who are engaged by, the employer or hiring entity. In a preferred embodiment, the database 30H can contain and/or include information regarding job postings, job listings, project postings, project listings, request for proposals, requests for buds, or any other information regarding the employer or hiring entity. In a preferred embodiment, the database 30H can contain and/or include information regarding any job offerings, job openings, job(s) or position(s) needed to be filled, job(s) or position(s) desired to be filled, employer size, employer location, regional location, jobs or positions employed, benefits offered, employer history, salary information, compensation information, customer information, supplier information, information from past employees, information from current employees, past and/or current employment agencies or recruiters representing the employer, types of positions, including, but not limited to, permanent and/or temporary positions, references, pictures of facilities, video clips, fringe benefits, work hours, work requirements, recommendation letters, salary and/or compensation information, of or regarding the employer or hiring entity.

In a preferred embodiment, the database 30H can also include work schedule(s) and/or work calendar(s), including project schedules and/or calendars, work scheduling information, and/or work schedule information, for or regarding the employer or hiring entity. This data and/or information can also include information concerning when the employer or hiring entity may be in need of individuals, independent contractors, and/or freelancers, and/or when the employer and/or hiring entity may not be in need of same.

In a preferred embodiment, the database 30H can also contain and/or include any recruitment information, candidate search information, and/or other information for enabling or allowing the employer or hiring entity to recruit or locate new hires, employees, independent contractors, or freelancers, for any of their recruitment or manpower needs.

In a preferred embodiment, the database 30H can also contain and/or include information regarding any digital asset account(s), digital memorabilia account(s), a digital souvenir account(s), or any other digital account(s), instructional record(s), instructional records account(s), educational record(s), and/or educational records account(s), educational or instructional account(s), media account(s), and/or content account(s), of, for, or associated with, the employer or hiring entity. In a preferred embodiment, the database 30H can also contain and/or include video recordings, video calls, video conference recordings, video chat recordings, audio recordings, telephone call recordings, video and audio recordings, photographs, pictures, and/or any records regarding any transactions or activities, involving, regarding, or relating to any interests of or regarding, the employer or hiring entity.

The database 30H can also contain and/or include, and/or can be linked to or with, any of the data and/or information described herein as being stored in any of the respective databases 11H, 20H, 30H, 30H, 50H, 60H, 70H, and/or 80H, of any of the herein-described computers or communication devices. The database 30H can also contain and/or include any other data and/or information which is, or may be, needed and/or desired in performing any and/or all of the features and/or functionality described herein as being provided by the apparatus 100 of the present invention and/or the employer communication device 30.

The employer communication device 30 also includes an output device 30I for outputting any of the data, information, or reports, described herein or otherwise. In the preferred embodiment, the output device 30I can be a printer, a display, a transmitter, a modem, a speaker, and/or any other device which can be used to output data.

The employer communication device 30 can also include a video and/or audio recording device(s) 30J which can include a camera and/or a video recording device, for recording pictures or video and/or video clips, and/or a microphone or an audio recording device, for recording audio or audio clips, which can be recorded by, and/or transmitted live, by or from the employer communication device 30, or which can be recorded by, and stored at or in, the employer communication device 30 for transmission by or from the employer communication device 30 at a later time. The video and/or audio recording device(s) 30J can also be utilized to facilitate one-way broadcasts from the employer communication device 30, and/or can be utilized to facilitate video conferencing, video chatting, and/or audio conferencing, and/or video and audio conferencing, between a user of the employer communication device 30 and any of the herein-described users, individuals, persons, or entities, who or which utilize the apparatus 100 of the present invention.

The employer communication device 30 can also include a global positioning device 30K. In a preferred embodiment, the global positioning device 30K determines or can determine a position or location of the employer communication device 30.

In a preferred embodiment, the employer communication device 30 can also be equipped, and/or can be programmed, for voice activation operation and/or voice control operation of and/or regarding any and/or all of the herein-described operations and functions which are capable of being performed by the employer communication device 30.

Figure 5:
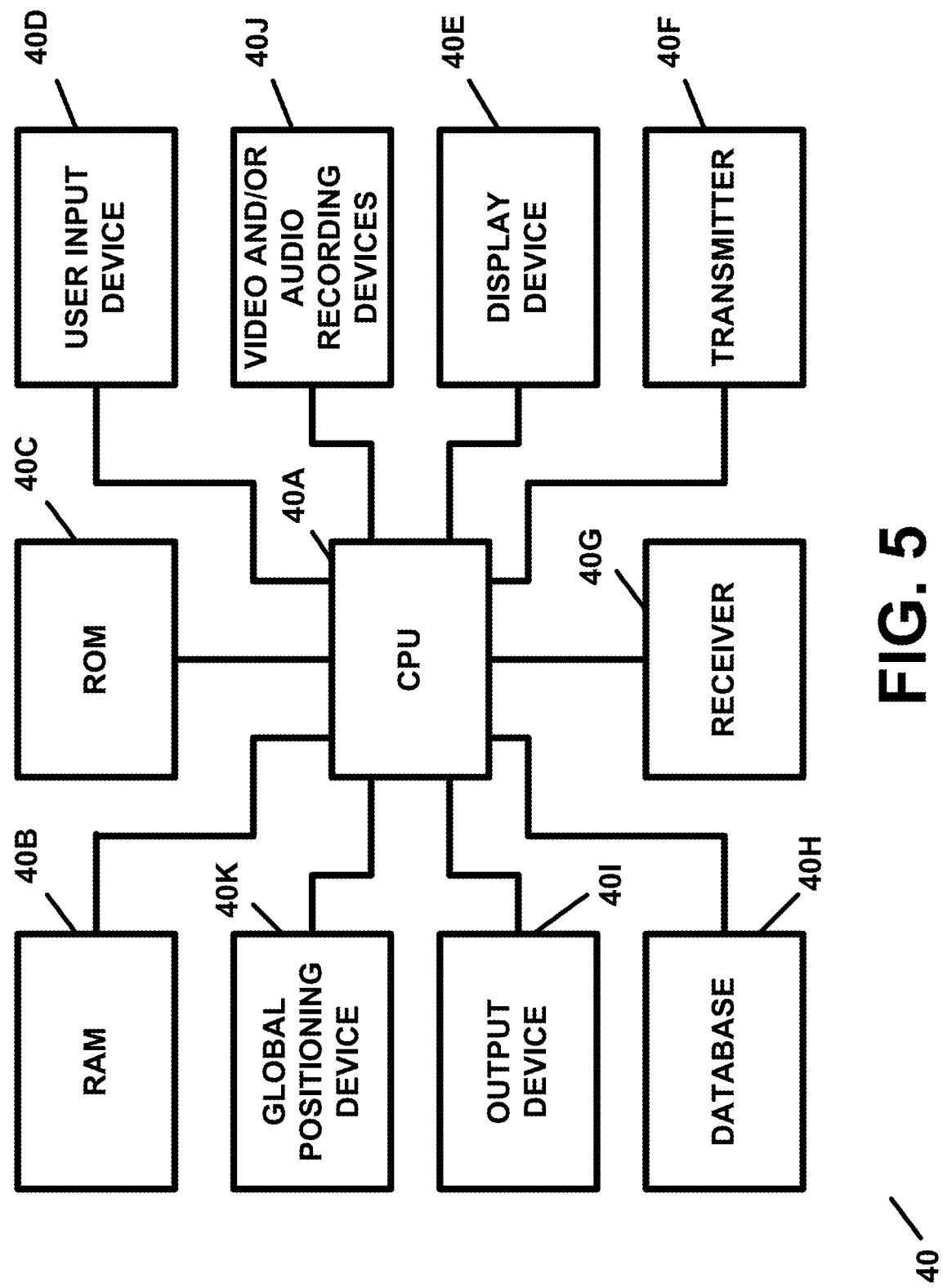
FIG. 5 illustrates the counterparty communication device of FIG. 1, in block diagram form.

FIG. 5 illustrates the counterparty communication device 40 of the apparatus 100, in block diagram form. The counterparty communication device 40, in the preferred embodiment, can be any communication device, computer, personal computer, laptop computer, notebook computer, Smart phone or smartphone, smart telephone, cellular telephone, personal digital assistant, wireless telephone, wireless communication device, tablet, tablet computer, watch, smart watch, or wearable device or computer, or any combination of same, or any equivalent of same, or any other computer or communication device, which can provide the functionality of, and which can be utilized as a counterparty communication device 40. In the preferred embodiment, the counterparty communication device 40 includes a central processing unit or CPU 40A, which, in the preferred embodiment, is a microprocessor. The CPU 40A can also be a microcomputer, a minicomputer, a macro-computer, and/or a mainframe computer, depending upon the application.

The counterparty communication device 40 also includes a random access memory device(s) 40B (RAM) and a read only memory device(s) 40C (ROM), each of which is connected to, or linked with, the CPU 40A, and a user input device 40D, for entering data and/or information and/or commands into the counterparty communication device 40, which can include any one or more of a keyboard, a scanner, a user pointing device, such as, for example, a mouse, a touch pad, and/or an audio input device and/or a video input device, a microphone or audio recording device, a camera or a video recording device, and/or any device, electronic and/or otherwise, which can be utilized for inputting and/or entering data and/or information and/or commands into the counterparty communication device 40. The user input device(s) 40D is/are also connected to, or linked with, the CPU 40A. The counterparty communication device 40 also includes a display device 40E for displaying data and/or information to a user or individual. The display device 40E is also connected to, or linked with, the CPU 40A.

The counterparty communication device 40 also includes a transmitter(s) 40F, for transmitting signals and/or data and/or information to any one or more of the central processing computer(s) 11, the user communication device(s)

20, the employer communication device(s) 30, the media/content provider computer(s) 50, the digital assets/records storage computer(s) 60, the educational/instructional provider computer(s) 70, and/or the social networking computer(s) 80, and/or to any other counterparty communication device(s) 40, and/or any other individual computer(s) or individual communication device(s) which may be utilized in conjunction with the apparatus 100 of the present invention. The transmitter 40F is also connected to, or linked with, the CPU 40A.

The counterparty communication device 40 also includes a receiver 40G, for receiving signals and/or data and/or information from any one or more of the central processing computer(s) 11, the user communication device(s) 20, the employer communication device(s) 30, the media/content provider computer(s) 50, the digital assets/records storage computer(s) 60, the educational/instructional provider computer(s) 70, and/or the social networking computer(s) 80, and/or to any other counterparty communication device(s) 40, and/or any other individual computer(s) or individual communication device(s) which may be utilized in conjunction with the apparatus 100 of the present invention. The receiver 40G is also connected to, or linked with, the CPU 40A.

The counterparty communication device 40 also includes a database(s) 40H which contains any and/or all of the data and/or information required, needed, or desired, for allowing and/or enabling the counterparty communication device 40 and/or the apparatus 100 to perform any and/or all of the functions and functionalities described herein as being performed, and/or as capable of being performed, by the counterparty communication device 40 and/or the apparatus 100 of the present invention. In this regard, and notwithstanding any specific examples of data and/or information described herein as being stored in the database 40H, it is to be understood that the database 40H contains and/or includes any and/or all data and/or information required, needed, or desired, for allowing and/or enabling the counterparty communication device 40 and/or the apparatus 100 to perform any and/or all of the functions and functionalities described herein as being performed by the counterparty communication device 40 and/or the apparatus 100 of the present invention.

In a preferred embodiment, the database 40H can contain and/or include any data and/or information regarding the counterparty, including, but not limited to, the name, sex, age, birth date, address, telephone number, cellular telephone number, text messaging number, videoconferencing or video chat identification (ID) name or number, email address, website address or uniform resource locator (url), and/or any other contact information, agent or representative contact information, of the counterparty. In a preferred embodiment, the database 40H can also contain and/or include information regarding any digital asset account(s), digital memorabilia account(s), a digital souvenir account(s), or any other digital account(s), instructional record(s), instructional records account(s), educational record(s), and/or educational records account(s), educational or instructional account(s), media account(s), and/or content account(s), of, for, or associated with, the counterparty. In a preferred embodiment, the database 40H can also contain and/or include video recordings, video calls, video conference recordings, video chat recordings, audio recordings, telephone call recordings, video and audio recordings, photographs, pictures, and/or any records regarding any transactions or activities, involving, regarding, or relating to any interests of or regarding, the counterparty.

The database 40H can also contain and/or include, and/or can be linked to or with, any of the data and/or information described herein as being stored in any of the respective databases 11H, 20H, 30H, 30H, 50H, 60H, 70H, and/or 80H, of any of the herein-described computers or communication devices. The database 40H can also contain and/or include any other data and/or information which is, or may be, needed and/or desired in performing any and/or all of the features and/or functionality described herein as being provided by the apparatus 100 of the present invention and/or the counterparty communication device 40.

The counterparty communication device 40 also includes an output device 40I for outputting any of the data, information, or reports, described herein or otherwise. In the preferred embodiment, the output device 40I can be a printer, a display, a transmitter, a modem, a speaker, and/or any other device which can be used to output data.

The counterparty communication device 40 can also include a video and/or audio recording device(s) 40J which can include a camera and/or a video recording device, for recording pictures or video and/or video clips, and/or a microphone or an audio recording device, for recording audio or audio clips, which can be recorded by, and/or transmitted live, by or from the counterparty communication device 40, or which can be recorded by, and stored at or in, the counterparty communication device 40 for transmission by or from the counterparty communication device 40 at a later time. The video and/or audio recording device(s) 40J can also be utilized to facilitate one-way broadcasts from the counterparty communication device 40, and/or can be utilized to facilitate video conferencing, video chatting, and/or audio conferencing, and/or video and audio conferencing, between a user of the counterparty communication device 40 and any of the herein-described users, individuals, persons, or entities, who or which utilize the apparatus 100 of the present invention.

The counterparty communication device 40 can also include a global positioning device 40K. In a preferred embodiment, the global positioning device 40K determines or can determine a position or location of the counterparty communication device 40.

In a preferred embodiment, the counterparty communication device 40 can also be equipped, and/or can be programmed, for voice activation operation and/or voice control operation of and/or regarding any and/or all of the herein-described operations and functions which are capable of being performed by the counterparty communication device 40.

Figure 6:
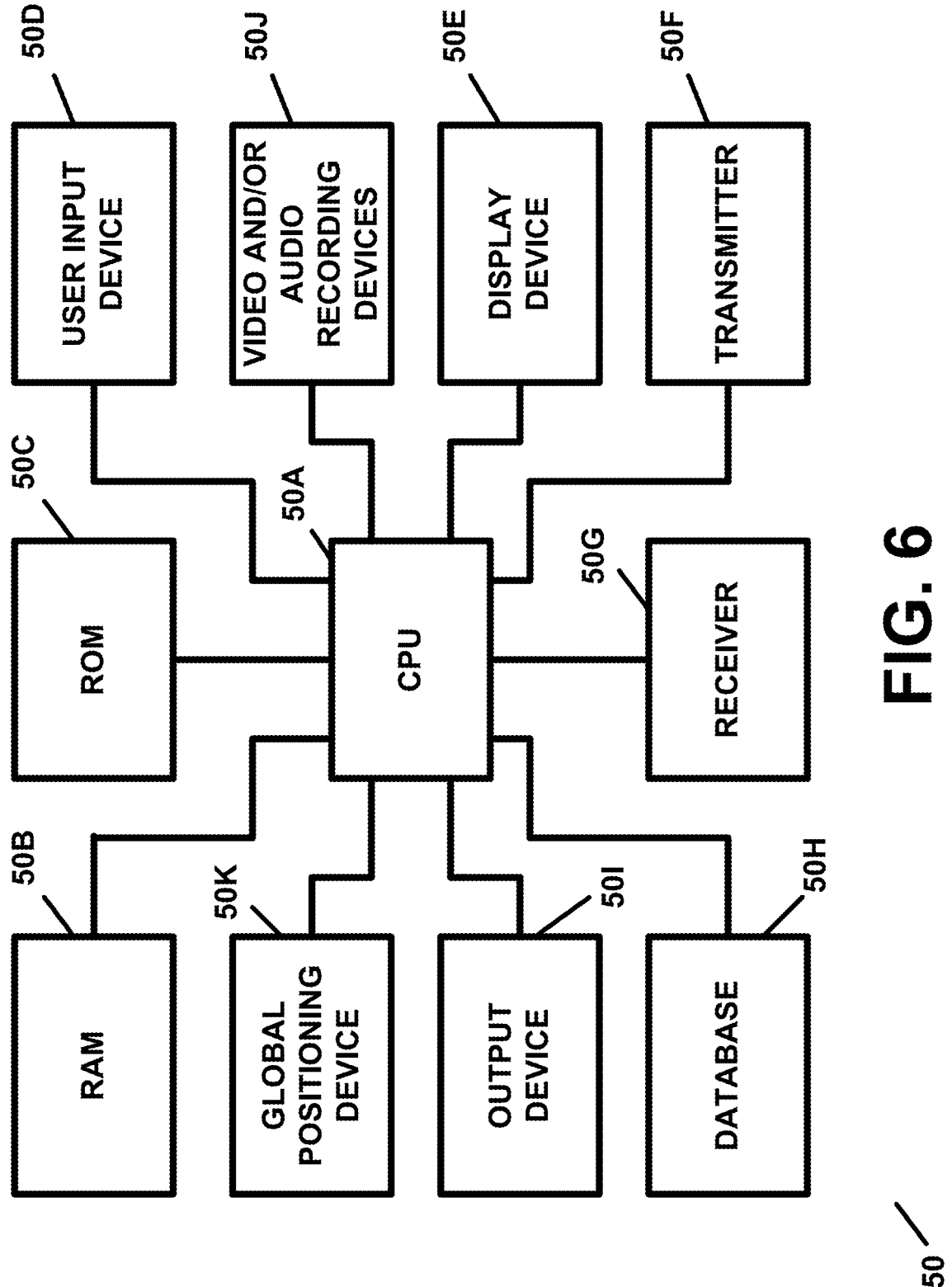
FIG. 6 illustrates the media/content provider computer of FIG. 1, in block diagram form.

FIG. 6 illustrates the media/content provider computer 50 of the apparatus 100, in block diagram form. The media/content provider computer 50, in the preferred embodiment, can be a computer or computer system, a server computer, a network computer, or any other communication device, which can provide the functionality of, and which can be utilized as a media/content provider computer 50, such as an Internet server computer and/or a web site server computer. The media/content provider computer 50, in the preferred embodiment, can also be any communication device, computer, personal computer, laptop computer, notebook computer, Smart phone or smartphone, smart telephone, cellular telephone, personal digital assistant, wireless telephone, wireless communication device, tablet, tablet computer, watch, smart watch, or wearable device or computer, or any combination of same, or any equivalent of same, or any other computer or communication device, which can provide the functionality of, and which can be utilized as a media/content provider computer 50. In the preferred embodiment, the media/content provider computer 50 includes a central processing unit or CPU 50A, which, in the preferred embodiment, is a microprocessor. The CPU 50A can also be a microcomputer, a minicomputer, a macro-computer, and/or a mainframe computer, depending upon the application.

The media/content provider computer 50 also includes a random access memory device(s) 50B (RAM) and a read only memory device(s) 50C (ROM), each of which is connected to, or linked with, the CPU 50A, and a user input device 50D, for entering data and/or information and/or commands into the media/content provider computer 50, which can include any one or more of a keyboard, a scanner, a user pointing device, such as, for example, a mouse, a touch pad, and/or an audio input device and/or a video input device, a microphone or audio recording device, a camera or a video recording device, and/or any device, electronic and/or otherwise, which can be utilized for inputting and/or entering data and/or information and/or commands into the media/content provider computer 50. The user input device(s) 50D is/are also connected to, or linked with, the CPU 50A. The media/content provider computer 50 also includes a display device 50E for displaying data and/or information to a user or individual. The display device 50E is also connected to, or linked with, the CPU 50A.

The media/content provider computer 50 also includes a transmitter(s) 50F, for transmitting signals and/or data and/or information to any one or more of the central processing computer(s) 11, the user communication device(s) 20, the employer communication device(s) 30, the counterparty communication device(s) 40, the digital assets/records storage computer(s) 60, the educational/instructional provider computer(s) 70, and/or the social networking computer(s) 80, and/or to any other media/content provider computer(s) 50, and/or any other individual computer(s) or individual communication device(s) which may be utilized in conjunction with the apparatus 100 of the present invention. The transmitter 50F is also connected to, or linked with, the CPU 50A.

The media/content provider computer 50 also includes a receiver 50G, for receiving signals and/or data and/or information from any one or more of the central processing computer(s) 11, the user communication device(s) 20, the employer communication device(s) 30, the counterparty communication device(s) 40, the digital assets/records storage computer(s) 60, the educational/instructional provider computer(s) 70, and/or the social networking computer(s) 80, and/or to any other media/content provider computer(s) 50, and/or any other individual computer(s) or individual communication device(s) which may be utilized in conjunction with the apparatus 100 of the present invention. The receiver 50G is also connected to, or linked with, the CPU 50A.

The media/content provider computer 50 also includes a database(s) 50H which contains and/or includes any and/or all of the data and/or information required, needed, or desired, for allowing and/or enabling the media/content provider computer 50 and/or the apparatus 100 to perform any and/or all of the functions and functionalities described herein as being performed, and/or as capable of being performed, by the media/content provider computer 50 and/or the apparatus 100 of the present invention. In this regard, and notwithstanding any specific examples of data and/or information described herein as being stored in the database 50H, it is to be understood that the database 50H contains or includes any and/or all data and/or information required, needed, or desired, for allowing and/or enabling the media/content provider computer 50 and/or the apparatus 100 to perform any and/or all of the functions and functionalities described herein as being performed by the media/content provider computer 50 and/or the apparatus 100 of the present invention.

In a preferred embodiment, the database 50H can contain and/or include, and/or can be linked to or with, any media content, entertainment content, educational content, instructional content, news content, recruitment content, recruitment news content, job searching content, job searching news content, advertising content, marketing content, promotional content, and/or any other content, which can be in text content, video content, audio content, and/or video and audio content, which can be provided by the apparatus 100 of the present invention. The databases 50H can also contain and/or include any data and/or information, or any link to same, which can be offered or provided by any provider or media content providers or content providers of any type or kind.

The database 50H can also contain and/or include information regarding any media account(s) or content account(s) assigned to, or associated with, each party, user, individual, independent contractor, freelancer, employer, or hiring entity. In the preferred embodiment, each respective party, user, individual, independent contractor, freelancer, employer, or hiring entity, can requested or otherwise be provided with media content or any other content, and/or can subscribe to same. Information regarding the media content or other content requested by, provided to, and/or or subscribed to by, each respective party, user, individual, independent contractor, freelancer, employer, or hiring entity, can be stored in the respective media account(s) or content account(s) of, for, or associated with, the respective party, user, individual, independent contractor, freelancer, employer, or hiring entity.

In a preferred embodiment, each media provider or content provider can provide media or content via the apparatus 100 to each respective party, user, individual, independent contractor, freelancer, employer, or hiring entity. In a preferred embodiment, each respective party, user, individual, independent contractor, freelancer, employer, or hiring entity, can have a media account or a content account for each respective media provider or content provider from which the respective party, user, individual, independent contractor, freelancer, employer, or hiring entity, is provided media content or other content. Information regarding any and/or all media accounts and/or content accounts associated with each party, user, individual, independent contractor, freelancer, employer, or hiring entity, can be stored in the database 50H.

The database 50H can also contain and/or include, and/or can be linked to or with, any of the data and/or information described herein as being stored in any of the respective databases 11H, 20H, 30H, 30H, 50H, 60H, 70H, and/or 80H, of any of the herein-described computers or communication devices. The database 50H can also contain and/or include any other data and/or information which is, or may be, needed and/or desired in performing any and/or all of the features and/or functionality described herein as being provided by the apparatus 100 of the present invention and/or the media/content provider computer 50.

The media/content provider computer 50 also includes an output device 50I for outputting any of the data, information, or reports, described herein or otherwise. In the preferred embodiment, the output device 50I can be a printer, a display, a transmitter, a modem, a speaker, and/or any other device which can be used to output data.

The media/content provider computer 50 can also include a video and/or audio recording device(s) 50J which can include a camera and/or a video recording device, for recording pictures or video and/or video clips, and/or a microphone or an audio recording device, for recording audio or audio clips, which can be recorded by, and/or transmitted live, by or from the media/content provider computer 50, or which can be recorded by, and stored at or in, the media/content provider computer 50 for transmission by or from the media/content provider computer 50 at a later time. The video and/or audio recording device(s) 50J can also be utilized to facilitate one-way broadcasts from the media/content provider computer 50, and/or can be utilized to facilitate video conferencing, video chatting, and/or audio conferencing, and/or video and audio conferencing, between a user of the media/content provider computer 50 and any of the herein-described users, individuals, persons, or entities, who or which utilize the apparatus 100 of the present invention.

The media/content provider computer 50 can also include a global positioning device 50K. In a preferred embodiment, the global positioning device 50K determines or can determine a position or location of the media/content provider computer 50.

In a preferred embodiment, the media/content provider computer 50 can also be equipped, and/or can be programmed, for voice activation operation and/or voice control operation of and/or regarding any and/or all of the herein-described operations and functions which are capable of being performed by the media/content provider computer 50.

Figure 7:
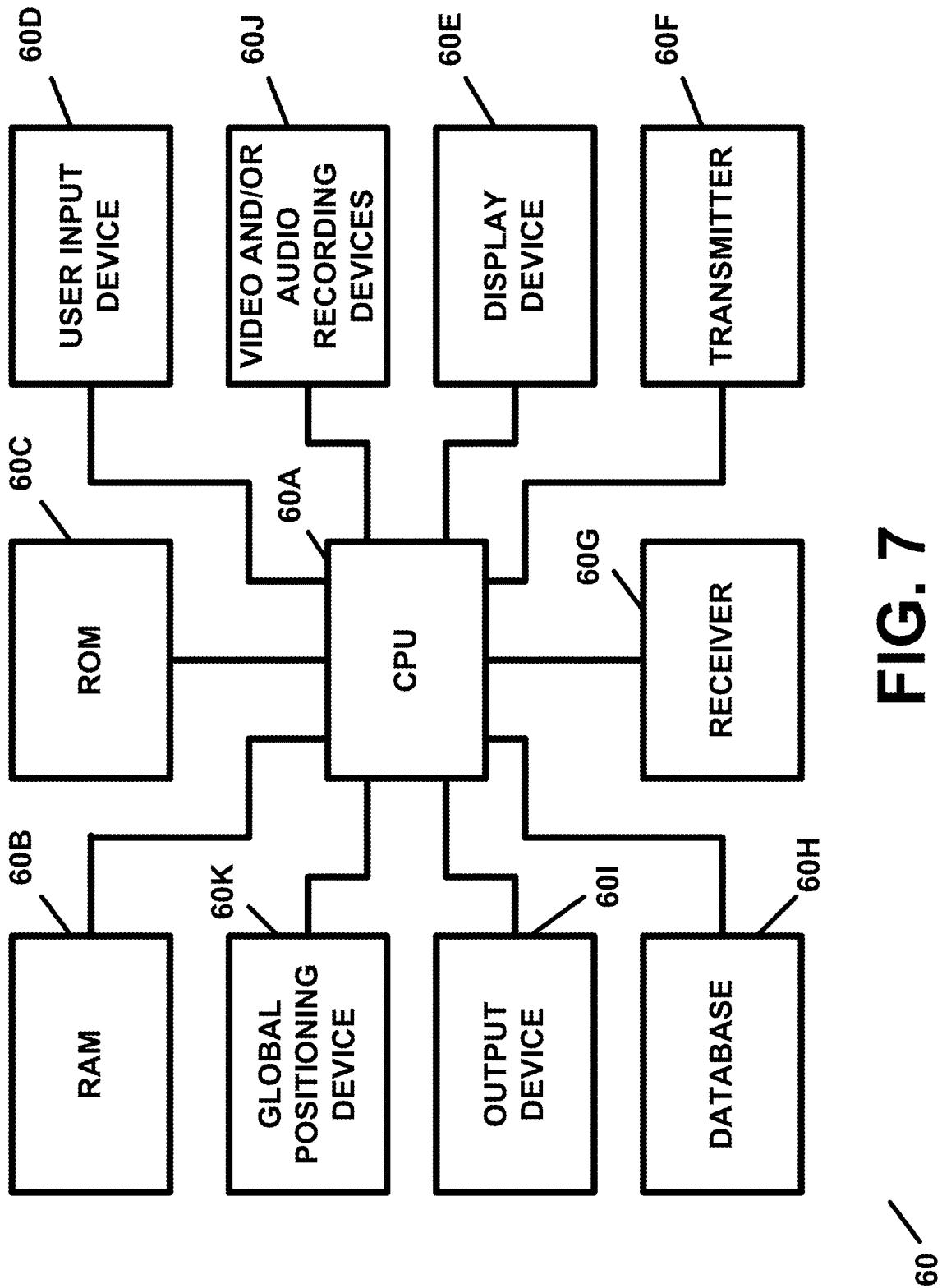
FIG. 7 illustrates the digital assets/records storage computer of FIG. 1, in block diagram form.

FIG. 7 illustrates the digital assets/records storage computer 60 of the apparatus 100, in block diagram form. The digital assets/records storage computer 60, in the preferred embodiment, can be a computer or computer system, a server computer, a network computer, or any other communication device, which can provide the functionality of, and which can be utilized as a digital assets/records storage computer 60, such as an Internet server computer and/or a web site server computer. The digital assets/records storage computer 60, in the preferred embodiment, can also be any communication device, computer, personal computer, laptop computer, notebook computer, Smart phone or smartphone, smart telephone, cellular telephone, personal digital assistant, wireless telephone, wireless communication device, tablet, tablet computer, watch, smart watch, or wearable device or computer, or any combination of same, or any equivalent of same, or any other computer or communication device, which can provide the functionality of, and which can be utilized as a digital assets/records storage computer 60. In the preferred embodiment, the digital assets/records storage computer 60 includes a central processing unit or CPU 60A, which, in the preferred embodiment, is a microprocessor. The CPU 60A can also be a microcomputer, a minicomputer, a macro-computer, and/or a mainframe computer, depending upon the application.

The digital assets/records storage computer 60 also includes a random access memory device(s) 60B (RAM) and a read only memory device(s) 60C (ROM), each of which is connected to, or linked with, the CPU 60A, and a user input device 60D, for entering data and/or information and/or commands into the digital assets/records storage computer 60, which can include any one or more of a keyboard, a scanner, a user pointing device, such as, for example, a mouse, a touch pad, and/or an audio input device and/or a video input device, a microphone or audio recording device, a camera or a video recording device, and/or any device, electronic and/or otherwise, which can be utilized for inputting and/or entering data and/or information and/or commands into the digital assets/records storage computer 60. The user input device(s) 60D is/are also connected to, or linked with, the CPU 60A. The digital assets/records storage computer 60 also includes a display device 60E for displaying data and/or information to a user or individual. The display device 60E is also connected to, or linked with, the CPU 60A.

The digital assets/records storage computer 60 also includes a transmitter(s) 60F, for transmitting signals and/or data and/or information to any one or more of the central processing computer(s) 11, the user communication device(s) 20, the employer communication device(s) 30, the counterparty communication device(s) 40, the media/content provider computer(s) 50, the educational/instructional provider computer(s) 70, and/or the social networking computer(s) 80, and/or to any other digital assets/records storage computer(s) 60, and/or any other individual computer(s) or individual communication device(s) which may be utilized in conjunction with the apparatus 100 of the present invention. The transmitter 60F is also connected to, or linked with, the CPU 60A.

The digital assets/records storage computer 60 also includes a receiver 60G, for receiving signals and/or data and/or information from any one or more of the central processing computer(s) 11, the user communication device(s) 20, the employer communication device(s) 30, the counterparty communication device(s) 40, the media/content provider computer(s) 50, the educational/instructional provider computer(s) 70, and/or the social networking computer(s) 80, and/or to any other digital assets/records storage computer(s) 60, and/or any other individual computer(s) or individual communication device(s) which may be utilized in conjunction with the apparatus 100 of the present invention. The receiver 60G is also connected to, or linked with, the CPU 60A.

The digital assets/records storage computer 60 also includes a database(s) 60H which contains any and/or all of the data and/or information required, needed, or desired, for allowing and/or enabling the digital assets/records storage computer 60 and/or the apparatus 100 to perform any and/or all of the functions and functionalities described herein as being performed, and/or as capable of being performed, by the digital assets/records storage computer 60 and/or the apparatus 100 of the present invention. In this regard, and notwithstanding any specific examples of data and/or information described herein as being stored in the database 60H, it is to be understood that the database 60H contains or includes any and/or all data and/or information required, needed, or desired, for allowing and/or enabling the digital assets/records storage computer 60 and/or the apparatus 100 to perform any and/or all of the functions and functionalities described herein as being performed by the digital assets/records storage computer 60 and/or the apparatus 100 of the present invention.

The digital assets/records storage computer 60 also includes a database 60H which can include, for each user, individual, independent contractor, freelancer, employer, or hiring entity, who or which utilizes the apparatus 100 and method of the present invention, information regarding the respective user's, individual's, independent contractor's, freelancer's, employer's, or hiring entity's, name, sex, age, birth date, address, telephone number, cellular telephone number, text messaging number, videoconferencing or video chat identification (ID) name or number, email address, website address or uniform resource locator (url), and/or any other contact information, agent or representative contact information, and/or digital asset account information.

In a preferred embodiment, a digital asset account can be utilized to digitally store and/or to safeguard, assets of any type or kind for a user, individual, independent contractor, freelancer, employer, or hiring entity. In a preferred embodiment, the assets can include, among other things, monetary assets, currency assets, cryptocurrency assets, non-monetary assets, and/or any other assets which can be used to effectuate payment for services rendered, or to be rendered, by any user, individual, independent contractor, freelancer, employer, or hiring entity, who or which utilizes the apparatus 100 of the present invention. In a preferred embodiment, any of the monetary assets, currency assets, cryptocurrency assets, non-monetary assets, and/or any other assets, can be used to effectuate a payment to a respective party, user, individual, independent contractor, freelancer, employer, or hiring entity, or to receive a payment from a respective party, user, individual, independent contractor, freelancer, employer, or hiring entity.

In a preferred embodiment, the assets can also include any of the herein described, memorabilia, digital memorabilia, souvenirs, digital souvenirs, video recordings, video and audio recordings, pictures, photographs, autographs, digital autographs, and/or any other items or things have a memorabilia, nostalgic, or sentimental, value to any user, individual, independent contractor, freelancer, employer, or hiring entity. In a preferred embodiment, any of the herein described, memorabilia, digital memorabilia, souvenirs, digital souvenirs, video recordings, video and audio recordings, photographs, pictures, autographs, digital autographs, and/or any other items or things which have a memorabilia, nostalgic, or sentimental, value, can also be stored in a digital memorabilia account, a digital souvenir account, or any other digital account for storing things and/or items having nostalgic or sentimental value, each of which accounts can be stand alone accounts or can be stored in, or as a component account of, or sub-account of, a respective digital asset account of, for, or associated with, any user, individual, independent contractor, freelancer, employer, or hiring entity.

In a preferred embodiment, the database 60H can contain and/or include, for each digital asset account, and/or for each digital memorabilia account, digital souvenir account, or any other digital account, held by, owned by, or associated with, a respective user, individual, independent contractor, freelancer, employer, or hiring entity, data and/or information regarding each asset held by the respective user, individual, independent contractor, freelancer, employer, or hiring entity, and for each asset, data and/or information regarding the name of the asset the date the asset was acquired, a description of the asset, an assigned value for the asset, and/or any other information regarding the asset. In a preferred embodiment, the digital asset account can also include information regarding currencies or cryptocurrencies which can be used by a respective user, individual, independent contractor, freelancer, employer, or hiring entity, to make a payment to another respective user, individual, independent contractor, freelancer, employer, or hiring entity. In another preferred embodiment, the digital asset account can also include information regarding currencies or cryptocurrencies which can represent, or include, a payment or payments received by a respective user, individual, independent contractor, freelancer, employer, or hiring entity, from another respective user, individual, independent contractor, freelancer, employer, or hiring entity.

The database 60H can also contain and/or include, and/or can be linked to or with, any of the data and/or information described herein as being stored in any of the respective databases 11H, 20H, 30H, 30H, 50H, 60H, 70H, and/or 80H, of any of the herein-described computers or communication devices. The database 60H can also contain and/or include any other data and/or information which is, or may be, needed and/or desired in performing any and/or all of the features and/or functionality described herein as being provided by the apparatus 100 of the present invention and/or the digital assets/records storage computer 60.

The digital assets/records storage computer 60 also includes an output device 60I for outputting any of the data, information, or reports, described herein or otherwise. In the preferred embodiment, the output device 60I can be a printer, a display, a transmitter, a modem, a speaker, and/or any other device which can be used to output data.

The digital assets/records storage computer 60 can also include a video and/or audio recording device(s) 60J which can include a camera and/or a video recording device, for recording pictures or video and/or video clips, and/or a microphone or an audio recording device, for recording audio or audio clips, which can be recorded by, and/or transmitted live, by or from the digital assets/records storage computer 60, or which can be recorded by, and stored at or in, the digital assets/records storage computer 60 for transmission by or from the digital assets/records storage computer 60 at a later time. The video and/or audio recording device(s) 60J can also be utilized to facilitate one-way broadcasts from the digital assets/records storage computer 60, and/or can be utilized to facilitate video conferencing, video chatting, and/or audio conferencing, and/or video and audio conferencing, between a user of the digital assets/records storage computer 60 and any of the herein-described users, individuals, persons, or entities, who or which utilize the apparatus 100 of the present invention.

The digital assets/records storage computer 60 can also include a global positioning device 60K. In a preferred embodiment, the global positioning device 60K determines or can determine a position or location of the digital assets/records storage computer 60.

In a preferred embodiment, the digital assets/records storage computer 60 can also be equipped, and/or can be programmed, for voice activation operation and/or voice control operation of and/or regarding any and/or all of the herein-described operations and functions which are capable of being performed by the digital assets/records storage computer 60.

Figure 8:
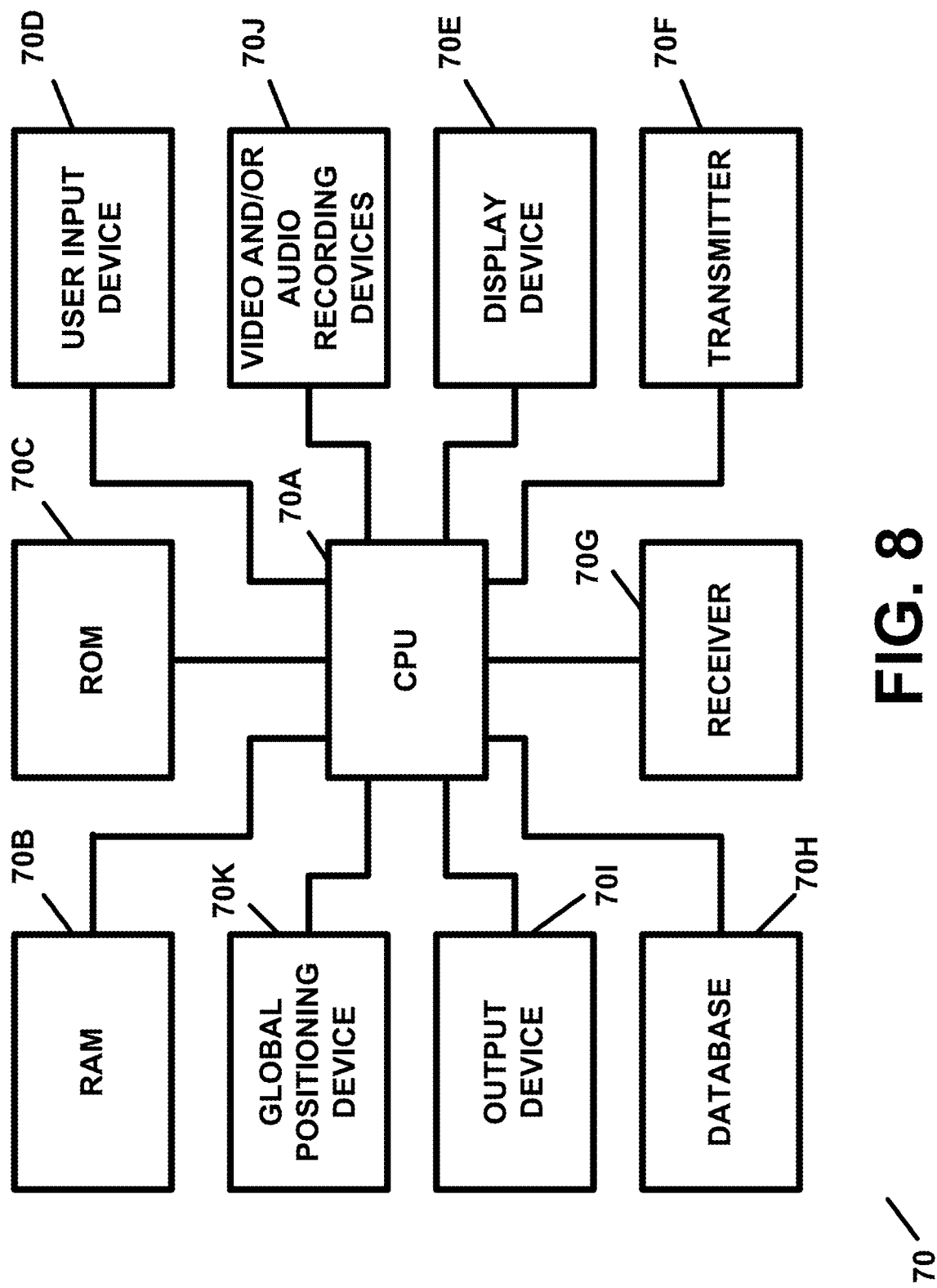
FIG. 8 illustrates the educational/instructional provider computer of FIG. 1, in block diagram form.
Figure 9:
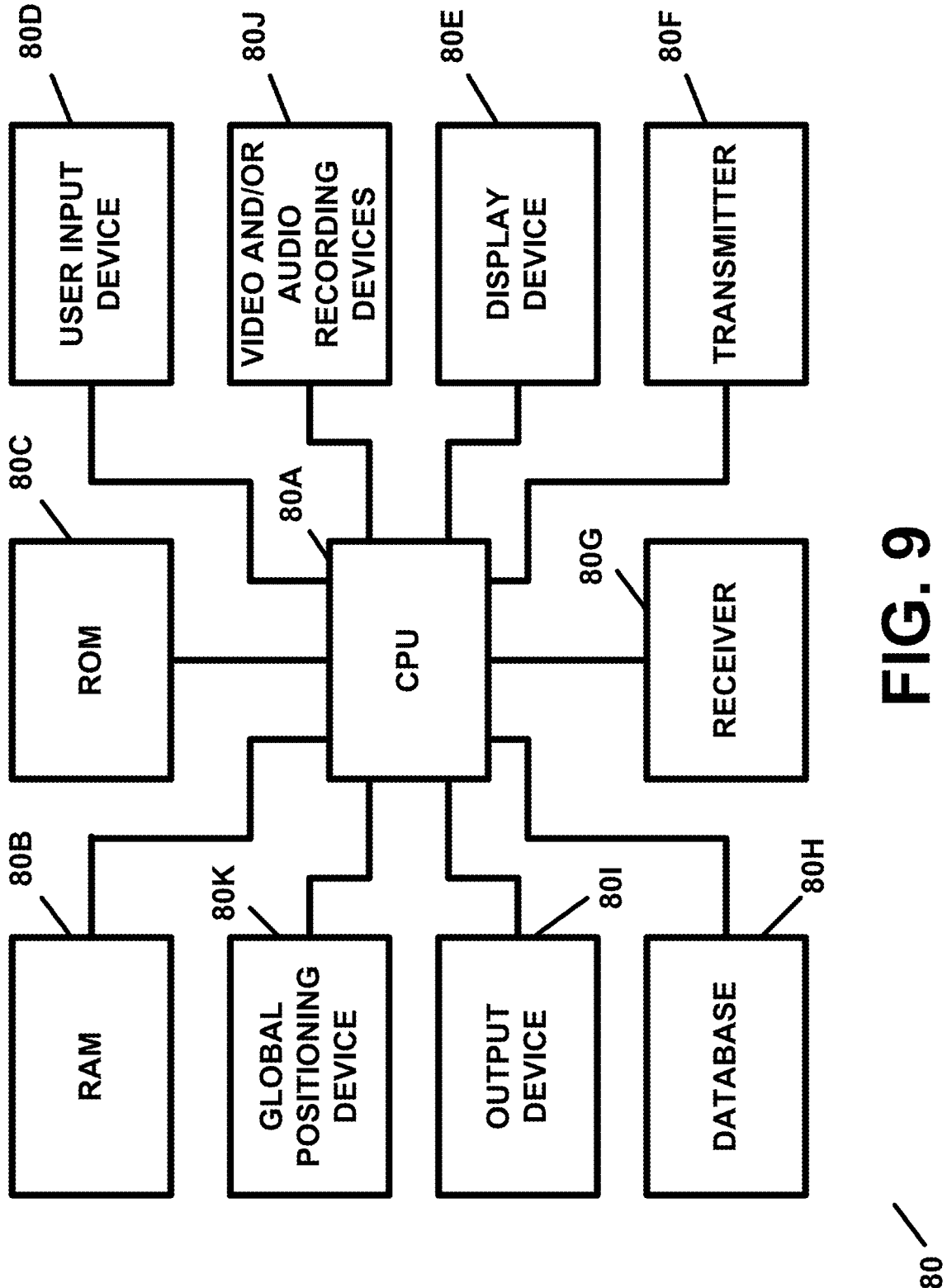
FIG. 9 illustrates the social networking computer of FIG. 1, in block diagram form.

FIG. 8 illustrates the educational/instructional provider computer 70 of the apparatus 100, in block diagram form. The educational/instructional provider computer 70, in the preferred embodiment, can be a computer or computer system, a server computer, a network computer, or any other communication device, which can provide the functionality of, and which can be utilized as an educational/instructional provider computer 70, such as an Internet server computer and/or a web site server computer. The educational/instructional provider computer 70, in the preferred embodiment, can also be any communication device, computer, personal computer, laptop computer, notebook computer, Smart phone or smartphone, smart telephone, cellular telephone, personal digital assistant, wireless telephone, wireless communication device, tablet, tablet computer, watch, smart watch, or wearable device or computer, or any combination of same, or any equivalent of same, or any other computer or communication device, which can provide the functionality of, and which can be utilized as an educational/ instructional provider computer 70. In the preferred embodiment, the educational/instructional provider computer 70 includes a central processing unit or CPU 70A, which, in the preferred embodiment, is a microprocessor. The CPU 70A can also be a microcomputer, a minicomputer, a macrocomputer, and/or a mainframe computer, depending upon the application.

The educational/instructional provider computer 70 also includes a random access memory device(s) 70B (RAM) and a read only memory device(s) 70C (ROM), each of which is connected to, or linked with, the CPU 70A, and a user input device 70D, for entering data and/or information and/or commands into the educational/instructional provider computer 70, which can include any one or more of a keyboard, a scanner, a user pointing device, such as, for example, a mouse, a touch pad, and/or an audio input device and/or a video input device, a microphone or audio recording device, a camera or a video recording device, and/or any device, electronic and/or otherwise, which can be utilized for inputting and/or entering data and/or information and/or commands into the educational/instructional provider computer 70. The user input device(s) 70D is/are also connected to, or linked with, the CPU 70A. The educational/instructional provider computer 70 also includes a display device 70E for displaying data and/or information to a user or individual. The display device 70E is also connected to, or linked with, the CPU 70A.

The educational/instructional provider computer 70 also includes a transmitter(s) 70F, for transmitting signals and/or data and/or information to any one or more of the central processing computer(s) 11, the user communication device(s) 20, the employer communication device(s) 30, the counterparty communication device(s) 40, the media/content provider computer(s) 50, the digital assets/records storage computer(s) 60, and/or the social networking computer(s) 80, and/or to any other educational/instructional provider computer(s) 70, and/or any other individual computer(s) or individual communication device(s) which may be utilized in conjunction with the apparatus 100 of the present invention. The transmitter 70F is also connected to, or linked with, the CPU 70A.

The educational/instructional provider computer 70 also includes a receiver 70G, for receiving signals and/or data and/or information from any one or more of the central processing computer(s) 11, the user communication device(s) 20, the employer communication device(s) 30, the counterparty communication device(s) 40, the media/content provider computer(s) 50, the digital assets/records storage computer(s) 60, and/or the social networking computer(s) 80, and/or to any other educational/instructional provider computer(s) 70, and/or any other individual computer(s) or individual communication device(s) which may be utilized in conjunction with the apparatus 100 of the present invention. The receiver 70G is also connected to, or linked with, the CPU 70A.

The educational/instructional provider computer 70 also includes a database(s) 70H which contains any and/or all of the data and/or information required, needed, or desired, for allowing and/or enabling the educational/instructional provider computer 70 and/or the apparatus 100 to perform any and/or all of the functions and functionalities described herein as being performed, and/or as capable of being performed, by the educational/instructional provider computer 70 and/or the apparatus 100 of the present invention. In this regard, and notwithstanding any specific examples of data and/or information described herein as being stored in the database 70H, it is to be understood that the database 70H contains or includes any and/or all data and/or information required, needed, or desired, for allowing and/or enabling the educational/instructional provider computer 70 and/or the apparatus 100 to perform any and/or all of the functions and functionalities described herein as being performed by the educational/instructional provider computer 70 and/or the apparatus 100 of the present invention.

The educational/instructional provider computer 70 also includes a database 70H which can include, for each user, individual, independent contractor, freelancer, employer, or hiring entity, who or which utilizes the apparatus 100 and method of the present invention, information regarding the respective user's, individual's, independent contractor's, freelancer's, employer's, or hiring entity's, name, sex, age, birth date, address, telephone number, cellular telephone number, text messaging number, videoconferencing or video chat identification (ID) name or number, email address, website address or uniform resource locator (url), and/or any other contact information, agent or representative contact information, and/or educational or instructional account information. In a preferred embodiment, each user, individual, independent contractor, freelancer, employer, or hiring entity, can be assigned, and/or can utilize, an educational or instructional account which can include information regarding any schools, high schools, secondary schools, colleges, universities, trade schools, gyms, training centers, fitness centers, fitness schools, martial arts schools, or any other educational or instructional institutions, attended by the respective user, individual, independent contractor, freelancer, employer, or hiring entity, or in which the respective user, individual, independent contractor, freelancer, employer, or hiring entity, is or was a student or member, and any in-person or online degree programs, any in-person or online certificate programs, any in-person or online courses, any in-person or online classes, any in-person or online lessons, any in-person or online seminars, any other in-person or online educational or instructional offerings, attended by or viewed by the respective user, individual, independent contractor, freelancer, employer, or hiring entity.

The database 70H can also contain and/or include video recordings and/or audio recordings of any and/or all classes, lectures, seminars, and/or lessons, offered by, or provided by, any of the schools, high schools, secondary schools, colleges, universities, trade schools, gyms, training centers, fitness centers, fitness schools, martial arts schools, or any other educational or instructional institutions, which utilize the apparatus 100 of the present invention. The database 70H can also contain and/or include video recordings and/or audio recordings of any and/or all classes, lectures, seminars, and/or lessons, offered by, or provided by, any of the respective users, individuals, independent contractors, freelancers, employers, or hiring entities, which or which utilize the apparatus 100 of the present invention.

The database 70H can also contain and/or include, and/or can be linked to or with, any of the data and/or information described herein as being stored in any of the respective databases 11H, 20H, 30H, 30H, 50H, 60H, 70H, and/or 80H, of any of the herein-described computers or communication devices. The database 70H can also contain and/or include any other data and/or information which is, or may be, needed and/or desired in performing any and/or all of the features and/or functionality described herein as being provided by the apparatus 100 of the present invention and/or the educational/instructional provider computer 70.

The educational/instructional provider computer 70 also includes an output device 70I for outputting any of the data, information, or reports, described herein or otherwise. In the preferred embodiment, the output device 70I can be a printer, a display, a transmitter, a modem, a speaker, and/or any other device which can be used to output data.

The educational/instructional provider computer 70 can also include a video and/or audio recording device(s) 70J which can include a camera and/or a video recording device, for recording pictures or video and/or video clips, and/or a microphone or an audio recording device, for recording audio or audio clips, which can be recorded by, and/or transmitted live, by or from the educational/instructional provider computer 70, or which can be recorded by, and stored at or in, the educational/instructional provider computer 70 for transmission by or from the educational/instructional provider computer 70 at a later time. The video and/or audio recording device(s) 70J can also be utilized to facilitate one-way broadcasts from the educational/instructional provider computer 70, and/or can be utilized to facilitate video conferencing, video chatting, and/or audio conferencing, and/or video and audio conferencing, between a user of the educational/instructional provider computer 70 and any of the herein-described users, individuals, persons, or entities, who or which utilize the apparatus 100 of the present invention.

The educational/instructional provider computer 70 can also include a global positioning device 70K. In a preferred embodiment, the global positioning device 70K determines or can determine a position or location of the educational/instructional provider computer 70.

In a preferred embodiment, the educational/instructional provider computer 70 can also be equipped, and/or can be programmed, for voice activation operation and/or voice control operation of and/or regarding any and/or all of the herein-described operations and functions which are capable of being performed by the educational/instructional provider computer 70.

FIG. 8 illustrates the social networking computer 80 of the apparatus 100, in block diagram form. The social networking computer 80, in the preferred embodiment, can be a computer or computer system, a server computer, a network computer, or any other communication device, which can provide the functionality of, and which can be utilized as a social networking computer 80, such as an Internet server computer and/or a web site server computer. The social networking computer 80, in the preferred embodiment, can also be any communication device, computer, personal computer, laptop computer, notebook computer, Smart phone or smartphone, smart telephone, cellular telephone, personal digital assistant, wireless telephone, wireless communication device, tablet, tablet computer, watch, smart watch, or wearable device or computer, or any combination of same, or any equivalent of same, or any other computer or communication device, which can provide the functionality of, and which can be utilized as a social networking computer 80. In the preferred embodiment, the social networking computer 80 includes a central processing unit or CPU 80A, which, in the preferred embodiment, is a microprocessor. The CPU 80A can also be a microcomputer, a minicomputer, a macro-computer, and/or a mainframe computer, depending upon the application.

The social networking computer 80 also includes a random access memory device(s) 80B (RAM) and a read only memory device(s) 80C (ROM), each of which is connected to, or linked with, the CPU 80A, and a user input device 80D, for entering data and/or information and/or commands into the social networking computer 80, which can include any one or more of a keyboard, a scanner, a user pointing device, such as, for example, a mouse, a touch pad, and/or an audio input device and/or a video input device, a microphone or audio recording device, a camera or a video recording device, and/or any device, electronic and/or otherwise, which can be utilized for inputting and/or entering data and/or information and/or commands into the social networking computer 80. The user input device(s) 80D is/are also connected to, or linked with, the CPU 80A. The social networking computer 80 also includes a display device 80E for displaying data and/or information to a user or individual. The display device 80E is also connected to, or linked with, the CPU 80A.

The social networking computer 80 also includes a transmitter(s) 80F, for transmitting signals and/or data and/or information to any one or more of the central processing computer(s) 11, the user communication device(s) 20, the employer communication device(s) 30, the counterparty communication device(s) 40, the media/content provider computer(s) 50, the digital assets/records storage computer(s) 60, and/or the educational/instructional provider computer(s) 70, and/or to any other social networking computer(s) 80, and/or any other individual computer(s) or individual communication device(s) which may be utilized in conjunction with the apparatus 100 of the present invention. The transmitter 80F is also connected to, or linked with, the CPU 80A.

The social networking computer 80 also includes a receiver 80G, for receiving signals and/or data and/or information from any one or more of the central processing computer(s) 11, the user communication device(s) 20, the employer communication device(s) 30, the counterparty communication device(s) 40, the media/content provider computer(s) 50, the digital assets/records storage computer(s) 60, and/or the educational/instructional provider computer(s) 70, and/or to any other social networking computer(s) 80, and/or any other individual computer(s) or individual communication device(s) which may be utilized in conjunction with the apparatus 100 of the present invention. The receiver 80G is also connected to, or linked with, the CPU 80A.

The social networking computer 80 also includes a database(s) 80H which contains any and/or all of the data and/or information required, needed, or desired, for allowing and/or enabling the social networking computer 80 and/or the apparatus 100 to perform any and/or all of the functions and functionalities described herein as being performed, and/or as capable of being performed, by the social networking computer 80 and/or the apparatus 100 of the present invention. In this regard, and notwithstanding any specific examples of data and/or information described herein as being stored in the database 80H, it is to be understood that the database 80H contains or includes any and/or all data and/or information required, needed, or desired, for allowing and/or enabling the social networking computer 80 and/or the apparatus 100 to perform any and/or all of the functions and functionalities described herein as being performed by the social networking computer 80 and/or the apparatus 100 of the present invention.

The social networking computer 80 also includes a database(s) 80H. The database 80H can contain and/or included, and/or can be linked to or with, any of the data and/or information typically found in, or utilized by, a social networking computer, or any information regard any members of the social network serviced thereby, as well as any data and/or information typically utilized in providing or in performing the functionality and/or services described-herein as being provided by, or offered by, the social network associated with the social networking computer 80.

The database 80H can also contain and/or include, and/or can be linked to or with, any of the data and/or information described herein as being stored in any of the respective databases 11H, 20H, 30H, 30H, 50H, 60H, 70H, and/or 80H, of any of the herein-described computers or communication devices. The database 80H can also contain and/or include any other data and/or information which is, or may be, needed and/or desired in performing any and/or all of the features and/or functionality described herein as being provided by the apparatus 100 of the present invention and/or the social networking computer 80.

The social networking computer 80 also includes an output device 801 for outputting any of the data, information, or reports, described herein or otherwise. In the preferred embodiment, the output device 80I can be a printer, a display, a transmitter, a modem, a speaker, and/or any other device which can be used to output data.

The social networking computer 80 can also include a video and/or audio recording device(s) 80J which can include a camera and/or a video recording device, for recording pictures or video and/or video clips, and/or a microphone or an audio recording device, for recording audio or audio clips, which can be recorded by, and/or transmitted live, by or from the social networking computer 80, or which can be recorded by, and stored at or in, the social networking computer 80 for transmission by or from the social networking computer 80 at a later time. The video and/or audio recording device(s) 80J can also be utilized to facilitate one-way broadcasts from the social networking computer 80, and/or can be utilized to facilitate video conferencing, video chatting, and/or audio conferencing, and/or video and audio conferencing, between a user of the social networking computer 80 and any of the herein-described users, individuals, persons, or entities, who or which utilize the apparatus 100 of the present invention.

The social networking computer 80 can also include a global positioning device 80K. In a preferred embodiment, the global positioning device 80K determines or can determine a position or location of the social networking computer 80.

In a preferred embodiment, the social networking computer 80 can also be equipped, and/or can be programmed, for voice activation operation and/or voice control operation of and/or regarding any and/or all of the herein-described operations and functions which are capable of being performed by the social networking computer 80.

In a preferred embodiment, any of the herein-described databases 11H, 20H, 30H, 40H, 50H, 60H, 70H, and/or 80H, can also contain and/or include any of the data and/or information described as being stored in any of the databases which are disclosed or described in U.S. Pat. No. 6,662,194, filed Jul. 7, 2000, entitled "APPARATUS AND METHOD FOR PROVIDING RECRUITMENT INFORMATION" and as being stored in any of the databases which are disclosed or described in U.S. patent application Ser. No. 14/714,365, filed May 18, 2015, and entitled "APPARATUS AND METHOD FOR REMOTELY PROVIDING INSTRUCTIONAL AND/OR EDUCATIONAL INFORMATION AND/OR SERVICES IN A NETWORK ENVIRONMENT".

The apparatus 100 of the present invention can also be utilized to perform any and/or all of the functions and/or functionalities described as being performed by the various apparatuses, systems, inventions, computers, and/or communications devices, disclosed or described in U.S. Pat. No.

6,662,194, filed Jul. 7, 2000, entitled "APPARATUS AND METHOD FOR PROVIDING RECRUITMENT INFORMATION", and disclosed or described in U.S. patent application Ser. No. 14/714,365, filed May 18, 2015, and entitled "APPARATUS AND METHOD FOR REMOTELY PROVIDING INSTRUCTIONAL AND/OR EDUCATIONAL INFORMATION AND/OR SERVICES IN A NETWORK ENVIRONMENT".

Applicant hereby incorporates by reference hereby the subject and teachings of U.S. Pat. No. 6,662,194, filed Jul. 7, 2000, entitled "APPARATUS AND METHOD FOR PROVIDING RECRUITMENT INFORMATION", the subject matter and teachings of which are hereby incorporated by reference herein in their entirety.

In a preferred embodiment, any of the herein-described databases 11H, 20H, 30H, 40H, 50H, 60H, 70H, and/or 80H, can also contain and/or include any of the data and/or information described as being stored in any of the databases which are described Applicant hereby incorporates by reference hereby the subject and teachings of U.S. patent application Ser. No. 14/714,365, filed May 18, 2015, and entitled "APPARATUS AND METHOD FOR REMOTELY PROVIDING INSTRUCTIONAL AND/OR EDUCATIONAL INFORMATION AND/OR SERVICES IN A NETWORK ENVIRONMENT", the subject matter and teachings of which are hereby incorporated by reference herein in their entirety.

It is important to note, and it is to be understood, that the respective databases 11H, 20H, 30H, 40H, 50H, 60H, 70H, and/or 80H, can contain and/or include any data and/or information which is described herein, or otherwise, as being input into, received by, processed by, generated by, and/or transmitted from, each of the herein-described central procession computer(s) 11, user communication devices 20, employer communication devices 30, counterparty communication devices 40, media/content provider computers 50, digital assets/records storage computers 60, educational/instructional provider computers 70, and/or social networking computers 80.

In a preferred embodiment, the apparatus 100 can be utilized by any user, individual, independent contractor, or freelancer, in order to manage and/or monitor his, her, or its, job seeking, employment, and/or work, activities. In a preferred embodiment, it is envisioned that each user, individual, independent contractor, or freelancer, and each employer or hiring entity, will create, and/or have associated therewith, a user or member account. In a preferred embodiment, the user or member account can be utilized in order to perform any of the herein-described activities described herein as being capable of being performed while using the apparatus 100 of the present invention.

In a preferred embodiment, the user or member account can contain and/or can include any information regarding the respective user, individual, independent contractor, or freelancer, and each employer or hiring entity, including, but not limited to, any and/or all of the information described herein as being stored, for the respective user, individual, independent contractor, or freelancer, and each employer or hiring entity, in any of the databases 11H, 20H, 30H, 40H, 50H, 60H, 70H, and/or 80H, along with identification information, contact information, user or member profile information, and/or user work schedule or work calendar information.

In a preferred embodiment, the user, individual, independent contractor, or freelancer, can utilize the apparatus 100 of the present invention in order to search for jobs, projects, or assignments, and/or to search for postings or listings for jobs, projects, or assignments, to submit resumes and/or job applications for jobs, projects, or assignments, to submit proposals or bids for jobs, projects, or assignments, to submit cover letters, to submit video messages, to ascertain the status of a submission(s) or application(s) for or regarding a job(s), a project(s), or an assignment(s), to request an interview, to request information, in applying for, or submitting a proposal for, a job, project, or assignment, to check on the status of an application or proposal for a job, project, or assignment, and/or to perform any other action or activity in finding a job, project, or assignment, and/or a listing or posting for same. In a preferred embodiment, the user, individual, independent contractor, or freelancer, can also request to be notified when employer or hiring entity receives, views, considers, or acts upon, his or her application for a job, project, or assignment. In a preferred embodiment, the user, individual, independent contractor, or freelancer, can also request to be notified regarding new job, project, or assignment, postings or listings.

Figure 10:
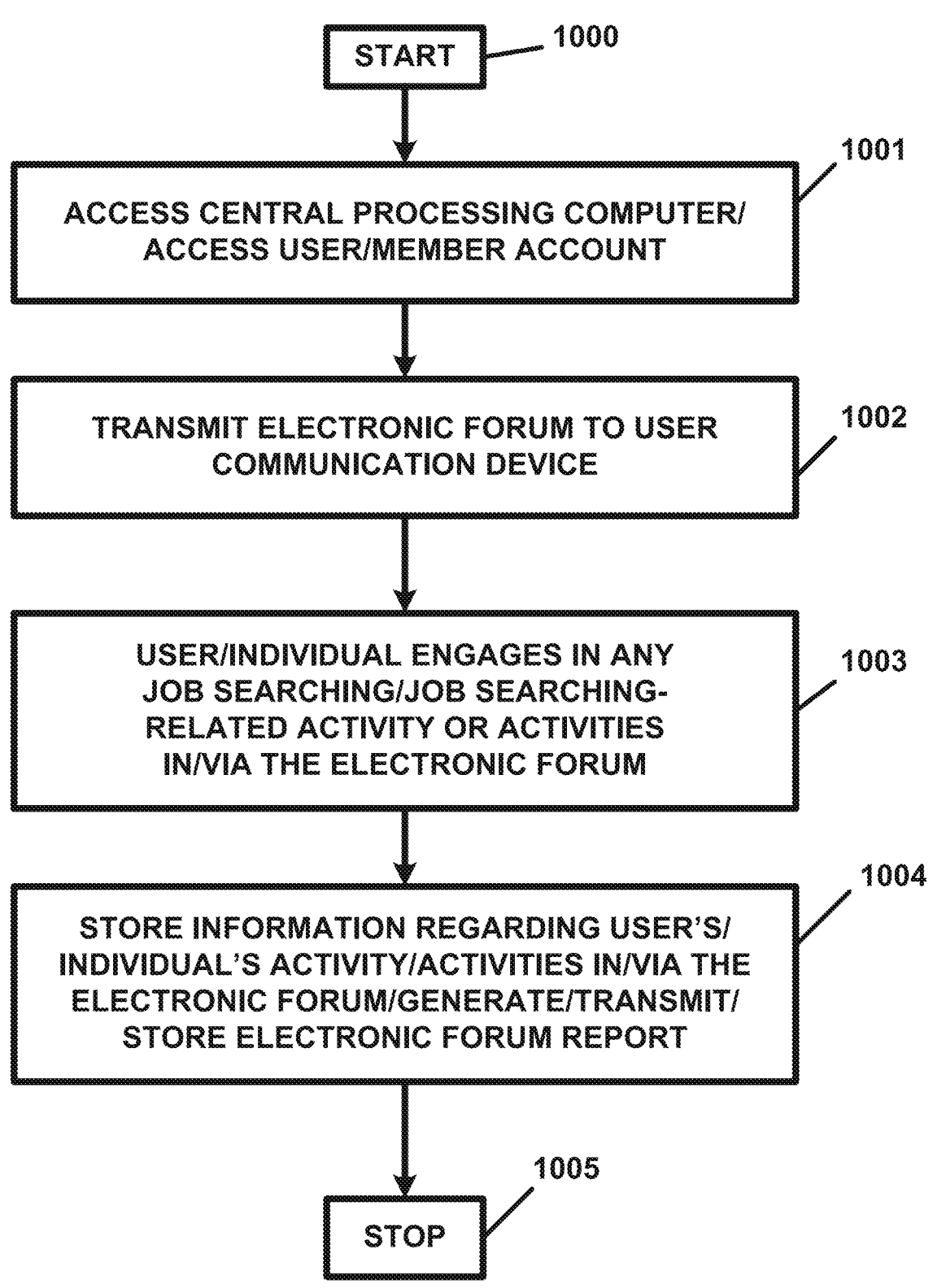
FIG. 10 illustrates a preferred embodiment method for utilizing the apparatus of the present invention, in flow diagram form.

FIG. 10 illustrates a preferred embodiment method for utilizing the apparatus 100 of the present invention, in flow diagram form. With reference to FIG. 10, the operation of the apparatus 100 commences at step 1000. At step 1001, the user or individual, who can be any individual seeking a job, or any independent contractor or freelancer seeking a project or assignment, can access the central processing computer 11 using his or her user communication device 20. At step 1001, the user or individual can access, or can log into, his or her user or member account by transmitting an access request message, or login information, from his or her user communication device 20 to the central processing computer 11. At step 1001, the central processing computer 11 can receive and process the information contained in the access request message, or the login information, and can grant the user or individual access to his or her user or member account.

At step 1002, the central processing computer 11 can transmit an electronic job search forum (hereinafter referred to as an "electronic forum"), or web page, to the user communication device 20. In a preferred embodiment, the central processing computer 11 can transmit the electronic forum to the user communication device 20. In another preferred embodiment, the central processing computer 20 can transmit a web page to the user communication device 20. In a preferred embodiment, the electronic forum, or web page, can be displayed on, and viewed via, the display device 20E of the user communication device 20. Thereafter, the operation of the apparatus 100 can proceed to step 1003.

At step 1003, the user or individual can engage in any job searching, project searching, or assignment searching, activity or activities while in and/or via the electronic forum. At step 1003, the user or individual can perform a search or searches for any type or kind of job, project, or assignment, postings or listings and can be provided with search results containing any number of postings or listings of available jobs, projects, or assignments. In a preferred embodiment, the user or individual can perform searches by entering search information using a keyword or keywords, location(s), category or categories, and/or any other searching method or methodology.

In another preferred embodiment, the user or individual can search for jobs, projects, or locations, in a same geographic area in which his or her user communication device 20 is located at the time of the performing of the search. In such an embodiment, information regarding the position or location of the user communication device 20, as determined by the global positioning device 20K, can also be transmitted to the central processing computer 11 along with any search information. In a preferred embodiment, the search information, along with any position or location information, if utilized, can be transmitted from the user communication device 20 to the central processing computer 11. At step 1003, the central processing computer 11 can receive and process the search information and can generate a job, project, or assignment, search report and can transmit the same to the user communication device 20.

At step 1003, the user communication device 20 can receive the job, project, or assignment, search report and can display information contained therein to the user or individual via the electronic forum and/or the display device 20E. At step 1003, the user or individual can apply for any job, project, or assignment, posted or listed in the job, project, or assignment, search report. For each job, project, or assignment, for which the user or individual applies, the user or individual can submit a resume, fill out a job application, submit a cover letter, submit a video message, or submit information regarding references, in applying for the job, project, or assignment. In a preferred embodiment, the user or individual can also submit work samples, video recordings of presentations, video recordings or pictures of work samples, video messages from prior or existing employers, customers, or clients, video reference messages, marketing materials, promotional materials, and/or any other information.

At step 1003, all of the information submitted by the user or individual, in applying for the job, project, or assignment can be transmitted to the central processing computer 11 and/or to the employer communication device 30 of or associated with the employer or hiring entity for each job, project, or assignment, posting or listing for which the user or individual applies. Thereafter, at step 1003, the central processing computer 11 or each respective employer communication device 30, which receives a job, project, or assignment, application from the user or individual, can store the same and can generate an application confirmation message. At step 1003, the central processing computer 11 or each respective employer communication device 30 can, thereafter, transmit the application confirmation message to the user communication device 20.

In a preferred embodiment, the electronic forum can also display information regarding and/or all of the jobs, projects, or assignments, for which the user or individual has previously applied along with information regarding a status of each of the same. The information regarding the status of an application can include information regarding a date of application, a date of consideration, feedback information from the employer or hiring entity, a decision, or a date on which a decision is to be made. The information regarding the status of an application can also include information indicating that the job, project, or assignment, has been filled or withdrawn.

In a preferred embodiment, it is envisioned that each time an employer communication device 30 of an employer or hiring entity receives an application for a job, a project, or an assignment, and/or each time the application is reviewed and/or acted upon in any manner or way, the employer communication device 30 can automatically generate a status message, and can transmit the status message to the user communication device 20 of the user or individual. In this regard, in a preferred embodiment, a status message can be used to indicate that the application has been received, that the application has been reviewed, that the application and the user or individual has been referred in the organization for further consideration, the name and/or position of the person or persons who have reviewed the application, the name and/or position of the person or persons who have reviewed, or who are reviewing, or who will be reviewing, the application, or a decision rejecting the application, a decision to hire the user or individual, or a decision referring the application for a further interview or review.

In a preferred embodiment, the employer communication device 30 can automatically generate any status message(s), and can transmit the same to the user's or individual's user communication device 20, at any time before, during, or after, the occurrence of the electronic forum, or before, during, or after, any occurrence of any electronic forum.

At step 1003, any and all status messages can also be stored in the database 20H of the user communication device 20, in the database 30H of the employer communication device 30, and/or in the database 11H of the central processing computer and/or in the distributed ledger/Blockchain technology system 12 of the central processing computer and distributed ledger and Blockchain technology system 10.

At step 1003, the user or individual can review the status of each job, project, or assignment, application which was previously made. At step 1003, the user or individual can also review the user or member profile for each employer or hiring entity to or with whom he or she has applied for a job, project, or assignment. At step 1003, the user or individual can schedule a videoconference call with any employer or hiring entity to or with whom he or she has applied for a job, project, or assignment. At step 1003, the user or individual can conduct a videoconference call with any employer or hiring entity to or with whom he or she has applied for a job, project, or assignment. At step 1003, the user or individual can also submit an application status inquiry for any job, project, or assignment, for which he or she has applied, and/or can transmit the application status inquiry to the respective employer communication device 30 associated with the employer or hiring entity to or with whom the user or individual has applied for a job, project, or assignment.

At step 1003, the user or individual can also supplement any previously made or submitted application for a job, project, or assignment, by submitting and transmitting, to a respective employer communication device 30, any additional information and/or materials. In a preferred embodiment, the user or individual can also enter information regarding a request to receive status alerts and/or status messages from any employer or hiring entity regarding any activities or developments relating to, or pertaining to, any previously made or submitted application for a job, project, or assignment. At step 1003, for any project or assignment, the user or individual can also submit a proposal, an estimate, or a bid, for any project or assignment posted or listed by an employer or hiring entity. At step 1003, the user or individual can engage in, and/or can perform, any other action or activity in searching for and/or in securing a job, project, or assignment. Once the user or individual completes his or her activities in the electronic forum, the operation of the apparatus 100 can proceed to step 1004.

At step 1004, any and/or all information regarding the user's or individual's activities performed in and/or via the electronic forum, any information regarding any job, project, or assignment, application(s), submitted by the user or individual in and/or via the electronic forum, any video conference calls made in or via the electronic forum, and/or any information regarding any activity performed by the user or individual in or via the electronic forum, and/or any information provided to the user or individual in or via the electronic forum, can be stored in an electronic forum report which can be generated by the central processing computer 11. In a preferred embodiment, the electronic forum report can thereafter, at step 1004, be stored in the database 20H of the user's or individuals user communication device 20, in the database 11H of the central processing computer 11, and/or in the distributed ledger/Blockchain technology system 12 of the central processing computer and distributed ledger and Blockchain technology system 10. Thereafter, the operation of the apparatus 100 will cease at step 1005.

In another preferred embodiment of the embodiment of FIG. 10, any of the herein-described status alerts and/or status messages can be generated and transmitted, from an employer communication device 30 and/or by the central processing computer 11 to the user communication device 20 at any time and/or upon the any occurrence or happening of any event or activity of interest to the user or individual. In a preferred embodiment, in addition to containing information regarding the occurrence or happening, the status alert or status message can also contain a link or hyperlink to the electronic forum via which the user or individual can enter or re-enter the electronic forum at any time.

In another preferred embodiment of the embodiment of FIG. 10, the user or individual can use his or her user communication device 20 in order to program the central processing computer 11 in order to detect the posting of jobs, projects, or assignments, of interest to the user or individual. Upon detecting the posting of any jobs, projects, or assignments, of interest to the user or individual, the central processing computer 11 can generate a job alert message or a project alert message automatically and can automatically transmit the same to the user's or individual's user communication device 20. In a preferred embodiment, the job alert message or a project alert message can contain information regarding the job, project, or assignment, and can also contain a link or hyperlink to the electronic forum.

In another preferred embodiment, the apparatus 100 can be utilized by any employer or hiring entity in order to manage and/or monitor his, her, or its, recruitment and/or manpower procurement and/or management activities. In a preferred embodiment, it is envisioned that each user, individual, independent contractor, or freelancer, and each employer or hiring entity, will create, and/or have associated therewith, a user or member account. In a preferred embodiment, the user or member account can be utilized in order to perform any of the herein-described activities described herein as being capable of being performed while using the apparatus 100 of the present invention. In a preferred embodiment, the user or member account can contain and/or can include any information regarding the respective user, individual, independent contractor, or freelancer, and each employer or hiring entity, including, but not limited to, any and/or all of the information described herein as being stored, for the respective user, individual, independent contractor, or freelancer, and each employer or hiring entity, in any of the databases 11H, 20H, 30H, 40H, 50H, 60H, 70H, and/or 80H, along with identification information, contact information, user or member profile information, and/or user work schedule or work calendar information.

In a preferred embodiment, the employer or hiring entity, can utilize the apparatus 100 of the present invention in order to search for individuals, independent contractors, or freelancers, who can perform services for the employer or hiring entity, and/or to search for employees or candidates for jobs, projects, or assignments, to receive and review resumes and/or job applications from individuals, independent contractors, or freelancers, to submit requests for proposals or bids for jobs, projects, or assignments to individuals, independent contractors, or freelancers, to receive cover letters, to receive video messages, to ascertain the status of an individual, independent contractor, or freelancer, to request an interview, to request information, and/or to check on the status of an applicant for a job, project, or assignment, and/or to perform any other action or activity in finding an employee or candidate for a job, project, or assignment. In a preferred embodiment, the employer or hiring entity can also request to be notified when an individual, an independent contractor, or a freelancer, becomes available for a job, project, or assignment.

Figure 11:
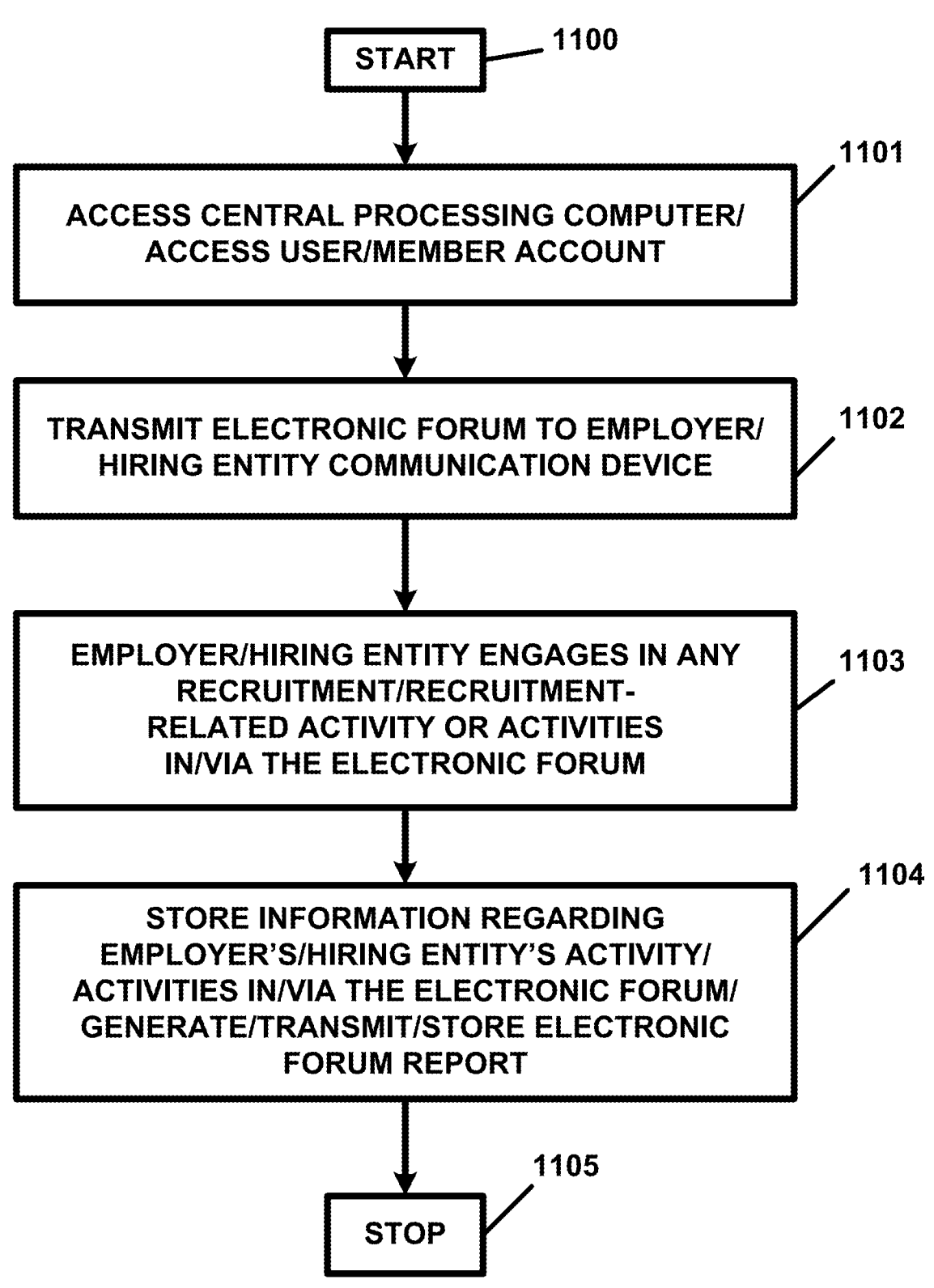
FIG. 11 illustrates another preferred embodiment method for utilizing the apparatus of the present invention, in flow diagram form.

FIG. 11 illustrates a preferred embodiment method for utilizing the apparatus 100 of the present invention, in flow diagram form. With reference to FIG. 11, the operation of the apparatus 100 commences at step 1100. At step 1101, the employer or hiring entity can access the central processing computer 11 using his or her employer communication device 30. At step 1101, the employer or hiring entity can access, or can log into, his or her user or member account by transmitting an access request message, or login information, from his or her employer communication device 30 to the central processing computer 11. At step 1101, the central processing computer 11 can receive and process the information contained in the access request message, or the login information, and can grant the employer or hiring entity access to his or her user or member account.

At step 1102, the central processing computer 11 can transmit an electronic job search forum (hereinafter referred to as an "electronic forum"), or web page, to the employer communication device 30. In a preferred embodiment, the central processing computer 11 can transmit the electronic forum to the employer communication device 30. In another preferred embodiment, the central processing computer 20 can transmit a web page to the employer communication device 30. In a preferred embodiment, the electronic forum, or web page, can be displayed on, and viewed via, the display device 30E of the employer communication device 30. Thereafter, the operation of the apparatus 100 can proceed to step 1103.

At step 1103, the employer or hiring entity can engage in any recruitment activity or activities while in and/or via the electronic forum. At step 1103, the employer or hiring entity can perform a search or searches for candidates for any open or available job, project, or assignment, and can be provided with search results containing any number of individuals, independent contractors, or freelancers, who might be available for, or who can be a candidate for, an available job, project, or assignment. In a preferred embodiment, the employer or hiring entity can perform searches for candidates by entering search information using a keyword or keywords, location(s), category or categories, names of potential candidates, and/or any other searching method or methodology.

In another preferred embodiment, the employer or hiring entity can search for candidates in a same geographic area in which his or her employer communication device 30 is located at the time of the performing of the search. In such an embodiment, information regarding the position or location of the employer communication device 30, as determined by the global positioning device 30K, can also be transmitted to the central processing computer 11 along with any search information. In a preferred embodiment, the search information, along with any position or location information, if utilized, can be transmitted from the employer communication device 30 to the central processing computer 11. At step 1103, the central processing computer 11 can receive and process the search information and generate a candidate search report and can transmit the same to the employer communication device 30.

At step 1103, the employer communication device 40 can receive the candidate search report and can display information contained therein to the employer or hiring entity via the electronic forum and/or the display device 30E. At step 1103, the employer or hiring entity can identify one or more candidates from the search report, and the employer communication device 30 can generate a recruitment message, and, thereafter, can transmit the recruitment message to the user communication device 20 associated with the identified candidate or to the respective communication devices associates with each of the identified candidates. In a preferred embodiment, the recruitment message can contain and/or include information regarding the job, project, or assignment, a description of same, a proposed salary or project price for same, a request for a proposal for same, or a request for an estimate for same, and/or any other information regarding the job, project, or assignment. The recruitment message can also include a link or a hyperlink to the user or member profile for the employer or hiring entity, a website of the employer or hiring entity, and/or any other information regarding the employer or hiring entity.

At step 1103, the recruitment message, and/or any and/or all of the information described as being contained therein, can also be transmitted to the central processing computer 11. Thereafter, at step 1103, the central processing computer 11 and/or each respective user communication device 20 that received the recruitment message can store the same and can generate a message received confirmation message. At step 1103, the central processing computer 11, and each respective user communication device 20 which received the recruitment message, can transmit the message received confirmation message to the employer communication device 30.

In a preferred embodiment, the electronic forum can also display information regarding all applicants for the job, project, or assignment, and/or for and/or all applicants for any other available jobs, projects, or assignments, of the employer or hiring entity. In a preferred embodiment, the electronic forum can also display information regarding a listing of all individuals, independent contractors, or freelancers, who have previously applied for the job, project, or assignment, and/or who have previously applied for any of the other jobs, projects, or assignment, and/or information regarding each respective individual, independent contractor, or freelancer, and/or his or her application and/or application status. The information regarding the status of an application can include information regarding a date of application, a date of consideration, feedback information from the employer or hiring entity, a decision, or a date on which a decision is to be made. The information regarding the status of an application can also include information indicating that an individual, independent contractor, or freelancer, has withdrawn his or her application, was extended an offer, or has rejected the offer.

In a preferred embodiment, it is envisioned that each time an employer communication device 30 of an employer or hiring entity receives an application for a job, a project, or an assignment, and/or each time the application is reviewed and/or acted upon in any manner or way, the employer communication device 30 can automatically generate a status message which can be utilized to update the status information for each candidate and/or for each job, project, or assignment, for later viewing in the electronic forum. In a preferred embodiment, the status message can contain information which can indicate that the application has been received, that the application has been reviewed, that the application and the individual, independent contractor, or freelancer, has been referred for further consideration, the name and/or position of the person or persons who have reviewed the application, the name and/or position of the person or persons who have reviewed, or who are reviewing, or who will be reviewing, the application, or a decision rejecting the application, a decision to hire the user or individual, or a decision referring the application for a further interview or review. In a preferred embodiment, the employer communication device 30 can automatically generate any status message(s), and can store the same in the database 30H of the employer's communication device 30, at any time before, during, or after, the occurrence of the electronic forum, or before, during, or after, any occurrence of any electronic forum.

At step 1103, any and all status messages, whenever the same are generated, can also be transmitted to the user communication device(s) 20, of any applicant(s) for any job, project, or assignment, of the employer or hiring entity, and to the central processing computer 11. At step 1103, the any and/or all status messages can also be stored in the database 20H of the user communication device 20, and/or in the database 11H of the central processing computer 11 and/or in the distributed ledger/Blockchain technology system 12 of the central processing computer and distributed ledger and Blockchain technology system 10.

At step 1103, the employer or hiring entity can review the status of each application for each job, project, or assignment, application which was previously made. At step 1103, the employer or hiring entity can also review the user or member profile for each candidate identified in the search report or for any applicant(s) for the job, project, or assignment, or any applicants for any other previously posted or listed jobs, projects, or assignments, of the employer or hiring entity. At step 1103, the employer or hiring entity can schedule a videoconference call with any applicant(s) for the job, project, or assignment, or with any applicant(s) for any other previously posted or listed jobs, projects, or assignments, of the employer or hiring entity. At step 1103, the employer or hiring entity can conduct a videoconference call, or schedule an interview or follow-up interview, with any applicant or with any number of applicants for the job, project, or assignment, or with any applicant(s) for any other previously posted or listed jobs, projects, or assignments, of the employer or hiring entity. At step 1103, the employer or hiring entity can also transmit a message, requesting additional information from any one or more applicants for the job, project, or assignment, or from any applicant(s) for any other previously posted or listed jobs, projects, or assignments, of the employer or hiring entity, and can transmit the message to the communication device 20 of or associated with each applicant from who the additional information is requested.

In a preferred embodiment, the employer or hiring entity can also enter information regarding a request to receive status alerts and/or status messages from the central processing computer 11 or from any of the user communication devices 20 of or associated with and individuals, independent contractors, or freelancers, regarding an availability of an individual, independent contractor, or freelancer, the unavailability of an individual, independent contractor, or freelancer, or any change in circumstances regarding any individual(s), independent contractor(s), or freelancer(s), and/or any other change of circumstances regarding the employment environment of the employer or hiring entity.

At step 1103, the employer or hiring entity can also engage in, and/or can perform, any other action or activity in searching for candidates for any job(s), project(s), or assignment(s). Once the employer or hiring entity completes his or her activities in the electronic forum, the operation of the apparatus 100 can proceed to step 1104.

At step 1104, any and/or all information regarding the employer's or hiring entity's activities performed in and/or via the electronic forum, any information regarding any candidates and/or any job, project, or assignment, application(s), any video conference calls made in or via the electronic forum, and any information regarding any activity performed by the employer to hiring entity in or via the electronic forum, and/or any information provided to the employer or hiring entity in or via the electronic forum, can be stored in an electronic forum report which can be generated by the central processing computer 11. In a preferred embodiment, the electronic forum report can thereafter, at step 1104, be stored in the database 30H of the employer's or hiring entity's communication device 30, in the database 11H of the central processing computer 11, and/or in the distributed ledger/Blockchain technology system 12 of the central processing computer and distributed ledger and Blockchain technology system 10. Thereafter, the operation of the apparatus 100 will cease at step 1105.

In another preferred embodiment of the embodiment of FIG. 11, any of the herein-described status alerts and/or status messages can be generated and transmitted, by and/or from a user communication device 20, or from the central processing computer 11, to the employer communication device 30 at any time and/or upon the any occurrence or happening of any event or activity of interest to the employer or hiring entity. In a preferred embodiment, in addition to containing information regarding the occurrence or happening, the status alert or status message can also contain a link or hyperlink to the electronic forum via which the employer or hiring entity can enter or re-enter the electronic forum at any time.

In another preferred embodiment of the embodiment of FIG. 11, the employer or hiring entity can use his or her employer communication device 30 in order to program the central processing computer 11 in order to detect the posting of a user or member profile or a resume of or for potential candidates, potential employees, independent contractors, or freelancers, who may be of interest to the employer or hiring entity. Upon detecting the posting of a user or member profile or a resume of or for a potential candidate, a potential employee, an independent contractor, or a freelancer, of interest to the employer or hiring entity, the central processing computer 11 can generate a candidate alert message automatically and can automatically transmit the same to the employer communication device 30 of the employer or hiring entity. In a preferred embodiment, the candidate alert message can contain information regarding the potential candidate, potential employee, independent contractor, or freelancer, and can also contain a link or hyperlink to the electronic forum.

In another preferred embodiment, the apparatus 100 of the present invention can be utilized in order to allow any of the herein-described users or individuals to schedule an appointment with an independent contractor or a freelancer for or regarding the performing of a work project or an assignment, or for or regarding obtaining a consultation, or a work estimate, and/or for or regarding a project or an assignment. In such a preferred embodiment, the apparatus 100 can be utilized to schedule appointments with independent contractors and/or freelancers for any and/or all types of kinds of services. In this regard, the apparatus 100 of the present invention can be utilized to schedule appointments with independent contractors and/or freelancers who can perform any service or services in any field or sector of the global economy.

As and for an example, users or individuals can utilize the apparatus 100 in order to schedule an appointment with a healthcare professional, a doctor, a dentist, an attorney, an accountant, a business consultant, a tradesman, and/or any other service provider.

FIG. 12 illustrates another preferred embodiment method for utilizing the apparatus 100 of the present invention, in flow diagram form. In the preferred embodiment of FIG. 12, the apparatus 100 is described herein as being utilized to schedule an appointment with any service provider, professional or otherwise.

With reference to FIG. 12, the operation of the apparatus 100 commences at step 1200. At step 1201, the user or individual can access the central processing computer 11 by using his or her user communication device 20. At step 1201, the user or individual can transmit, from his or her user communication device 20 to the central processing computer 11 component of the central processing computer and distributed ledger and Blockchain technology system 10, his or her request to locate one or more service providers who can perform the needed service or services for the user or individual.

At step 1201, the central processing computer 11 can receive and process the information regarding the request, and can generate a service provider report which can include a listing of identified and/or available service providers. In a preferred embodiment, the service report can contain and/or include information regarding each identified and/or available service providers and link to hyperlink to their respective user or member profile and work schedule(s) and/or work calendar. Thereafter, the user or individual can review the information contained in the service provider report and/or any user or member profile and/or work schedule(s) or work calendar(s) for any service provider or for any service providers identified in the service provider report. Thereafter, at step 1201, the user or individual can transmit, to the central processing computer 11, information for scheduling an appointment with a service provider identified in the service provider report.

At step 1202, the central processing computer 11 can receive and process the information for scheduling the appointment with the service provider, can process any information needed to make or to schedule the appointment with the service provider, and can update the service provider's work schedule or work calendar so as to include the scheduled appointment. Thereafter, the central processing computer 11 can generate an appointment confirmation message which can contain and/or include information regarding the scheduled appointment, the date and the time(s) of the same, the scheduled time duration of the same, a link or hyperlink to, or information regarding, the user or member profile of, or other information regarding, the service provider, a link or hyperlink to, or other information regarding, the user or member profile of, or other information regarding, the user or individual, and/or any other information regarding the scheduled appointment.

At step 1202, the central processing computer 11 can transmit the appointment confirmation message to the user communication device 20 of the user or individual and to the user communication device 20 of the service provider. In a preferred embodiment, the appointment confirmation message can be transmitted in or as, or as an attachment to, an electronic communication, and electronic transmission, an email message, a text message, or any other transmission or communication which can be transmitted from the central processing computer 11 to the respective user communication devices 20 of each of the user or individual and the service provider. In the case of an email message, the email message can be transmitted to an email server of or for each of the user or individual and the service provider and can, in a preferred embodiment, be transmitted to or otherwise received at each of the respective user communication devices 20 of each of the user or individual and the service provider.

Thereafter, at step 1202, the service provider can, if he or she desires and before the appointment, review the user's or individual's user or member profile in order to become familiar with the user or individual. If, after reviewing the user's or individual's user or member profile, the service provide decides to decline the appointment, the service provider can, at step 1202, transmit an appointment decline message from his or her user communication device 20, to the central processing computer 11.

If, at step 1202, the service provider transmits an appointment decline message in response to the appointment confirmation message, then the central processing computer 11 will process information for canceling the appointment and will process information for clearing that appointment time or slot in the service provider's work schedule or work calendar. Thereafter, at step 1202, the central processing computer 11 will generate an appointment cancellation message and transmit the same to the user's or individual's user communication device 20.

At step 1203, information regarding the appointment, the appointment confirmation message, the appointment decline message, or the appointment cancellation message, can be stored in the database 20H of the service provider's user communication device 20, in the database 20H of the user's or individuals user communication device 20, and/or in the database 11H of the central processing computer 11. At step 1203, the information regarding the appointment, the appointment confirmation message, the appointment decline message, or the appointment cancellation message, can be stored in the distributed ledger/Blockchain technology system 12 of the central processing computer and distributed ledger and Blockchain technology system 10. Thereafter, the operation of the apparatus 100 will cease at step 1204.

In another preferred embodiment, the apparatus 100 of the present invention can be utilized in order to allow any of the herein-described users or individuals to schedule, and/or to participate in, videoconference calls, video chat sessions, telephone calls, or telephone conference calls, with any independent contractor, freelancer, consultant, or other user or individual.

As and for an example, users or individuals can utilize the apparatus 100 in order to schedule, and to participate in, a video conference call, a video chat session, a telephone call, or a telephone conference call, with any independent contractor, freelancer, consultant, or counterparty, for any reason or purpose. In a preferred embodiment, the video conference call, the video chat session, the telephone call, or the telephone conference call, between the user or individual and the independent contractor, freelancer, consultant, or counterparty, can be recorded, and a digitally recorded copy of the same can be stored in a digital asset account of or associated with the user or individual.

In a preferred embodiment, in the case of a video conference call or video chat session, the user or individual and/or the respective independent contractor, freelancer, consultant, or counterparty, can also, at any time during the video conference call or video chat session, take a screenshot picture or photograph of the user or individual and the respective independent contractor, freelancer, consultant, or counterparty, so as to record any information provided during the video conference call or video chat session.

Figure 13:
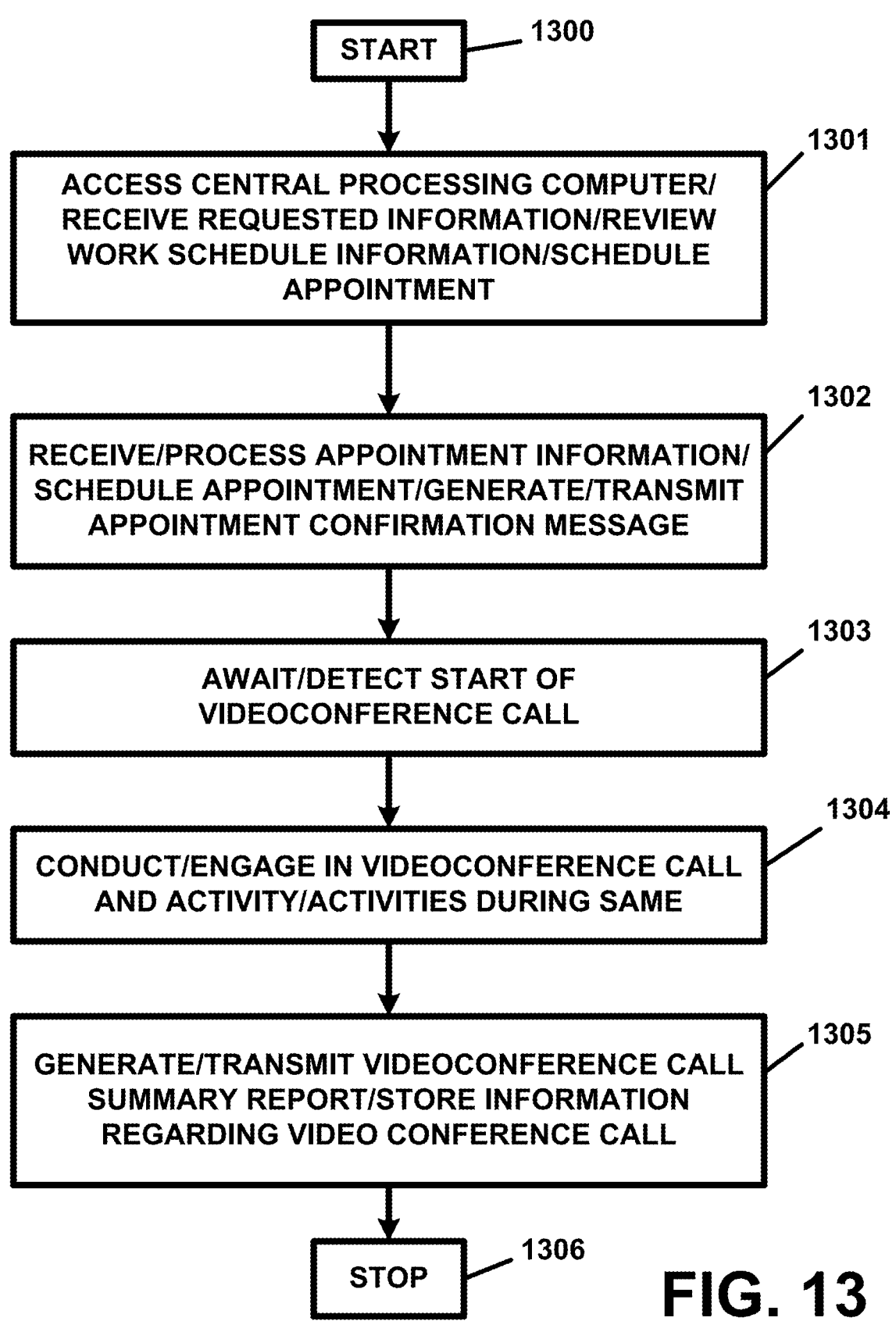
FIG. 13 illustrates yet preferred embodiment method for utilizing the apparatus of the present invention, in flow diagram form.

FIG. 13 illustrates another preferred embodiment method for utilizing the apparatus 100 of the present invention, in flow diagram form. In the preferred embodiment of FIG. 13, the apparatus 100 is described herein as being utilized to facilitate and to record a scheduled videoconference call between a user or individual and a consultant. Although described in a preferred embodiment as being utilized in connection a scheduled videoconference call between a user or individual and a consultant, it is important to note that the apparatus 100 of the embodiment of FIG. 13 can also be utilized in a same, a similar, and/or an analogous, manner in connection with any scheduled, or unscheduled, or arranged, or unarranged, or spur of the moment, video conference call, the video chat session, the telephone call, or the telephone conference call, between and with any user or individual and any independent contractor, freelancer, consultant, or counterparty.

With reference to FIG. 13, the operation of the apparatus 100 commences at step 1300. At step 1301, the user or individual can access the central processing computer 11 by using his or her user communication device 20. At step 1301, the user or individual can transmit, from his or her user communication device 20 to the central processing computer 11 component of the central processing computer and distributed ledger and Blockchain technology system 10, his or her request to access the user or member profile and/or the work schedule of or for the consultant with whom he or she desires to engage in a videoconference call. At step 1301, the central processing computer 11 can transmit the requested information regarding the consultant's user or member profile and/or the work schedule to the user communication device 20. Thereafter, at step 1301, the user or individual can review the consultant's work schedule and can transmit, to the central processing computer 11, information for scheduling a videoconference call with the consultant. In a preferred embodiment, the user or individual can schedule the videoconference call for any desired length of time. In a preferred embodiment, the consultant may require compensation or payment for the videoconference call, may require a monetary or non-monetary contribution or donation to a charity, or may opt to participate in the videoconference call without seeking any compensation or donation.

At step 1302, the central processing computer 11 can receive and process the information for scheduling the videoconference call with the consultant and can update the consultant's work schedule to include the scheduled videoconference call for the scheduled date and time. Thereafter, the central processing computer 11 can generate a videoconference call confirmation message which can contain and/or include information regarding the scheduled videoconference call, the date and the time(s) of the same, the scheduled time duration of the same, a link or hyperlink to, or information regarding, the user or member profile of, or other information regarding, the consultant, a link or hyperlink to, or other information regarding, the user or member profile of, or other information regarding, the user or individual, and/or a link, hyperlink, or uniform resource locator (url), or any other information, needed or desired for initiating and/or engaging in the scheduled videoconference call, and/or information regarding whom, the user or individual or the consultant, is to initiate the videoconference call at the scheduled time.

At step 1302, the central processing computer 11 can transmit the videoconference call confirmation message to the user communication device 20 of the user or individual and to the user communication device 20 of the consultant. In a preferred embodiment, the videoconference call confirmation message can be transmitted in or as, or as an attachment to, an electronic communication, and electronic transmission, an email message, a text message, or any other transmission or communication which can be transmitted from the central processing computer 11 to the respective user communication devices 20 of each of the user or individual and the consultant. In the case of an email message, the email message can be transmitted to an email server of or for each of the user or individual and the consultant and can, in a preferred embodiment, be transmitted to or otherwise received at each of the respective user communication devices 20 of each of the user or individual and the consultant. Thereafter, at step 1302, the consultant can, if he or she desires and before the videoconference call, review the user's or individual's user or member profile in order to become familiar with the user or individual.

At step 1303, the apparatus 100 will await the start of the videoconference call. In a preferred embodiment, the videoconference call can be initiated either by the user or individual or by the consultant. At step 1303, the apparatus 100 can detect the start of the videoconference call. Thereafter, the operation of the apparatus 100 will proceed to step 1304.

At step 1304, the user or individual and the consultant can engage in the video conference call, for the scheduled amount of time or for any amount of time permitted. In a preferred embodiment, the entirety, or any portion, of the videoconference call can be recorded or digitally recorded by the consultant's user communication device 20, by the user's or individual's user communication device 20, and/or by the central processing computer 11. In a preferred embodiment, the entirety, or any portion, of the videoconference call can be recorded or digitally recorded and stored, as a digital recording of the videoconference call, in the database 20H of the consultant's user communication device 20, in the database 20H of the user's or individuals user communication device 20, and/or in the database 11H of the central processing computer 11.

In a preferred embodiment, as noted hereinafter, the recording or digital recording of the entirety, or any portion, of the videoconference call can also be stored, as a digital recording, in the user's or individual's digital asset account in the database 60H of the digital assets/records storage computer 60, in the database 20H of the user's or individual's user communication device 20, and/or in the database 11H of the central processing computer 11. In a preferred embodiment, as noted hereinafter, the recording or digital recording of the entirety, or any portion, of the videoconference call can also be stored, as a digital recording, in the distributed ledger/Blockchain technology system 12 of the central processing computer and distributed ledger and Blockchain technology system 10.

At step 1304, the user or individual and the consultant can engage in any discussions and/or activities during the videoconference call. In a preferred embodiment, at step 1304, and at any time during the videoconference call, the user or individual and/or the consultant, can take a screenshot picture or photograph, or any number of screenshots or photographs of the user or individual and the consultant, or of any information provided by the user or individual or provided by the consultant, during the videoconference call. In a preferred embodiment, at step 1304, or during the videoconference call, or at any time after the videoconference call, the user or individual or the consultant can affix or attach a digital signature to, or digitally sign, any screenshot picture or photograph, or any number of screenshot pictures or photographs, taken during the videoconference call.

In a preferred embodiment, the user or individual and/or the consultant can also, at step 1304, or during the videoconference call, or at any time after the videoconference call, can affix or attach a digital signature to, or digitally sign, the digitally recorded copy of the videoconference call (also referred to interchangeably as "digital videoconference call recording") at the conclusion of the videoconference call.

In a preferred embodiment, at step 1304, the audio conversation between to the consultant and the user or individual, during the videoconference call, can be recorded and translated into a written transcript. In another preferred embodiment, the written transcript can be translated into any desired language. At step 1304, the videoconference call can continue until its conclusion. Thereafter, the operation of the apparatus 100 will proceed to step 1305.

At step 1305, the central processing computer 11, or the consultant's user communication device 20, or the user's or individual's user communication device 20, can generate a videoconference call summary report. In a preferred embodiment, the videoconference call summary report can include information regarding the date and time of the videoconference call, the name of the user or individual, and the name of the consultant, who participated in the videoconference call, information regarding, and/or a link or hyperlink to, the digital videoconference call recording which was recorded and stored, information regarding, and/or a link or hyperlink to, any written transcript of the audio conversation during the videoconference call, any information regarding, and/or a link or hyperlink to, any screenshot picture(s) or photograph(s), taken during the videoconference call, and/or any other information regarding the videoconference call.

At step 1305, the videoconference call summary report can be transmitted and stored in or at any one or more of the central processing computer 11, the consultant's user communication device 20, and/or the user's or individual's user communication device 20. At step 1305, the videoconference call summary report, the digital videoconference call recording, any written transcript of the audio conversation during the videoconference call, any information regarding any screenshot picture(s) or photograph(s) taken during the videoconference call, and/or any other information, can be stored in the database 11H of the central processing computer 11, and in the distributed ledger/Blockchain technology system 12 of the central processing computer and distributed ledger and Blockchain technology system 10.

At step 1305, the videoconference call summary report, the digital videoconference call recording, any written transcript of the audio conversation during the videoconference call, any information regarding any screenshot picture(s) or photograph(s) taken during the videoconference call, and/or any other information, can be stored in the database 60H of the digital assets/records storage computer 60 and/or in the user's or individual's digital asset account. At step 1305, the videoconference call summary report, the digital videoconference call recording, any written transcript of the audio conversation during the videoconference call, any information regarding any screenshot picture(s) or photograph(s) taken during the videoconference call, and/or any other information, can also be stored in the database 20H of the consultant's user communication device 20 and in the database 20H of the user's or individual's user communication device. Thereafter, the operation of the apparatus 100 will cease at step 1306.

In another preferred embodiment of the embodiment of FIG. 13, the user or individual can, at any time, access the central processing computer 11, the distributed ledger/Blockchain technology system 12 of the central processing computer and distributed ledger and Blockchain technology system 10, and/or the digital assets/records storage computer 60, and can request access to, and can be provided, via his or her user communication device 20, with access to, any videoconference call summary report, any digital videoconference call recording, any written transcript of the audio conversation during the videoconference call, and/or any information regarding any screenshot picture(s) or photograph(s) taken during any videoconference call or video conference calls involving the user or individual. In another preferred embodiment, the user or individual can access the central processing computer 11 and can obtain, and can be provided with via his or her user communication device 20, a translation of any written transcript from one language to another. In another preferred, the user or individual can access the central processing computer 11 and can request, and can be provided with, a written transcript of any video conference call. In another preferred embodiment, any written transcript can also be digitally signed, with a digital signature of the user or individual or of the consultant who participated in the respective videoconference call, and such digital signature can be assigned a serial number or an authentication number.

As noted herein, the apparatus 100 of FIG. 13 can be utilized in a same, a similar, and/or an analogous, manner in connection with allowing a user or individual to engage in a video conference call, a video chat session, a telephone call, or a telephone conference call, with any independent contractor, freelancer, consultant, or counterparty, described herein or otherwise. The apparatus 100 of FIG. 13 can also be utilized by any user or individual to create, store, and/or collect, information as a digital asset of any type or kind.

In another preferred embodiment, the apparatus 100 of the present invention can be utilized in order to allow any of the herein-described users or individuals to schedule, and/or to participate in, videoconference calls, video chat sessions, telephone calls, or telephone conference calls, with athletes, active or retired, of any and/or all ages and/or of any and/or all types or kinds, with actors or actresses, active or retired, of any and/or all ages and/or of any and/or all types or kinds, with entertainers, active or retired, of any and/or all ages and/or of any and/or all types or kinds, with any other celebrities, active or retired, of any and/or all ages and/or of any and/or all types or kinds, or with any other notable individuals or groups of individuals of any and/or all ages and/or of any and/or all types or kinds. In a preferred embodiment, any of the athletes, actors, actresses, or entertainers, can be professional, amateur, college, high school or secondary school-aged, athletes, actors, actresses, entertainers, celebrities, and/or other notable people.

As and for an example, users or individuals can utilize the apparatus 100 in order to schedule, and to participate in, a video conference call, a video chat session, a telephone call, or a telephone conference call, with an athlete, with an actor or actress, or with a celebrity. In such a preferred embodiment, the respective athlete, actor or actress, entertainer, or celebrity, can utilize the apparatus 100 as an independent contractor or as a freelancer. In a preferred embodiment, the respective athlete, actor or actress, entertainer, or celebrity, can agree to participate in the video conference call, the video chat session, the telephone call, or the telephone conference call, in return for, or in exchange for, compensation, in return for, or in exchange for, a donation to a designated or undesignated charity, or for no compensation.

In a preferred embodiment, the user or individual and the respective athlete, actor or actress, entertainer, or celebrity, can engage in the video conference call, the video chat session, the telephone call, or the telephone conference call, for any scheduled or unscheduled amount of time. In a preferred embodiment, the video conference call, the video chat session, the telephone call, or the telephone conference call, can be recorded, and a digitally recorded copy of the video conference call, the video chat session, the telephone call, or the telephone conference call, between the user or individual and the respective athlete, actor or actress, entertainer, or celebrity, can be stored as a digital memorabilia asset or as digital memorabilia in a digital asset account or in digital memorabilia account of or associated with the user or individual.

In a preferred embodiment, in the case of a video conference call or video chat session, the user or individual and/or the respective athlete, actor or actress, entertainer, or celebrity, can also, at any time during the same, take a screenshot picture or photograph of the user or individual and the respective athlete, actor or actress, entertainer, or celebrity, and can affix, attach, or digitally sign, a digital autograph to or on the same. In a preferred embodiment, the digital autograph can be a digitized copy of any actual autograph of the respective athlete, actor or actress, entertainer, or celebrity, or any other recognized electronic, or other digital, signature. In a preferred embodiment, a digital autograph can also be affixed, attached, or digitally signed, to or on the digitally recorded copy of the video conference call, the video chat session, the telephone call, or the telephone conference call. The apparatus 100 can assign a serial number, or an authentication number, to the digitally recorded copy of the video conference call, the video chat session, the telephone call, or the telephone conference call, and/or to each screenshot picture or photograph of the user or individual and the respective athlete, actor or actress, entertainer, or celebrity, taken during the respective video conference call or video chat session, and can store the same, along with information regarding the same, in the distributed ledger/Blockchain technology system 12 of the central processing computer and distributed ledger and Blockchain technology system 10.

In this regard, the apparatus 100 of the present invention can also be utilized by any user or individual to create, store, and/or collect, digital memorabilia of any and/or all types or kinds. Further, the apparatus 100 of the present invention can also be utilized in order to facilitate and/or to provide athlete, actor or actress, entertainer, or celebrity, meetings, introductions, meet and greets, and/or personalized autograph sessions, with any of the herein-described users or individuals.

FIG. 14 illustrates another preferred embodiment method for utilizing the apparatus 100 of the present invention, in flow diagram form. In the preferred embodiment of FIG. 14, the apparatus 100 is described herein as being utilized to facilitate and to record a scheduled videoconference call between a user or individual and an athlete. The athlete can be an active athlete or a retired athlete. Although described in a preferred embodiment as being utilized in connection a scheduled videoconference call between a user or individual and an athlete, it is important to note that the apparatus 100 of the embodiment of FIG. 14 can also be utilized in a same, a similar, and/or an analogous, manner in connection with any scheduled, or unscheduled, or arranged, or unarranged, or spur of the moment, video conference call, the video chat session, the telephone call, or the telephone conference call, between and with any user or individual and any athlete, actor or actress, entertainer, or celebrity.

With reference to FIG. 14, the operation of the apparatus 100 commences at step 1400. At step 1401, the user or individual can access the central processing computer 11 by using his or her user communication device 20. At step 1401, the user or individual can transmit, from his or her user communication device 20 to the central processing computer 11 component of the central processing computer and distributed ledger and Blockchain technology system 10, his or her request to access the user or member profile and/or the work schedule of or for the athlete with whom he or she desires to engage in a videoconference call. At step 1401, the central processing computer 11 can transmit the requested information regarding the athlete's user or member profile and/or the work schedule to the user communication device 20. Thereafter, at step 1401, the user or individual can review the athlete's work schedule and can transmit, to the central processing computer 11, information for scheduling a videoconference call with the athlete. In a preferred embodiment, the user or individual can schedule the videoconference call for any desired length of time. In a preferred embodiment, the athlete may require compensation or payment for the videoconference call, may require a monetary or non-monetary contribution or donation to a charity, or may opt to participate in the videoconference call without seeking any compensation or donation.

At step 1402, the central processing computer 11 can receive and process the information for scheduling the videoconference call with the athlete and can update the athlete's work schedule to include the scheduled videoconference call for the scheduled date and time. Thereafter, the central processing computer 11 can generate a videoconference call confirmation message which can contain and/or include information regarding the scheduled videoconference call, the date and the time(s) of the same, the scheduled time duration of the same, a link or hyperlink to, or information regarding, the user or member profile of, or other information regarding, the athlete, a link or hyperlink to, or other information regarding, the user or member profile of, or other information regarding, the user or individual, and/or a link, hyperlink, or uniform resource locator (url), or any other information, needed or desired for initiating and/or engaging in the scheduled videoconference call, and/or information regarding whom, the user or individual or the athlete, is to initiate the videoconference call at the scheduled time.

At step 1402, the central processing computer 11 can transmit the videoconference call confirmation message to the user communication device 20 of the user or individual and to the user communication device 20 of the athlete. In a preferred embodiment, the videoconference call confirmation message can be transmitted in or as, or as an attachment to, an electronic communication, and electronic transmission, an email message, a text message, or any other transmission or communication which can be transmitted from the central processing computer 11 to the respective user communication devices 20 of each of the user or individual and the athlete. In the case of an email message, the email message can be transmitted to an email server of or for each of the user or individual and the athlete and can, in a preferred embodiment, be transmitted to or otherwise received at each of the respective user communication devices 20 of each of the user or individual and the athlete. Thereafter, at step 1402, the athlete can, if he or she desires and before the videoconference call, review the user's or individual's user or member profile in order to become familiar with the user or individual.

At step 1403, the apparatus 100 will await the start of the videoconference call. In a preferred embodiment, the videoconference call can be initiated either by the user or individual or by the athlete. At step 1403, the apparatus 100 can detect the start of the videoconference call. Thereafter, the operation of the apparatus 100 will proceed to step 1404.

At step 1404, the user or individual and the athlete can engage in the video conference call, for the scheduled amount of time or for any amount of time permitted. In a preferred embodiment, the entirety, or any portion, of the videoconference call can be recorded or digitally recorded by the athlete's user communication device 20, by the user's or individual's user communication device 20, and/or by the central processing computer 11. In a preferred embodiment, the entirety, or any portion, of the videoconference call can be recorded or digitally recorded and stored, as a digital recording of the videoconference call, in the database 20H of the athlete's user communication device 20, in the database 20H of the user's or individuals user communication device 20, and/or in the database 11H of the central processing computer 11.

In a preferred embodiment, as noted hereinafter, the recording or digital recording of the entirety, or any portion, of the videoconference call can also be stored, as a digital recording, in the user's or individual's digital asset account and/or digital memorabilia account in the database 60H of the digital assets/records storage computer 60, in the database 20H of the user's or individual's user communication device 20, and/or in the database 11H of the central processing computer 11. In a preferred embodiment, as noted hereinafter, the recording or digital recording of the entirety, or any portion, of the videoconference call can also be stored, as a digital recording, in the distributed ledger/Blockchain technology system 12 of the central processing computer and distributed ledger and Blockchain technology system 10.

At step 1404, the user or individual and the athlete can engage in any discussions and/or activities during the videoconference call. In a preferred embodiment, at step 1404, and at any time during the videoconference call, the user or individual and/or the athlete, can take a screenshot picture or photograph, or any number of screenshots or photographs, of the user or individual and the athlete, or of any information provided by the user or individual or provided by the athlete, during the videoconference call. In a preferred embodiment, at step 1404, or during the videoconference call, or at any time after the videoconference call, the athlete can affix, attach, or digitally sign, a digital autograph, which can be a digitized copy of any actual autograph of the athlete, or any other recognized electronic, or other digital, signature of the athlete, to or on any screenshot picture or photograph, or any number of screenshot pictures or photographs, taken during the videoconference call.

In a preferred embodiment, the athlete can also, at step 1404, or during the videoconference call, or at any time after the videoconference call, affix, attach, or digitally sign, a digital autograph, which can be a digitized copy of any actual autograph of the athlete, or any other recognized electronic, or other digital, signature of the athlete, to or on the digitally recorded copy of the videoconference call (also referred to interchangeably as "digital videoconference call recording") at the conclusion of the videoconference call. In a preferred embodiment, each digital autograph provided by the athlete will be assigned an autograph serial number or an autograph authentication number. In a preferred embodiment, the digital videoconference call recording can be assigned a videoconference call serial number or a videoconference call authentication number. In a preferred embodiment, each screenshot picture or photograph can also be assigned a screenshot serial number or a screenshot authentication number.

In a preferred embodiment, at step 1404, the audio conversation between to the athlete and the user or individual, during the videoconference call, can be recorded and translated into a written transcript. In another preferred embodiment, the written transcript can be translated into any desired language. At step 1404, the videoconference call can continue until its conclusion. Thereafter, the operation of the apparatus 100 will proceed to step 1405.

At step 1405, the central processing computer 11, or the athlete's user communication device 20, or the user's or individual's user communication device 20, can generate a videoconference call summary report. In a preferred embodiment, the videoconference call summary report can include information regarding the date and time of the videoconference call, the name of the user or individual, and the name of the athlete, who participated in the videoconference call, information regarding, and/or a link or hyperlink to, the digital videoconference call recording which was recorded and stored, information regarding, and/or a link or hyperlink to, any written transcript of the audio conversation during the videoconference call, any information regarding, and/or a link or hyperlink to, any screenshot picture(s) or photograph(s), taken during the videoconference call, any information regarding any digital autographs provided by the athlete, and/or any other information regarding the videoconference call.

At step 1405, the videoconference call summary report can be transmitted and stored in or at any one or more of the central processing computer 11, the athlete's user communication device 20, and/or the user's or individual's user communication device 20. At step 1405, the videoconference call summary report, the digital videoconference call recording, any written transcript of the audio conversation during the videoconference call, any information regarding any screenshot picture(s) or photograph(s) taken during the videoconference call, any information regarding any digital autographs provided by the athlete, and/or any other information, can be stored in the database 11H of the central processing computer 11, and in the distributed ledger/Blockchain technology system 12 of the central processing computer and distributed ledger and Blockchain technology system 10.

At step 1405, the videoconference call summary report, the digital videoconference call recording, any written transcript of the audio conversation during the videoconference call, any information regarding any screenshot picture(s) or photograph(s) taken during the videoconference call, and/or any information regarding any digital autographs provided by the athlete, can be stored in the database 60H of the digital assets/records storage computer 60 and/or in the user's or individual's digital asset account and/or digital memorabilia account. At step 1405, the videoconference call summary report, the digital videoconference call recording, any written transcript of the audio conversation during the videoconference call, any information regarding any screenshot picture(s) or photograph(s) taken during the videoconference call, and/or any information regarding any digital autographs provided by the athlete, can also be stored in the database 20H of the athlete's user communication device 20 and in the database 20H of the user's or individual's user communication device. Thereafter, the operation of the apparatus 100 will cease at step 1406.

In a preferred embodiment, a digital asset account can be utilized to digitally store and/or to safeguard, assets of any type or kind for a user, individual, independent contractor, freelancer, employer, or hiring entity. In a preferred embodiment, the assets can be or can include, among other things, monetary assets, currency assets, cryptocurrency assets, non-monetary assets, and/or any other assets which can be used to effectuate payment for services rendered, or to be rendered, by any user, individual, independent contractor, freelancer, employer, or hiring entity, who or which utilizes the apparatus 100 of the present invention. In a preferred embodiment, any of the monetary assets, currency assets, cryptocurrency assets, non-monetary assets, and/or any other assets, can be used to effectuate a payment to a respective party, user, individual, independent contractor, freelancer, employer, or hiring entity, or to receive a payment from a respective party, user, individual, independent contractor, freelancer, employer, or hiring entity.

In a preferred embodiment, the assets can also include any of the herein described, memorabilia, digital memorabilia, souvenirs, digital souvenirs, video recordings, video and audio recordings, photographs, pictures, autographs, digital autographs, and/or any other items or things have a memorabilia, nostalgic, or sentimental, value to any user, individual, independent contractor, freelancer, employer, or hiring entity. In a preferred embodiment, any of the herein described, memorabilia, digital memorabilia, souvenirs, digital souvenirs, video recordings, video and audio recordings, photographs, pictures, autographs, digital autographs, and/or any other items or things that have or may have a memorabilia, nostalgic, or sentimental, value, can also be stored in a digital memorabilia account, a digital souvenir account, or any other digital account for storing things and/or items having nostalgic or sentimental value, each of which accounts can be a stand alone accounts or can be stored in, or can be stored as a component account of, or a sub-account of, a respective digital asset account of, for, or associated with, any user, individual, independent contractor, freelancer, employer, or hiring entity.

In a preferred embodiment, the database 60H can contain and/or include, for each digital asset account, and/or for each digital memorabilia account, a digital souvenir account, or any other digital account, held by, owned by, or associated with, a respective user, individual, independent contractor, freelancer, employer, or hiring entity, data and/or information regarding each asset held by the respective user, individual, independent contractor, freelancer, employer, or hiring entity, and for each asset, data and/or information regarding the name of the asset the date the asset was acquired, a description of asset, an assigned value for asset, and/or any other information regarding the asset. In a preferred embodiment, the digital asset account can also include information regarding currencies or cryptocurrencies which can be used by a respective user, individual, independent contractor, freelancer, employer, or hiring entity, to make a payment to another respective user, individual, independent contractor, freelancer, employer, or hiring entity. In another preferred embodiment, the digital asset account can also include information regarding currencies or cryptocurrencies which can represent, or can include, a payment or payments received by a respective user, individual, independent contractor, freelancer, employer, or hiring entity, from another respective user, individual, independent contractor, freelancer, employer, or hiring entity.

Any type of Blockchain technology can be utilized in connection with the present invention. For example, the present invention can utilize a distributed ledger(s) along with any Blockchain technology or technologies, Bitcoin Blockchain technology or technologies, Ethereum Blockchain technology or technologies, Bitcoin Cash Blockchain technology or technologies, Litecoin Blockchain technology or technologies, Privacy Coin Bitcoin technology or technologies, and/or any other suitable Blockchain technology or technologies, and/or Smart contracts and/or Smart contract technology or technologies and/or decentralized autonomous organizations (DAOs), decentralized autonomous organizations (DAOs) technology or technologies, and/or any combination of same.

The present invention can also be utilized with any suitable cryptocurrency, such as, but not limited to, Bitcoin, Bitcoin Cash, Ethereum, Ripple, Dash, Monero, Zcash, Digibyte, Litecoin, any privacy coins, and/or any other cryptocurrency and/or privacy coin cryptocurrency. In this regard, any of the embodiments described herein can be performed with or utilizing any currency or any cryptocurrency. Further, any of the accounts described herein, and any of the transactions on or which can involve any of the accounts described herein can also involve or utilize any currency or cryptocurrency.

Applicant incorporates by reference herein the subject matter and teachings of "Blockchain Technology Explained" by Alan T. Norman, "Blockchain" by Abraham K. White, "Blockchain-A Practical Guide To Developing Business, Law, And Technology Solutions" by Joseph J. Bambara and Paul R. Allen, and "Blockchain-Ultimate Guide To Understanding Blockchain, Bitcoin, Cryptocurrencies, Smart Contracts And The Future of Money" by Mark Gates, in their entirety, for all of their respective subject matter and teachings regarding distributed ledger technology and/or technologies, Blockchain technology and/or technologies, Bitcoin technology and/or technologies, Bitcoin Blockchain technology and/or technologies, Ethereum technology and/or technologies, Ethereum Blockchain technology and/or technologies, cryptocurrencies, cryptocurrency technology and/or technologies, and/or smart contract technology and/or technologies, and/or decentralized autonomous organizations (DAOs) technologies, and/or peer-to-peer technology and/or technologies, and/or any other technology or technologies related thereto or which can be utilized in conjunction distributed ledgers, Blockchain technologies, Smart contracts, decentralized autonomous organizations (DAOs), and/or cryptocurrencies.

In another preferred embodiment of the embodiment of FIG. 14, the user or individual can, at any time, access the central processing computer 11, the distributed ledger/Blockchain technology system 12 of the central processing computer and distributed ledger and Blockchain technology system 10, and/or the digital assets/records storage computer 60, and can request access to, and can be provided, via his or her user communication device 20, with access to, any videoconference call summary report, any digital videoconference call recording, any written transcript of the audio conversation during the videoconference call, and/or any information regarding and/or any screenshot picture(s) or photograph(s) taken during any videoconference call or video conference calls involving the user or individual. In another preferred embodiment, the user or individual can access the central processing computer 11 and can obtain, and can be provided with via his or her user communication device 20, a translation of any written transcript from one language to another. In another preferred, the user or individual can access the central processing computer 11 and can request, and can be provided with, a written transcript of any video conference call. In another preferred embodiment, any written transcript can also be digitally autographed by the athlete who participated in the videoconference call, and such digital autograph can be assigned an autograph serial number or an autograph authentication number.

As noted herein, the apparatus 100 of FIG. 14 can be utilized in a same, a similar, and/or an analogous, manner in connection with allowing a user or individual to engage in a video conference call, a video chat session, a telephone call, or a telephone conference call, with any athlete, actor or actress, entertainer, celebrity, or other notable person. The apparatus 100 of FIG. 14 can also be utilized by any user or individual to create, store, and/or collect, digital memorabilia of any and/or all types or kinds. The apparatus 100 of FIG. 14 can also be utilized in order to facilitate and/or to provide athlete, actor or actress, entertainer, or celebrity, meetings, introductions, meet and greets, and/or personalized autograph sessions, with any of the herein-described users or individuals.

In another preferred embodiment, any of the herein-described digital assets, digital autographs, digital memorabilia, or digital souvenirs, can be tracked, monitored, and/or authenticated, and/or safeguarded, by using the serial numbers and/or authentication numbers which have been assigned to the same.

In another preferred embodiment, any digital asset(s) or digital memorabilia described herein can be stored in, and/or can be accessed via, any number of digital asset accounts, digital memorabilia accounts, or digital souvenir accounts, of or associated with the user or individual. In a preferred embodiment, an RFID tag 90A, or any number of RFID tags 90A, can be assigned to each digital asset account, digital memorabilia account, or digital souvenir account, of the user or individual.

Each RFID tag 90A can be provided to the user or individual so that the user or individual can access any of his or her digital asset accounts, digital memorabilia accounts, or digital souvenir accounts, at any time and from or at any location, and/or via a kiosk or other public communication device or computer system. In such a preferred embodiment, the RFID tag 90A, which the user or individual possesses or can possess, can be read or scanned by an RFID reader system 90B located at, or associated with, a respective kiosk or other private or public communication device or computer system. The data and/or information read or scanned by the RFID reader system 90B can be transmitted to the central processing computer 11 which can process the same and can verify or authenticate the user or individual and/or the respective digital asset account, digital memorabilia account, or digital souvenir account.

Once the user or individual and/or the respective digital asset account, digital memorabilia account, or digital souvenir account, has been verified or authenticated, the user or individual can be provided with access to his or her digital asset account, digital memorabilia account, or digital souvenir account, which is stored in the digital assets/records storage computer 60. Thereafter, the user or individual can access and/or can view any digital asset, digital memorabilia, or digital souvenir, or any number of digital assets, digital memorabilia, or digital souvenirs, which is/are stored in the respective digital asset account, digital memorabilia account, or digital souvenir account, via the respective kiosk or other private or public communication device or computer system. In another preferred embodiment, an RFID tag 90A can also be affixed to, attached to, or associated with the user communication device 20 of or associated with the user or individual.

In another preferred embodiment, the educational/instructional records computer 70 can contain, in its database 70H, video recordings and/or audio recordings of lessons, classes, courses, seminars, educational materials, instructional materials, training materials, fitness materials, sports materials, athletic materials, or any other recordings or materials. In a preferred embodiment, any of the herein-described athletes, actors or actresses, entertainers, celebrities, or other notable persons, or any educational providers or any instructional providers, can produce, record, and/or can post, any of the herein-described video recordings and/or audio recordings of lessons, classes, courses, seminars, educational materials, instructional materials, training materials, fitness materials, sports materials, athletic materials, or any other recordings or materials (hereinafter referred to as "educational/instructional content"), with the educational/instructional records computer 70, which can be stored in the database 70H of same. In a preferred embodiment, any user or individual can access the educational/instructional records computer 70 at any time using his or her user communication device 20 and can request to receive any of the herein-described educational/instructional content. Thereafter, the educational/instructional records computer 70 can transmit the request educational/instructional content to the user's or individual's user communication device 20 and the same can be viewed via the display device 20E of the same.

In a preferred embodiment, as well as any and/or all of the embodiments described herein, the herein-described educational/instructional content can be used by any of the herein-described users, individuals, independent contractors, and/or freelancers, and/or by any of the herein-described employers or hiring entities, for any educational, training, re-training, certification, change of career, continuing training, and/or any other, purpose(s).

In any and/or all of the preferred embodiments, any user, individual, independent contractor, freelancer, employer, or hiring entity, can enroll in, and can participate in any distance learning activities offered by any of the operators of any of the herein-described educational providers and/or instructional providers. In a preferred embodiment, the above-referenced distance learning activities can be, or can include, classes, lessons, seminars, degree programs, certificate programs, and/or any other educational and/or instructional products, services, offerings, and/or activities.

In any and/or all of the preferred embodiments, any user, individual, independent contractor, freelancer, employer, or hiring entity, can also access the social networking computer 80 of a social network in or to which he or she belongs for any social networking, socializing, and/or information gathering, purpose or purposes.

In any and/or all of the embodiments described herein, any data and/or information received by, processed by, generated by, and/or transmitted from, the central processing computer(s) 11, any user communication device(s) 20, any employer communication device(s) 30, any counterparty communication device(s) 40, any media/content provider computer(s) 50, any digital assets/records storage computer(s) 60, any other educational/instructional provider computer(s) 70, and/or any social networking computer(s) 80, can be stored in the distributed ledger/Blockchain technology system 12 of the central processing computer and distributed ledger and Blockchain technology system 10 as well as in the database 11H of the central processing computer 11.

In any and/or all of the embodiments described herein, any data and/or information regarding, pertaining to, indicative of, or representative of, any action(s) taken by, or any activity or activities performed by, or engaged in by, any herein-described user, individual, independent contractor, freelancer, employer, or hiring entity, can be stored in the distributed ledger/Blockchain technology system 12 of the central processing computer and distributed ledger and Blockchain technology system 10 as well as in the database 11H of the central processing computer 11.

As provided herein, the apparatus 100 and methods of the present invention can provide a distributed ledger and blockchain technology-based recruitment, job searching and/or project searching, scheduling, and/or asset and/or consideration tracking, and/or monitoring, apparatus and method, which can be used in any number and/or variety of ways.

In another preferred embodiment, as well as any and/or all of the embodiments described herein, the apparatus 100 and methods of the present invention can be utilized to provide a distributed ledger and blockchain technology-based recruitment, job searching and/or project searching, scheduling, and/or asset tracking and/or monitoring, which can be utilized in commercializing, developing, marketing, selling, transferring, licensing, litigating, enforcing, and/or monetizing, intellectual property and/or intellectual properties of any type or kind.

In another preferred embodiment, the apparatus 100 and methods of the present invention can also be utilized in order to provide an apparatus and a method which allows any user, individual, or entity, to post, list, or register, his, her, or its, intellectual property with the apparatus 100 of the present invention for purposes of commercializing, developing, marketing, selling, transferring, licensing, litigating, enforcing, and/or monetizing, same. The apparatus 100 of the present invention can also be utilized in order to provide an apparatus and method which allows any user, individual, entity, provider, service provider, goods provider, funding entity or funding source, official or governmental office or agency, agent, broker, social network member, media source, and/or information provider or news provider, to search for and be provided with and/or otherwise obtain information regarding any intellectual property which is posted, listed, or registered, with the apparatus 100 of the present invention.

In a preferred embodiment, the apparatus 100 of the present invention can also be programmed to generate and/or to provide, upon a posting, a listing, or a registration, of an intellectual property or intellectual properties with the apparatus of the present invention, a notification message(s) or an alert message(s), containing information regarding the posted, the listed, or the registered, or any newly posted, newly listed, or newly registered, intellectual property or intellectual properties, to any user, individual, entity, provider, service provider, goods provider, funding entity or funding source, official or governmental office or agency, agent, broker, social network member, media source, or information provider or news provider, who or which may be interested in same.

The apparatus 100 of the present invention can also be programmed to generate and/or to provide, upon a posting, a listing, or registration, of a user, individual, entity, provider, service provider, goods provider, funding entity or funding source, official or governmental office or agency, agent, broker, social network member, media source, or information provider or news provider, or a new user, individual, entity, provider, service provider, goods provider, funding entity or funding source, official or governmental office or agency, agent, broker, social network member, media source, or information provider or news provider, with the apparatus 100, a notification message(s) or an alert message(s), containing information regarding the newly posted, listed, or registered or available, user, individual, entity, provider, service provider, goods provider, funding entity or funding source, official or governmental office or agency, agent, broker, social network member, media source, or information provider or news provider, to any user, individual, or entity, who or which has posted, listed, or registered, intellectual property or intellectual properties with the apparatus 100 of the present invention.

The apparatus 100 and method of the present invention can also be utilized to process information regarding a commercialization of, a development of, a marketing of, a sale of, a transfer of, a licensing of, or a monetization of, any intellectual property, or any investment in such activity for or regarding any intellectual property. The apparatus 100 and method of the present invention can also be utilized to sell shares or interests in intellectual property, or to sell shares or interests in any activity, effort, or entity, for or regarding the commercialization of, the development of, the marketing of, the sale of, the transfer of, the licensing of, or the monetization of, any intellectual property.

The apparatus 100 and method of the present invention can also be utilized in order to allow any user, individual, or entity, to search for, hire, or other engage any provider(s), service provider(s), or professional service provider(s), for purposes of protecting, securing rights to, obtaining rights to or regarding, commercializing, developing, marketing, selling, transferring, licensing, or monetization of, his, her, or its, intellectual property. The apparatus 100 and method of the present invention can also be utilized in order to allow a user, individual, entity, provider, service provider, goods provider, funding entity or funding source, official or governmental office or agency, agent, broker, social network member, media source, or information provider or news provider, to obtain information regarding, provide information for or regarding, or to offer to sell, advertise, or sell, a service or goods, or to be hired by or engaged by any user, individual, or entity who or which utilizes the apparatus 100 and method of the present invention in order to commercialize, develop, market, sell, transfer, license, or monetize of, his, her, or its, intellectual property.

The apparatus 100 and method of the present invention can also be utilized in order to allow a user, individual, or entity, to sell, transfer, or license, any domestic rights or foreign rights to his, her, or its, intellectual property. The apparatus 100 and method of the present invention can also be utilized in order to offer, advertise, provide, or sell, services of any of the herein-described users, individuals, entities, providers, service providers, goods providers, funding entities or funding sources, official or governmental offices or agencies, agents, brokers, social networking members, media sources, or information providers or news providers. The apparatus 100 and method of the present invention can also be utilized in order to offer, advertise, provide, or sell, subscriptions for the services of any of the herein-described users, individuals, entities, provider, service providers, goods providers, funding entities or funding sources, official or governmental offices or agencies, agents, brokers, social networking members, media sources, or information providers or news providers. The apparatus 100 and method of the present invention can also be utilized to allow any users, individuals, entities, or any of the herein-described users, individuals, entities, providers, service providers, goods providers, funding entities or funding sources, official or governmental offices or agencies, agents, brokers, social networking members, media sources, or information providers or news providers, to buy, sell, trade in, or barter for, any herein-described intellectual property or any services or goods, or any subscriptions for any services or goods, provided by any of the herein-described users, individuals, entities, providers, service providers, goods providers, funding entities or funding sources, official or governmental offices or agencies, agents, brokers, social networking members, media sources, or information providers or news providers.

The apparatus 100 and method of the present invention can also be utilized as a clearinghouse for the selling, purchasing, trading, or bartering, of shares or interests in or regarding intellectual property.

The apparatus 100 and method of the present invention can also be utilized as a clearinghouse for intellectual property and/or any rights in, to, or relating to, same, as a clearinghouse for any services or goods, or any subscriptions for any services or goods, which can be provided by any of the herein-described users, individuals, entities, providers, service providers, goods providers, funding entities or funding sources, official or governmental offices or agencies, agents, brokers, social networking members, media sources, or information providers or news providers, as a virtual employment agency, as a virtual subscription buying, selling, trading, or bartering, clearinghouse or platform, and/or as a virtual incubator for incubating start-up companies, for launching new business divisions or entities, or as a new product or service launch platform or forum. The apparatus 100 and method of the present invention can also be utilized to provide or perform any number of functions or functionality.

As used herein, the term "intellectual property" refers to, or means, any patent, utility patent, design patent, plant patent, or any foreign or international equivalent of same or any foreign or international counterpart to same, any patent application, provisional patent application, non-provisional patent application, utility patent application, design patent application, plant patent application, and/or any derivative rights associated with or relating to same, or any foreign or international equivalent of same or any foreign or international counterpart to same, or any Patent Cooperation Treaty (PCT) patent application, European Patent Application, or any national, foreign, or regional, patent application, or any foreign or international equivalent of same or any foreign or international counterpart to same, or any invention, idea, documented invention, documented idea, utility model, utility model application, petty patent, petty patent application, innovation patent, innovation patent application, laid open patent application, published patent application, or each and/or every any kind of protection available in and for each nation which is a signatory to the Patent Cooperation Treaty (PCT) or any other international intellectual patent treaty, or each and/or every any kind of protection available in and for each regional patent protection or intellectual property protection under the Patent Cooperation Treaty (PCT) or any other international intellectual patent treaty, or regional or any patent or patent equivalent protection vehicle, or any foreign or international equivalent of same or any foreign or international counterpart to same, and/or any derivative rights associated with or relating to same, or trademark, service mark, mark (hereinafter "trademark"), or any trademark application, service mark application, or mark application, or any federally or otherwise registered, or any common law trademark, service mark, mark, or any foreign or international equivalent of same or any foreign or international counterpart to same, and/or any derivative rights associated with or relating to same, or any copyright, copyright application, registered copyright, common law copyright, copyrighted work, work of authorship, book, literary work of any type or kind, story, short story, article, journal, novel, poem, design, logo, play, screen play, movie script, television show script, internet production or presentation script, movie, television show, Internet show or presentation, movie script, or music, a song, recital, or opera, or music, musical, or song, lyrics, or a design, new product design, apparel, clothing, or any other creation or work of authorship, or any foreign or international equivalent of same or any foreign or international counterpart to same, and/or any derivative rights associated with or relating to same, or any trade secret or trade secret information. As used herein, the term "intellectual property" also refers to, or also means, any license, exclusive license, non-exclusive license, covenant not to sue, or a release, to, for, regarding, or relating to, any herein-described or other intellectual property. The term "intellectual property" also means, or also refers to any derivative rights associated with any intellectual property. Derivative rights can be or can include any rights typically considered to be such for any intellectual property. In addition, the term "intellectual property" also means or refers to any rights which can be granted to any intellectual property. As and for an example, the right to make a book or a story into a television show, a television series, or a movie, is to be considered to be an example of a derivative right of or associated with the book or story for purposes of this patent application in addition to any other derivative rights normally and/or typically associated with the book or the story. Any rights associated with or relating to any item of intellectual property is also to be considered as intellectual property for purposes of this application. In addition, the term "intellectual property" also refers to, or means, or includes, franchises of any type or kind, media rights of any type or kind, and/or rights of publicity of any type or kind.

In a preferred embodiment, the apparatus 100 and methods of the present invention can be utilized by any of the various users who or which are described herein, as well can be utilized by any user who or which is an inventor, creator, author, artist, intellectual property creator, intellectual property owner, intellectual property holder or holding entity, or any employee or agent of same, or any agent, any broker, any attorney, any business consultant or professional, any marketing consultant or professional, any product development consultant or professional, or any provider, any service provider, any goods provider, or any funding service or funding source, any funding service or funding service or source employee, agent, or individual, or any investor or investment entity, any deal facilitator, middleman, or third party, any agent, broker, patent broker or patent brokerage entity, trademark broker or trademark brokerage entity, or copyright broker or copyright brokerage entity, or any intellectual property agent or intellectual property broker, or any agent or employee of same, or any official or government filing office, agency, department, or bureau, or any employee or agent of same. In a preferred embodiment, any of the herein-described users can utilize any respective user communication device 20, employer communication device 30, counterparty communication device 40, or any other suitable computer or communication device. In addition, in a preferred embodiment, any user described herein, any funding service or funding source, or any agent or employee of the same, any official filing office or agency or any governmental office or agency, or any agent or employee of the same, and/or any agent or broker, or any agent or employee of the same, can utilize any user communication device(s) 20 described herein. In a similar manner, in a preferred embodiment, any user described herein, any funding service or funding source, or any agent or employee of the same, any official filing office or agency or any governmental office or agency, or any agent or employee of the same, and/or any agent or broker, or any agent or employee of the same, can utilize any counterparty communication device(s) 40 described herein.

In a preferred embodiment, the database 11H can also contain and/or include, for each user, information regarding the user's name, address, telephone number, cellular telephone number, wireless telephone number, e-mail address, text messaging number, SMS messaging number, company name or business name, company telephone number or business telephone number, company e-mail address or business e-mail address, the user's agent's name, the user's agent's telephone number, the user's agent's cellular telephone number, the user's agent's wireless telephone number, the user's agent's e-mail address, the user's text messaging number, the user's SMS messaging number, and/or any other contact information for the user and/or for the user's agent.

In a preferred embodiment, the database 11H can also contain and/or can include, for each user, information regarding any of the user's intellectual property. For example, in a preferred embodiment, the database 11H can contain and/or can include, for each user, information regarding any of the user's intellectual property, the user's patent(s), the user's patent application(s), the user's domestic patent(s), the user's domestic patent application(s), the user's provisional patent application(s) either domestic or foreign, the user's foreign patent(s) or the user's regional patents, the user's foreign patent application(s) or the user's regional patent applications, the user's PCT patent applications, or any other types or kinds of patent or patent-related protections or international patent or patent-related protections of the user, or information regarding any of the user's trademark(s), the user's trademark application(s), the user's domestic trademark(s), the user's domestic trademark application(s), the user's foreign trademark(s) or the user's regional trademark(s), the user's foreign trademark application(s) or the user's regional trademark applications, the user's international trademark applications, or any other types or kinds of trademark, service mark, or mark, protections, either domestic or foreign, of the user, or information regarding any of the user's copyrights(s), the user's copyrighted works, the user's copyright application(s), the user's domestic copyrights(s) or copyrighted works, the user's domestic copyright application(s), the user's foreign copyright(s) or the user's regional copyright(s), the user's foreign copyright application(s) or the user's regional copyright applications, the user's international copyright applications, or any other types or kinds of copyright protections, either domestic or foreign, of the user. The database 11H can also contain and/or can include, for each user, information regarding any other types or kinds of intellectual property or intellectual property-related protections or any international intellectual property or intellectual property-related protections.

For each type of intellectual property of, owned by, or controlled by, the user, the database 11H can also contain and/or include data and/or information regarding each item of intellectual property, each patent, each patent application, each provisional patent application, each foreign patent application, each foreign patent, each PCT application, each regional patent, or each regional patent application, or each trademark, each trademark application, each foreign trademark, each foreign trademark application, or each convention trademark application, or each copyright, each copyright application, each foreign copyright, each foreign copyright application, or each convention copyright.

For each patent or patent application of any kind or type, domestic or foreign, the database 11H can include a patent number or a patent application derail number, a name of the patent or a name of the patent application, a description of the invention described in or covered by the patent or the patent application, a copy of the patent or the patent application or a link or a hyperlink to a copy of the patent or the patent application, the filing date of the patent or the patent application, the priority date of the patent or the patent application, the country or countries in which protection have been sought for the inventions described or covered by the patent or the patent application, the status of the patent or the patent application, the inventor(s) of the patent or the patent application, the assignee, if any, of the patent or the patent application, the status of payment of any fees or maintenance fees for any patent, and/or the date and/or time of the posting, listing, or registration, of the patent or the patent application with the apparatus 100.

The database 11H can also contain and/or include, for each user, any data and/or information regarding what the user desires or plans to do with the patent or the patent application or any invention covered by same or described by same, including, but not limited to, any information regarding whether or not the user wants to commercialize the invention covered by or described in the patent or the patent application, information regarding whether or not the user wants to develop, produce, market, and/or sell, any goods, products, or services, covered by the invention covered by or described in the patent or the patent application, information regarding whether or not the user wants to start a company or a business entity to develop, produce, market, and/or sell, any goods, products, or services, covered by the invention covered by or described in the patent or the patent application, information regarding whether or not the user wants to find a partner(s) or investor(s) to develop, produce, market, and/or sell, any goods, products, or services, covered by the invention covered by or described in the patent or the patent application, information regarding whether or not the user wants to find a provider of any services, goods, or products, in order to assist the user or to aid the user in developing, producing, marketing, and/or selling, any goods, products, or services, covered by the invention covered by or described in the patent or the patent application, information regarding whether or not the user wants to find a provider of any services, goods, or products, in order to assist the user or to aid the user in obtaining protection for, in obtaining additional protection for, or in further developing and/or protecting additional patents or other intellectual property relating to or regarding, the patent or the patent application, information regarding whether or not the user wants to find an attorney or other professional to represent the user in obtaining protection for, in obtaining additional protection for, or to further developing and/or protecting additional patents or other intellectual property relating to or regarding, the patent or the patent application, information regarding whether or not the user wants to sell, assign, transfer, license, license in a field or use, exclusively license, exclusively license in a field of use, non-exclusively license, market, or monetize, the invention(s) covered by or described in the patent or the patent application, information regarding whether or not the user wants to sell, assign, transfer, license, license in a field or use, exclusively license, exclusively license in a field of use, non-exclusively license, non-exclusively license in a field of use, market, or monetize, any foreign country counterparts to the patent or the patent application or any foreign patents or patent applications relating to same, information regarding any user asking prices or any offering prices for selling, assigning, transferring, licensing, exclusively licensing, non-exclusively licensing, or otherwise monetizing, the patent or the patent application, or information regarding whether or not the user is seeking any partners, strategic partners, joint ventures, or joint venture partners, or others, in the user's efforts or activities in commercializing, developing, marketing, selling, transferring, licensing, and/or monetizing, the patent or the patent application or any inventions covered by same or described in same, or any information regarding the user's expectations, needs, or desires regarding same, information regarding any hiring needs of the user, or information regarding the user's needs, plans, strategies, or desires, for the patent or the patent application, information regarding any work schedule or scheduling needs of the user, and/or any other information regarding the user, the patent, or the patent application, the user's needs, plans, strategies, or desires, for or regarding the patent or the patent application, or any other information which would be needed or desired for or regarding the user, the patent, or the patent application, relating to the user's use of the apparatus 100 of the present invention for, relating to, or regarding, the patent or the patent application.

For each trademark or trademark application of any kind or type, domestic or foreign, the database 11H can include a trademark number or a trademark application serial number, the name or a description of the trademark, a description of the goods, products, or services, with which the trademark is utilized, a copy of the trademark or the trademark application or a link or a hyperlink to a copy of the trademark or the trademark application, the filing date of the trademark or the trademark application, the priority date of the trademark or the trademark application, the country or countries in which protection have been sought for the trademark, the status of the trademark or the trademark application, the applicant(s) for the trademark or the trademark application, the assignee, if any, of the trademark or the trademark application, the status of payment of any fees or renewal fees for the trademark, and/or the date and/or time of the posting, listing, or registration, of the trademark or the trademark application with the apparatus 100.

The database 11H can also contain and/or include, for each user, any data and/or information regarding what the user desires or plans to do with the trademark or the trademark application, including, but not limited to, any information regarding whether or not the user wants to commercialize any goods, products, or services, under the trademark or the trademark application, information regarding whether or not the user wants to develop, produce, market, and/or sell, any goods, products, or services, under the trademark or the trademark application, information regarding whether or not the user wants to start a company or a business entity using the trademark and/or to develop, produce, market, and/or sell, any goods, products, or services, under the trademark or the trademark application, information regarding whether or not the user wants to find a partner(s) or investor(s) to develop, produce, market, and/or sell, any goods, products, or services, under the trademark or the trademark application, information regarding whether or not the user wants to find a provider of any services, goods, or products, in order to assist the user or to aid the user in developing, producing, marketing, and/or selling, any goods, products, or services, under the trademark or the trademark application, information regarding whether or not the user wants to find a provider of any services, goods, or products, in order to assist the user or to aid the user in obtaining protection for, in obtaining additional protection for, or in further developing and/or protecting additional trademarks or other intellectual property relating to or regarding, the trademark or the trademark application, or information regarding whether or not the user wants to find an attorney or other professional to represent the user in obtaining protection for, in obtaining additional protection for, or in further developing and/or protecting additional trademarks or other intellectual property relating to or regarding the trademark or the trademark application, or information regarding whether or not the user wants to sell, assign, transfer, license, license in a field or use, exclusively license, exclusively license in a field of use, non-exclusively license, non-exclusively license in a field of use, market, or monetize, the trademark or the trademark application or any goods, products, or services, under the trademark or the trademark application, or information regarding whether or not the user wants to sell, assign, transfer, license, license in a field or use, exclusively license, exclusively license in a field of use, non-exclusively license, non-exclusively license in a field of use, market, or monetize, any foreign country counterparts to the trademark or the trademark application or any foreign trademarks or trademark applications relating to same, or information regarding any user asking prices or any offering prices for selling, assigning, transferring, licensing, exclusively licensing, non-exclusively licensing, or otherwise monetizing, the trademark or the trademark application, information regarding whether or not the user is seeking any partners, strategic partners, joint ventures, or joint venture partners, or others, in the user's efforts or activities in commercializing, developing, marketing, selling, transferring, licensing, and/or monetizing, the trademark or the trademark application or any goods, products, or services, under the trademark or the trademark application, or any information regarding the user's expectations, needs, or desires regarding same, or information regarding any hiring needs of the user, information regarding the user's needs, plans, strategies, or desires, for the trademark or the trademark application, information regarding any work schedule or scheduling needs of the user, and/or any other information regarding the user, the trademark, or the trademark application, the user's needs, plans, strategies, or desires, for or regarding the trademark or the trademark application, or any other information which would be needed or desired for or regarding the user, the trademark, or the trademark application, relating to the user's use of the apparatus 100 of the present invention for, relating to, or regarding, the trademark or the trademark application.

For each copyright, copyrighted work, or copyright application, of any kind or type, domestic or foreign, the database 11H can include a copyright number of a copyright application serial number, the name or a description of the copyrighted work, the copyright, of the copyright application, a description of the copyrighted work, the copyright, of the copyright application, a copy of the copyrighted work, the copyright, or the copyright application, or a link or a hyperlink to a copy of the copyrighted work, the copyright, or the copyright application, the date of creation of the copyrighted work or the date of filing of the copyright or the copyright application, any first publication date or other priority date of the copyrighted work, the country or countries in which protection has been sought for the copyrighted work, the copyright, or the copyright application, the status of the copyright or the copyright application, the author, creator, or applicant for the copyright or the copyright application, the assignee, if any, of the copyrighted work, the copyright, or the copyright application, the status of payment of any fees or renewal fees for the copyright, and/or the date and/or time of the posting, listing, or registration, of the copyrighted work, the copyright, or the copyright application with the apparatus 100.

The database 11H can also contain and/or include, for each user, any data and/or information regarding what the user desires or plans to do with the copyrighted work, the copyright, or the copyright application, including, but not limited to, any information regarding whether or not the user wants to commercialize the copyrighted work, the copyright, or the copyright application, information regarding whether or not the user wants to develop, produce, market, and/or sell, the copyrighted work, the copyright, or the copyright application, and/or any goods, products, or services, under the copyright or the copyright application, information regarding whether or not the user wants to start a company or a business entity to commercialize or exploit the copyrighted work and/or to develop, produce, market, and/or sell, the copyrighted work and/or any goods, products, or services, relating to same, information regarding whether or not the user wants to find a partner(s) or investor(s) to develop, produce, market, and/or sell, any copyrighted work and/or any goods, products, or services, relating to same, information regarding whether or not the user wants to find a provider of any services, goods, or products, in order to assist the user or to aid the user in developing, producing, marketing, and/or selling, the copyrighted work and/or any goods, products, or services, relating to same, information regarding whether or not the user wants to find a provider of any services, goods, or products, in order to assist the user or to aid the user in obtaining protection for, in obtaining additional protection for, or in further developing and/or protecting additional copyrighted works and/or any goods, products, or services, relating to same, or information regarding whether or not the user wants to find an attorney or other professional to represent the user in obtaining protection for, in obtaining additional protection for, or in further developing and/or protecting additional, copyrighted works, the copyrighted work or other intellectual property relating to or regarding the copyrighted work, the copyright, or the copyright application, or information regarding whether or not the user wants to sell, assign, transfer, license, license in a field or use, exclusively license, exclusively license in a field of use, non-exclusively license, non-exclusively license in a field of use, market, or monetize, the copyrighted work, the copyright, or the copyright application, or any goods, products, or services, under the copyright or the copyright application, or information regarding whether or not the user wants to sell, assign, transfer, license, license in a field or use, exclusively license, exclusively license in a field of use, non-exclusively license, non-exclusively license in a field of use, market, or monetize, any foreign country counterparts to the copyrighted work, the copyright, or the copyright application, or any foreign copyrighted works, copyrights, or copyright applications, or information regarding any user asking prices or any offering prices for selling, assigning, transferring, licensing, exclusively licensing, non-exclusively licensing, or otherwise monetizing, the copyrighted work, the copyright, or the copyright application, or information regarding whether or not the user is seeking any partners, strategic partners, joint ventures, or joint venture partners, or others, in the user's efforts or activities in commercializing, developing, marketing, selling, transferring, licensing, and/or monetizing, the copyrighted work, the copyright, or the copyright application or any goods, products, or services, relating to the copyrighted work, the copyright, or the copyright application or any information regarding the user's expectations, needs, or desires regarding same, or information regarding any hiring needs of the user, information regarding the user's needs, plans, strategies, or desires, for the copyrighted work, the copyright, or the copyright application, information regarding any work schedule or scheduling needs of the user, and/or any other information regarding the user, copyrighted work, the copyright, or the copyright application, the user's needs, plans, strategies, or desires, for or regarding the copyrighted work, the copyright, or the copyright application or any other information which would be needed or desired for or regarding the user, copyrighted work, the copyright, or the copyright application, relating to the user's use of the apparatus 100 of the present invention for, relating to, or regarding, copyrighted work, the copyright, or the copyright application.

The database 11H can also contain and/or include any link(s) or hyperlink(s) to any respective intellectual property of the user, a link(s) or a hyperlink(s) to the user communication device(s) 20 or other respective communication device(s) of or associated with the user, and/or any other data and/or information needed or desired for utilizing the apparatus 100 and method of the present invention in any of the embodiments described herein. The database 11H can also, for each user or for each item of intellectual property associated with that user, contain and/or include, and/or contain and/or include a link(s) or a hyperlink(s) to, any data and/or information maintained by, provided by, offered by, or sold by, the user and/or which can be accessed or obtained from the user or any computer, server, or website, of same.

In a preferred embodiment, the database 11H can contain and/or can include, for each provider, service provider, goods provider (hereinafter "provider") who or which utilizes the apparatus 100 and method of the present invention, information regarding the provider's name, address, telephone number, cellular telephone number, wireless telephone number, e-mail address, text messaging number, SMS messaging number, company name or business name, company telephone number or business telephone number, company e-mail address or business e-mail address, the provider's agent's name, the provider's agent's telephone number, the provider's agent's cellular telephone number, the provider's agent's wireless telephone number, the provider's agent's e-mail address, the provider's text messaging number, the provider's SMS messaging number, and/or any other contact information for the provider and/or for the provider's agent.

The database 11H can also contain and/or include, for each provider, a description of the types or kinds of the services and/or the goods or products, provided, offered, or performed by the provider, information regarding the prices, fees, or charges, for the provider's various services, goods, or products, information regarding educational or training information, professional or other licenses or certifications, work samples, references, past work performed, past project or work experiences, desired projects or jobs, types or kinds of projects, compensation structures, marketing information and/or materials of or regarding the provider, and/or information regarding employees, partners, business partners, working partners, or agents, of the provider.

The database 11H can also contain and/or include, for each provider, information regarding the provider's, or the provider's employees' or agents', work schedule(s), work calendar(s), or other scheduling information, which can be utilized to allow any user of the apparatus 100 to engage or reserve the provider's, or the provider's employees' or agents' services. The database 11H can also contain and/or include information for allowing any user of the apparatus 100 to order or purchase goods, products, or services, from the provider.

The database 11H can also contain and/or include, for each provider, information regarding any available subscriptions offered by the provider for any services, goods, or products, performed by or offered by the provider, so that any user can purchase a subscription from the provider for any services, or goods or products, performed by or offered by the provider.

The database 11H can also contain and/or include, for each provider, any link(s) or hyperlink(s) to the provider, a link(s) or a hyperlink(s) to the respective communication device(s) of or associated with the provider, and/or any other data and/or information needed or desired for utilizing the apparatus 100 and method of the present invention in any of the embodiments described herein. The database 11H can also, for each provider, contain and/or include, and/or contain and/or include, a link(s) or a hyperlink(s) to, any data and/or information maintained by, provided by, offered by, or sold by, the provider and/or which can be accessed or obtained from the provider or any computer, server, or website, of same.

In a preferred embodiment, the database 11H can contain and/or can include, for each funding service or funding source (hereinafter "funding service") who or which utilizes the apparatus 100 and method of the present invention, information regarding the funding service's name, address, telephone number, cellular telephone number, wireless telephone number, e-mail address, text messaging number, SMS messaging number, names of principals, employees or agents and contact information for same, company name or business name, company telephone number or business telephone number, company e-mail address or business e-mail address, the funding service's agent's name, the funding service's agent's telephone number, the funding service's agent's cellular telephone number, the funding service's agent's wireless telephone number, the funding service's agent's e-mail address, the funding service's text messaging number, the funding service's SMS messaging number, and/or any other contact information for the funding service and/or for the funding service's, principals, employees, or agents.

The database 11H can also contain and/or include, for each funding service, a description of the types or kinds of funding services, and/or any goods or products, provided, offered, or performed, by the funding service, information regarding the commissions, success fees, prices, fees, or charges, for the funding service's various services, goods, or products, information regarding educational or training information, professional or other licenses or certifications, work samples, references, past work performed, past deals worked on or completed, past investments made, past project or work experiences, desired investments, projects or jobs, types or kinds of projects, compensation structures, marketing information and/or materials of or regarding the funding service, and/or information regarding principals, employees, partners, business partners, working partners, or agents, of the funding service.

The database 11H can also contain and/or include, for each funding service, information regarding the funding service's, or the funding service's employees' or agents', work schedule(s), work calendar(s), or other scheduling information, which can be utilized to allow any user of the apparatus 100 to engage or reserve the funding service's, or the funding service's employees' or agents' services. The database 11H can also contain and/or include information for allowing any user of the apparatus 100 to order or purchase goods, products, or services, from the funding service or engage the services of the funding service or the services or any principals, employees, or agents, of the funding service.

The database 11H can also contain and/or include, for each funding service, information regarding any available subscriptions offered by the funding service for any services, goods, or products, performed by or offered by the funding service, so that any user can purchase a subscription from the funding service for any services, or goods or products, performed by or offered by the funding service.

The database 11H can also, for each funding service, contain and/or include any link(s) or hyperlink(s) to the funding service, a link(s) or a hyperlink(s) to the respective user communication device 20 or other suitable communication device(s) of or associated with the funding service, and/or any other data and/or information needed or desired for utilizing the apparatus 100 and method of the present invention in any of the embodiments described herein.

The database 11H can also, for each funding service, contain and/or include, and/or contain and/or include a link(s) or a hyperlink(s) to, any data and/or information maintained by, provided by, offered by, or sold by, the funding service and/or which can be accessed or obtained from the funding service or any computer, server, or website, of same.

In a preferred embodiment, the database 11H can contain and/or can include, for each official or governmental filing office which utilizes the apparatus 100 of the present invention, information regarding the name of the official or governmental filing office and its address, its telephone number(s), and/or a listing of its directors, employees, or agents, including, but not limited to their names, telephone numbers, e-mail addresses, text messaging numbers, SMS messaging numbers, department, work group, or art unit, identifying information, and/or any other contact information for the official or governmental filing office. The database 11H can also contain and/or include, for each official or governmental filing office, a link(s) or hyperlink(s) to the official or governmental filing office, to any of its departments, work groups, or art units, or to any of its directors, employees, or agents.

The database 11H can also contain and/or include, for each official or governmental filing office, any information regarding, and/or any link(s) or hyperlink(s) to, any and/or all of the respective patents, patent applications, trademarks, trademark applications, copyrights, copyright applications, or any other intellectual property, the respective official or governmental filing office has issued and/or is currently examining or reviewing, information regarding the status of any issued patents, patent applications, trademarks, trademark applications, copyrights, copyright applications, or any other intellectual property, the status of the payment or the non-payment of any filing fees, examination fees, issue fees, maintenance fees, or renewal, or any other fees, and/or the status of fees owed any issued patents, patent applications, trademarks, trademark applications, copyrights, copyright applications, or any other intellectual property.

The database 11H can also contain and/or include, for each official or governmental filing office, information regarding, electronic copies of, access to physical copies of, and/or a link(s) or a hyperlink(s) to, any recorded documents, assignments, licenses, covenants not to sue, releases, transfers, liens, or any other documents recorded for or regarding any of the patents, patent applications, trademarks, trademark applications, copyrights, copyright applications, or any other intellectual property. For each patent, patent application, trademark, trademark application, copyright, copyright application, or other intellectual property, the database 11H can contain or include information regarding the name, address, telephone number, company name, e-mail address, or any other contact information, of and for the inventor(s), the author(s), the creator(s), or the applicant(s), owner(s), assignee(s), assignor(s), attorney(s), examiner(s), lien holder(s), or any other individuals or entities associated with each patent, patent application, trademark, trademark application, copyright, copyright application, or other intellectual property.

The database 11H can also contain and/or include, for each official or governmental filing office, data and/or information regarding licensed or authorized practitioners or other individuals who can represent others before, and in proceedings in, the official or governmental filing office, and any contact information to each practitioner or other individual. The database 11H can also contain and/or include, for each official or governmental filing office, any data and/or information for providing information regarding patents, patent applications, trademarks, trademark applications, copyrights, copyright applications, or any other intellectual property, for which the official or governmental filing office is authorized or responsible for administering, examining, or maintaining, information regarding instructions or other information regarding the filing, the examination, the prosecution, the issuance, and the maintenance, of any patents, patent applications, trademarks, trademark applications, copyrights, copyright applications, or any other intellectual property, or information for appealing decisions or actions of the official or governmental filing office. In a preferred embodiment, any data and/or information provided by the official or governmental filing office can be provided in text form, video form, audio form, or any combination of same.

The database 11H can also contain and/or include, for each official or governmental filing office, any link(s) or hyperlink(s) to the official or governmental filing office, a link(s) or a hyperlink(s) to the respective user communication device 20 or other suitable communication device(s) of or associated with the official or governmental filing office, and/or any other data and/or information needed or desired for utilizing the apparatus 100 and method of the present invention in any of the embodiments described herein. The database 11H can also, for each official or governmental filing office, contain and/or include, and/or contain and/or include a link(s) or a hyperlink(s) to, any data and/or information maintained by, provided by, offered by, or sold by, the official or governmental filing office and/or which can be accessed or obtained from the official or governmental filing office or any computer, server, or website, of same.

The database 11H can also contain and/or include, for each official or governmental filing office, a link(s) or a hyperlink(s) to, any data and/or information maintained by, provided by, offered by, or sold by, the official or government filing office and/or which can be accessed or obtained from the official or government filing office or any computer, server, or website, of same.

In a preferred embodiment, the database 11H can contain and/or can include, for each agent or broker who or which utilizes the apparatus 100 and method of the present invention, information regarding the agent's or the broker's name, address, telephone number, cellular telephone number, wireless telephone number, e-mail address, text messaging number, SMS messaging number, names of principals, employees or agents and contact information for same, company name or business name, company telephone number or business telephone number, company e-mail address or business e-mail address, the agent's or the broker's agent's name, the agent's or the broker's agent's telephone number, the agent's or the broker's agent's cellular telephone number, the agent's or the broker's agent's wireless telephone number, the agent's or the broker's agent's e-mail address, the agent's or the broker's text messaging number, the agent's or the broker's SMS messaging number, and/or any other contact information for the agent or the broker and/or for the agent's or the broker's, principals, employees, or agents.

The database 11H can also contain and/or include, for each agent or broker, a description of the types or kinds of services, and/or any goods or products, provided, offered, or performed by the agent or the broker, information regarding the commissions, success fees, prices, fees, or charges, for the agent's or the broker's various services, goods, or products, information regarding educational or training information, professional or other licenses or certifications, work samples, references, past work performed, past deals worked on or completed, past project or work experiences, desired investments, projects or jobs, types or kinds of projects, compensation structures, marketing information and/or materials of or regarding the agent or the broker, and/or information regarding principals, employees, partners, business partners, working partners, or agents, of the agent or the broker.

The database 11H can also contain and/or include, for each agent or broker, information regarding the agent or the broker, or the agent's or the broker's employees' or agents', work schedule(s), work calendar(s), or other scheduling information, which can be utilized to allow any user of the apparatus 100 to engage or reserve the agent's or the broker's services, or the agent's or the broker's employees' or agent's services. The database 11H can also contain and/or include, for each agent or broker, information for allowing any user of the apparatus 100 to order or purchase goods, products, or services, from the agent or the broker or engage the services of the agent or the broker or engage the services of any principals, employees, or agents, of the agent or the broker.

The database 11H can also contain and/or include, for each agent or the broker, information regarding any available subscriptions offered by the agent or the broker for any services, goods, or products, performed by or offered by the agent or the broker, so that any user can purchase a subscription from the agent or the broker for any services, or goods or products, performed by or offered by the agent or the broker.

The database 11H can also contain and/or include, for each agent or broker, any link(s) or hyperlink(s) to the agent or broker, a link(s) or a hyperlink(s) to the user communication device(s) 20 of or associated with the agent or the broker, and/or any other data and/or information needed or desired for utilizing the apparatus 100 and method of the present invention in any of the embodiments described herein. The database 11H can also contain and/or include, for each agent or broker, a link(s) or a hyperlink(s) to, any data and/or information maintained by, provided by, offered by, or sold by, the agent or the broker and/or which can be accessed or obtained from the agent or the broker or any computer, server, or website, of same.

In a preferred embodiment, the database 11H can contain and/or can include, for each social network which utilizes the apparatus 100, information regarding the name, domain name, uniform resource locator (url), or web address of the social network, information regarding any members of the social network and for each member, the member's name, address, telephone number, cellular telephone number, wireless telephone number, e-mail address, text messaging number, SMS messaging number, company name or business name, company telephone number or business telephone number, company e-mail address or business e-mail address, and/or any other contact information for the social networking member.

The database 11H can also contain and/or include, and/or contain and/or include a link(s) or a hyperlink(s) to, any data and/or information, and/or any media, information, or news information, provided by, offered by, sold by, or maintained by, any media service and/or which can be accessed or obtained from any media service or any computer, server, or website, of same.

In the preferred embodiment, the database 11H can also contain and/or include any data and/or information regarding any relationship or relationships, or any working relationship or any working relationships, present or past, which exist or which may have existed between any of the herein-described users, providers, funding services, official or governmental filing offices, agents, brokers, social networks or social networking companies, or any media services, with or between any other users, providers, funding services, official or governmental filing offices, agents, brokers, social networks or social networking companies, or media services who or which utilize the apparatus 100 and method of the present invention, and/or can contain and/or include any data and/or information regarding dates of same, the nature or scope of same, any project or work which was the subject of same, and/or any outcome or result of same.

In a preferred embodiment, the database 11H can also contain and/or include any and/or all data and/or information, and/or any link(s) or hyperlink(s) to same, described herein as being stored in the respective databases of the herein-described communication devices or computers 20, 30, 40, 50, 60, 70. and/or 80.

In a preferred embodiment, the database 11H can also contain and/or include any link(s) or hyperlink(s) any and/or all of the herein-described communication devices or computers 20, 30, 40, 50, 60, 70. and/or 80, of or associated with any or the respective users, employers, counterparties, media/content providers, digital assets/records storage providers, educational/instructional providers, social network providers, funding services, official filing offices, agents, brokers, who or which utilize the apparatus 100 and method of the present invention.

In a preferred embodiment, the database 11H can also contain and/or include any data, information, software, algorithms, or processing routines needed or desired for generating any of the herein-described messages, reports, profiles, intellectual property profiles, provider reports, funding service/investor reports, agent/broker reports, intellectual property reports, intellectual property report messages, provider profiles, intellectual property user reports, provider reports, intellectual property user report messages, notification messages, alert messages, intellectual property ("IP") notification messages, IP alert messages, provider availability notification messages, provider availability alert messages, search requests, search reports, intellectual property offer messages, intellectual property bid messages, offer messages, or any other messages, reports, or communications, described herein which can be generated by the apparatus 100 of the present invention or by the central processing computer 10, or which can be generated by, transmitted from, or received by, any communication devices or computers 20, 30, 40, 50, 60, 70. and/or 80, described herein.

In a preferred embodiment, the database 11H can also contain and/or include any data and/or information regarding any advertisements, advertising information, marketing information, or marketing materials of for or regarding any of the herein-described users, employers, counterparties, media/content providers, digital assets/records storage providers, educational/instructional providers, service providers, goods providers, funding services, official filing offices, agents, brokers, social networks, or media services, information services, or news services, who or which utilize the apparatus 100 and method of the present invention.

In a preferred embodiment, the database 11H can also contain and/or include any data, information, software, programs, algorithms, or any other information for allowing the apparatus 100 to process financial transactions between any of the herein-described and herein-defined users, employers, counterparties, media/content providers, digital assets/records storage providers, educational/instructional providers, service providers, goods providers, funding services, official filing offices, agents, brokers, social networks, or media services, information services, or news services, who or which utilize the apparatus 100 and method of the present invention. In a preferred embodiment, the database 11H can also contain and/or include any data, information, software, programs, algorithms, or any other information for allowing the apparatus 100 to administer and/or maintain financial accounts for any of the herein-described and herein-defined users, employers, counterparties, media/content providers, digital assets/records storage providers, educational/instructional providers, service providers, goods providers, funding services, official filing offices, agents, brokers, social networks, or media services, information services, or news services, who or which utilize the apparatus 100 and method of the present invention.

In a preferred embodiment, the database 11H can also contain and/or include any data, information, software, programs, algorithms, or any other information for allowing the apparatus 100 to perform all of the functions and functionality described herein as being performed by the apparatus 100 and method of the present invention.

Any of the data and/or information stored in the database 11H can be updated by any of the herein-described users, employers, counterparties, media/content providers, digital assets/records storage providers, educational/instructional providers, service providers, goods providers, funding services, official filing offices, agents, brokers, social networks, or media services, information services, or news services, or by any other person, individual, or entity who or which utilizes the apparatus 100 and method of the present invention, and any such updated data and/or information can be made available to any other users, employers, counterparties, media/content providers, digital assets/records storage providers, educational/instructional providers, service providers, goods providers, funding services, official filing offices, agents, brokers, social networks, or media services, information services, or news services.

In a preferred embodiment, the database 20H can also contain and/or include for the user who or which utilizes the user communication device 20, information regarding the user's name, address, telephone number, cellular telephone number, wireless telephone number, e-mail address, text messaging number, SMS messaging number, company name or business name, company telephone number or business telephone number, company e-mail address or business e-mail address, the user's agent's name, the user's agent's telephone number, the user's agent's cellular telephone number, the user's agent's wireless telephone number, the user's agent's e-mail address, the user's text messaging number, the user's SMS messaging number, and/or any other contact information for the user and/or for the user's agent.

In a preferred embodiment, the database 20H can also contain and/or can include, for the user, information regarding any of the user's intellectual property. In a preferred embodiment, the database 20H can contain and/or can include, for the user, information regarding any of the user's intellectual property, the user's patent(s), the user's patent application(s), the user's domestic patent(s), the user's domestic patent application(s), the user's provisional patent application(s) either domestic or foreign, the user's foreign patent(s) or the user's regional patents, the user's foreign patent application(s) or the user's regional patent applications, the user's PCT patent applications, or any other types or kinds of patent or patent-related protections or international patent or patent-related protections of the user, or information regarding any of the user's trademark(s), the user's trademark application(s), the user's domestic trademark(s), the user's domestic trademark application(s), the user's foreign trademark(s) or the user's regional trademark(s), the user's foreign trademark application(s) or the user's regional trademark applications, the user's international trademark applications, or any other types or kinds of trademark, service mark, or mark, protections, either domestic or foreign, of the user, or information regarding any of the user's copyrights(s), the user's copyrighted works, the user's copyright application(s), the user's domestic copyrights(s) or copyrighted works, the user's domestic copyright application(s), the user's foreign copyright(s) or the user's regional copyright(s), the user's foreign copyright application(s) or the user's regional copyright applications, the user's international copyright applications, or any other types or kinds of copyright protections, either domestic or foreign, of the user.

The database 20H can also contain and/or can include, for the user, information regarding any other types or kinds of intellectual property or intellectual property-related protections or any international intellectual property or intellectual property-related protections. For each type of intellectual property of, owned by, or controlled by, the user, the database 20H can also contain and/or include data and/or information regarding each item of intellectual property, each patent, each patent application, each provisional patent application, each foreign patent application, each foreign patent, each PCT application, each regional patent, or each regional patent application, or each trademark, each trademark application, each foreign trademark, each foreign trademark application, or each convention trademark application, or each copyright, each copyright application, each foreign copyright, each foreign copyright application, or each convention copyright.

For each patent or patent application of any kind or type, domestic or foreign, the database 20H can include a patent number or a patent application derail number, a name of the patent or a name of the patent application, a description of the invention described in or covered by the patent or the patent application, a copy of the patent or the patent application or a link or a hyperlink to a copy of the patent or the patent application, the filing date of the patent or the patent application, the priority date of the patent or the patent application, the country or countries in which protection have been sought for the inventions described or covered by the patent or the patent application, the status of the patent or the patent application, the inventor(s) of the patent or the patent application, the assignee, if any, of the patent or the patent application, the status of payment of any fees or maintenance fees for any patent, and/or the date and/or time of the posting, listing, or registration, of the patent or the patent application with the apparatus 100.

The database 20H can also contain and/or include, for each user, any data and/or information regarding what the user desires or plans to do with the patent or the patent application or any invention covered by same or described by same, including, but not limited to, any information regarding whether or not the user wants to commercialize the invention covered by or described in the patent or the patent application, information regarding whether or not the user wants to develop, produce, market, and/or sell, any goods, products, or services, covered by the invention covered by or described in the patent or the patent application, information regarding whether or not the user wants to start a company or a business entity to develop, produce, market, and/or sell, any goods, products, or services, covered by the invention covered by or described in the patent or the patent application, information regarding whether or not the user wants to find a partner(s) or investor(s) to develop, produce, market, and/or sell, any goods, products, or services, covered by the invention covered by or described in the patent or the patent application, information regarding whether or not the user wants to find a provider of any services, goods, or products, in order to assist the user or to aid the user in developing, producing, marketing, and/or selling, any goods, products, or services, covered by the invention covered by or described in the patent or the patent application, information regarding whether or not the user wants to find a provider of any services, goods, or products, in order to assist the user or to aid the user in obtaining protection for, in obtaining additional protection for, or in further developing and/or protecting additional patents or other intellectual property relating to or regarding, the patent or the patent application, information regarding whether or not the user wants to find an attorney or other professional to represent the user in obtaining protection for, in obtaining additional protection for, or to further developing and/or protecting additional patents or other intellectual property relating to or regarding, the patent or the patent application, information regarding whether or not the user wants to sell, assign, transfer, license, license in a field or use, exclusively license, exclusively license in a field of use, non-exclusively license, non-exclusively license in a field of use, market, or monetize, the invention(s) covered by or described in the patent or the patent application, information regarding whether or not the user wants to sell, assign, transfer, license, license in a field or use, exclusively license, exclusively license in a field of use, non-exclusively license, non-exclusively license in a field of use, market, or monetize, any foreign country counterparts to the patent or the patent application or any foreign patents or patent applications relating to same, information regarding any user asking prices or any offering prices for selling, assigning, transferring, licensing, exclusively licensing, non-exclusively licensing, or otherwise monetizing, the patent or the patent application, or information regarding whether or not the user is seeking any partners, strategic partners, joint ventures, or joint venture partners, or others, in the user's efforts or activities in commercializing, developing, marketing, selling, transferring, licensing, and/or monetizing, the patent or the patent application or any inventions covered by same or described in same, or any information regarding the user's expectations, needs, or desires regarding same, information regarding any hiring needs of the user, or information regarding the user's needs, plans, strategies, or desires, for the patent or the patent application, information regarding any work schedule or scheduling needs of the user, and/or any other information regarding the user, the patent, or the patent application, the user's needs, plans, strategies, or desires, for or regarding the patent or the patent application, or any other information which would be needed or desired for or regarding the user, the patent, or the patent application, relating to the user's use of the apparatus 100 of the present invention for, relating to, or regarding, the patent or the patent application.

For each trademark or trademark application of any kind or type, domestic or foreign, the database 20H can include a trademark number or a trademark application serial number, the name or a description of the trademark, a description of the goods, products, or services, with which the trademark is utilized, a copy of the trademark or the trademark application or a link or a hyperlink to a copy of the trademark or the trademark application, the filing date of the trademark or the trademark application, the priority date of the trademark or the trademark application, the country or countries in which protection have been sought for the trademark, the status of the trademark or the trademark application, the applicant(s) for the trademark or the trademark application, the assignee, if any, of the trademark or the trademark application, the status of payment of any fees or renewal fees for the trademark, and/or the date and/or time of the posting, listing, or registration, of the trademark or the trademark application with the apparatus 100.

The database 20H can also contain and/or include, for each user, any data and/or information regarding what the user desires or plans to do with the trademark or the trademark application, including, but not limited to, any information regarding whether or not the user wants to commercialize any goods, products, or services, under the trademark or the trademark application, information regarding whether or not the user wants to develop, produce, market, and/or sell, any goods, products, or services, under the trademark or the trademark application, information regarding whether or not the user wants to start a company or a business entity using the trademark and/or to develop, produce, market, and/or sell, any goods, products, or services, under the trademark or the trademark application, information regarding whether or not the user wants to find a partner(s) or investor(s) to develop, produce, market, and/or sell, any goods, products, or services, under the trademark or the trademark application, information regarding whether or not the user wants to find a provider of any services, goods, or products, in order to assist the user or to aid the user in developing, producing, marketing, and/or selling, any goods, products, or services, under the trademark or the trademark application, information regarding whether or not the user wants to find a provider of any services, goods, or products, in order to assist the user or to aid the user in obtaining protection for, in obtaining additional protection for, or in further developing and/or protecting additional trademarks or other intellectual property relating to or regarding, the trademark or the trademark application, or information regarding whether or not the user wants to find an attorney or other professional to represent the user in obtaining protection for, in obtaining additional protection for, or in further developing and/or protecting additional trademarks or other intellectual property relating to or regarding the trademark or the trademark application, or information regarding whether or not the user wants to sell, assign, transfer, license, license in a field or use, exclusively license, exclusively license in a field of use, non-exclusively license, non-exclusively license in a field of use, market, or monetize, the trademark or the trademark application or any goods, products, or services, under the trademark or the trademark application, or information regarding whether or not the user wants to sell, assign, transfer, license, license in a field or use, exclusively license, exclusively license in a field of use, non-exclusively license, non-exclusively license in a field of use, market, or monetize, any foreign country counterparts to the trademark or the trademark application or any foreign trademarks or trademark applications relating to same, or information regarding any user asking prices or any offering prices for selling, assigning, transferring, licensing, exclusively licensing, non-exclusively licensing, or otherwise monetizing, the trademark or the trademark application, information regarding whether or not the user is seeking any partners, strategic partners, joint ventures, or joint venture partners, or others, in the user's efforts or activities in commercializing, developing, marketing, selling, transferring, licensing, and/or monetizing, the trademark or the trademark application or any goods, products, or services, under the trademark or the trademark application, or any information regarding the user's expectations, needs, or desires regarding same, or information regarding any hiring needs of the user, information regarding the user's needs, plans, strategies, or desires, for the trademark or the trademark application, information regarding any work schedule or scheduling needs of the user, and/or any other information regarding the user, the trademark, or the trademark application, the user's needs, plans, strategies, or desires, for or regarding the trademark or the trademark application, or any other information which would be needed or desired for or regarding the user, the trademark, or the trademark application, relating to the user's use of the apparatus 100 of the present invention for, relating to, or regarding, the trademark or the trademark application.

For each copyright, copyrighted work, or copyright application, of any kind or type, domestic or foreign, the database 20H can include a copyright number of a copyright application serial number, the name or a description of the copyrighted work, the copyright, of the copyright application, a description of the copyrighted work, the copyright, of the copyright application, a copy of the copyrighted work, the copyright, or the copyright application, or a link or a hyperlink to a copy of the copyrighted work, the copyright, or the copyright application, the date of creation of the copyrighted work or the date of filing of the copyright or the copyright application, any first publication date or other priority date of the copyrighted work, the country or countries in which protection has been sought for the copyrighted work, the copyright, or the copyright application, the status of the copyright or the copyright application, the author, creator, or applicant for the copyright or the copyright application, the assignee, if any, of the copyrighted work, the copyright, or the copyright application, the status of payment of any fees or renewal fees for the copyright, and/or the date and/or time of the posting, listing, or registration, of the copyrighted work, the copyright, or the copyright application with the apparatus 100.

The database 20H can also contain and/or include any data and/or information regarding what the user desires or plans to do with the copyrighted work, the copyright, or the copyright application, including, but not limited to, any information regarding whether or not the user wants to commercialize the copyrighted work, the copyright, or the copyright application, information regarding whether or not the user wants to develop, produce, market, and/or sell, the copyrighted work, the copyright, or the copyright application, and/or any goods, products, or services, under the copyright or the copyright application, information regarding whether or not the user wants to start a company or a business entity to commercialize or exploit the copyrighted work and/or to develop, produce, market, and/or sell, the copyrighted work and/or any goods, products, or services, relating to same, information regarding whether or not the user wants to find a partner(s) or investor(s) to develop, produce, market, and/or sell, any copyrighted work and/or any goods, products, or services, relating to same, information regarding whether or not the user wants to find a provider of any services, goods, or products, in order to assist the user or to aid the user in developing, producing, marketing, and/or selling, the copyrighted work and/or any goods, products, or services, relating to same, information regarding whether or not the user wants to find a provider of any services, goods, or products, in order to assist the user or to aid the user in obtaining protection for, in obtaining additional protection for, or in further developing and/or protecting additional copyrighted works and/or any goods, products, or services, relating to same, or information regarding whether or not the user wants to find an attorney or other professional to represent the user in obtaining protection for, in obtaining additional protection for, or in further developing and/or protecting additional, copyrighted works, the copyrighted work or other intellectual property relating to or regarding the copyrighted work, the copyright, or the copyright application, or information regarding whether or not the user wants to sell, assign, transfer, license, license in a field or use, exclusively license, exclusively license in a field of use, non-exclusively license, non-exclusively license in a field of use, market, or monetize, the copyrighted work, the copyright, or the copyright application, or any goods, products, or services, under the copyright or the copyright application, or information regarding whether or not the user wants to sell, assign, transfer, license, license in a field or use, exclusively license, exclusively license in a field of use, non-exclusively license, non-exclusively license in a field of use, market, or monetize, any foreign country counterparts to the copyrighted work, the copyright, or the copyright application, or any foreign copyrighted works, copyrights, or copyright applications, or information regarding any user asking prices or any offering prices for selling, assigning, transferring, licensing, exclusively licensing, non-exclusively licensing, or otherwise monetizing, the copyrighted work, the copyright, or the copyright application, or information regarding whether or not the user is seeking any partners, strategic partners, joint ventures, or joint venture partners, or others, in the user's efforts or activities in commercializing, developing, marketing, selling, transferring, licensing, and/or monetizing, the copyrighted work, the copyright, or the copyright application or any goods, products, or services, relating to the copyrighted work, the copyright, or the copyright application or any information regarding the user's expectations, needs, or desires regarding same, or information regarding any hiring needs of the user, information regarding the user's needs, plans, strategies, or desires, for the copyrighted work, the copyright, or the copyright application, information regarding any work schedule or scheduling needs of the user, and/or any other information regarding the user, copyrighted work, the copyright, or the copyright application, the user's needs, plans, strategies, or desires, for or regarding the copyrighted work, the copyright, or the copyright application or any other information which would be needed or desired for or regarding the user, copyrighted work, the copyright, or the copyright application, relating to the user's use of the apparatus 100 of the present invention for, relating to, or regarding, copyrighted work, the copyright, or the copyright application.

The database 20H can also contain and/or include any link(s) or hyperlink(s) to any respective intellectual property of the user, a link(s) or a hyperlink(s) to the user communication device(s) 20 of or associated with the user, and/or any other data and/or information needed or desired for utilizing the apparatus 100 and method of the present invention in any of the embodiments described herein. The database 20H can also, for each item of intellectual property associated with the user, contain and/or include, and/or contain and/or include a link(s) or a hyperlink(s) to, any data and/or information maintained by, provided by, offered by, or sold by, the user and/or which can be accessed or obtained from the user or any computer, server, or website, of same.

The database 20H can also contain and/or include, and/or contain and/or include a link(s) or a hyperlink(s) to, any data and/or information described herein as being stored in any of the databases 11H, 20H, 30H, 40H, 50H, 60H, 70H, and/or 80H, described herein.

The database 20H can also contain and/or be linked to any of the data and/or information described herein as being stored in the database 11H.

For any provider who or which utilizes the user communication device 20, the database 20H can also contain and/or include any data and/or information regarding the provider's name, address, telephone number, cellular telephone number, wireless telephone number, e-mail address, text messaging number, SMS messaging number, company name or business name, company telephone number or business telephone number, company e-mail address or business e-mail address, the provider's agent's name, the provider's agent's telephone number, the provider's agent's cellular telephone number, the provider's agent's wireless telephone number, the provider's agent's e-mail address, the provider's text messaging number, the provider's SMS messaging number, and/or any other contact information for the provider and/or for the provider's agent.

The database 20H can also contain and/or include, for the provider, a description of the types or kinds of the services and/or the goods or products, provided, offered, or performed by the provider, information regarding the prices, fees, or charges, for the provider's various services, goods, or products, information regarding educational or training information, professional or other licenses or certifications, resume(s), qualifications, honors or awards, work samples, references, past work performed, past project or work experiences, desired projects or jobs, types or kinds of projects, compensation structures, marketing information and/or materials of or regarding the provider, and/or information regarding employees, partners, business partners, working partners, or agents, of the provider.

The database 20H can also contain and/or include, for the provider, information regarding the provider's, or the provider's employees' or agents', work schedule(s), work calendar(s), or other scheduling information, which can be utilized to allow any user of the apparatus 100 to engage or reserve the provider's, or the provider's employees' or agents' services. The database 20H can also contain and/or include information for allowing any user of the apparatus 100 to order or purchase goods, products, or services, from the provider.

The database 20H can also contain and/or include information regarding any available subscriptions offered by the provider for any services, goods, or products, performed by or offered by the provider, so that any user can purchase a subscription from the provider for any services, or goods or products, performed by or offered by the provider.

The database 20H can also contain and/or include, for the provider, any link(s) or hyperlink(s) to the provider, a link(s) or a hyperlink(s) to the user communication device(s) 20 of or associated with the provider, and/or any other data and/or information needed or desired for utilizing the apparatus 100 and method of the present invention in any of the embodiments described herein. The database 20H can also contain and/or include, and/or contain and/or include, a link(s) or a hyperlink(s) to, any data and/or information maintained by, provided by, offered by, or sold by, the provider and/or which can be accessed or obtained from the provider or any computer, server, or website, of same.

For any funding service who or which utilizes the user communication device 20, the database 20H can also contain and/or include any data and/or information regarding the funding service's name, address, telephone number, cellular telephone number, wireless telephone number, e-mail address, text messaging number, SMS messaging number, names of principals, employees or agents and contact information for same, company name or business name, company telephone number or business telephone number, company e-mail address or business e-mail address, the funding service's agent's name, the funding service's agent's telephone number, the funding service's agent's cellular telephone number, the funding service's agent's wireless telephone number, the funding service's agent's e-mail address, the funding service's text messaging number, the funding service's SMS messaging number, and/or any other contact information for the funding service and/or for the funding service's, principals, employees, or agents.

The database 20H can also contain and/or include, for the funding service, a description of the types or kinds of funding services, and/or any goods or products, provided, offered, or performed, by the funding service, information regarding the commissions, success fees, prices, fees, or charges, for the funding service's various services, goods, or products, information regarding educational or training information, professional or other licenses or certifications, resume(s), qualifications, honors or awards, work samples, references, past work performed, past deals worked on or completed, past investments made, past project or work experiences, desired investments, projects or jobs, types or kinds of projects, compensation structures, marketing information and/or materials of or regarding the funding service, and/or information regarding principals, employees, partners, business partners, working partners, or agents, of the funding service.

The database 20H can also contain and/or include, for the funding service, information regarding the funding service's, or the funding service's employees' or agents', work schedule(s), work calendar(s), or other scheduling information, which can be utilized to allow any user of the apparatus 100 to engage or reserve the funding service's, or the funding service's employees' or agents' services. The database 20H can also contain and/or include information for allowing any user of the apparatus 100 to order or purchase goods, products, or services, from the funding service or engage the services of the funding service or the services or any principals, employees, or agents, of the funding service.

The database 20H can also contain and/or include information regarding any available subscriptions offered by the funding service for any services, goods, or products, performed by or offered by the funding service, so that any user can purchase a subscription from the funding service for any services, or goods or products, performed by or offered by the funding service.

The database 20H can also contain and/or include any link(s) or hyperlink(s) to the funding service, a link(s) or a hyperlink(s) to the funding service communication device(s) 40 of or associated with the funding service, and/or any other data and/or information needed or desired for utilizing the apparatus 100 and method of the present invention in any of the embodiments described herein.

The database 20H can also contain and/or include, and/or contain and/or include a link(s) or a hyperlink(s) to, any data and/or information maintained by, provided by, offered by, or sold by, the funding service and/or which can be accessed or obtained from the funding service or any computer, server, or website, of same.

For any official filing office or agency or any governmental office or agency (hereinafter also referred to as "official or governmental filing office") who or which utilizes the user communication device 20, the database 20H can also contain and/or include, for the official or governmental filing office, information regarding the name of the official or governmental filing office and its address, its telephone number(s), and/or a listing of its directors, employees, or agents, including, but not limited to their names, telephone numbers, e-mail addresses, text messaging numbers, SMS messaging numbers, department, work group, or art unit, identifying information, and/or any other contact information for the official or governmental filing office. The database 20H can also contain and/or include, for the official or governmental filing office, a link(s) or hyperlink(s) to the official or governmental filing office, to any of its departments, work groups, or art units, or to any of its directors, employees, or agents.

The database 20H can also contain and/or include, for the official or governmental filing office, any information regarding, and/or any link(s) or hyperlink(s) to, any and/or all of the respective patents, patent applications, trademarks, trademark applications, copyrights, copyright applications, or any other intellectual property, the official or governmental filing office has issued and/or is currently examining or reviewing, information regarding the status of any issued patents, patent applications, trademarks, trademark applications, copyrights, copyright applications, or any other intellectual property, the status of the payment or the non-payment of any filing fees, examination fees, issue fees, maintenance fees, or renewal, or any other fees, and/or the status of fees owed any issued patents, patent applications, trademarks, trademark applications, copyrights, copyright applications, or any other intellectual property.

The database 20H can also contain and/or include, for the official or governmental filing office, information regarding, electronic copies of, access to physical copies of, and/or a link(s) or a hyperlink(s) to, any recorded documents, assignments, licenses, covenants not to sue, releases, transfers, liens, or any other documents recorded for or regarding any of the patents, patent applications, trademarks, trademark applications, copyrights, copyright applications, or any other intellectual property. For each patent, patent application, trademark, trademark application, copyright, copyright application, or other intellectual property, the database 50H can contain or include information regarding the name, address, telephone number, company name, e-mail address, or any other contact information, of and for the inventor(s), the author(s), the creator(s), or the applicant(s), owner(s), assignee(s), assignor(s), attorney(s), examiner(s), lien holder (s), or any other individuals or entities associated with each patent, patent application, trademark, trademark application, copyright, copyright application, or other intellectual property.

The database 20H can also contain and/or include, for the official or governmental filing office, data and/or information regarding licensed or authorized practitioners or other individuals who can represent others before, and in proceedings in, the official or governmental filing office, and any contact information to each practitioner or other individual. The database 50H can also contain and/or include, for the official or governmental filing office, any data and/or information for providing information regarding patents, patent applications, trademarks, trademark applications, copyrights, copyright applications, or any other intellectual property, for which the official or governmental filing office is authorized or responsible for administering, examining, or maintaining, information regarding instructions or other information regarding the filing, the examination, the prosecution, the issuance, and the maintenance, of any patents, patent applications, trademarks, trademark applications, copyrights, copyright applications, or any other intellectual property, or information for appealing decisions or actions of the official or governmental filing office. In a preferred embodiment, any data and/or information provided by the official or governmental filing office can be provided in text form, video form, audio form, or any combination of same.

The database 20H can also contain and/or include, for the official or governmental filing office, any link(s) or hyperlink(s) to the official or governmental filing office, a link(s) or a hyperlink(s) to the user communication device(s) 20 of or associated with the official or governmental filing office, and/or any other data and/or information needed or desired for utilizing the apparatus 100 and method of the present invention in any of the embodiments described herein. The database 20H can also contain and/or include, and/or contain and/or include a link(s) or a hyperlink(s) to, any data and/or information maintained by, provided by, offered by, or sold by, the official or governmental filing office and/or which can be accessed or obtained from the official or governmental filing office or any computer, server, or website, of same.

The database 20H can also contain and/or include a link(s) or a hyperlink(s) to, any data and/or information maintained by, provided by, offered by, or sold by, the official or government filing office and/or which can be accessed or obtained from the official or government filing office or any computer, server, or website, of same.

For any agent or broker, or any agent or employee of the same, who or which utilizes the user communication device 20, the database 20H can also, for the agent or the broker, information regarding the agent's or the broker's name, address, telephone number, cellular telephone number, wireless telephone number, e-mail address, text messaging number, SMS messaging number, names of principals, employees or agents and contact information for same, company name or business name, company telephone number or business telephone number, company e-mail address or business e-mail address, the agent's or the broker's agent's name, the agent's or the broker's agent's telephone number, the agent's or the broker's agent's cellular telephone number, the agent's or the broker's agent's wireless telephone number, the agent's or the broker's agent's e-mail address, the agent's or the broker's text messaging number, the agent's or the broker's SMS messaging number, and/or any other contact information for the agent or the broker and/or for the agent's or the broker's, principals, employees, or agents.

The database 20H can also contain and/or include, for the agent or the broker, a description of the types or kinds of services, and/or any goods or products, provided, offered, or performed by the agent or the broker, information regarding the commissions, success fees, prices, fees, or charges, for the agent's or the broker's various services, goods, or products, information regarding educational or training information, professional or other licenses or certifications, resume(s), qualifications, honors or awards, work samples, references, past work performed, past deals worked on or completed, past project or work experiences, desired investments, projects or jobs, types or kinds of projects, compensation structures, marketing information and/or materials of or regarding the agent or the broker, and/or information regarding principals, employees, partners, business partners, working partners, or agents, of the agent or the broker.

The database 20H can also contain and/or include information regarding the agent or the broker, or the agent's or the broker's employees' or agents', work schedule(s), work calendar(s), or other scheduling information, which can be utilized to allow any user of the apparatus 100 to engage or reserve the agent's or the broker's services, or the agent's or the broker's employees' or agent's services. The database 20H can also contain and/or include information for allowing any user of the apparatus 100 to order or purchase goods, products, or services, from the agent or the broker or engage the services of the agent or the broker or engage the services of any principals, employees, or agents, of the agent or the broker.

The database 20H can also contain and/or include information regarding any available subscriptions offered by the agent or the broker for any services, goods, or products, performed by or offered by the agent or the broker, so that any user can purchase a subscription from the agent or the broker for any services, or goods or products, performed by or offered by the agent or the broker.

The database 20H can also contain and/or include any link(s) or hyperlink(s) to the agent or the broker, a link(s) or a hyperlink(s) to the agent/broker user communication device(s) 20 of or associated with the agent or the broker, and/or any other data and/or information needed or desired for utilizing the apparatus 100 and method of the present invention in any of the embodiments described herein. The database 20H can also contain and/or include a link(s) or a hyperlink(s) to, any data and/or information maintained by, provided by, offered by, or sold by, the agent or the broker and/or which can be accessed or obtained from the agent or the broker or any computer, server, or website, of same.

In a preferred embodiment, for each media service, media service provider, or content provider (hereinafter also referred to as "media service"), who or which utilizes the media/content computer 50, the database 50H can also contain and/or include, for the media service, any data and/or information regarding the media service's name, address, telephone number, e-mail address, company name or business name, company telephone number or business telephone number, company e-mail address or business e-mail address, employee directory, and/or any other contact information for the media service or its employees or agents. The database 50H can also contain and/or include, any and/or all media, information, or new information, provided by the media service in any text form, in video form, in audio form, and/or in any combination of same.

The database 50H can also contain and/or include, for the media service, a description of the types or kinds of media, information, or news information, or any other services, products or goods, performed, provided, or offered, by the media service, the type or kind of media, information, or news information, provided by the media service, information regarding whether or not the media service provides, and/or the types or kinds of, general news or information, global news or information, national news or information, regional news or information, local news or information, business news of information, investment news of information, financial news of information, legal news or information, news or information regarding patents, trademarks, copyrights, trade secrets, or other intellectual property, any news or information regarding any commercialization, development, marketing, sale, transfer, licensing, and/or monetization, of or regarding patents, trademarks, copyrights, trade secrets, or other intellectual property, or any other media, information, or news information which may be of interest to any of the users, providers, funding services, official or governmental filing offices, agents, brokers, social networks or social networking members, or any other media services, who or which utilize the apparatus 100 and method of the present invention.

The database 50H can also contain and/or include, for the media service, the prices or fees for the various media services, or products or goods, offered by or provided by the media service.

The database 50H can also contain and/or include data and/or information regarding any available subscriptions offered by the media service for any services, goods, or products, performed by or offered by the media service, so that any user can purchase a subscription from the media service for any services, or goods or products, performed by or offered by the media service. In a preferred embodiment, any data and/or information provided by, and/or any media, information, or news information, provided by, the media service can be provided in text form, video form, audio form, or any combination of same.

The database 50H can also contain and/or include any link(s) or hyperlink(s) to the media service, a link(s) or a hyperlink(s) to any other media/content provider computer(s) 50 of or associated with the media service, and/or any other data and/or information needed or desired for utilizing the apparatus 100 and method of the present invention in any of the embodiments described herein. The database 50H can also contain and/or include, and/or contain and/or include a link(s) or a hyperlink(s) to, any data and/or information maintained by, provided by, offered by, or sold by, the media service and/or which can be accessed or obtained from the media service or any computer, server, or website, of same.

The database 50H can also contain and/or include, and/or contain and/or include a link(s) or a hyperlink(s) to, any data and/or information, and/or any media, information, or news information, provided by, offered by, sold by, or maintained by, the media service and/or which can be accessed or obtained from the media service or any computer, server, or website, of same.

For each social network which utilizes the social networking computer 80, the database 80H can also contain and/or include, for the social network utilizing the same, data and/or information regarding the name, domain name, uniform resource locator (url), or web address, of the social network, information regarding any members of the social network and for each member, the member's name, address, telephone number, cellular telephone number, wireless telephone number, e-mail address, text messaging number, SMS messaging number, company name or business name, company telephone number or business telephone number, company e-mail address or business e-mail address, and/or any other contact information for the social networking member.

The database 80H can also contain and/or include, for the social network, any link(s) or hyperlink(s) to the social network, a link(s) or a hyperlink(s) to the social network computer(s) 80 of or associated with the social network, and/or any other data and/or information needed or desired for utilizing the apparatus 100 and method of the present invention in any of the embodiments described herein. The database 90H can also, for the social network, contain and/or include, and/or contain and/or include a link(s) or a hyperlink(s) to, any data and/or information maintained by, provided by, offered by, or sold by, the social network and/or which can be accessed or obtained from the social network or any computer, server, or website, of same.

The database 80H can also contain and/or include, for the social network and/or each of the social networking members, a description of the social network sub-group(s) in which the member belongs and any information regarding each subgroup(s) and any characteristics or interests of the members of each subgroup.

The database 80H can also contain and/or include, for the social network and/or each of the social networking members, any link(s) or hyperlink(s) to the social networking computer 80 associated with the social network, and/or can contain and/or include any link(s) or hyperlink(s) to any group(s) or subgroup(s) in that social network. The database 80H can also, for the social network and/or for each of the social networking members, contain and/or include, and/or contain or include a link(s) or a hyperlink(s) to, any data and/or information maintained by, provided by, offered by, or sold by, the social network or the social networking company or entity associated with same and/or which can be accessed or obtained from the social network or the social networking company or entity associated with same, or any computer, server, or website, of same.

In a preferred embodiment, any data and/or information described herein as being stored in any of the databases 11H, 20H, 30H, 40H, 50H, 60H, 70H, and/or 80H, of any of the respective computers or communication devices 11, 20, 30, 40, 50, 60, 70, and/or 80, described herein, can also be stored in, and/or can accessed via, any other of the respective databases 11H, 20H, 30H, 40H, 50H, 60H, 70H, and/or 80H of any of the other respective computers or communication devices 11, 20, 30, 40, 50, 60, 70, and/or 80, described herein.

Applicant hereby incorporates by reference herein the subject matter and teachings of U.S. patent application Ser. No. 15/953,702, filed Apr. 16, 2018, and entitled "APPARATUS AND METHOD FOR PROVIDING AND/OR FOR PROCESSING INFORMATION FOR, REGARDING, AND/OR FOR FACILITATING, THE COMMERCIALIZATION, DEVELOPMENT, MARKETING, SALE, TRANSFER, LICENSING, AND/OR MONETIZATION, OF INTELLECTUAL PROPERTY", the subject matter and teachings of which are hereby incorporated by reference herein in their entirety.

In another preferred embodiment, the apparatus 100 and method of the present invention can be utilized in order to allow any user, individual, or entity, to post, list, or register, his, her, or its, intellectual property with the apparatus 100 of the present invention for purposes of commercializing, developing, marketing, selling, transferring, licensing, and/or monetizing, same. In such an embodiment, the apparatus 100 and method of the present invention can be utilized as a posting, listing, or registration, entity for intellectual property of any type or kind.

FIG. 15 illustrates a preferred embodiment method of utilizing the apparatus 100 of the present invention, in flow diagram form. While the embodiment of FIG. 15 is described herein as using a patent application and any rights to foreign patent applications as the subject intellectual property, it is to be understood that the embodiment of FIG. 15 can also be utilized, in a same, a similar, or an analogous, manner in connection with any type or kind of intellectual property, described or identified herein or otherwise, and/or with any type or kind of foreign rights, international rights, or derivative rights, associated with the same or related to the same.

In the exemplary embodiment described in connection with the preferred embodiment of FIG. 15, a user who or which owns a pending United States patent application can, for example, post, list, or register, his, her, or its, patent application with the apparatus 100 in order to identify, find, or locate, a provider, a funding service, or any other entity, or any other user of the apparatus 100 of the present invention, in order to commercialize, develop, market, sell, transfer, license, or monetize, the invention or inventions described in the patent application. The user can also post, list, or register, any rights to any foreign or international patent applications which, can be counterparts of or to the United States patent application, or which can claim any benefit of any priority to the United States patent application in order to commercialize, develop, market, sell, transfer, license, or monetize, the same.

With reference to FIG. 15, the operation of the apparatus 100 commences at step 1500. At step 1501, the user can access the central processing computer 11 of the central processing computer and distributed ledger and Blockchain technology system 10 with or using his, her, or its, user communication device 20. At step 1502, the user can post, list, or register, his, her, or its, United States patent application with the central processing computer 11 by entering information regarding the same into the user communication device 20 and by transmitting the same to the central processing computer 11.

At step 1502, the user can also enter information regarding the serial number of the United States patent application ("the patent application"), the title of the patent application, a brief description of any invention(s) described in or covered by the patent application, the names of the applicant(s), inventor(s), or any assignee, a legal representative, any user ideas for uses of the invention(s) described or covered in the patent application, any foreign patent application(s) or international patent application(s) which are or can be counterpart(s) to the patent application or which can correspond to same in a foreign country, or which can claim the benefit of the priority of the patent application. At step 1502, the user can also enter information regarding the category or categories, and/or any sub-category or sub-categories, of services, goods, or products, within which he, she, or it, believes the invention, described or covered in the patent application, falls. For example, for a software patent or business method patent relating to providing an Internet-based retail shopping website for clothing and apparel, the user might enter information categorizing the invention as being in an Internet electronic commerce retail sales category and as also being in a clothing and apparel subcategory of said category.

At step 1502, the user can also enter information regarding his, her, or its, objectives, plans, or desires, for commercializing, developing, marketing, selling, transferring, licensing, or monetizing, the patent application, any foreign counterpart(s) or international counterparts(s) of the patent application, and/or any inventions described in or covered by the patent application. At step 1502, the user can also enter information regarding his, her, or its, plans or desired courses of action for or regarding the patent application, or any patent(s) which might issue from same, or any need of or for any service(s) of any provider(s), or any need for any good(s) or product(s) of any provider, the user's budget or budget for certain projects or services, or any need of or for funding regarding or relating to any desired courses of action, or any need or needs for any provider(s) or funding service(s), for facilitating any commercialization, development, marketing, sale, transfer, licensing, and/or monetization, of, for, or regarding, the patent application, any foreign counterpart(s) or international counterparts(s) of the patent application, and/or or of, for, or regarding, any inventions described in or covered by the patent application.

For example, for a patent application for or covering an Internet software invention or software products and/or services relating to the same, the user can enter information whereby he, she, or it, can express a need or a desire for, or to hire, a patent attorney to assist in prosecuting the patent application in the United States for the user or to hire a commercial attorney to represent the user in starting a business entity to practice the inventions described in or covered by the patent application, or a need for or a desire to engage the services of a funding service, or to find an investor, to provide funding for any commercialization, development, marketing, sale, transfer, licensing, and/or monetization, activities, or a need or a desire for, or to hire, a software developer to develop the invention described in or covered by the patent application into an operational website, or a need or a desire for, or to hire, a web hosting service, or a need or a desire to engage the services of an agent, a patent broker, or a patent auction company or service, in order to assist the user to selling or in auctioning off rights to any foreign patent application counterparts or international patent application counterparts to the patent application, any licenses, covenants not to sue, or releases, under the patent application or any foreign patent application counterparts or international patent application counterparts to same, or any use, sale, or development rights to or under the patent application or any foreign patent application counterparts or international patent application counterparts to the same.

In a preferred embodiment, at step 1502, the user can enter any data and/or information in any order or manner determined or selected by the user, or the central processing computer 11 can also provide the user with information, prompts, or templates, which can be tailored to elicit the information from the user depending upon any information which having been provided by the user at or during step 1502. At step 1002, the information entered by the user at step 1002, can be transmitted from the user communication device 20 to, and can be received by, the central processing computer 11 at step 1502. At step 1502, the user can also transmit a copy of the patent application to the central processing computer 11, or upload a copy of the patent application to the central processing computer 11.

At step 1503, the central processing computer 11 can process the data and/or information received at step 1502 and can generate a posting or listing of or for the patent application. At step 1503, the central processing computer 11 can also generate an intellectual property profile for the patent application containing any information regarding the patent application, the invention(s) described therein or covered thereby, any information regarding the user's plans or desires or the user can also enter information regarding his, her, or its, plans or desired for commercializing, developing, marketing, selling, transferring, licensing, or monetizing, the patent application, any foreign counterpart(s) or international counterparts(s) of the patent application, and/or any inventions described in or covered by the patent application, or information regarding the user's plans or desired course(s) of action for or regarding the patent application, or any patent(s) which might issue from same, or any need by the user for any providers for providing any services, goods, or products. Once generated, the intellectual property profile can be stored in the database 11H of the central processing computer 11 for later searches and retrievals by any providers, funding services, agents, or brokers, or other users, who or which utilize the apparatus 100 and method of the present invention. At step 1503, the intellectual property profile can also be stored in the distributed ledger/Blockchain technology system 12 of the central processing computer and distributed ledger and Blockchain technology system 10. At step 1503, the intellectual property profile can also be stored in the any digital assets/records storage computer(s) 60 and/or in the database 60H of the same.

At step 1503, the central processing computer 11 can also process any information stored in the database 11H in order to identify, find, or locate, a provider(s), funding service(s), or an investor(s), or an agent or broker, who or which has been previously registered with the apparatus 100 of the present invention as being interested in serving the needs of the user. In this regard, the user can be viewed as an employer or hiring entity as described herein and the provider(s), funding service(s), or investor(s), or agent or broker, can be viewed as the individual or entity available for hire or engagement.

At step 1503, the central processing computer 11 can generate a provider report which can contain information identifying a provider or providers who or which can provide any needed or desired services, goods, or products, to the user, or which or which can otherwise assist the user in pursuing his, her, or its, objectives, can generate a funding service/investor report which can contain information identifying a funding service or funding services or an investor or investors who or which might be able to assist the user with his, her, or its, funding needs, or can generate an agent/broker report which can contain information identifying an agent or a broker who or which can provide any needed or desired services to the user.

In a preferred embodiment, the provider report can contain, for each provider identified therein, information identifying the provider, a telephone number for the provider, an e-mail address for the provider, a text message or an SMS message number for the provider, information regarding the provider's business address, website, or a link or a hyperlink to the provider's website, information regarding any credentials or qualifications of the provider, information regarding any services provided by the provider, information regarding any goods or products provided by the provider, information regarding the provider's work schedule or work schedules, information or instructions for reserving, hiring, or engaging, the services of the provider, information regarding the provider's price lists, fees, fee schedules, or rates, information or instructions for ordering goods or products from the provider, or information regarding the prices or price lists for goods or services offered or sold by the provider, or information for or regarding any contract or contracts, or any link or hyperlink to same, used by or required by the provider in order to allow the user to engage the services of the provider, purchase goods or products from the provider, or to otherwise do business with the provider.

In a preferred embodiment, the funding service/investor report can contain, for each funding service or investor identified therein, information identifying the funding service or the investor, a telephone number for the funding service or the investor, an e-mail address for the funding service or the investor, a text message or an SMS message number for the funding service or the investor, information regarding the funding service's or the investor's business address, website, or a link or a hyperlink to the funding service's or the investor's website, information regarding any credentials or qualifications of the funding service's or the investor's, information regarding any services provided by the funding service's or the investor's, information regarding the funding service's or the investor's schedule or schedules, information or instructions for reserving, hiring, or engaging, the services of the funding service, or information or instructions for providing the investor with information for the investor to consider, information regarding the funding service's price lists, fees, fee schedules, or rates, or information for or regarding any contract or contracts, or any link or hyperlink to same, used by or required by the funding service or the investor in order to allow the user to engage the services of the funding service or in order to submit information to the investor.

In a preferred embodiment, the agent/broker report can contain, for each agent or broker identified therein, information identifying the agent or the broker, a telephone number for the agent or the broker, an e-mail address for the agent or the broker, a text message or an SMS message number for the agent or the broker, information regarding the agent's or the broker's business address, website, or a link or a hyperlink to the agent's or the broker's website, information regarding any credentials or qualifications of the agent or the broker, information regarding any services provided by the agent or the broker, information regarding the agent's or the broker's work schedule or work schedules, information or instructions for reserving, hiring, or engaging, the services of the agent or the broker, information regarding the agent or the broker's commissions, price lists, fees, fee schedules, or rates, or information for or regarding any contract or contracts, or any link or hyperlink to same, used by or required by the agent or the broker in order to allow the user to engage the services of the agent or the broker, or to otherwise do business with the agent or the broker.

At step 1503, the central processing computer 10 can transmit the provider report, the funding service/investor report, or the agent/broker report, to the user communication device 20 of or associated with the user. At step 1503, the user can review any information contained in the provider report, in the funding service/investor report, or in the agent/broker report, and can decide to make contact with or explore discussions or opportunities with any provider identified in the provider report, to make contact with or explore discussions or opportunities with any funding service or with any investor identified in the funding service/investor report, or to make contact with or explore discussions or opportunities with any agent or broker identified in the agent/broker report. In a preferred embodiment, contact can be made by email communication, text message communication, telephone call, video chat, video conference call, or any combination of the same.

In another preferred embodiment, the central processing computer 11, at step 1503, can generate an intellectual property report containing any information contained in the intellectual property profile, including, at the very least, information regarding the patent application and information for contacting the user, and can transmit same to any user communication device(s) 20, or any counterparty communication device(s) 40, of or associated with any provider(s) identified at step 1503 or included or identified in any provider report, can transmit the intellectual property report to any funding service user communication device(s) 20 or counterparty communication device(s) 40 of or associated with any funding service(s) or investor(s) identified at step 1503 or included or identified in any funding service/investor report, or can transmit the intellectual property report to any user communication device(s) 20, or any counterparty communication device(s) 40, of or associated with any agent(s) or broker(s) identified in the agent/broker report. At step 1503, any respective provider, any respective funding service or investor, or any respective agent or broker, can review the intellectual property report and can contact the user to explore any discussions or opportunities with the user. In a preferred embodiment, contact can be made by email communication, text message communication, telephone call, video chat, video conference call, or any combination of the same.

In another preferred embodiment, the central processing computer 11, at step 1503, can generate an intellectual property report message which can contain information regarding any provider(s), funding service(s), or investor(s), or agent(s) or broker(s), to whom or to which an intellectual property report was transmitted and can transmit the intellectual property report message to the user communication device 20 of the user.

At step 1504, the central processing computer 11 can store any information processed at step 1502 and/or at step 1503, and/or can store any data and/or information regarding the posting, the listing, or the registration, of the patent application and/or any associated data and/or information provided by the user, and/or the central processing computer 11 can store the intellectual property profile, and/or can store any provider report(s), any funding service/investor report(s), any agent/broker report(s), any intellectual property report(s), or any intellectual property report message(s), if generated, in the database 11H. In a preferred embodiment, at step 1503, any data and/or information regarding the posting, the listing, or the registration, of the patent application and/or any associated data and/or information provided by the user, and/or the intellectual property profile, any provider report(s), any funding service/investor report(s), any agent/broker report(s), any intellectual property report(s), or any intellectual property report message(s), if generated, can also be stored in the distributed ledger/ Blockchain technology system 12 of the central processing computer and distributed ledger and Blockchain technology system 10. Thereafter, the operation of the apparatus 100 will cease at step 1505.

In another preferred embodiment, any information regarding any contract or agreement entered into by the user with any provider, funding service, or agent/broker, at any time before, during, or after, any of the steps 1501 to 1504, and any information regarding any payment or other consideration provided by the user pursuant to the contract or agreement, can be stored in the database 11H of the central processing computer and/or in the distributed ledger/Blockchain technology system 12 of the central processing computer and distributed ledger and Blockchain technology system 10.

In another preferred embodiment, the apparatus 100 of FIG. 15 can also be utilized in a same, in a similar, and/or in an analogous, manner in connection with the posting, listing, or registration, of any types or kinds of intellectual property described herein or otherwise, and/or in connection with any types or kinds of providers, service providers, goods providers, funding services, investors, agents, brokers, official or governmental filing offices, social networks, media services, information service, or news information services, described herein or otherwise.

In another preferred embodiment, the apparatus 100 and method of the present invention can also be utilized in order to allow any provider, service provider, goods provider, funding service, investor, agent, broker, employer, counterparty, media/content provider, digital assets/records storage provider, educational/instructional provider, or social network provider, to post, list, or register, himself, herself, or itself, and/or any information regarding the respective services, goods, or products, which he, she, or it, provides, with the apparatus 100 of the present invention for purposes of serving the commercializing, developing, marketing, selling, transferring, licensing, and/or monetizing, needs of any of users described herein who or which own, hold, or manage, any intellectual property. In such an embodiment, the apparatus 100 and method of the present invention can be utilized as a posting, listing, or registration, entity for services, goods, or products, of any type or kind.

Figure 16:
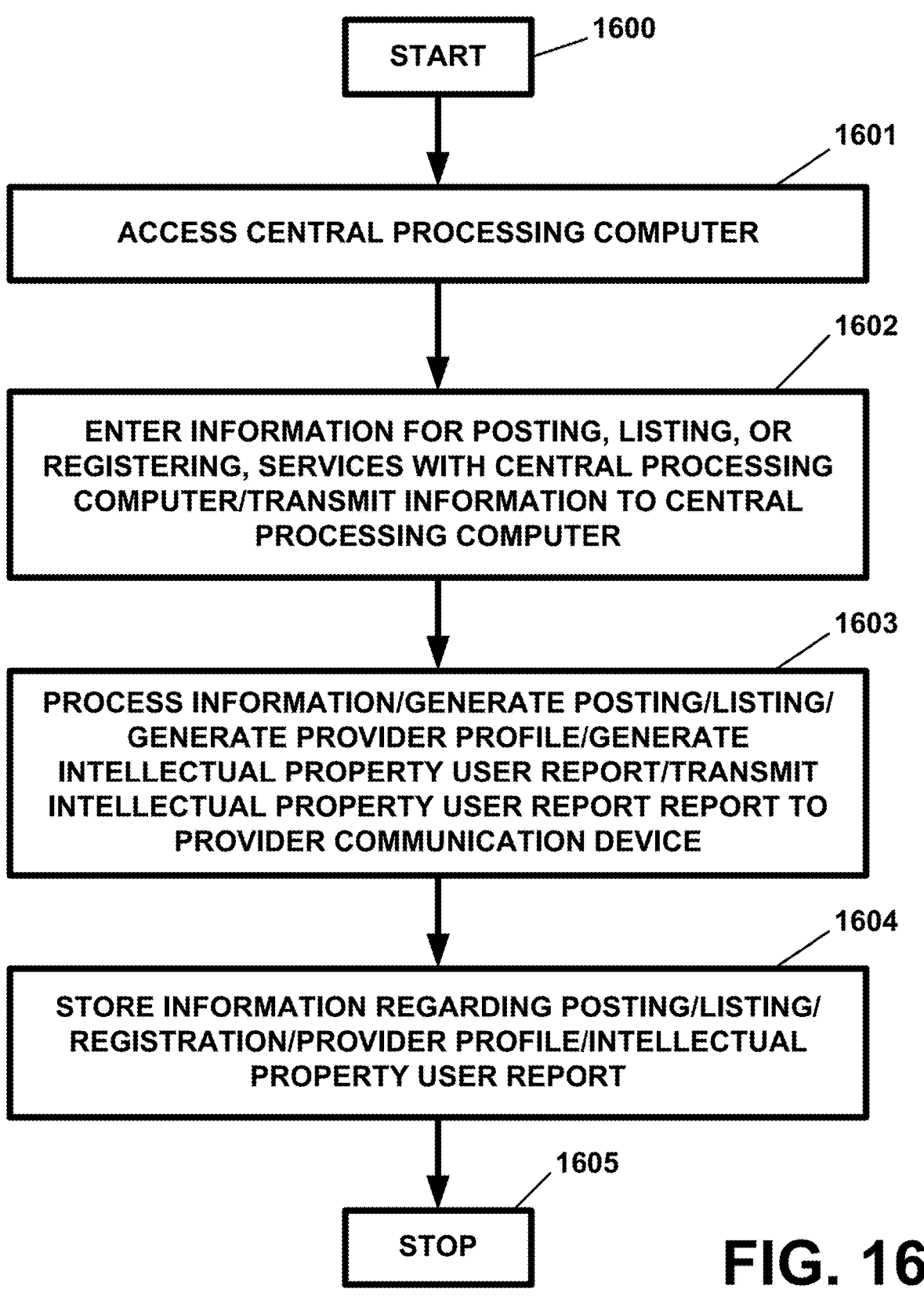
FIG. 16 illustrates another preferred embodiment method of utilizing the apparatus of the present invention, in flow diagram form.

FIG. 16 illustrates a preferred embodiment method of utilizing the apparatus 100 of the present invention, in flow diagram form. While the embodiment of FIG. 16 is described herein as being used by a provider of a service or a service provider to post, list, or register, himself, herself, or itself, along with information regarding the service or services he, she, or it, provides, it is to be understood that the embodiment of FIG. 16 can also be utilized, in a same, a similar, or an analogous, manner in connection with any type or kind of provider, service provider, goods provider, funding service, investor, official or governmental filing office, agent, broker, employer, counterparty, media/content provider, digital assets/records storage provider, educational/instructional provider, or social network provider, to post, list, or register, himself, herself, or itself, and/or information regarding the respective services, goods, or products, which he, she, or it, provides which can be of assistance to a user in commercializing, developing, marketing, selling, transferring, licensing, and/or monetizing, intellectual property.

In the exemplary embodiment described in connection with the preferred embodiment of FIG. 16, a provider of website development and/or software development can, for example, post, list, or register, his, her, or its, services with the apparatus 100 in order to identify, find, or locate, a user interested in commercializing or developing his, her, or its, intellectual property, which in an exemplary embodiment, can be a patent or a patent application describing or covering a software invention or a business method invention which the user desires to practice. Although described as being utilized by a provider of website development services and/or software development services to identify a user interested in commercializing or developing a software or business method invention, it is to be understood, that the embodiment of FIG. 16 can also be utilized in a same, a similar, or an analogous, manner to identify any user for which the provider can provide services, goods, or products, to allow or assist any user to commercialize, develop, market, sell, transfer, license, or monetize, his, hers, or its, intellectual property of any type or kind.

With reference to FIG. 16, the operation of the apparatus 100 commences at step 1600. At step 1601, the provider can access the central processing computer 11 of the central processing computer and distributed ledger and Blockchain technology system 10 with or using his, her, or its, user communication device 20. At step 1602, the provider can post, list, or register, his, her, or its, services with the central processing computer 11 by entering information regarding the same into the user communication device 20 and by transmitting the same to the central processing computer 11.

At step 1602, the provider can also enter information regarding himself, herself, or itself, information regarding the various services he, she, or it provides or performs, information regarding his, her, or its, telephone number, e-mail address, text message or an SMS message number, business address, website, a link or a hyperlink to the provider's website, information regarding any of the provider's credentials or qualifications, information regarding any services provided by the provider, information regarding any goods or products provided by the provider, information regarding the provider's work schedule or work schedules, information or instructions for reserving, hiring, or engaging, the services of the provider, information regarding the provider's price lists, fees, fee schedules, or rates, information or instructions for ordering goods or products from the provider, or information regarding the prices or price lists for goods or services offered or sold by the provider, or information for or regarding any contract or contracts, or any link or hyperlink to same, used by or required by the provider in order for a user to engage the services of the provider, purchase goods or products from the provider, or to otherwise do business with the provider. For example, the provider can post, list, or register, information regarding its experience and/or expertise in developing software and websites for certain software inventions or business method inventions in the hopes of finding work from users having software or business method inventions covered or described in a pending patent application or in an issued patent.

At step 1602, the provider can also enter information regarding his, her, or its, desired projects or jobs and any rates charged for his, her, or its, services. At step 1602, the provider can also enter information regarding any project category or categories and/or any project subcategory or subcategories of services, goods, or products, for which he, she, or it, is interested in being engaged or hired. In a preferred embodiment, at step 1602, the provider can enter any data and/or information in any order or manner determined or selected by the provider, or the central processing computer 11 can also provide the provider with information, prompts, or templates, which can be tailored to elicit the information from the provider depending upon information having been provided by the provider at and during step 1602. At step 1602, the information entered by the provider at step 1602, can be transmitted from the user communication device 20 to, and can be received by, the central processing computer 11 at step 1602. At step 1602, the provider can also transmit any other information which might be deemed important for the provider's posting, listing, or registration.

At step 1603, the central processing computer 11 can process the data and/or information received at step 1602 and can generate a posting or listing of or for the provider. At step 1603, the central processing computer 11 can also generate a provider profile for the provider containing any information regarding the provider, his, her, or its, services offered, any goods or products offered, and/or any information regarding the provider's desired projects or jobs, for commercializing, developing, marketing, selling, transferring, licensing, or monetizing, certain intellectual property, and the provider's compensation requirements or fees.

Once generated, the provider profile can be stored in the database 11H of the central processing computer 11 for later searches and retrievals by any users described herein, or by any other providers, by any funding services or investor, by any agents or brokers, or by any other users, who or which utilize the apparatus 100 and method of the present invention. At step 1603, the provider profile can also be stored in the distributed ledger/Blockchain technology system 12 of the central processing computer and distributed ledger and Blockchain technology system 10. At step 1503, the provider profile can also be stored in the any digital assets/records storage computer(s) 60 and/or in the database 60H of the same.

At step 1603, the central processing computer 11 can also process any information stored in the database 11H in order to identify, find, or locate, any user(s) who or which has previously posted, listed, or registered intellectual property with the apparatus 100 of the present invention as being interested in securing or engaging the services of the provider. At step 1603, the central processing computer 11 can generate an intellectual property user report which can contain information identifying a user or users who or which might be in need of the provider's services.

In a preferred embodiment, the intellectual property user report can contain, for each user identified therein, information identifying the intellectual property which the respective user desires to commercialize, develop, market, sell, transfer, license, or monetize, a telephone number for the user, an e-mail address for the user, a text message or an SMS message number for the user, information regarding the user's business address, website, or a link or a hyperlink to the user's website, information regarding any services requested by the user, information regarding any goods or products requested by the user, information regarding the user's time requirements for having services performed or completed, information regarding the user's work schedule or work schedules, information, requirements, or instructions, for being interviewed by, hired by, or engaged by, the user, information regarding the user's budget or budgets, or information for or regarding any contract or contracts, or any link or hyperlink to same, used by or required by the user in order for the provider to be engaged by the user or to otherwise do business with the user.

At step 1603, the central processing computer 11 can transmit the intellectual property user report to the user communication device 20 of or associated with the provider. At step 1603, the provider can review any information contained in the intellectual property user report and can decide to make contact with or explore discussions or opportunities with any user identified in the intellectual property user report. In a preferred embodiment, contact can be made by email communication, text message communication, telephone call, video chat, video conference call, or any combination of the same.

At step 1603, the central processing computer 11, at step 1603, can also generate a provider report containing any information contained in the provider profile, including, at the very least, information regarding the provider and information for contacting the provider, and can transmit same to any user communication device(s) 20 of or associated with any user(s) identified at step 1603 or included or identified in any intellectual property user report. At step 1603, any respective user can review the provider report and can contact the provider to explore any discussions or opportunities with the provider. In a preferred embodiment, contact can be made by email communication, text message communication, telephone call, video chat, video conference call, or any combination of the same.

In another preferred embodiment, the central processing computer 11, at step 1603, can also generate an intellectual property user report message which can contain information regarding any user(s) to whom or to which a provider report was transmitted and can transmit the intellectual property user report message to the user communication device 20 of the provider. At step 1604, the central processing computer 11 can store any information processed at step 1602 and/or at step 1603, and/or can store any data and/or information regarding the posting, the listing, or the registration, of the provider and/or any associated data and/or information provided by the provider, and/or the central processing computer 11 can store the provider profile, and/or can store any intellectual property user report(s), or any intellectual property user report message(s), or any provider report(s), if generated, in the database 11H. In a preferred embodiment, at step 1603, any data and/or information regarding the posting, the listing, or the registration, of the provider and/or any associated data and/or information provided by the provider, and/or the central processing computer 11 can store the provider profile, and/or can store any intellectual property user report(s), or any intellectual property user report message(s), or any provider report(s), if generated, can also be stored in the distributed ledger/Blockchain technology system 12 of the central processing computer and distributed ledger and Blockchain technology system 10. Thereafter, the operation of the apparatus 100 will cease at step 1605.

In another preferred embodiment, any information regarding any contract or agreement entered into by the provider and the user, at any time before, during, or after, any of the steps 1601 to 1604, and any information regarding any payment or other consideration provided by the user pursuant to the contract or agreement, can be stored in the database 11H of the central processing computer and/or in the distributed ledger/Blockchain technology system 12 of the central processing computer and distributed ledger and Blockchain technology system 10.

In another preferred embodiment, the apparatus 100 of FIG. 16 can also be utilized in a same, in a similar, and/or in an analogous, manner in connection with the posting, listing, or registration, of any type or kind of providers, service providers, goods providers, funding services, investors, agents, brokers, official or governmental filing offices, social networks, media services, information service, or news information services, described herein or otherwise, and/or in connection with any types or kinds of intellectual property, described herein or otherwise.

In another preferred embodiment, the apparatus 100 and method of the present invention can also be utilized in order to allow any user, provider, funding service or investor, agent or broker, employer, counterparty, media/content provider, digital assets/records storage provider, educational/instructional provider, or social network provider, to be notified upon the posting, listing, or registration, of an intellectual property with the apparatus 100. In this regard, the apparatus 100 of the present invention can be utilized to generate a notification message or an alert message, containing information regarding a newly posted, listed, or registered, intellectual property, and to transmit the notification message or the alert message to a respective communication device or computer 20, 30, 40, 50, 60, 70, or 80 of a respective user, provider, funding service or investor, agent or broker, employer, counterparty, media/content provider, digital assets/records storage provider, educational/instructional provider, or social network provider.

FIG. 17 illustrates another preferred embodiment method of utilizing the apparatus 100 of the present invention, in flow diagram form. While the embodiment of FIG. 17 is described herein as being used to provide a notification message or an alert message to a user, who or which may be interested in purchasing the intellectual property, or any rights in, to, or relating to, same, or to a provider who or which might be interested in providing services to a user, who or which owns, posts, lists, or registers, the intellectual property, for facilitating the commercialization, development, marketing, sale, transfer, licensing, and/or monetization, of the same, the apparatus 100 of FIG. 17 can also be utilized in a same, a similar, or an analogous, manner, in order to provide a notification message or an alert message to any of the herein-described users, providers, funding services or investors, agents or brokers, employers, counterparties, media/content providers, digital assets/records storage providers, educational/instructional providers, or social network providers, for any reason or purpose.

In the embodiment of FIG. 17, any user, provider, funding service or investor, agent or broker, employer, counterparty, media/content provider, digital assets/records storage provider, educational/instructional provider, or social network provider, can pre-register with the apparatus 100 and/or can set-up or establish with the central processing computer 11, or can program the central processing computer 11 with information regarding, any criteria for receiving a notification message or an alert message regarding any posting, listing, or registration, of any intellectual property of or for which the respective user, provider, funding service or investor, agent or broker, employer, counterparty, media/content provider, digital assets/records storage provider, educational/instructional provider, or social network provider, desires to be notified. For, example, a user may want to be notified if certain patent applications or patents may be available for sale or for licensing, a provider may want to be notified if an owner of a patent application in a specific category or technology field desires to commercialize same or develop same, or an agent or a broker may want to be notified if an owner of a patent application has a need for an agent or a broker for commercializing, developing, marketing, selling, transferring, licensing, or monetizing, same. Any such pre-registration information can be stored in the database 11H of the central processing computer 11.

With reference or FIG. 17, the operation of the apparatus 100 commences at step 1700. At step 1701, the central processing computer 11 of the central processing computer and distributed ledger and Blockchain technology system 10 will await a posting, listing, or registration, or an intellectual property by a user. For example, in a preferred embodiment, the central processing computer 11 will await an occurrence of a user accessing the same, and providing information regarding an intellectual property for posting, listing, or registration, with the apparatus 100. For example, a user can access the central processing computer 11 using his, her, or its, user communication device 20 and can enter information regarding an intellectual property. In the preferred embodiment of FIG. 17, the intellectual property posted, listed, or registered, can be a patent application. Although a patent application is used in the example of the preferred embodiment of FIG. 17, it is important to note that the embodiment of FIG. 17 can also be utilized in connection with any of the herein-described intellectual property, intellectual property types, or intellectual property kinds, described herein or otherwise.

In a preferred embodiment, the central processing computer 11 and/or the CPU 11A can detect the occurrence of the posting, the listing, or the registration, of the patent application by the user. The central processing computer 11 can receive and process any information regarding the patent application, and/or any foreign counterpart applications or international counterpart applications, which can be transmitted from the user's user communication device 20. The information provided by the user can contain or can include information regarding the patent application and any foreign counterpart application(s) or international counterpart application(s) ("counterpart application(s)"), the serial number of the patent application and/or of any counterpart application(s), the title of the patent application, a brief description of any invention(s) described in or covered by the patent application or counterpart application(s), the names of the applicant(s), inventor(s), or any assignee, a legal representative, any user ideas for uses of the invention(s) described or covered in the patent application or counterpart application(s), information regarding the category or categories, and/or any sub-category or sub-categories, of services, goods, or products, into which or within which he, she, or it, believes the invention, described or covered in the patent application or counterpart application(s), falls. For example, for a software patent or business method patent relating to providing an Internet-based retail shopping website for clothing and apparel, the user might enter information categorizing the invention as being in an Internet electronic commerce retail sales category and as also being in a clothing and apparel subcategory of said category.

The user can also enter information regarding his, her, or its, objectives, plans, or desires, for commercializing, developing, marketing, selling, transferring, licensing, or monetizing, the patent application or any counterpart application(s), and/or any inventions described in or covered by the patent application. The user can also enter information regarding his, her, or its, plans or desired courses of action for or regarding the patent application or counterpart application(s), or any patent(s) which might issue from same, or any need of any service(s) of any provider(s), or any need for any good(s) or product(s) of any provider, the user's budget or budget for certain projects or services, or any need of or for funding regarding or relating to any desired courses of action, or any need or needs for any provider(s) or funding service, for facilitating any commercialization, development, marketing, sale, transfer, licensing, and/or monetization, of, for, or regarding, the patent application, any counterpart application(s), and/or of, for, or regarding, any inventions described in or covered by the patent application or the counterpart application(s).

For example, for a patent application for or covering an Internet software invention or software products and/or services relating to same, the user can enter information whereby he, she, or it, can express a need or a desire for, or to hire, a patent attorney to assist in prosecuting the patent application in the United States for the user or to hire a commercial attorney to represent the user in starting a business entity to practice the inventions described in or covered by the patent application, or a need for or a desire to engage the services of a funding service, or to find an investor, to provide funding for the any commercialization, development, marketing, sale, transfer, licensing, and/or monetization, activities, or a need or a desire for, or to hire, a software developer to develop the invention described in or covered by the patent application into an operational website, or a need or a desire for, or to hire, a web hosting service, or a need or a desire to engage the services of an agent, a patent broker, or a patent auction company or service, in order to assist the user to selling or in auctioning off rights to any foreign patent application counterparts or international patent application counterparts to the patent application, any licenses, covenants not to sue, or releases, under the patent application or any foreign patent application counterparts or international patent application counterparts to same, or any use, sale, or development rights to or under the patent application or any foreign patent application counterparts or international patent application counterparts to same.

The user can also enter information regarding an asking price or a selling price for the patent application or any counterpart application(s), or any asking prices for any license, exclusive license, non-exclusive license, or defined field of use license, or for any release or covenant not to sue regarding the patent application or counterpart application(s). The user can also enter any information which many of interest to any other user or any provider regarding the patent application or counterpart applications. Once the user has entered and transmitted to the central processing computer 11 any and/or all information regarding the patent application or any counterpart application(s), and once the posting, listing, or registration, of same, is complete, the central processing computer 11 will detect same at step 1701.

At step 1702, the central processing computer 11 can generate an intellectual property ("IP") notification message or an IP alert message which can contain or include any of the herein-described information regarding the patent application or any counterpart application(s) provided by the user when he, she, or it, posted, listed, or registered, the patent application and/or any counterpart application(s) with the central processing computer 11. In a preferred embodiment the IP notification message or the IP alert message can also contain a link(s) or a hyperlink(s) to the patent application or any counterpart application(s) and/or contact information, or a link(s) or a hyperlink(s) to contact information, for contacting the owner of the patent application or the user who posted, listed, or registered, same with the central processing computer 11. In the preferred embodiment, the contact information can be, or can include, but is not limited to, a telephone number, a cellular telephone number, an e-mail address, a text messaging number, an SMS messaging number, or any other contact information.

At step 1703, the central processing computer 11 can transmit the IP notification message or the IP alert message to the user communication device 20 of the user who or which desires to be notified of the posting, the listing, or the registration, of the patent application or any counterpart application(s) and/or can transmit the IP notification message or the IP alert message to the user communication device 20, or to any other respective communication device or computer 30, 40, 50, 60, 70, or 80, of the respective user or provider, or any other user, employer, counterparty, media/content provider, digital assets/records storage provider, educational/instructional provider, or social network provider, who or which desires to be notified of the posting, the listing, or the registration, of the patent application or any counterpart application(s). At step 1704, the user communication device 20 of the respective user or provider, desiring to the notified of the posting, the listing, or the registration, of the patent application or any counterpart application(s), can receive the IP notification message or the IP alert message or the user communication device 20, or other respective communication device or computer 30, 40, 50, 60, 70, or 80, of the user or provider desiring to the notified of the posting, the listing, or the registration, of the patent application or any counterpart application(s), can receive the IP notification message or the IP alert message.

At step the 1704, the user receiving the IP notification message or the IP alert message, or the provider receiving the IP notification message or the IP alert message, can review the information contained therein and can decide whether or not to contact the owner of the patent application or the user who posted, listed, or registered, same with the central processing computer 11 in order to engage in any discussions regarding the patent application or any counterpart application(s) and/or to discuss any opportunities regarding same. In a preferred embodiment, contact can be made by email communication, text message communication, telephone call, video chat, video conference call, or any combination of the same.

At step 1704, the central processing computer 11 can also store, in the database 11H, any information regarding any IP notification message(s) or IP alert message(s) generated at step 1702 and transmitted by the central processing computer 11 at step 1703 and any information regarding the user or the provider to whom the IP notification message(s) or the IP alert message(s) were sent. In a preferred embodiment, at step 1704, any information regarding any IP notification message(s) or IP alert message(s) generated at step 1702 and transmitted by the central processing computer 11 at step 1703, and any information regarding the user or the provider to whom the IP notification message(s) or the IP alert message(s) were sent, can also be stored in the distributed ledger/Blockchain technology system 12 of the central processing computer and distributed ledger and Blockchain technology system 10. Thereafter, the operation of the apparatus 100 will cease at step 1705.

In another preferred embodiment, any information regarding any contract or agreement entered into by the provider and the user, at any time before, during, or after, any of the steps 1701 to 1704, and any information regarding any payment or other consideration provided by the user pursuant to the contract or agreement, can be stored in the database 11H of the central processing computer and/or in the distributed ledger/Blockchain technology system 12 of the central processing computer and distributed ledger and Blockchain technology system 10.

In another preferred embodiment, the apparatus 100 and method of the present invention can be utilized in order to allow any owner of intellectual property or any user who posts, lists, or registers, the same with the apparatus 100 of the present invention to be notified upon the posting, listing, or registration, of any provider, funding service or investor, agent or broker, official or governmental filing office, employer, counterparty, media/content provider, digital assets/records storage provider, educational/instructional provider, or social network provider, or any other user, who or which the owner of intellectual property or any user who posts, lists, or registers, the same might be interested in engaging the services of, or might be interested in purchasing services, goods, or products, from, or might be interested in being represented by, or to whom the owner of intellectual property or any user who posts, lists, or registers, the same might be interested in selling or licensing the intellectual property or a portion thereof, or who or which the owner of intellectual property or any user who posts, lists, or registers, the same may have any reason or interest for being so notified. In this regard, the apparatus 100 of the present invention can be utilized to generate a notification message or an alert message, containing information regarding a newly posted, listed, or registered, provider, funding service or investor, agent or broker, official or governmental filing office, employer, counterparty, media/content provider, digital assets/records storage provider, educational/instructional provider, or social network provider, or other user, who can provide any service, good, or product, which might be of interest to the owner of intellectual property or any user who posts, lists, or registers, the same or who might be of any interest to the owner of intellectual property or any user who posts, lists, or registers, the same for any reason or purpose. The apparatus 100 can thereafter transmit the notification message or the alert message to the user communication device 20 of or associated with the owner of intellectual property or any user who posts, lists, or registers, the same.

Figure 18:
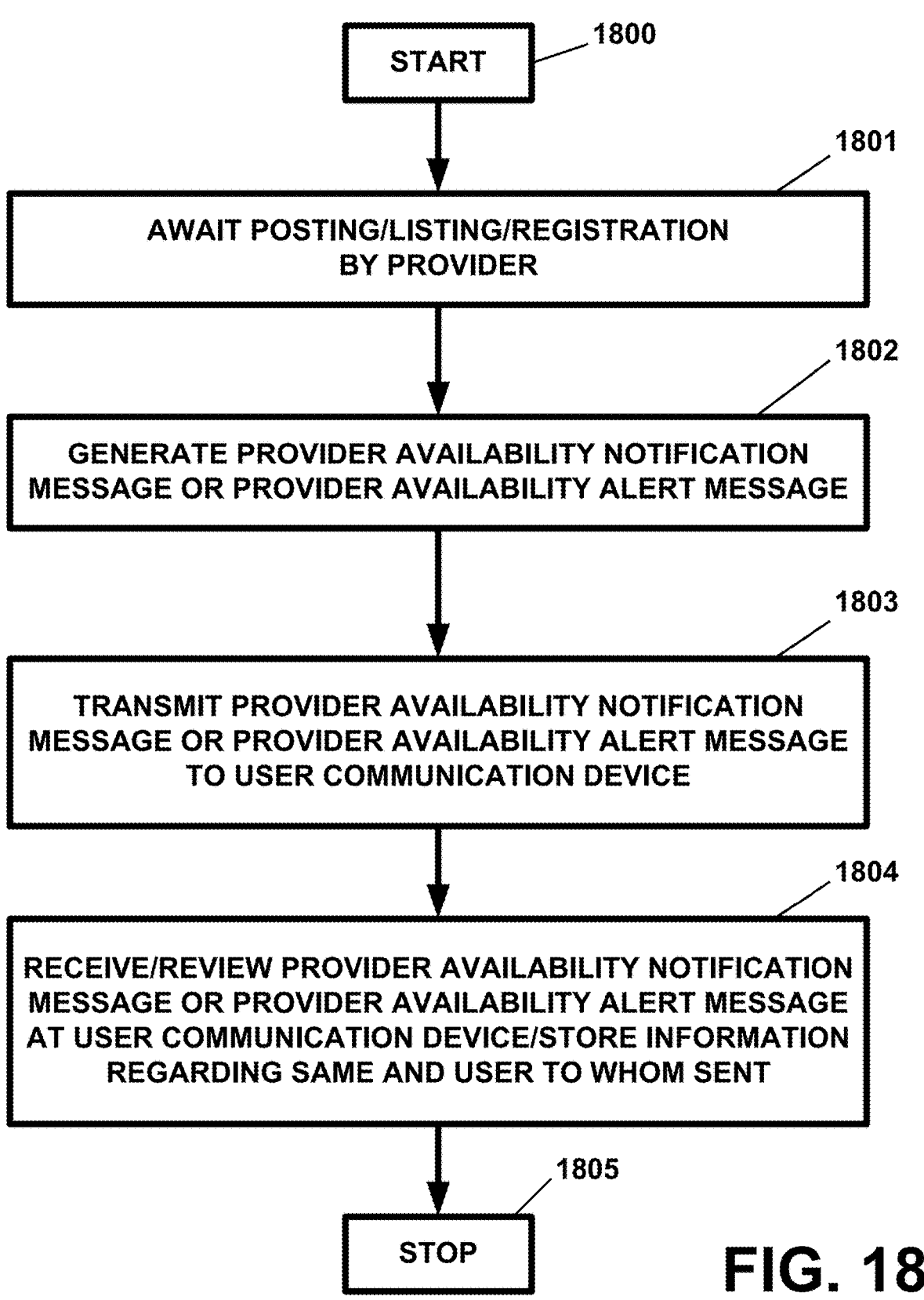
FIG. 18 illustrates still another preferred embodiment method of utilizing the apparatus of the present invention, in flow diagram form.

FIG. 18 illustrates another preferred embodiment method of utilizing the apparatus 100 of the present invention, in flow diagram form. While the embodiment of FIG. 18 is described herein as being used to provide a notification message or an alert message to a user, who or which is the owner of intellectual property or the user who posts, lists, or registers, the same with the apparatus 100, the apparatus 100 of the present invention can also be utilized, in a same, a similar, or an analogous, manner, in order to provide a notification message or an alert message to any user, provider, funding service or investor, agent or broker, official or governmental filing office, employer, counterparty, media/content provider, digital assets/records storage provider, educational/instructional provider, or social network provider, who or which utilizes the apparatus 100 and method of the present invention and/or who or which might be interested in any commercialization, development, marketing, sale, transfer, licensing, or monetization, of or involving the posted, listed, or registered, intellectual property or for any other reason or purpose.

In the embodiment of FIG. 18, any user who or which posts, lists, or registers, intellectual property information with the central processing computer 11, can pre-register with the apparatus 100 and/or can set-up or establish with the central processing computer 11, or can program the central processing computer 11 with information regarding, any criteria for receiving a notification message or an alert message regarding any posting, listing, or registration, by any provider, funding service or investor, agent or broker, official or governmental filing office, employer, counterparty, media/content provider, digital assets/records storage provider, educational/instructional provider, or social network provider, or by any other user, of or for which the posting, listing, or registering, owner or user desires to be notified. For, example, a user may desire to be notified if a certain provider who or which can perform a needed service for the user to develop or commercialize his, her, or its, invention, a user may desire to be notified if another user may be interested in purchasing his, her, or its, patent application or any foreign counterpart application or international counterpart application or in purchasing a license or other right in or to the same, or a user may desire to be notified if an agent or a broker becomes available to represent the user. Any such pre-registration information can be stored in the database 11H of the central processing computer 11.

With reference or FIG. 18, the operation of the apparatus 100 commences at step 1800. At step 1801, the central processing computer 11 of the central processing computer and distributed ledger and Blockchain technology system 10 will await a posting, listing, or registration, by any provider, funding service or investor, agent or broker, official or governmental filing office, employer, counterparty, media/content provider, digital assets/records storage provider, educational/instructional provider, or social network provider, or by any other user. For example, in a preferred embodiment, the central processing computer 11 will await an occurrence of any provider, funding service or investor, agent or broker, official or governmental filing office, employer, counterparty, media/content provider, digital assets/records storage provider, educational/instructional provider, or social network provider, or any other user, accessing same, and providing information regarding any service or services, or any types or kinds or services, which the provider, funding service or investor, agent or broker, official or governmental filing office, employer, counterparty, media/content provider, digital assets/records storage provider, educational/instructional provider, or social network provider, or any other user, can offer to an owner of intellectual property or to a user who or which posts, lists, or registers, the same, with the apparatus 100 or central processing computer 11, information regarding any goods or products which the provider, funding service or investor, agent or broker, official or governmental filing office, employer, counterparty, media/content provider, digital assets/records storage provider, educational/instructional provider, or social network provider, or any other user, can offer to an owner of intellectual property or a user who or which posts, lists, or registers, the same, information regarding any funding services or capital raising services which any provider, funding service or investor, agent or broker, official or governmental filing office, employer, counterparty, media/content provider, digital assets/records storage provider, educational/instructional provider, or social network provider, or any other user, can offer to an owner of intellectual property or to a user who or which posts, lists, or registers, the same, information regarding any work schedules or work scheduling information for any provider, funding service or investor, agent or broker, official or governmental filing office, employer, counterparty, media/content provider, digital assets/records storage provider, educational/instructional provider, or social network provider, or any other user, who or which can offer to an owner of intellectual property or to a user who or which posts, lists, or registers, the same, or any information regarding any fees charged or commissions charged by the provider, funding service or investor, agent or broker, official or governmental filing office, employer, counterparty, media/content provider, digital assets/records storage provider, educational/instructional provider, or social network provider, or the other user, or any price lists, price listings, or other cost information for any services, goods, or products, offered by the provider, funding service or investor, agent or broker, official or governmental filing office, employer, counterparty, media/content provider, digital assets/records storage provider, educational/instructional provider, or social network provider, or the other user.

In the preferred embodiment of FIG. 18, the provider, funding service or investor, agent or broker, official or governmental filing office, employer, counterparty, media/content provider, digital assets/records storage provider, educational/instructional provider, or social network provider, or the other user, can be any provider of any service needed or desired for developing or for commercializing an invention covered in a patent application. Although a provider offered or provided service, needed or desired for developing or for commercializing an invention covered in a patent application, is used in the example of the preferred embodiment of FIG. 18, it is important to note that the embodiment of FIG. 18 can also be utilized in connection with any services, goods, or products, provided by or offered by any of the herein-described providers, funding services or investors, agents or brokers, official or governmental filing offices, employer, counterparty, media/content provider, digital assets/records storage provider, educational/instructional provider, or social network provider, or other users.

In a preferred embodiment, the central processing computer 11 and/or the CPU 11A can detect the occurrence of the posting, the listing, or the registration, of the provider's service or services by the provider. The central processing computer 11 can receive and process any information regarding the provider and the provider's offered or provided service or services, any fees, costs, or price(s) for same, any information regarding the provider's work schedule or scheduling information, and/or any other information provided by the provider in the posting, listing, or registration, made or performed by the provider.

Once the provider has entered and transmitted to the central processing computer 11 any and/or all information regarding the provider and the provider's service or services, and once the posting, listing, or registration, of same, is complete, the central processing computer 11 will detect same at step 1801.

At step 1802, the central processing computer 11 can generate a provider availability notification message or a provider availability alert message which can contain or include any of the herein-described information regarding the provider and the provider's offered or provided service or services and/or any other information provided by the provider when he, she, or it, posted, listed, or registered, the same with the central processing computer 11. In a preferred embodiment, the provider availability notification message or the provider availability alert message can also contain a link(s) or a hyperlink(s) to the provider, to the user communication device 20 of the provider, to the provider's website, and/or contact information, or a link(s) or a hyperlink(s) to contact information, for contacting the provider who posted, listed, or registered, with the central processing computer 11. In the preferred embodiment, the contact information can be, or can include, but is not limited to, a domain name, a uniform resource locator (url), a telephone number, a cellular telephone number, an e-mail address, a text messaging number, an SMS messaging number, a videoconferencing number or information, or any other contact information for or associated with the provider.

At step 1803, the central processing computer 11 can transmit the provider availability notification message or a provider availability alert message to the user communication device 20 of the user who or which desires to be notified of the posting, the listing, or the registration, of the same. At step 1804, the user communication device 20 of the user, desiring to the notified of the posting, the listing, or the registration, by the provider can receive the provider availability notification message or the provider availability alert message.

At step the 1804, the user receiving the provider availability notification message or the provider availability alert message can review the information contained therein and can decide whether or not to contact the provider identified therein in order to engage in any discussions regarding the engaging or hiring of the provider to perform a service or services for the user and/or to discuss any opportunities regarding same.

In a preferred embodiment, contact can be made by email communication, text message communication, telephone call, video chat, video conference call, or any combination of the same.

At step 1804, the central processing computer 11 can also store, in the database 11H, any information regarding any provider availability notification message(s) or a provider availability alert message(s), generated at step 1802 and transmitted by the central processing computer 11 at step 1803, and any information regarding the user to whom the provider availability notification message or the provider availability alert message was sent, and any provider availability notification message(s) or a provider availability alert message(s), generated at step 1802 and transmitted by the central processing computer 11, can also be stored in the distributed ledger/Blockchain technology system 12 of the central processing computer and distributed ledger and Blockchain technology system 10. Thereafter, the operation of the apparatus will cease at step 1805.

In another preferred embodiment, any information regarding any contract or agreement entered into by the provider and the user, at any time before, during, or after, any of the steps 1801 to 1804, and any information regarding any payment or other consideration provided by the user pursuant to the contract or agreement, can be stored in the database 11H of the central processing computer and/or in the distributed ledger/Blockchain technology system 12 of the central processing computer and distributed ledger and Blockchain technology system 10.

In another preferred embodiment, the apparatus 100 and method of the present invention can also be utilized to provide a centralized entity or repository, or a clearinghouse, for storing and/or for providing information regarding intellectual property of any kind or type which is available, or which can be available for commercialization, development, marketing, sale, transfer, licensing, or monetization. In a preferred embodiment, any number of users of the apparatus 100 and method of the present invention can post, list, or register, his, her, or its, intellectual property or intellectual properties with the apparatus 100 of the present invention and/or the central processing computer 11 in order to commercialize, develop, market, sell, transfer, license, or monetize, the same. In a preferred embodiment, any and/or all information regarding any of the posted, listed, or registered, intellectual properties, and/or any information regarding the user who posted, listed, or registered, the same, can be stored by in the database 11H of the central processing computer 11, and/or in the distributed ledger/Blockchain technology system 12 of the central processing computer and distributed ledger and Blockchain technology system 10, and can be searchable by any of the herein-described providers, funding services or investors, official or governmental filing offices, agents or brokers, employers, counterparties, media/content providers, digital assets/records storage providers, educational/instructional providers, or social network providers, or other users.

In a preferred embodiment, a provider of a service or a provider of goods or products can, for example, search available intellectual properties for purposes of offering its respective services, goods, or products, to an owner of an intellectual property or to a user who or which posted, listed, or registered, the same, or to owners of intellectual properties or to users who or which posted, listed, or registered, the same, to assist the respective owner or the posting, listing, or registering, user in commercializing, developing, marketing, selling, transferring, licensing, or monetizing, the same, or for any other purpose or purposes.

In a preferred embodiment, a funding service or an investor can, for example, search available intellectual property or intellectual properties for purposes of offering to provide funding for, or offering to raise capital for, or offering to invest in or with, any efforts to commercialize, develop, market, sell, transfer, litigate, enforce, license, or monetize, an intellectual property or intellectual properties posted, listed, or registered, with the central processing computer 11, or for any other purpose or purposes.

In a preferred embodiment, an official or governmental filing office can, for example, search available intellectual property or intellectual properties for purposes of offering to provide its services, goods, or products, to an owner of an intellectual property or to a user who or which posted, listed, or registered, the same, or to owners of intellectual properties or to users who or which posted, listed, or registered, the same, to assist the respective owner or the posting, listing, or registering, user in protecting, commercializing, developing, marketing, selling, transferring, licensing, litigating, enforcing, or monetizing, the same, or for any other purpose or purposes.

In a preferred embodiment, an agent or a broker can, for example, search available intellectual properties for purposes of offering its respective services, goods, or products, to an owner of an intellectual property or to a user who or which posted, listed, or registered, the same, or to owners of intellectual properties or to users who or which posted, listed, or registered, to same, to assist the respective owner or the posting, listing, or registering, user in commercializing, developing, marketing, selling, transferring, licensing, litigating, enforcing, or monetizing, the same, for purposes of representing the owner or the user, or for any other purpose or purposes.

In a preferred embodiment, a social networking company or entity can, for example, search available intellectual properties for purposes of offering its respective services, goods, or products, to an owner of an intellectual property or to a user who or which posted, listed, or registered, the same, or to owners of intellectual properties or to users who or which posted, listed, or registered, the same, for purposes of providing access to its social network or social networking members for purposes of assisting the respective owner or the posting, listing, or registering, user in commercializing, developing, marketing, selling, transferring, licensing, litigating, enforcing, or monetizing, the same, for purposes of providing the owner or user with access to its social networking members, for purposes of providing information regarding any posted, listed, or registered, intellectual property or intellectual properties to its social networking members, or for any other purpose or purposes.

In a preferred embodiment, a media/content provider, media source, information service or information source, news information service or news information source, can, for example, search available intellectual properties for purposes of offering its respective services, goods, or products, to an owner of an intellectual property or to a user who or which posted, listed, or registered, the same, or to owners of intellectual properties or to users who or which posted, listed, or registered, the same, or for purposes or obtaining information regarding any intellectual property or intellectual properties, or for any other purpose or purposes.

In a preferred embodiment, any user of the apparatus 100 of the present invention, can, for example, perform a search of available intellectual properties for purposes of offering to purchase same, offering to purchase foreign rights or international rights to any foreign counterpart or any international counterpart of same, for purposes of purchasing an intellectual property or a foreign counterpart or an international counterpart to same, for purchasing or acquiring a license, an exclusive license, or a non-exclusive license, under an intellectual property or under any foreign counterpart or international counterpart to same, for purposes of acquiring a covenant not to sue or a release under an intellectual property or under any foreign counterpart or international counterpart to same, for purposes of purchasing a share in, or shares in, or an interest in, an intellectual property or in any foreign counterpart or international counterpart to same, or for any other purpose or purposes.

It is envisioned that any number of owners of intellectual property or intellectual properties, or any number of users who or which can post, list, or register, the same, can post, list, or register, the same with the central processing computer 11. In a preferred embodiment, the owner or user can include, in posting, listing, or registering, an intellectual property, information identifying the intellectual property, any foreign or international counterpart(s) of same, or any derivative rights in or to same, information regarding a description of what the intellectual property is or what it covers or protects, information regarding any inventor(s), applicant(s), owner(s), assignor(s), and/or assignee(s), of the intellectual property or any foreign or international counterpart(s) of same, information regarding the field or the subject matter of the intellectual property, information regarding a market sector, a service sector, a goods sector, or a products sector, or field, or technological field, in which the intellectual property, or any services, goods, products, or entities, covered thereby or protected thereby and/or to which the intellectual property pertains, information regarding what the owner of the intellectual property wants to do with the same, including, but not limited to, any interests or desires to commercialize, develop, market, sell, transfer, license, litigate, enforce, or monetize, the intellectual property, or any other information described herein as being provided by a user who or which posts, lists, or registers, any intellectual property with the central processing computer 11 as described in any of the other and/or herein-described embodiments, including, but not limited to, the embodiments of each of FIGS. 15, 16, 17, 18, 19, and 20. Any and/or all information provided by the owner or user, when posting, listing, or registering, an intellectual property can be transmitted to, received by, and stored by, the central processing computer 11 and/or can be stored in the database 11H and can also be stored in the distributed ledger/Blockchain technology system 12 of the central processing computer and distributed ledger and Blockchain technology system 10.

FIG. 19 illustrates another preferred embodiment method of utilizing the apparatus 100 of the present invention, in flow diagram form. While the embodiment of FIG. 19 is described and illustrated as being utilized by a user, or by a provider of a service, for any purpose or purposes, it is important to note that the embodiment of FIG. 19 can also be utilized in a same, a similar, or an analogous, manner, by any of the herein-described providers, funding services or investors, official or governmental filing offices, agents or brokers, employers, counterparties, media/content providers, digital assets/records storage providers, educational/instructional providers, or social network providers, or any other users.

With reference to FIG. 19, the operation of the apparatus 100 commences at step 1900. At step 1901, the user can access the central processing computer 11 of the central processing computer and distributed ledger and Blockchain technology system 10 using his, her, or its, user communication device 20 or the provider can access the central processing computer 11 using his, her, or its, user communication device 20. At step 1902, the user or the provider can enter his, her, or its, search parameters, for searching for, or to identify and/or to obtain, information regarding any available intellectual property, into his, her, or its, respective user communication device 20. At step 1902, the respective user communication device 20 can generate a search request, which can contain information regarding the search parameters, and the respective user communication device 20 can transmit the search request to the central processing computer 11.

In a preferred embodiment, a user can, for example, enter search parameters pertaining to identifying or locating intellectual property, of any specific kind or type, which is, or which may be, available for purchase by the user or for licensing by the user, or the user can enter any other search parameters pertaining to any interest or involvement the user may desire to have in any commercialization, development, marketing, sale, transfer, licensing, litigating, enforcement, or monetization, of any type or kind of specified or unspecified intellectual property.

In a preferred embodiment, a provider can, for example, enter search parameters pertaining to identifying or locating intellectual property, of any specific kind or type, which is, or which may be, available for commercialization, development, marketing, sale, transfer, licensing, litigating, enforcement, or monetization, of any type or kind of specified or unspecified intellectual property which might involve a service or services provided by, or which can be provided or performed by, the provider, or which might involve any goods or products provided by, or which can be provided or performed by, the provider, or the provider can enter any other search parameters pertaining to any interest or involvement the provider may desire to have in any commercialization, development, marketing, sale, transfer, licensing, litigating, enforcement, or monetization, of any type or kind of specified or unspecified intellectual property.

At step 1903, the central processing computer 11 can receive and process the search request, identify an intellectual property or any number of intellectual properties which are responsive to the search request and/or which are responsive to the search parameters, and can generate a search report. In a preferred embodiment, the search report can contain or include any information, or any link(s) or hyperlink(s) to any information, which is responsive to the search request or responsive to any search parameters. At step 1903, the central processing computer 11 can transmit the search report to the respective user communication device 20 of the user or the provider.

At step 1904, the respective user communication device 20 can receive the search report and/or can process any information contained therein and/or can provide the same and/or any information contained therein to the respective user or provider. At step 1904, the user or the provider can review the information contained in the search report. At step 1904, the respective user can enter information pertaining to or regarding an offer to purchase the intellectual property, can enter information pertaining to or regarding an offer to purchase a foreign counterpart or an international counterpart to or of the intellectual property, can enter information pertaining to or regarding an offer to purchase a derivative right in or under the intellectual property, can enter information pertaining to or regarding an offer to purchase a license, an exclusive license, or non-exclusive license, or a defined field license, in or under the intellectual property or a foreign counterpart or an international counterpart of same, can enter information pertaining to or regarding an offer to purchase a covenant not to sue or a release under the intellectual property or a foreign counterpart or an international counterpart of same, or a derivative right in same, or can enter information regarding a bid or an offer to purchase any of the above rights or interests, or can enter information regarding an offer or a bid to purchase a share of or an interest in and to the intellectual property, any foreign counterpart or an international counterpart same, or derivative right in same, or can enter information regarding an offer to partner with the owner of the intellectual property in commercializing, developing, marketing, selling, transferring, licensing, litigating, enforcing, or monetizing, the intellectual property.

At step 1904, the provider can enter information pertaining to or regarding an offer or a bid to provide any service or services, or any goods or any products, needed or desired in commercializing, developing, marketing, selling, transferring, licensing, litigating, enforcing, or monetizing, the intellectual property, or a foreign counterpart or an international counterpart of same, or a derivative right in same.

At step 1904, the provider can also offer to sell a subscription for his, her, or its, services, or goods or products, which subscription can include, involve, or represent, the provider's obligation to perform a number of services, a number the same service, a number of different services, with each obligated performance of a service being represented by a transferable coupon, or which subscription can include, involve, or represent, the provider's obligation to provide a number of the same goods or products, or a number of different goods or products, with each obligation to provide any goods or products being represented by a transferable coupon. For example, a provider who provides software development services can sell an owner of the intellectual property, or the user who or which posts, lists, or registers, the same, a subscription obligating the provider to perform a number such as, for example, ten (10) software programming projects, with each project being represented by a coupon. The coupons obtained from the provider can thereafter be resold by the owner of the intellectual property, or the user who or which posts, lists, or registers, the same, to another owner of intellectual property, or to another user who or which posts, lists, or registers, the intellectual property. The coupons can also be bartered or traded for other coupons issued by other providers for other services, goods, or products.

At step 1904, the respective user or provider can enter any of the herein-described information, or any other information, for or regarding any intellectual property or any number of intellectual properties or any offer relating to the same or regarding the same. At step 1905, the information entered by the respective user or provider can be transmitted from the user communication device 20 to the central processing computer 11 and can be received by the central processing computer 11. At step 1905, the central processing computer 11 will, for each intellectual property for which the user or provider entered information, generate an intellectual property offer message or an intellectual property bid message, whichever the case may be, and will transmit the respective intellectual property offer message or intellectual property bid message to the user communication device 20 of or associated with the owner of the intellectual property or the user who or which posted, listed, or registered, the same with the central processing computer 11.

In a preferred embodiment, any intellectual property offer message or intellectual property bid message can contain contact information for the respective user or provider making the offer or the bid. At step 1905, the user communication device 20 of or associated with the owner of the intellectual property or the user who or which posted, listed, or registered, the same, can receive the respective intellectual property offer message or the intellectual property bid message and can decide whether or not to respond to the same, accept any offer or bid, or reject any offer or bid, can purchase any subscription(s) and/or associated coupon(s) for any services, goods, or products, offered by any providers, can contact the respective user or provider to discuss or explore any opportunities with the respective user or provider, or can enter into any other discussions or negotiations with the with the respective user or provider.

The central processing computer 11 can also, at step 1905, store, in the database 11H, any information regarding any of the user's or provider's search parameters, any search reports generated by the central processing computer 11, any intellectual property offer message(s) or intellectual property bid message(s) generated and/or transmitted to the owner of the intellectual property or the user who or which posted, listed, or registered, the same, and/or any information regarding any ensuing discussions or activities, or any sale or purchase of any intellectual property, or a foreign counterpart or an international counterpart of same, or a derivative right in same, or any sale of any license, covenant not to sue, or release, regarding or relating to the intellectual property, or any sale of any of the herein-described subscriptions offered by any provider, which may have occurred or which may have taken place between the owner of the intellectual property or the user who or which posted, listed, or registered, the same, and any respective user(s) or providers(s), or the central processing computer 11 can store, in the database 11H, any other data and/or information regarding the user's or the provider's use of the apparatus 100. In a preferred embodiment, any owner of the intellectual property or any user who or which posted, listed, or registered, the same, or any respective user(s) or providers(s) can enter, and transmit to the central processing computer 11, any notes or comments regarding any interactions with the other party.

In a preferred embodiment, at step 1905, any information regarding any of the user's or provider's search parameters, any search reports generated by the central processing computer 11, any intellectual property offer message(s) or intellectual property bid message(s) generated and/or transmitted to the owner of the intellectual property or the user who or which posted, listed, or registered, the same, and/or any information regarding any ensuing discussions or activities, or any sale or purchase of any intellectual property, or a foreign counterpart or an international counterpart of same, or a derivative right in same, or any sale of any license, covenant not to sue, or release, regarding or relating to the intellectual property, or any sale of any of the herein-described subscriptions offered by any provider, which may have occurred or which may have taken place between the owner of the intellectual property or the user who or which posted, listed, or registered, the same, or any other data and/or information regarding the user's or the provider's use of the apparatus 100 can also be stored in the distributed ledger/Blockchain technology system 12 of the central processing computer and distributed ledger and Blockchain technology system 10.

At step 1905, in a situation in which an owner of, or a user who or which posts, lists, or registers, an intellectual property desires to sell, to sell a share or interest, or to sell a license, a covenant not to sue, or a release, in or to the same, or in or to a foreign counterpart or an international counterpart of the same, or in or to a derivative right in the same, the central processing computer 11 can process information regarding any associated or resulting, or other, transaction, and can store information regarding the same in the database 11H. Any information regarding any such associated or resulting, or other, transaction can also be stored in the distributed ledger/Blockchain technology system 12 of the central processing computer and distributed ledger and Blockchain technology system 10.

At step 1905, in a situation in which an owner of, or a user who or which posts, lists, or registers, an intellectual property desires to hire or engage a provider to perform a service or services, or to provide goods or products, the central processing computer 11 can also process information regarding any associated or resulting, or other, transaction and store the same in the database 11. Any such information regarding any associated or resulting, or other, transaction can also be stored in the distributed ledger/Blockchain technology system 12 of the central processing computer and distributed ledger and Blockchain technology system 10. Thereafter, the operation of the apparatus 100 will cease at step 1906.

In this regard, in a preferred embodiment, the apparatus 100 of the present invention can also be utilized in order to process information regarding a commercialization of, a development of, a marketing of, a sale of, a transfer of, a licensing of, a litigating of, an enforcement of, or a monetization of, any intellectual property, or any investment in such activity for or regarding any intellectual property. In a preferred embodiment, the apparatus 100 of the present invention can also be utilized in order allow an owner of an intellectual property, or a user who or which posts, lists, or registers, the same, to sell, transfer, or license, any domestic rights or foreign rights, or any derivative rights, in or to his, her, or its, intellectual property, or to sell shares or interests in the intellectual property, or to sell licenses for the intellectual property, or to sell shares or interests in any activity, effort, or entity, for or regarding the commercialization of, the development of, the marketing of, the sale of, the transfer of, the licensing of, the litigating of, the enforcement of, or the monetization of, his, her, or its, intellectual property.

It is important to note that the embodiment of FIG. 19 can also be utilized in a same, a similar, and/or in an analogous, manner by any providers, funding services or investors, official or governmental filing offices, agents or brokers, employers, counterparties, media/content providers, digital assets/records storage providers, educational/instructional providers, or social network providers, or any other users, in order to search for or to identify or to locate, intellectual property for which they can offer services, or goods, or products, for the commercialization, development, marketing, sale, transfer, licensing, litigating, enforcement, and/or monetization, of the same, or which can provide any providers, funding services or investors, official or governmental filing offices, agents or brokers, employers, counterparties, media/content providers, digital assets/records storage providers, educational/instructional providers, or social network providers, or any other users, with information pertaining to their own activities and/or operations.

In another preferred embodiment, the apparatus 100 and method of the present invention can also be utilized to provide a centralized entity or repository, or a clearinghouse, for storing and/or for providing information regarding any of the herein-described providers, funding services or investors, official or governmental filing offices, agents or brokers, employers, counterparties, media/content providers, digital assets/records storage providers, educational/instructional providers, or social network providers, or any other users, and/or any of the respective services, goods, or products, which are or which can be provided by each of the same.

The apparatus 100 and method of the present invention can also provide any information regarding the type or kinds of the respective services, goods, or products, which are or can be provided by each of the herein-described providers, funding services or investors, official or governmental filing offices, agents or brokers, employers, counterparties, media/content providers, digital assets/records storage providers, educational/instructional providers, or social network providers, or any other users, or any information regarding the work schedule(s) or scheduling information for or regarding any of the same, or any information regarding instructions for engaging, contracting, or otherwise doing business with, or hiring, any providers, funding services or investors, official or governmental filing offices, agents or brokers, employers, counterparties, media/content providers, digital assets/records storage providers, educational/instructional providers, or social network providers, or any other user(s), or any information regarding any subscriptions offered by the same, or any information regarding a coupons, which can be transferable or nontransferable, for any services, goods, or products, offered by any of the same, which coupons can be stand alone coupons or coupons associated with, or be part of or related to, any subscription.

In a preferred embodiment, any number of the herein-described providers, funding services or investors, official or governmental filing offices, agents or brokers, employers, counterparties, media/content providers, digital assets/records storage providers, educational/instructional providers, or social network providers, or any other user(s), can post, list, or register, himself, herself, or itself, any of the respective services, goods, or products, he, she, or it, provides or can provide, with the apparatus 100 of the present invention and/or the central processing computer 11, in order to provide services, goods, or products, which can be utilized by an owner of intellectual property or by any user who or which posts, lists, or registers, the same with the central processing computer 11 in commercializing, developing, marketing, selling, transferring, licensing, litigating, enforcing, and/or monetizing, his, her, or its, intellectual property.

In a preferred embodiment, any and/or all information regarding any of the posted, listed, or registered, providers, funding services or investors, official or governmental filing offices, agents or brokers, employers, counterparties, media/content providers, digital assets/records storage providers, educational/instructional providers, or social network providers, or any other user(s), and/or their respective services, goods, or products, can be stored by in the database 11H of the central processing computer 11 and can be searchable by any of the herein-described users who or which are owners of an intellectual property or who or which posts, lists, or registers, an intellectual property with the central processing computer 11.

In a preferred embodiment, a user who or which is an owner of an intellectual property or who or which posts, lists, or registers, the same with the central processing computer 11 can, for example, search available providers, funding services or investors, official or governmental filing offices, agents or brokers, employers, counterparties, media/content providers, digital assets/records storage providers, educational/instructional providers, or social network providers, or any other users, and/or their respective services, goods, or products, for purposes of gaining access to, obtaining, or securing, the respective services, goods, or products, of one or more of the respective providers, funding services or investors, official or governmental filing offices, agents or brokers, employers, counterparties, media/content providers, digital assets/records storage providers, educational/instructional providers, or social network providers, or any other users, for purposes of commercializing, developing, marketing, selling, transferring, licensing, litigating, enforcing, or monetizing, his, her, or its, intellectual property or for any other purpose or purposes.

In a preferred embodiment, a user who or which is an owner of intellectual property or who or which posts, lists, or registers, the same with the central processing computer 11 can, for example, search available providers, funding services or investors, official or governmental filing offices, agents or brokers, employers, counterparties, media/content providers, digital assets/records storage providers, educational/instructional providers, or social network providers, or any other users, and/or any of the respective services, goods, or products, offered or provided by same for purposes of gaining access to, obtaining, or securing, the respective services, goods, or products, of one or more of the respective providers, funding services or investors, official or governmental filing offices, agents or brokers, employers, counterparties, media/content providers, digital assets/records storage providers, educational/instructional providers, or social network providers, or any other users, for purposes of commercializing, developing, marketing, selling, transferring, licensing, litigating, enforcing, or monetizing, his, her, or its, intellectual property or for any other purpose or purposes.

In a preferred embodiment, a provider of a service or a provider of goods or products can, for example, post, list, or register, information, or a link(s) or hyperlink(s) to information, regarding, describing, pertaining to, or relating to, its services, goods, or products, or any subscriptions for the same or relating to the same, or any information sessions or any broadcasts, seminars, or any other activities or events, or any schedule(s) or scheduling information for or regarding the same, offered by the provider, or any provider work schedule(s) or scheduling information, which can be searchable by, and which can be utilized by, an owner of an intellectual property or by a user who or which posted, listed, or registered, the same, in order to assist the respective owner or posting, listing, or registering, user in gaining access to, obtaining, or securing, the respective services, goods, or products, of one or more providers for purposes of commercializing, developing, marketing, selling, transferring, licensing, litigating, enforcing, or monetizing, his, her, or its, intellectual property, or for any other purpose or purposes.

In a preferred embodiment, a funding service or an investor can, for example, post, list, or register, information, or a link(s) or hyperlink(s) to information, regarding, describing, pertaining to, or relating to, its services, funding services, information regarding his, her, or its, investing criteria, and any other information, and/or any services, goods, or products, or any subscriptions for the same or relating to the same, or any information sessions or any broadcasts, seminars, or any other activities or events, or any schedule(s) or scheduling information for or regarding the same, offered by the funding service or the investor, or any work schedule(s) or scheduling information for or regarding the same, which can be searchable by, and which can be utilized by, an owner of an intellectual property or by a user who or which posted, listed, or registered, the same, in order to assist the respective owner or the posting, listing, or registering, user in gaining access to, obtaining, or securing, funding, capital, or an investment, or any other services, goods, or products, of one or more funding services or investors for purposes of commercializing, developing, marketing, selling, transferring, licensing, litigating, enforcing, or monetizing, his, her, or its, intellectual property, or for any other purpose or purposes.

In a preferred embodiment, an official or governmental filing office can, for example, post, list, or register, information, or a link(s) or hyperlink(s) to information, regarding, describing, pertaining to, or relating to, its services, goods, or products, or any information sessions or any broadcasts, seminars, or any other activities or events, or any schedule(s) or scheduling information for or regarding the same, or any subscriptions for the same or relating to the same, which can be searchable by, and which can be utilized by, an owner of an intellectual property or by a user who or which posted, listed, or registered, the same, in order to assist the respective owner or posting, listing, or registering, user in gaining access to, obtaining, or securing, the respective services, goods, or products, of one or more official or governmental filing offices for purposes of protecting, commercializing, developing, marketing, selling, transferring, licensing, litigating, enforcing, or monetizing, his, her, or its, intellectual property, or for any other purpose or purposes.

In a preferred embodiment, an agent or a broker can, for example, post, list, or register, information, or a link(s) or hyperlink(s) to information, regarding, describing, pertaining to, or relating to, its representation services or offerings, services, goods, or products, or any work schedule(s) or scheduling information, or any subscriptions for the same or relating to the same, which can be searchable by, and which can be utilized by, an owner of an intellectual property or by a user who or which posted, listed, or registered, the same, in order to assist the respective owner or posting, listing, or registering, user in gaining access to, obtaining, or securing, the respective services, goods, or products, of one or more agents or brokers for purposes of commercializing, developing, marketing, selling, transferring, licensing, litigating, enforcing, or monetizing, his, her, or its, intellectual property, or for any other purpose or purposes.

In a preferred embodiment, a social networking company or entity can, for example, post, list, or register, information, or a link(s) or hyperlink(s) to information, regarding, describing, pertaining to, or relating to, its services, goods, or products, and/or its social networks and/or social networking groups and/or subgroups, or networking groups, and/or its members, and/or its information sessions, classes, or seminars, or group chat rooms, group chat room events or activities, social networking forums, seminars, or webinars, and/or any other activities or events, or any schedules or scheduling information for the same or regarding the same, or any subscriptions for the same or relating to the same, pertaining to, relating, or regarding, any types or kinds or topics or networking activities pertaining to, relating, or regarding, commercializing, developing, marketing, selling, transferring, licensing, litigating, enforcing, or monetizing, intellectual property of any type or kind, or for any other purpose or purposes.

In a preferred embodiment, a media/content provider, media source, information service or information source, news information service or news information source, can, for example, post, list, or register, information, or a link(s) or hyperlink(s) to information, regarding, describing, pertaining to, or relating to, its services, goods, or products, or any broadcasts or shows, or any schedules or scheduling information for the same or regarding the same, or any subscriptions for the same or relating to the same, pertaining to, relating, or regarding, any media, information, or news, business news, financial news, legal news, intellectual property news, current events, world news or current events, national news or current events, local news or current events, or any other information which may be useful or helpful to any owner or posting, listing, or registering, user, pertaining to, relating, or regarding, commercializing, developing, marketing, selling, transferring, licensing, litigating, enforcing, or monetizing, intellectual property of any type or kind, or for any other purpose or purposes.

In a preferred embodiment, any owner of intellectual property, or any posting, listing, or registering, user, or any other user, of the apparatus 100 of the present invention, can, for example, perform a search of available providers, funding services or investors, official or governmental filing offices, agents or brokers, employers, counterparties, media/content providers, digital assets/records storage providers, educational/instructional providers, or social network providers, or any other users, and/or any of the respective services, goods, or products, or other offerings, offered or provided by the same, in order to obtain information regarding, or to gain access to, or to engage the services of, or to hire or to enter into a contract or other working relationship with, to purchase services, goods, or products, from, or to otherwise obtain information or assistance of any type or kind from, any of the herein-described providers, funding services or investors, official or governmental filing offices, agents or brokers, employers, counterparties, media/content providers, digital assets/records storage providers, educational/instructional providers, or social network providers, or any other users, for purposes or commercializing, developing, marketing, selling, transferring, licensing, litigating, enforcing, or monetizing, his, her, or its, intellectual property or for any other purpose or purposes.

Figure 20:
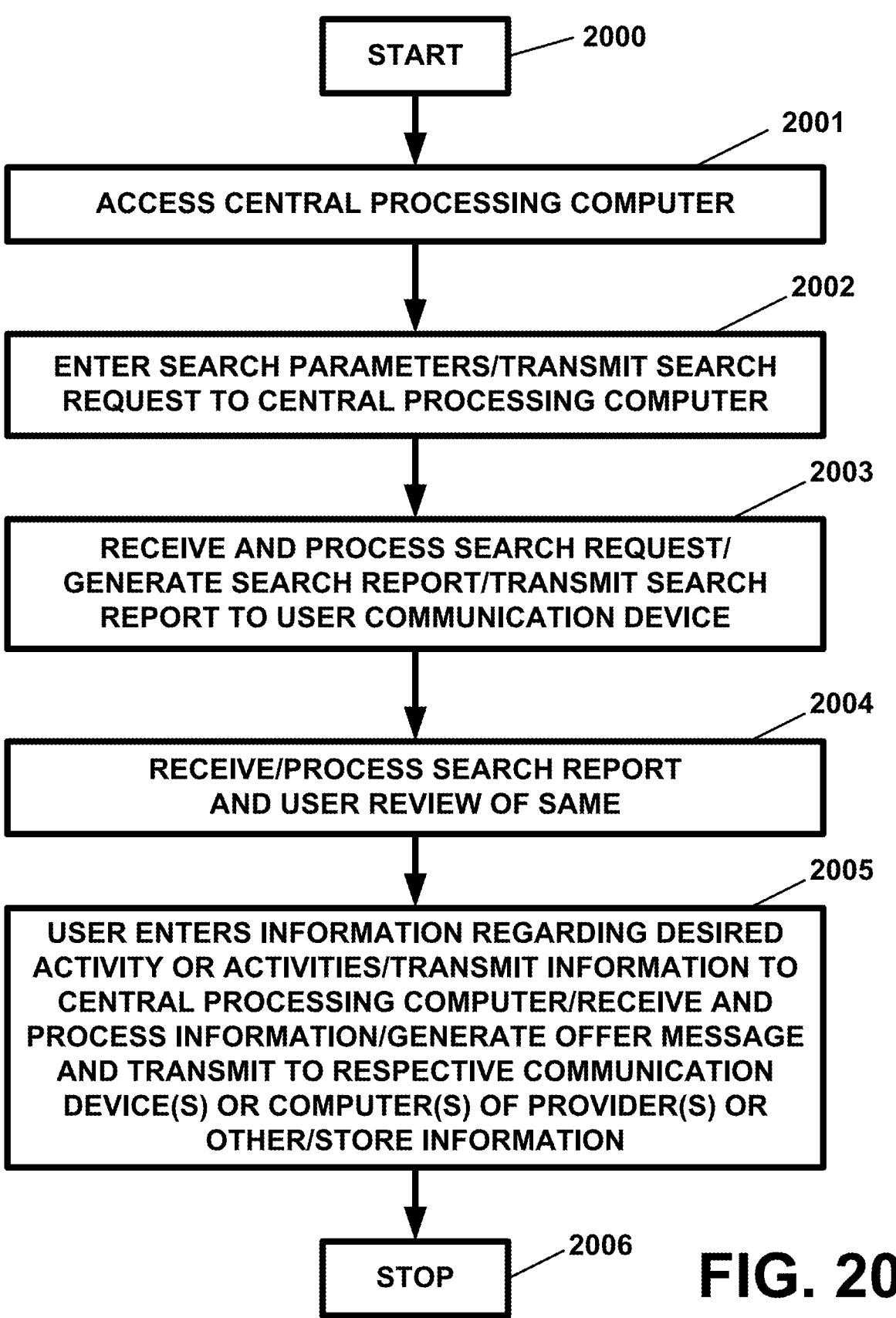
FIG. 20 illustrates another preferred embodiment method for utilizing the apparatus of the present invention, in flow diagram form.

FIG. 20 illustrates another preferred embodiment method of utilizing the apparatus 100 of the present invention, in flow diagram form. While the embodiment of FIG. 20 is described and illustrated as being utilized by an owner of intellectual property or a posting, listing, or registering, user of the same, for any purpose or purposes, it is important to note that the embodiment of FIG. 20 can also be utilized in a same, a similar, or an analogous, manner, by any of the herein-described providers, funding services or investors, official or governmental filing offices, agents or brokers, employers, counterparties, media/content providers, digital assets/records storage providers, educational/instructional providers, or social network providers, or any other users.

With reference to FIG. 20, the operation of the apparatus 100 commences at step 2000. At step 2001, the user can access the central processing computer 11 using his, her, or its, user communication device 20. At step 2002, the user can enter his, her, or its, search parameters, for searching to identify and/or to obtain information regarding any provider(s), funding service(s) or investor(s), official or governmental filing office(s), agent(s) or broker(s), employers, counterparties, media/content providers, digital assets/records storage providers, educational/instructional providers, or social network providers, or any other user(s), and/or its or their respective services, goods, or products, or other offerings, and/or any subscription(s) regarding same in the user communication device 20. At step 2002, the user communication device 20 can generate a search request, which can contain information regarding the search parameters, and the user communication device 20 can transmit to search request to the central processing computer 11.

In a preferred embodiment, a user can, for example, enter search parameters pertaining to or for identifying or for locating a provider or providers who can provide the user with a service(s) needed or desired for commercializing, developing, marketing, selling, transferring, licensing, litigating, enforcing, or monetizing, his, her, or its, intellectual property or for any other purpose or purposes, or the user can enter search parameters pertaining to or for identifying or for locating a funding service(s) or an investor(s) who or which might be interested in providing any needed or desired funding for or any needed or desired investment for commercializing, developing, marketing, selling, transferring, licensing, litigating, enforcing, or monetizing, his, her, or its, intellectual property or for any other purpose or purposes, or the user can enter search parameters pertaining to or for identifying or for locating an official or governmental filing office(s) which can provide any needed or desired services, products, or goods, regarding protecting, commercializing, developing, marketing, selling, transferring, licensing, litigating, enforcing, or monetizing, his, her, or its, intellectual property or for any other purpose or purposes, or the user can enter search parameters pertaining to or for identifying or for locating an agent(s) or a broker(s) who or which can provide any needed or desired representation or other services, goods, or products, for or regarding commercializing, developing, marketing, selling, transferring, licensing, litigating, enforcing, or monetizing, his, her, or its, intellectual property or for any other purpose or purposes, or the user can enter search parameters pertaining to or for identifying or for locating any social network(s) or social networking members who or which can provide the user with any needed or desired information, advise, or any other needed or desired services, goods, products, for or regarding commercializing, developing, marketing, selling, transferring, licensing, litigating, enforcing, or monetizing, his, her, or its, intellectual property or for any other purpose or purposes, or the user can enter search parameters pertaining to or for identifying or for locating a media/content provider, or media source(s), or information service(s) or information source(s), or news service(s) or news source(s), which or who can provide the user with any needed or desired or information, or any other services, goods, or products, needed or desired for or regarding commercializing, developing, marketing, selling, transferring, licensing, litigating, enforcing, or monetizing, his, her, or its, intellectual property or for any other purpose or purposes, or the user can enter search parameters pertaining to or for identifying or for locating any other user, employer, counterparty, media/content provider, digital assets/records storage provider, educational/instructional provider, or social network provider, who or which can provide the user with any needed or desired services, goods, or products, for or regarding commercializing, developing, marketing, selling, transferring, licensing, litigating, enforcing, or monetizing, his, her, or its, intellectual property or for any other purpose or purposes. At step 2002, the user an also enter any search parameters for or regarding any services, goods, or products, or any coupon(s) or subscription(s) for the same, offered by or provided by any of the herein-described provider(s), funding service(s) or investor(s), official or governmental filing office(s), agent(s) or broker(s), employer(s), counterparty or counterparties, media/content provider(s), digital assets/records storage provider(s), educational/instructional provider(s), or social network provider(s), or by any other user(s). In a preferred embodiment, any coupon(s) or subscription(s) can also be made available for sale or for re-sale.

At step 2002, any search parameters can be transmitted, in a search request, to the central processing computer 11. At step 2003, the central processing computer 11 can receive and process the search request, identify any provider(s), funding service(s) or investor(s), official or governmental filing office(s), agent(s) or broker(s), employers, counterparties, media/content providers, digital assets/records storage providers, educational/instructional providers, or social network providers, or any other user(s), which are responsive to the search request and/or which are responsive to the search parameters, and can generate a search report. At step 2003, the central processing computer 11 can transmit the search report to the user communication device 20 of the user. At step 2003, the central processing computer 11 can also identify any of the herein-described coupon(s) or subscription(s) which can or might be available for sale or for resale. In a preferred embodiment, the search report can contain or can include any information, or any link(s) or hyperlink(s) to any information which is responsive to the search request or responsive to any search parameters.

At step 2004, the user communication device 20 can receive the search report and/or process any information contained therein and/or can provide the same, or any information contained therein, to the user via the display device 20E. At step 2004, the user can review the information contained in the search report regarding any provider(s), funding service(s) or investor(s), official or governmental filing office(s), agent(s) or broker(s), employer(s), counterparty or counterparties, media/content provider(s), digital assets/records storage provider(s), educational/instructional provider(s), or social network provider(s), or any other user(s), and/or any of their respective offerings, or their respective services, goods, or products, offerings or any other offerings.

At step 2005, the user can, for each provider, funding service or investor, official or governmental filing office, agent or broker, employer, counterparty, media/content provider, digital assets/records storage provider, educational/instructional provider, or social network provider, or other user, utilize the user communication device 20 in order to enter information in order to contact the provider, the funding service or the investor, the official or governmental filing office, the agent or the broker, the employer, the counterparty, the media/content provider, the digital assets/records storage provider, the educational/instructional provider, or the social network provider, in order to discuss engaging the services of, or purchasing any service(s), goods, or products, or any other offerings, provided by the respective provider, funding service or investor, official or governmental filing office, agent or broker, employer, counterparty, media/content provider, digital assets/records storage provider, educational/instructional provider, or social network provider, in order to request to hire, or engage the services, of the same, or in order to hire, or engage, or reserve, the services, of the same. In a preferred embodiment, the user can request to hire, or to engage the services, or in order to hire, to engage, or to reserve, the services of the respective provider, funding service or investor, official or governmental filing office, agent or broker, employer, counterparty, media/content provider, digital assets/records storage provider, educational/instructional provider, or social network provider, from, via, or using information contained in, the work schedule(s) or scheduling information of same, the work schedule(s) or scheduling information of the respective provider, funding service or investor, official or governmental filing office, agent or broker, employer, educational/instructional provider, or social network provider. In a preferred embodiment, the user can also purchase, place an order to purchase, subscribe to, purchase a subscription for, or bid on or for, any service(s), goods, or products, from or offered or provided by a respective provider, funding service or investor, official or governmental filing office, agent or broker, employer, counterparty, media/content provider, digital assets/records storage provider, educational/instructional provider, or social network provider. In another preferred embodiment, the user can join or participate in, or engage in, any social networking activity identified as being provided by a social networking provider, purchase any coupon(s) for any services, goods, or products, from a respective provider, funding service or investor, official or governmental filing office, agent or broker, employer, counterparty, media/content provider, digital assets/records storage provider, educational/instructional provider, or social network provider, or perform any other activity or to take any other action for or regarding commercializing, developing, marketing, selling, transferring, licensing, litigating, enforcing, or monetizing, his, her, or its, intellectual property or for any other purpose or purposes.

At step 2005, the user can engage in any activity or activities or take any action using any of the information, or any link(s) or hyperlink(s) to any information provided in the search report with any of the provider(s), funding service(s) or investor(s), official or governmental filing office(s), agent(s) or broker(s), employer(s), counterparty or counterparties, media/content provider(s), digital assets/records storage provider(s), educational/instructional provider(s), or social network provider(s), or any other user(s), identified in the search report. At any time during or after step 2005, the user can make contact with any of the provider(s), funding service(s) or investor(s), official or governmental filing office(s), agent(s) or broker(s), employer(s), counterparty or counterparties, media/content provider(s), digital assets/records storage provider(s), educational/instructional provider(s), or social network provider(s), or any other user(s), identified in the search report. In a preferred embodiment, contact can be made by email communication, text message communication, telephone call, video chat, video conference call, or any combination of the same.

At step 2005, any information entered by the user can be transmitted from the user communication device 20 to the central processing computer 11 and can be received by the central processing computer 11 in the database 11H. At step 2005, any information entered by the user can be transmitted from the user communication device 20 to the central processing computer 11 and can also be stored in the in the distributed ledger/Blockchain technology system 12 of the central processing computer and distributed ledger and Blockchain technology system 10.

In a preferred embodiment, at step 2005, the central processing computer 11 can generate an offer message for each provider, funding service or investor, official or governmental filing office, agent or broker, employer, counterparty, media/content provider, digital assets/records storage provider, educational/instructional provider, or social network provider, or other user, for whom or for which the user may enter information for contacting the same in order to discuss engaging the services of the same, or for purchasing any service(s), goods, or products, or any other offerings, from the same, or in order to request to hire, or to engage the services of, the same, or in order to hire, to engage, or to reserve, the services, of a respective provider, funding service or investor, official or governmental filing office, agent or broker, employer, counterparty, media/content provider, digital assets/records storage provider, educational/instructional provider, or social network provider, or other user, from, via, or using, information contained in the work schedule(s) or scheduling information of the same, or in order to purchase, place an order to purchase, or to bid on or for, any service(s), goods, or products, from or offered or provided by the same, or in order to purchase a subscription for, or to subscribe to, any service(s), goods, or products, from the same, or in order to join or participate in, or engage in, any social networking activity, or in order to purchase any coupon(s) for any services, goods, or products, from the same. At step 2005, the central processing computer 11 can transmit each generated offer message to the respective user communication device 20 or counterparty communication device or any other respective computer or communication device 30, 50, 60, 70, or 80, of the respective provider, funding service or investor, official or governmental filing office, agent or broker, employer, counterparty, media/content provider, digital assets/records storage provider, educational/instructional provider, or social network provider, or other user. In a preferred embodiment, any offer message can also contain contact information for the user making the offer.

At step 2005, the respective communication device or computer 20, 30, 40, 50, 60, 70, or 80, can receive the respective offer message and the respective provider, funding service or investor, official or governmental filing office, agent or broker, employer, counterparty, media/content provider, digital assets/records storage provider, educational/instructional provider, or social network provider, or other user, can decide whether or not to respond to the same, can accept any offer or bid, can reject any offer or bid, and/or cam sell any subscriptions and/or associated coupons for any services, goods, or products, and/or can contact the user to discuss or explore any opportunities with the user, and/or can enter into any other discussions or negotiations with the user. In a preferred embodiment, contact can be made by email communication, text message communication, telephone call, video chat, video conference call, or any combination of the same.

The central processing computer 11 can also, at step 2005, store, in the database 11H, any information regarding any of the user's search parameters, any search reports generated by the central processing computer 11, any actions taken by the user or any activities engaged in by the user, any of the user's offer messages, any actions taken by, or any activities engaged in by, any of the providers, funding services or investors, official or governmental filing offices, agents or brokers, employers, counterparties, media/content providers, digital assets/records storage providers, educational/instructional providers, or social network providers, or other users, to whom or to which an offer message was transmitted, and/or any information regarding any associated or resulting, or other, transaction regarding or resulting from the offer message, and/or or any other data and/or information regarding the user's use of the apparatus 100.

At step 2005, any information regarding any of the user's search parameters, any search reports generated by the central processing computer 11, any actions taken by the user or any activities engaged in by the user, any of the user's offer messages, any actions taken by, or any activities engaged in by, any of the providers, funding services or investors, official or governmental filing offices, agents or brokers, employers, counterparties, media/content providers, digital assets/records storage providers, educational/ instructional providers, or social network providers, or other users, to whom or to which an offer message was transmitted, and/or any information regarding any associated or resulting, or other, transaction regarding or resulting from the offer message, and/or or any other data and/or information regarding the user's use of the apparatus 100, can also be stored in the distributed ledger/Blockchain technology system 12 of the central processing computer and distributed ledger and Blockchain technology system 10.

At step 2005, any provider, funding service or investor, official or governmental filing office, agent or broker, employer, counterparty, media/content provider, digital assets/records storage provider, educational/instructional provider, or social network provider, or other user, who or which is posted, listed, or registered, with the apparatus 100 can enter and transmit to the central processing computer 11 any notes or comments regarding any interactions with the user, and the same can be stored in the database 11H and/or in the distributed ledger/Blockchain technology system 12 of the central processing computer and distributed ledger and Blockchain technology system 10.

At step 2005, central processing computer 11 can also process any information regarding an associated or resulting, or other, transaction between the user and any provider, funding service or investor, official or governmental filing office, agent or broker, employer, counterparty, media/content provider, digital assets/records storage provider, educational/instructional provider, or social network provider, or other user, and store any information regarding same in the database 11H, and/or any information regarding the same can also be stored in the distributed ledger/Blockchain technology system 12 of the central processing computer and distributed ledger and Blockchain technology system 10.

At any time during or after step 2005, the user can make contact with any provider, funding service or investor, official or governmental filing office, agent or broker, employer, counterparty, media/content provider, digital assets/records storage provider, educational/instructional provider, or social network provider, or other user. In a preferred embodiment, contact can be made by email communication, text message communication, telephone call, video chat, video conference call, or any combination of the same. Thereafter, the operation of the apparatus 100 will cease at step 2006.

In another preferred embodiment, any information regarding any contract or agreement entered into by the user and any provider, funding service or investor, official or governmental filing office, agent or broker, employer, counterparty, media/content provider, digital assets/records storage provider, educational/instructional provider, or social network provider, or other user, at any time before, during, or after, any of the steps 2001 to 2005, and any information regarding any payment or other consideration provided by the user pursuant to the contract or agreement, can be stored in the database 11H of the central processing computer and/or in the distributed ledger/Blockchain technology system 12 of the central processing computer and distributed ledger and Blockchain technology system 10.

In another preferred embodiment, the apparatus 100 and/ or the central processing computer 11 can receive, such as with receiver 11G, information regarding an intellectual property. In a preferred embodiment, the information regarding the intellectual property can include at least an identifier for the intellectual property, which can signify that the intellectual property has been previously filed with an intellectual property examining entity or an official filing office, and information regarding a goal or an objective for commercializing or monetizing the intellectual property.

The apparatus and/or the central processing computer 11 can process, such as with CPU 11A, the information regarding the intellectual property. In a preferred embodiment, the apparatus 100, the central processing computer 11, or the CPU 11A, can be specially programmed to process the information regarding the intellectual property, can be specially programmed to create a posting, a listing, or a registration, of, for, or associated with, the intellectual property, and/or can be specially programmed to generate a profile for the intellectual property. In a preferred embodiment, the apparatus 100, the central processing computer 11, or the CPU 11A, can generate or create the posting, the listing, or the registration, for the intellectual property, and can also generate the profile for the intellectual property as well as a report containing information regarding the intellectual property.

In a preferred embodiment, the apparatus 100, the central processing computer 11, or the CPU 11A, can process information for identifying a provider of a service, services, goods, or products, or for identifying a funding service or an investor, based on the goal or the objective for commercializing or monetizing the intellectual property, using information regarding the goal or the objective for commercializing or monetizing the intellectual property which can be previously stored in the database 11H. In another preferred embodiment, the apparatus 100 the central processing computer 11, or the transmitter 11F can transmit the report to any one or more of the user communication device 20 of a user or provider of any type or kind.

In another preferred embodiment, the apparatus 100 and/ or the central processing computer 11 can receive, such as with receiver 11G, information regarding a provider of a service, services, goods, or products, or information regarding an investor or a funding entity. In a preferred embodiment, the information regarding the provider can include at least information regarding qualifications or credentials of the provider and desired projects or jobs sought by the provider, in order to assist an owner of intellectual property to commercialize or monetize the intellectual property. In a preferred embodiment, the information regarding the investor or the funding entity can include information regarding investment criteria, services provided, and/or information regarding projects or intellectual property opportunities in or for which the investor or funding entity is interested in investing.

The apparatus and/or the central processing computer 11 can process, such as with CPU 11A, any information regarding the provider or the investor or funding entity. In a preferred embodiment, the apparatus 100, the central processing computer 11, or the CPU 11A, can be specially programmed to generate a posting or a listing of or for the provider or the investor or funding entity and can be specially programmed to generate a profile for the provider or the investor or funding entity. In a preferred embodiment, the apparatus 100, the central processing computer 11, or the CPU 11A, can generate or create the posting, the listing, or the registration, of, for, or associated with, the provider or the investor or the funding entity, and can also generate the profile for the provider or the investor or the funding entity as well as a report containing information regarding the provider or the investor or the funding entity.

In a preferred embodiment, the apparatus 100, the central processing computer 11, or the CPU 11A, can process information for identifying the owner of intellectual property based on the qualifications or credentials of the provider, or based on the qualifications, credentials, or investment criteria, of the investor or funding entity, and for identifying desired projects or jobs sought by the provider, to assist an owner of intellectual property to commercialize or monetize the intellectual property, or for identifying investment opportunities for the investor or funding entity, or for assisting the intellectual property owner in commercializing or monetizing the intellectual property. In another preferred embodiment, the apparatus 100 the central processing computer 11, or the transmitter 11F can transmit the report to any one or more of the user communication device 20 of or used by the intellectual property owner, or the provider, or the funding service, investor, or funding entity.

In any and/or all of the embodiments described herein, any of the information, messages, reports, profiles, intellectual property profiles, provider reports, funding service/investor reports, agent/broker reports, intellectual property reports, intellectual property report messages, provider profiles, intellectual property user reports, provider reports, intellectual property user report messages, notification messages, alert messages, intellectual property ("IP") notification messages, IP alert messages, provider availability notification messages, provider availability alert messages, search requests, search reports, intellectual property offer messages, intellectual property bid messages, offer messages, or any other messages, reports, or communications, described herein which can be generated by the apparatus 100 of the present invention or by the central processing computer 11, or which can be generated by, transmitted from, or received by, any user communication device 20, or any of the other computers or communication devices 30, 40, 50, 60, 70, or 80, described herein can be stored in the database 11H of the central processing computer 11, and/or can be stored in the distributed ledger/Blockchain technology system 12 of the central processing computer and distributed ledger and Blockchain technology system 10, and/or any of the same can also contain or include an advertisement, advertising information, marketing information, or marketing materials.

In any and/or all of the embodiments described herein, the apparatus 100 and/or the central processing computer 11 can also process any transactions, or any transaction information associated with same, which can or may occur, or which can or may transpire, with, between, or involving, any of the herein-described users, providers, funding services or investors, official or governmental filing offices, agents or brokers, employers, counterparty or counterparties, media/content providers, digital assets/records storage providers, educational/instructional providers, or social network providers, or other users, pursuant to their respective utilization of the apparatus 100 of the present invention and/or otherwise, and information regarding the same can also be stored in the database 11H and/or in the distributed ledger/Blockchain technology system 12 of the central processing computer and distributed ledger and Blockchain technology system 10.

In any and/or all of the embodiments described herein, the apparatus 100 and/or the central processing computer 11 can also administer, or process data and/or information for administering, financial accounts or any other accounts for or on behalf of any of the herein-described users, providers, funding services or investors, official or governmental filing offices, agents or brokers, employers, counterparty or counterparties, media/content providers, digital assets/records storage providers, educational/instructional providers, or social network providers, or other users, and information regarding the same can also be stored in the database 11H and/or in the distributed ledger/Blockchain technology system 12 of the central processing computer and distributed ledger and Blockchain technology system 10.

The apparatus 100 and method of the present invention can be utilized in many applications by providing a venue by which owners of intellectual property can sell or license their intellectual property, any foreign or international counterparts of to same, or any derivative rights to same, or any portion of same, or can identify, find, or locate, providers for commercializing, developing, marketing, selling, transferring, licensing, litigating, enforcing, or monetizing, their intellectual property, any foreign or international counterparts of the same, or any derivative rights to the same, or any portion of the same, or can identify, find, or locate, a funding service or investor to fund any commercialization, development, marketing, sales, transfers, licensing, litigation, enforcement, or monetization, of their intellectual property, any foreign or international counterparts of the same, or any derivative rights to the same, or any portion of the same, or can identify, find, or locate, official or governmental filing offices and/or any services, goods, or products, of the same, for protecting, commercializing, developing, marketing, selling, transferring, licensing, litigating, enforcing, or monetizing, their intellectual property, any foreign or international counterparts of the same, or any derivative rights to the same, or any portion of the same, or can identify, find, or locate, agents or brokers for obtaining representation and/or any other services for and/or regarding commercializing, developing, marketing, selling, transferring, licensing, litigating, enforcing, or monetizing, their intellectual property, any foreign or international counterparts of the same, or any derivative rights to the same, or any portion of the same, or can identify, find, or locate, social networks for obtaining information and/or networking contacts for and/or regarding commercializing, developing, marketing, selling, transferring, licensing, litigating, enforcing, or monetizing, their intellectual property, any foreign or international counterparts of the same, or any derivative rights to the same, or any portion of the same, or can identify, find, or locate, media services or media sources, information services or information sources, or news information services or news information sources, for obtaining any information for or regarding commercializing, developing, marketing, selling, transferring, licensing, litigating, enforcing, or monetizing, their intellectual property, any foreign or international counterparts of the same, or any derivative rights to the same, or any portion of the same or can utilize the apparatus 100 and method of the present invention in any other manner which can allow them to benefit from the same.

The apparatus 100 and method of the present invention can also be utilized as a venue by which any providers of any services, goods, or products, any funding services or investors, any official or governmental filing offices, agents or brokers, employers, counterparty or counterparties, media/content providers, digital assets/records storage providers, educational/instructional providers, or social network providers, or other users, can respectively find clients or customers for their respective services, goods, or products, can obtain work projects, or can obtain orders for their goods, products, or services, can find investment opportunities, or can find new work projects from and/or for existing clients or customers, or can find prospective or potential customers or clients for disseminating information regarding their respective services, goods, or products, or can find clients or customers to represent, or can find new social networking members and/or provide enhanced services for their members, or can advertise and/or market themselves and/or their respective services, goods, or products, to others, or can disseminate information which can be utilized by any of the herein-described users, providers, funding services or investors, official or governmental filing offices, agents or brokers, employers, counterparty or counterparties, media/content providers, digital assets/records storage providers, educational/instructional providers, or social network providers, or other users, or can establish business relationships with any users, providers, funding services or investors, official or governmental filing offices, agents or brokers, employers, counterparty or counterparties, media/content providers, digital assets/records storage providers, educational/instructional providers, or social network providers, or other users, who or which utilize the apparatus 100, or can utilize the apparatus 100 and method of the present invention in any other manner which can allow them to benefit from the same.

In another preferred embodiment, as well as in any and/or all of the embodiments described herein, any of the herein-described information, messages, reports, profiles, intellectual property profiles, provider reports, funding service/investor reports, agent/broker reports, intellectual property reports, intellectual property report messages, provider profiles, intellectual property user reports, provider reports, intellectual property user report messages, notification messages, alert messages, intellectual property ("IP") notification messages, IP alert messages, provider availability notification messages, provider availability alert messages, search requests, search reports, intellectual property offer messages, intellectual property bid messages, offer messages, or any other messages, reports, or communications, which can be generated by the apparatus 100 of the present invention or by the central processing computer 11, or which can be generated by, transmitted from, or received by, any user communication device 20, or any of the communication devices 30, 40, 50, 60, 70, and/or 80, described herein, can contain or can include data or information regarding, or a link(s) to or a hyperlink(s) to, any of the herein-described users, providers, funding services or investors, official or governmental filing offices, agents or brokers, employers, counterparty or counterparties, media/content providers, digital assets/records storage providers, educational/instructional providers, or social network providers, or other users, or any respective communication device(s) or computer(s) 20, 30, 40, 50, 60, 70, or 80 associated with or corresponding to the same, or to any social network, or to any Internet chat room or discussion group, Internet forum, on-line chat room or discussion group, on-line forum, class or instructional session or broadcast, seminar, or webinar, or to any advertisement(s) or advertising materials, or to any marketing information or marketing materials, or to any work schedule(s) or scheduling information, of, for, regarding, relating to, or associated with or corresponding to, the same.

In another preferred embodiment, as well as in any and/or all of the embodiments described herein, any of the herein-described information, messages, reports, profiles, intellectual property profiles, provider reports, funding service/investor reports, agent/broker reports, intellectual property reports, intellectual property report messages, provider profiles, intellectual property user reports, provider reports, intellectual property user report messages, notification messages, alert messages, intellectual property ("IP") notification messages, IP alert messages, provider availability notification messages, provider availability alert messages, search requests, search reports, intellectual property offer messages, intellectual property bid messages, offer messages, or any other messages, reports, or communications, which can be generated by the apparatus 100 of the present invention or by the central processing computer 11, or which can be generated by, transmitted from, or received by, any user communication device 20 described herein and/or any of the other herein-described communication devices or computers 30, 40, 50, 60, 70, and/or 80, can be stored in the database 11H and/or in the distributed ledger/Blockchain technology system 12 of the central processing computer and distributed ledger and Blockchain technology system 10.

In another preferred embodiment, as well as in any and/or all of the embodiments described herein, any of the herein-described information, messages, reports, profiles, intellectual property profiles, provider reports, funding service/investor reports, agent/broker reports, intellectual property reports, intellectual property report messages, provider profiles, intellectual property user reports, provider reports, intellectual property user report messages, notification messages, alert messages, intellectual property ("IP") notification messages, IP alert messages, provider availability notification messages, provider availability alert messages, search requests, search reports, intellectual property offer messages, intellectual property bid messages, offer messages, or any other messages, reports, or communications, which can be generated by the apparatus 100 of the present invention or by the central processing computer 11, or which can be generated by, transmitted from, or received by, any user communication device 20 described herein and/or any of the other herein-described communication devices or computers 30, 40, 50, 60, 70, and/or 80, can contain or can and/or include a video recording and/or an audio recording which can be recorded by any respective user or operator of the respective central processing computer 11, any user communication device 20, or any of the other herein-described communication devices or computers 30, 40, 50, 60, 70, and/or 80.

In a preferred embodiment, any of the herein-described information, messages, reports, profiles, intellectual property profiles, provider reports, funding service/investor reports, agent/broker reports, intellectual property reports, intellectual property report messages, provider profiles, intellectual property user reports, provider reports, intellectual property user report messages, notification messages, alert messages, intellectual property ("IP") notification messages, IP alert messages, provider availability notification messages, provider availability alert messages, search requests, search reports, intellectual property offer messages, intellectual property bid messages, offer messages, or any other messages, reports, or communications, can contain, include, or have attached thereto, a video clip, a video message, an audio clip, and/or an audio message.

For example, any time a respective user or operator of any central processing computer 11, user communication device 20, or computer or communication device 30, 40, 50, 60, 70, and/or 80, (hereinafter the "sending user") performs a transaction with or using the same, or any time the sending user desires to communicate with any other user or operator of the apparatus 100 (hereinafter the "receiving user"), a video and/or an audio recording of the sending user can be made with or using the respective video and/or audio recording device(s) 20J, 30J, 40J, 50J, 60J, 70J, and/or 80J, and the video and/or audio recording can be transmitted in, along with, or attached to, any message, correspondence, or communication, which is sent or transmitted by the sending user to the receiving user.

In another preferred embodiment, as well as in any and/or all of the embodiments described herein, the apparatus 100 and/or the central processing computer 11 can also process any data or information for allowing any of the herein-described users, providers, funding services or investors, official or governmental filing offices, agents or brokers, employers, counterparty or counterparties, media/content providers, digital assets/records storage providers, educational/instructional providers, or social network providers, or other users, or any agents or employees of the same, to engage in chat room sessions or discussions and/or video chat room sessions or discussions with one another, and/or in groups.

In another preferred embodiment, as well as in any and/or all of the embodiments described herein, the apparatus 100 and/or the central processing computer 11 can also process any data or information for allowing any of the herein-described users, providers, funding services or investors, official or governmental filing offices, agents or brokers, employers, counterparty or counterparties, media/content providers, digital assets/records storage providers, educational/instructional providers, or social network providers, or other users, or any agents or employees of same, to engage in bartering or in trading activities regarding or involving any services, goods, products, or other offerings which can be provided via the apparatus 100 and method of the present invention.

In another preferred embodiment, as well as any and/or all of the embodiments described herein, the apparatus 100 and/or the central processing computer 11 can process data or information for advertising, marketing, or selling, franchises of any type or kind.

In another preferred embodiment, as well as any and/or all of the embodiments described herein, the apparatus 100 and/or the central processing computer 11 can process data or information for advertising, marketing, or selling, media rights of any type or kind.

In another preferred embodiment, as well as any and/or all of the embodiments described herein, the apparatus 100 and/or the central processing computer 11 can process data or information for advertising, marketing, or selling, publicity rights of any type or kind.

In another preferred embodiment, as well as any and/or all of the embodiments described herein as well as, in particular, the preferred embodiments of FIGS. 10 to 20, any and/or all transactions which are or which can be processed by any of the herein-described central processing computer(s) 11, the user communication devices 20, and/or any of the computers or communications devices 30, 40, 50, 60, 70, and/or 80, can be processed by the distributed ledger/ Blockchain technology system 12 of the central processing computer and distributed ledger and Blockchain technology system 10 and/or can be processed by using any distributed ledger and/or distributed ledger technology or technologies, and/or by using Blockchain technology and/or technologies, Bitcoin technology and/or technologies, Ethereum technology and/or technologies, cryptocurrency technology and/or technologies, and/or smart contract technology and/or technologies, and/or peer-to-peer technology or technologies, and/or any technology or technologies related thereto or which can be utilized in conjunction therewith.

In another preferred embodiment, as well as in any and/or all of the preferred and/or other embodiments described herein, any combination of a centralized system, such as by using the central processing computer 11, to perform certain functions, and a decentralized system, such as a distributed ledger system, which can use any type or kind of suitable or appropriate Blockchain technology and/or technologies, Bitcoin technology and/or technologies, Ethereum technology and/or technologies, cryptocurrency technology and/or technologies, and/or smart contract technology and/or technologies, and/or peer-to-peer technology and/or technologies, to perform other functions, can also be utilized in the operation and use of the apparatus 100 and/or in or in connection or in conjunction with any of the herein-described described central processing computer(s) 11, user communication devices 20, and/or any of the other computers or communication devices 30, 40, 50, 60, 70, and/or 80, described herein.

In another preferred embodiment, as well as in any and/or all of the preferred and/or other embodiments described herein, a distributed ledger system, which can use Blockchain technology and/or technologies, Bitcoin technology and/or technologies, Ethereum technology and/or technologies, cryptocurrency technology and/or technologies, and/or smart contract technology and/or technologies, and/or peer-to-peer technology and/or technologies, can be utilized instead of using a central processing computer 11, or instead of using any other of the herein-described user communication devices 20, and/or any of the other computers or communication devices 30, 40, 50, 60, 70, and/or 80, described herein.

The apparatus 100 and method of the present invention can also be utilized in any number of ways in order to process information for, regarding, and/or for facilitating, the commercialization, development, marketing, sale, transfer, licensing, litigating, enforcement, or monetization, of any type or kind of intellectual property, which can be beneficial to the various users, providers, funding services or investors, official or governmental filing offices, agents or brokers, employers, counterparty or counterparties, media/ content providers, digital assets/records storage providers, educational/instructional providers, or social network providers, or other users, described herein or otherwise who or which utilize the apparatus 100 and method of the present invention.

As provided herein, the apparatus 100 and methods of the present invention, and/or the preferred embodiments of at least FIGS. 15-20, can be utilized in a number of ways, and in a number of applications, in order to provide a distributed ledger and blockchain technology-based recruitment, job searching and/or project searching, scheduling, and/or asset tracking and/or monitoring, which can be utilized in commercializing, developing, marketing, selling, transferring, licensing, litigating, enforcing, and/or monetizing, intellectual property and/or intellectual properties of any type or kind.

In another preferred embodiment, as well in as any and/or all of the embodiments described herein, any of the preferred embodiments of FIGS. 10, 11, 12, 13, and/or 14, can be utilized in connection with, in conjunction with, in combination with, or along with, any of the preferred embodiments of FIGS. 15, 16, 17, 18, 19, and/or 20, so as to utilize the inventions of the embodiments of FIGS. 10, 11, 12, 13, and/or 14, in commercializing, developing, marketing, selling, transferring, licensing, litigating, enforcing, and/or monetizing, intellectual property and/or intellectual properties of any type or kind. In this regard, each of the preferred embodiments of FIGS. 10, 11, 12, 13, and/or 14, as well as any and/or all of the embodiments described herein, can also be utilized to in order to provide distributed ledger and blockchain technology-based recruitment, job searching and/or project searching, scheduling, and/or asset tracking and/or monitoring, activities in order to perform or to engage in intellectual property commercialization activities or monetization activities and/or in order to perform or to engage in any recruitment, job searching and/or project searching, scheduling, and/or asset tracking and/or monitoring, activities which relate to, or which can relate to, any commercialization, development, marketing, sales of or selling, transfer, licensing, litigation regarding or the litigating, enforcement, and/or monetization, of intellectual property and/or intellectual properties of any type or kind. In this manner, in additional preferred embodiments of each of the preferred embodiments of FIGS. 10, 11, 12, 13, and/or 14, the apparatus 100 and methods of the present invention can also be utilized to in order to provide distributed ledger and blockchain technology-based recruitment, job searching and/or project searching, scheduling, and/or asset tracking and/or monitoring, activities in order to perform or to engage in intellectual property commercialization activities or monetization activities and/or in order to perform or to engage in any recruitment, job searching and/or project searching, scheduling, and/or asset tracking and/or monitoring, activities which relate to, or which can relate to, any commercialization, development, marketing, sales of or selling, transfer, licensing, litigation regarding or the litigating, enforcement, and/or monetization, of intellectual property and/or intellectual properties of any type or kind.

As provided herein, the apparatus 100 and methods of the present invention can provide a distributed ledger and blockchain technology-based recruitment, job searching and/or project searching, scheduling, and/or asset and/or consideration tracking, and/or monitoring, apparatus and method, which can be used in any number of applications and/or in any number and/or variety of ways.

While the present invention has been described and illustrated in various preferred and alternate embodiments, such descriptions are merely illustrative of the present invention and are not to be construed to be limitations thereof. In this regard, the present invention encompasses all modifications, variations, and/or alternate, embodiments, with the scope of the present invention being limited only by the claims which follow.

What is claimed is:

1. A computer-implemented method, comprising:
transmitting, from a central processing computer, information regarding a commercialization of an intellectual property, an electronic forum to a first user communication device, wherein the first user communication device is associated with a first individual, and further wherein the central processing computer is specially programmed to process job searching information or project searching information regarding a job or a project related to a commercialization activity or to a monetization activity regarding a first intellectual property, wherein the first intellectual property is a patent, a patent application, a trademark, a copyright, a trade secret, a franchise right, a publicity right, or a media right, and further wherein the central processing computer comprises a database which stores information regarding the first intellectual property and an intellectual property profile for the first intellectual property;
processing, with or using the central processing computer, information for posting, listing, or registering, the first intellectual property;
generating, with or using the central processing computer, the intellectual property profile for the first intellectual property;

storing information regarding the first intellectual property and the intellectual property profile for the first intellectual property in the database;
facilitating, via the electronic forum, a first job searching activity, a first project searching activity, or a first assignment searching activity, regarding a commercialization activity or a monetization activity regarding the first intellectual property;
facilitating, via the electronic forum, a submission of a first application for a first job, a first project, or a first assignment, with a first employer or a first hiring entity associated with or regarding the first intellectual property;
displaying, in or via the electronic forum, information regarding the first application for the first job, the first project, or the first assignment, wherein the information regarding the first application for the first job, the first project, or the first assignment, includes information regarding a date of application, a date of consideration, feedback from the first employer or the first hiring entity, a decision, or a date of a decision,
receiving, with or using the central processing computer, a request to perform a searching activity for a second job, a second project, or a second assignment, regarding a commercialization activity or a monetization activity regarding the first intellectual property or regarding a second intellectual property, wherein the request is transmitted from the first user communication device;
generating, with or using the central processing computer, a search report in response to the request;
transmitting, from the central processing computer, the search report to the first user communication device;
providing or displaying, via the electronic forum, the search report, wherein the search report contains information regarding the second job, the second project, or the second assignment, regarding the first intellectual property or regarding the second intellectual property;
facilitating, with or using the central processing computer, a submission of a second application for the second job, the second project, or the second assignment, regarding the first intellectual property or regarding the second intellectual property;
facilitating or providing, with or using the central processing computer, a videoconference call between the first user communication device and a second user communication device, wherein the second user communication device is associated with a second individual, wherein the second individual is, or is associated with, an owner of a first intellectual property or a second intellectual property;
recording, with or using the first user communication device, the second user communication device, or the central processing computer, the videoconference call as a digital recording;
translating an audio conversation between the first individual and the second individual during the videoconference call into a written transcript;
generating, with or using the central processing computer, an electronic forum report containing information regarding an activity or activities of the first individual in or during the electronic forum;
generating, with or using the central processing computer, a videoconference call summary message, wherein the videoconference call summary message includes information regarding a date and time of the videoconference call, information regarding the videoconference call, information regarding, or a link or a hyperlink to, the digital recording, and information regarding, or a link or a hyperlink to, the written transcript;

storing the videoconference call summary message in the central processing computer and in a distributed ledger and blockchain technology system;

storing the intellectual property profile in a digital asset records computer;

receiving, with or using the first user communication device, a status message transmitted from the second user communication device or from a third user communication device, wherein the third user communication device is associated with the first employer or the first hiring entity or is associated with a second employer or a second hiring entity, and further wherein the status message contains information indicating that the first application has been received, information indicating that the first application has been reviewed, information indicating that the first application has been referred for further consideration, information regarding a name or position of a person who has reviewed, is reviewing, or will be reviewing, the first application, or information regarding a decision to hire the first individual for the first job, the first project, or the first assignment, or wherein the status message contains information indicating that the second application has been received, information indicating that the second application has been reviewed, information indicating that the second application has been referred for further consideration, information regarding a name or position of a person who has reviewed, is reviewing, or will be reviewing, the second application, or information regarding a decision to hire the first individual for the second job, the second project, or the second assignment, and further wherein the status message contains a link or a hyperlink to the electronic forum;

generating, with or using the central processing computer, a job alert message or a project alert message, wherein the job alert message or the project alert message contains information regarding a third job, a third project, or a third assignment, and further wherein the job alert message or the project alert message contains a link or a hyperlink to the electronic forum;

receiving and processing, with or using the central processing computer, information regarding a candidate search performed by the first employer or the first hiring entity, by the second employer or the second hiring entity, or by a third employer or a third hiring entity;

generating, with or using the central processing computer, a candidate search report; and transmitting, from the central processing computer, the candidate search report to the second user communication device, the third user communication device, or a fourth user communication device, wherein the fourth user communication device is associated with the third employer or the third hiring entity.

2. The computer-implemented method of claim 1, wherein the first job searching activity or the first project searching activity is a job searching activity, and wherein the individual is a job applicant.

3. The computer-implemented method of claim 1, wherein the first job searching activity or the first project searching activity is a project searching activity, and wherein the individual is an independent contractor or a freelancer.

4. The computer-implemented method of claim 1, further comprising:

processing information regarding a scheduling activity.

5. The computer-implemented method of claim 1, further comprising:

utilizing information regarding a position or location of the first user communication device, as determined by a global positioning device associated with the first user communication device, in processing a job search, a project search, or an assignment search.

6. The computer-implemented method of claim 1, further comprising:

utilizing information regarding a position or location of the first user communication device, as determined by a global positioning device associated with the first user communication device, in processing a recruitment search.

7. The computer-implemented method of claim 1, further comprising:

processing information for scheduling an appointment for the first individual, wherein the appointment is an appointment with an employer, a hiring entity, or an intellectual property owner.

8. The computer-implemented method of claim 1, further comprising:

processing information for scheduling an appointment for the first individual, wherein the individual is an independent contractor.

9. The computer-implemented method of claim 1, further comprising:

processing information for scheduling an appointment for the first individual, wherein the appointment is an appointment with an athlete, an actor or actress, an entertainer, or a celebrity.

10. The computer-implemented method of claim 1, further comprising:

processing information for identifying a provider of a service, services, goods, or products, or for identifying a funding service or an investor; and transmitting a report to a fourth user communication device, wherein the fourth user communication device is associated with the provider, the funding service, or the investor.

11. The computer-implemented method of claim 1, further comprising:

receiving and processing information for creating a posting, a listing, or a registration, of, for, or associated with, a provider of a service, services, goods, or products, or a funding service or an investor;

generating a profile for the provider, the funding service, or the investor;

generating a report containing information regarding the provider, the funding service, or the investor;

processing information for identifying a third intellectual property or an owner of a third intellectual property; and transmitting the report to the first user communication device or to a fourth user communication device, wherein the fourth user communication device is associated with the intellectual property or the intellectual property owner.

12. The computer-implemented method of claim 1, wherein the intellectual property is a patent or a patent application.

13. The computer-implemented method of claim 1, wherein the intellectual property is a publicity right.

14. The computer-implemented method of claim 1, wherein the intellectual property is a copyright.

15. The computer-implemented method of claim 1, further comprising:

processing information for scheduling an appointment for the first individual, wherein the first individual is a job applicant.

16. The computer-implemented method of claim 1, wherein the intellectual property is a media right.

17. The computer-implemented method of claim 1, wherein the intellectual property is a trade secret.

18. The computer-implemented method of claim 1, wherein the intellectual property is a trademark.

19. The computer-implemented method of claim 1, further comprising:

generating an intellectual property report containing information regarding a provider, a funding service, an agent, or a broker.

20. The computer-implemented method of claim 1, further comprising:

transmitting the intellectual property report to the second user communication device.

\* \* \* \* \*